(12) United States Patent
Fujisaki

(10) Patent No.: US 8,195,142 B1
(45) Date of Patent: *Jun. 5, 2012

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,492

(22) Filed: Jul. 9, 2011

Related U.S. Application Data

(63) Continuation of application No. 12/901,496, filed on Oct. 9, 2010, which is a continuation of application No. 11/623,061, filed on Jan. 13, 2007, now Pat. No. 8,041,348, which is a continuation of application No. 10/905,365, filed on Dec. 30, 2004, now abandoned.

(60) Provisional application No. 60/521,265, filed on Mar. 23, 2004.

(51) Int. Cl.
*H04M 3/00* (2006.01)

(52) U.S. Cl. ..... 455/418; 370/486; 370/487; 455/404.2; 455/456.1; 455/457; 455/456.2; 455/456.3; 455/456.4; 455/456.5; 455/456.6; 455/414.1; 455/412.2; 455/566; 455/158.4; 455/158.5; 709/214; 709/216; 709/242

(58) Field of Classification Search ........... 370/486, 370/487; 709/214, 216, 242; 455/404.2, 455/456.1, 457, 456.2, 456.3, 456.4, 456.5, 455/456.6, 414.1, 412.2, 418, 566, 158.4, 455/158.5

See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,438,357 A | 8/1995 | McNelley | |
| 5,446,904 A | 8/1995 | Belt et al. | |
| 5,479,476 A | 12/1995 | Finke-Anlauff | |
| 5,530,472 A | 6/1996 | Bregman et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |

(Continued)

FOREIGN PATENT DOCUMENTS

JP   H11/195137 A1   7/1999

(Continued)

OTHER PUBLICATIONS

HI Corporation's company history (http://www.hicorp.co.jp/english/corporate/history.html).

(Continued)

*Primary Examiner* — Patrick Edouard
*Assistant Examiner* — Shantell Heiber

(57) ABSTRACT

The communication device comprising a voice communication implementer, an attached file email implementer, a geographic location implementer, a dictionary implementer, a schedule notification implementer, a multiple visual data display implementer, a touch panel implementer, a communication device search implementer, a resume enabled video game implementer, and an oncoming destination name notification implementer.

18 Claims, 1 Drawing Sheet

U.S. PATENT DOCUMENTS

| | | | |
|---|---|---|---|
| 5,648,768 | A | 7/1997 | Bouve |
| 5,675,630 | A | 10/1997 | Beatty |
| 5,687,331 | A | 11/1997 | Volk et al. |
| 5,732,383 | A | 3/1998 | Foladare et al. |
| 5,758,280 | A | 5/1998 | Kimura |
| 5,772,586 | A | 6/1998 | Heinonen et al. |
| 5,778,304 | A | 7/1998 | Grube et al. |
| 5,786,846 | A | 7/1998 | Hiroaki |
| 5,802,460 | A | 9/1998 | Parvulescu et al. |
| 5,805,672 | A | 9/1998 | Barkat et al. |
| 5,812,930 | A | 9/1998 | Zavrel |
| 5,825,408 | A | 10/1998 | Yuyama et al. |
| 5,844,824 | A | 12/1998 | Newman et al. |
| 5,902,349 | A | 5/1999 | Endo et al. |
| 5,916,024 | A | 6/1999 | Von Kohorn |
| 5,918,180 | A | 6/1999 | Dimino |
| 5,959,661 | A | 9/1999 | Isono |
| 6,009,336 | A | 12/1999 | Harris et al. |
| 6,011,973 | A | 1/2000 | Valentine et al. |
| 6,034,715 | A | 3/2000 | Ishida et al. |
| 6,043,752 | A | 3/2000 | Hisada et al. |
| 6,073,034 | A | 6/2000 | Jacobsen et al. |
| 6,081,265 | A | 6/2000 | Nakayama et al. |
| 6,115,597 | A | 9/2000 | Kroll et al. |
| 6,128,594 | A | 10/2000 | Gulli et al. |
| 6,144,848 | A | 11/2000 | Walsh et al. |
| 6,148,212 | A | 11/2000 | Park et al. |
| 6,161,134 | A | 12/2000 | Wang et al. |
| 6,167,283 | A | 12/2000 | Korpela et al. |
| 6,192,343 | B1 | 2/2001 | Morgan et al. |
| 6,198,942 | B1 | 3/2001 | Hayashi et al. |
| 6,202,060 | B1 | 3/2001 | Tran |
| 6,216,013 | B1 | 4/2001 | Moore et al. |
| 6,216,158 | B1 | 4/2001 | Luo et al. |
| 6,222,482 | B1 | 4/2001 | Gueziec |
| 6,223,029 | B1 | 4/2001 | Stenman et al. |
| 6,225,944 | B1 | 5/2001 | Hayes |
| 6,236,832 | B1 | 5/2001 | Ito |
| 6,243,039 | B1 | 6/2001 | Elliot |
| 6,249,720 | B1 | 6/2001 | Kubota et al. |
| 6,253,075 | B1 | 6/2001 | Beghtol et al. |
| 6,265,988 | B1 | 7/2001 | LeMense et al. |
| 6,285,317 | B1 | 9/2001 | Ong |
| 6,285,757 | B1 | 9/2001 | Carroll et al. |
| 6,292,666 | B1 | 9/2001 | Siddiqui et al. |
| 6,292,747 | B1 | 9/2001 | Amro et al. |
| 6,311,011 | B1 | 10/2001 | Kuroda |
| 6,311,077 | B1 | 10/2001 | Bien |
| 6,332,122 | B1 | 12/2001 | Ortega et al. |
| 6,333,684 | B1 | 12/2001 | Kang |
| 6,363,320 | B1 | 3/2002 | Chou |
| 6,366,651 | B1 | 4/2002 | Griffith et al. |
| 6,366,782 | B1 | 4/2002 | Fumarolo et al. |
| 6,374,221 | B1 | 4/2002 | Haimi-Cohen |
| 6,385,466 | B1 | 5/2002 | Hirai et al. |
| 6,385,541 | B1 | 5/2002 | Blumberg et al. |
| 6,385,654 | B1 | 5/2002 | Tanaka |
| 6,405,033 | B1 | 6/2002 | Kennedy, III et al. |
| 6,411,198 | B1 | 6/2002 | Hirai et al. |
| 6,411,822 | B1 | 6/2002 | Kraft |
| 6,415,138 | B2 | 7/2002 | Sirola et al. |
| 6,421,470 | B1 | 7/2002 | Nozaki et al. |
| 6,421,602 | B1 | 7/2002 | Bullock et al. |
| 6,430,498 | B1 | 8/2002 | Maruyama et al. |
| 6,438,380 | B1 | 8/2002 | Bi et al. |
| 6,442,404 | B1 | 8/2002 | Sakajiri |
| 6,445,802 | B1 | 9/2002 | Dan |
| 6,477,387 | B1 | 11/2002 | Jackson et al. |
| 6,486,867 | B1 | 11/2002 | Kopp et al. |
| 6,487,422 | B1 | 11/2002 | Lee |
| 6,512,919 | B2 | 1/2003 | Ogasawara |
| 6,518,956 | B1 | 2/2003 | Sato |
| 6,519,566 | B1 | 2/2003 | Boyer et al. |
| 6,526,293 | B1 | 2/2003 | Matsuo |
| 6,529,742 | B1 | 3/2003 | Yang |
| 6,532,035 | B1 | 3/2003 | Saari et al. |
| 6,538,558 | B2 | 3/2003 | Sakazume et al. |
| 6,542,750 | B2 | 4/2003 | Hendrey et al. |
| 6,542,814 | B2 | 4/2003 | Polidi et al. |
| 6,553,310 | B1 | 4/2003 | Lopke |
| 6,567,745 | B2 | 5/2003 | Fuchs et al. |
| 6,567,984 | B1 | 5/2003 | Allport |
| 6,600,975 | B2 | 7/2003 | Moriguchi et al. |
| 6,606,504 | B1 | 8/2003 | Mooney et al. |
| 6,611,753 | B1 | 8/2003 | Millington |
| 6,615,186 | B1 | 9/2003 | Kolls |
| 6,618,704 | B2 | 9/2003 | Kanevsky et al. |
| 6,622,018 | B1 | 9/2003 | Erekson |
| 6,630,958 | B2 | 10/2003 | Tanaka et al. |
| 6,631,271 | B1 | 10/2003 | Logan |
| 6,647,251 | B1 | 11/2003 | Siegle et al. |
| 6,650,877 | B1 | 11/2003 | Tarbouriech et al. |
| 6,650,894 | B1 | 11/2003 | Berstis et al. |
| 6,658,272 | B1 | 12/2003 | Lenchik et al. |
| 6,658,461 | B1 | 12/2003 | Mazo |
| 6,662,023 | B1 | 12/2003 | Helle |
| 6,681,120 | B1 | 1/2004 | Kim |
| 6,690,932 | B1 | 2/2004 | Barnier et al. |
| 6,701,148 | B1 | 3/2004 | Wilson et al. |
| 6,707,942 | B1 | 3/2004 | Cortopassi et al. |
| 6,711,399 | B1 | 3/2004 | Granier |
| 6,725,022 | B1 | 4/2004 | Clayton et al. |
| 6,728,531 | B1 | 4/2004 | Lee et al. |
| 6,738,643 | B1 | 5/2004 | Harris |
| 6,738,711 | B2 | 5/2004 | Ohmura et al. |
| 6,763,226 | B1 | 7/2004 | McZeal, Jr. |
| 6,772,174 | B1 | 8/2004 | Pettersson |
| 6,775,361 | B1 | 8/2004 | Arai et al. |
| 6,779,030 | B1 | 8/2004 | Dugan et al. |
| 6,788,928 | B2 | 9/2004 | Kohinata et al. |
| 6,795,715 | B1 | 9/2004 | Kubo et al. |
| 6,812,954 | B1 | 11/2004 | Priestman et al. |
| 6,819,939 | B2 | 11/2004 | Masamura |
| 6,820,055 | B2 | 11/2004 | Saindon et al. |
| 6,836,654 | B2 | 12/2004 | Decotignie |
| 6,850,209 | B2 | 2/2005 | Mankins et al. |
| 6,865,372 | B2 | 3/2005 | Mauney et al. |
| 6,870,828 | B1 | 3/2005 | Giordano, III |
| 6,883,000 | B1 | 4/2005 | Gropper |
| 6,891,525 | B2 | 5/2005 | Ogoro |
| 6,895,084 | B1 | 5/2005 | Saylor et al. |
| 6,895,256 | B2 | 5/2005 | Harma et al. |
| 6,895,259 | B1 | 5/2005 | Blank nee Keller et al. |
| 6,898,321 | B1 | 5/2005 | Knee et al. |
| 6,898,765 | B2 | 5/2005 | Matthews, III et al. |
| 6,901,383 | B1 | 5/2005 | Ricketts et al. |
| 6,904,298 | B2 | 6/2005 | Arai et al. |
| 6,912,544 | B1 | 6/2005 | Weiner |
| 6,922,630 | B2 | 7/2005 | Maruyama et al. |
| 6,937,868 | B2 | 8/2005 | Himmel et al. |
| 6,947,728 | B2 | 9/2005 | Tagawa et al. |
| 6,954,645 | B2 | 10/2005 | Tsai et al. |
| 6,958,675 | B2 | 10/2005 | Maeda et al. |
| 6,961,559 | B1 | 11/2005 | Chow et al. |
| 6,968,184 | B2 | 11/2005 | Criss et al. |
| 6,968,206 | B1 | 11/2005 | Whitsey-Anderson |
| 6,970,178 | B2 | 11/2005 | Tanioka et al. |
| 6,970,703 | B2 | 11/2005 | Fuchs et al. |
| 6,992,699 | B1 | 1/2006 | Vance et al. |
| 6,999,757 | B2 | 2/2006 | Bates et al. |
| 6,999,802 | B2 | 2/2006 | Kim |
| 7,003,598 | B2 | 2/2006 | Kavanagh |
| 7,007,239 | B1 | 2/2006 | Hawkins et al. |
| 7,012,999 | B2 | 3/2006 | Ruckart |
| 7,019,770 | B1 | 3/2006 | Katz |
| 7,028,077 | B2 | 4/2006 | Toshimitsu et al. |
| 7,030,880 | B2 | 4/2006 | Tanioka et al. |
| 7,035,666 | B2 | 4/2006 | Silberfenig et al. |
| 7,058,356 | B2 | 6/2006 | Slotznick |
| 7,076,052 | B2 | 7/2006 | Yoshimura |
| 7,081,832 | B2 | 7/2006 | Nelson et al. |
| 7,085,578 | B2 | 8/2006 | Barclay et al. |
| 7,085,739 | B1 | 8/2006 | Winter et al. |
| 7,089,298 | B2 | 8/2006 | Nyman et al. |
| 7,106,846 | B2 | 9/2006 | Nguyen et al. |
| 7,107,081 | B1 | 9/2006 | Fujisaki |
| 7,117,152 | B1 | 10/2006 | Mukherji et al. |

| | | | | | | |
|---|---|---|---|---|---|---|
| 7,117,504 | B2 | 10/2006 | Smith et al. | 2002/0082059 A1 | 6/2002 | Nariai et al. |
| 7,126,951 | B2 | 10/2006 | Belcea et al. | 2002/0085700 A1 | 7/2002 | Metcalf |
| 7,127,238 | B2 | 10/2006 | Vandermeijden et al. | 2002/0094806 A1 | 7/2002 | Kamimura |
| 7,127,271 | B1 | 10/2006 | Fujisaki | 2002/0097984 A1 | 7/2002 | Abecassis |
| 7,130,630 | B1 | 10/2006 | Enzmann et al. | 2002/0098857 A1 | 7/2002 | Ishii |
| 7,142,810 | B2 | 11/2006 | Oesterling | 2002/0102960 A1 | 8/2002 | Lechner |
| 7,142,890 | B2 | 11/2006 | Irimajiri et al. | 2002/0103872 A1 | 8/2002 | Watanabe |
| 7,190,880 | B2 | 3/2007 | Cookson et al. | 2002/0110246 A1 | 8/2002 | Gosior et al. |
| 7,218,916 | B2 | 5/2007 | Nonami | 2002/0115469 A1 | 8/2002 | Rekimoto et al. |
| 7,224,851 | B2 | 5/2007 | Kinjo | 2002/0120589 A1 | 8/2002 | Aoki |
| 7,224,987 | B1 | 5/2007 | Bhela et al. | 2002/0120718 A1 | 8/2002 | Lee |
| 7,233,781 | B2 | 6/2007 | Hunter et al. | 2002/0123336 A1 | 9/2002 | Kamada |
| 7,233,795 | B1 | 6/2007 | Ryden | 2002/0127997 A1 | 9/2002 | Karlstedt et al. |
| 7,239,742 | B2 | 7/2007 | Ohtani et al. | 2002/0133342 A1 | 9/2002 | McKenna |
| 7,251,255 | B1 | 7/2007 | Young | 2002/0137470 A1 | 9/2002 | Baron et al. |
| 7,254,408 | B2 | 8/2007 | Kim | 2002/0137503 A1 | 9/2002 | Roderique |
| 7,260,416 | B2 | 8/2007 | Shippee | 2002/0137526 A1 | 9/2002 | Shinohara |
| 7,266,186 | B1 | 9/2007 | Henderson | 2002/0142763 A1 | 10/2002 | Kolsky |
| 7,274,952 | B2 | 9/2007 | Hayashi | 2002/0147645 A1 | 10/2002 | Alao et al. |
| 7,277,711 | B2 | 10/2007 | Nyu | 2002/0151326 A1 | 10/2002 | Awada et al. |
| 7,321,783 | B2 | 1/2008 | Kim et al. | 2002/0151327 A1 | 10/2002 | Levitt |
| 7,346,373 | B2 | 3/2008 | Kim | 2002/0154632 A1 | 10/2002 | Wang et al. |
| 7,372,447 | B1 | 5/2008 | Jacobsen et al. | 2002/0157101 A1 | 10/2002 | Schrader et al. |
| 7,383,067 | B2 | 6/2008 | Phillips et al. | 2002/0164996 A1 | 11/2002 | Dorenbosch |
| 7,426,264 | B1 | 9/2008 | Henderson | 2002/0165850 A1 | 11/2002 | Roberts et al. |
| 7,433,845 | B1 | 10/2008 | Flitcroft et al. | 2002/0168959 A1 | 11/2002 | Noguchi et al. |
| 7,450,709 | B2 | 11/2008 | Gonzalez et al. | 2002/0173344 A1 | 11/2002 | Cupps et al. |
| 7,489,768 | B1 | 2/2009 | Strietzel | 2002/0177407 A1 | 11/2002 | Mitsumoto |
| 7,532,879 | B1 | 5/2009 | Fujisaki | 2002/0178009 A1 | 11/2002 | Firman |
| 7,551,899 | B1 | 6/2009 | Nicolas et al. | 2002/0178225 A1 | 11/2002 | Madenberg et al. |
| 7,657,252 | B2 | 2/2010 | Futami | 2002/0183045 A1 | 12/2002 | Emmerson et al. |
| 7,707,592 | B2 | 4/2010 | Wesslen et al. | 2002/0191951 A1 | 12/2002 | Sodeyama et al. |
| 7,707,602 | B2 | 4/2010 | Cragun et al. | 2002/0196378 A1 | 12/2002 | Slobodin et al. |
| 7,769,364 | B2 | 8/2010 | Logan et al. | 2002/0198813 A1 | 12/2002 | Patterson et al. |
| 7,787,857 | B2 | 8/2010 | Peterman | 2002/0198936 A1 | 12/2002 | McIntyre et al. |
| 7,787,887 | B2 | 8/2010 | Gupta et al. | 2003/0003967 A1 | 1/2003 | Ito |
| 7,853,295 | B1 | 12/2010 | Fujisaki | 2003/0006879 A1 | 1/2003 | Kang et al. |
| 7,853,297 | B1 | 12/2010 | Fujisaki | 2003/0007556 A1 | 1/2003 | Oura et al. |
| 7,873,349 | B1 | 1/2011 | Smith et al. | 2003/0013483 A1 | 1/2003 | Ausems et al. |
| 7,899,410 | B2 | 3/2011 | Rakshani et al. | 2003/0014286 A1 | 1/2003 | Cappellini |
| 7,941,141 | B2 | 5/2011 | Shoykhet et al. | 2003/0016189 A1 | 1/2003 | Abe et al. |
| 7,953,439 | B2 | 5/2011 | Rofougaran | 2003/0017857 A1 | 1/2003 | Kitson et al. |
| 2001/0000249 | A1 | 4/2001 | Oba et al. | 2003/0018744 A1 | 1/2003 | Johanson et al. |
| 2001/0005826 | A1 | 6/2001 | Shibuya | 2003/0018748 A1 | 1/2003 | McKenna, Jr. |
| 2001/0011293 | A1 | 8/2001 | Murakami et al. | 2003/0032389 A1 | 2/2003 | Kim et al. |
| 2001/0029425 | A1 | 10/2001 | Myr | 2003/0032406 A1 | 2/2003 | Minear et al. |
| 2001/0035829 | A1 | 11/2001 | Yu et al. | 2003/0033214 A1 | 2/2003 | Mikkelsen et al. |
| 2001/0037191 | A1 | 11/2001 | Furuta et al. | 2003/0038800 A1 | 2/2003 | Kawahara |
| 2001/0041590 | A1 | 11/2001 | Silberfenig et al. | 2003/0045301 A1 | 3/2003 | Wollrab |
| 2001/0049470 | A1 | 12/2001 | Mault et al. | 2003/0045311 A1 | 3/2003 | Larikka et al. |
| 2002/0002044 | A1 | 1/2002 | Naruse et al. | 2003/0045329 A1 | 3/2003 | Kinoshita |
| 2002/0002705 | A1 | 1/2002 | Byrnes et al. | 2003/0045996 A1 | 3/2003 | Yamazaki et al. |
| 2002/0004701 | A1 | 1/2002 | Nakano | 2003/0050776 A1 | 3/2003 | Blair |
| 2002/0006804 | A1 | 1/2002 | Mukai et al. | 2003/0052964 A1 | 3/2003 | Priestman et al. |
| 2002/0009978 | A1 | 1/2002 | Dukach et al. | 2003/0054830 A1 | 3/2003 | Williams et al. |
| 2002/0016724 | A1 | 2/2002 | Yang et al. | 2003/0055994 A1 | 3/2003 | Herrmann et al. |
| 2002/0019225 | A1 | 2/2002 | Miyashita | 2003/0061606 A1 | 3/2003 | Hartwig et al. |
| 2002/0026348 | A1 | 2/2002 | Fowler et al. | 2003/0063732 A1 | 4/2003 | Mcknight |
| 2002/0028690 | A1 | 3/2002 | McKenna et al. | 2003/0065784 A1 | 4/2003 | Herrod |
| 2002/0031120 | A1 | 3/2002 | Rakib | 2003/0065805 A1 | 4/2003 | Barnes, Jr. |
| 2002/0034292 | A1 | 3/2002 | Tuoriniemi | 2003/0069693 A1 | 4/2003 | Snapp et al. |
| 2002/0036231 | A1 | 3/2002 | Monaghan et al. | 2003/0073432 A1 | 4/2003 | Meade, II |
| 2002/0036642 | A1 | 3/2002 | Kwon et al. | 2003/0083055 A1 | 5/2003 | Riordan et al. |
| 2002/0038219 | A1 | 3/2002 | Yanay et al. | 2003/0083873 A1 | 5/2003 | Ross et al. |
| 2002/0039914 | A1 | 4/2002 | Hama et al. | 2003/0084121 A1 | 5/2003 | De Boor |
| 2002/0041262 | A1 | 4/2002 | Mukai et al. | 2003/0093503 A1 | 5/2003 | Yamaki et al. |
| 2002/0047787 | A1 | 4/2002 | Mikkola et al. | 2003/0093790 A1 | 5/2003 | Logan et al. |
| 2002/0049742 | A1 | 4/2002 | Chan et al. | 2003/0099367 A1 | 5/2003 | Okamura |
| 2002/0054068 | A1 | 5/2002 | Ellis et al. | 2003/0100326 A1 | 5/2003 | Grube et al. |
| 2002/0055350 | A1 | 5/2002 | Gupte et al. | 2003/0107580 A1 | 6/2003 | Egawa et al. |
| 2002/0058497 | A1 | 5/2002 | Jeong | 2003/0109251 A1 | 6/2003 | Fujito et al. |
| 2002/0058531 | A1 | 5/2002 | Terasaki et al. | 2003/0114191 A1 | 6/2003 | Nishimura |
| 2002/0065037 | A1 | 5/2002 | Messina et al. | 2003/0115240 A1 | 6/2003 | Cho |
| 2002/0065604 | A1 | 5/2002 | Sekiyama | 2003/0117316 A1 | 6/2003 | Tischer |
| 2002/0066115 | A1 | 5/2002 | Wendelrup | 2003/0119479 A1 | 6/2003 | Arima et al. |
| 2002/0068558 | A1 | 6/2002 | Janik | 2003/0119485 A1 | 6/2003 | Ogasawara |
| 2002/0068585 | A1 | 6/2002 | Chan et al. | 2003/0119562 A1 | 6/2003 | Kokubo |
| 2002/0068599 | A1 | 6/2002 | Rodriguez et al. | 2003/0120784 A1 | 6/2003 | Johnson et al. |
| 2002/0072395 | A1 | 6/2002 | Miramontes | 2003/0122779 A1 | 7/2003 | Martin et al. |

| | | | | | | |
|---|---|---|---|---|---|---|
| 2003/0125008 A1 | 7/2003 | Shimamura | | 2005/0107119 A1 | 5/2005 | Lee et al. |
| 2003/0132928 A1 | 7/2003 | Kori | | 2005/0113080 A1 | 5/2005 | Nishimura |
| 2003/0135563 A1 | 7/2003 | Bodin et al. | | 2005/0120225 A1 | 6/2005 | Kirsch et al. |
| 2003/0137970 A1 | 7/2003 | Odman | | 2005/0136949 A1 | 6/2005 | Barnes et al. |
| 2003/0142957 A1 | 7/2003 | Young et al. | | 2005/0153681 A1 | 7/2005 | Hanson |
| 2003/0144024 A1 | 7/2003 | Luo | | 2005/0153745 A1 | 7/2005 | Smethers |
| 2003/0148772 A1 | 8/2003 | Ben-Ari | | 2005/0159189 A1 | 7/2005 | Iyer |
| 2003/0153364 A1 | 8/2003 | Osann, Jr. | | 2005/0164684 A1 | 7/2005 | Chen et al. |
| 2003/0155413 A1 | 8/2003 | Kovesdi | | 2005/0165871 A1 | 7/2005 | Barrs et al. |
| 2003/0157929 A1 | 8/2003 | Janssen et al. | | 2005/0166242 A1 | 7/2005 | Matsumoto et al. |
| 2003/0166399 A1 | 9/2003 | Tokkonen et al. | | 2005/0186954 A1 | 8/2005 | Kenney |
| 2003/0169329 A1 | 9/2003 | Parker et al. | | 2005/0191969 A1 | 9/2005 | Mousseau |
| 2003/0171113 A1 | 9/2003 | Choi | | 2005/0235312 A1 | 10/2005 | Karaoguz et al. |
| 2003/0174685 A1 | 9/2003 | Hasebe | | 2005/0257149 A1 | 11/2005 | Kamiya et al. |
| 2003/0181201 A1 | 9/2003 | Bomze et al. | | 2005/0261945 A1 | 11/2005 | Mougin et al. |
| 2003/0204562 A1 | 10/2003 | Hwang | | 2005/0272504 A1 | 12/2005 | Eguchi et al. |
| 2003/0208541 A1 | 11/2003 | Musa | | 2005/0282582 A1 | 12/2005 | Slotznick |
| 2003/0220835 A1 | 11/2003 | Barnes, Jr. | | 2006/0003813 A1 | 1/2006 | Seligmann et al. |
| 2003/0222762 A1 | 12/2003 | Beigl et al. | | 2006/0015819 A1 | 1/2006 | Hawkins et al. |
| 2003/0222982 A1 | 12/2003 | Hamdan et al. | | 2006/0031407 A1 | 2/2006 | Dispensa et al. |
| 2003/0224760 A1 | 12/2003 | Day | | 2006/0033809 A1 | 2/2006 | Robinson |
| 2003/0227570 A1 | 12/2003 | Kim et al. | | 2006/0041923 A1 | 2/2006 | McQuaide, Jr. |
| 2003/0229900 A1 | 12/2003 | Reisman | | 2006/0052100 A1 | 3/2006 | Almgren |
| 2003/0236866 A1 | 12/2003 | Light | | 2006/0059038 A1 | 3/2006 | Iuchi et al. |
| 2004/0003307 A1 | 1/2004 | Tsuji | | 2006/0073820 A1 | 4/2006 | Craswell et al. |
| 2004/0004616 A1 | 1/2004 | Konya et al. | | 2006/0114100 A1 | 6/2006 | Ghabra et al. |
| 2004/0029640 A1 | 2/2004 | Masuyama et al. | | 2006/0133590 A1 | 6/2006 | Jiang |
| 2004/0033795 A1 | 2/2004 | Walsh et al. | | 2006/0140173 A1 | 6/2006 | Hoover |
| 2004/0034692 A1 | 2/2004 | Eguchi et al. | | 2006/0140387 A1 | 6/2006 | Boldt |
| 2004/0072595 A1 | 4/2004 | Anson et al. | | 2006/0143655 A1 | 6/2006 | Ellis et al. |
| 2004/0082321 A1 | 4/2004 | Kontianinen | | 2006/0166650 A1 | 7/2006 | Berger et al. |
| 2004/0103303 A1 | 5/2004 | Yamauchi et al. | | 2006/0199571 A1 | 9/2006 | Chin et al. |
| 2004/0107072 A1 | 6/2004 | Dietrich et al. | | 2006/0206913 A1 | 9/2006 | Jerding et al. |
| 2004/0114732 A1 | 6/2004 | Choe et al. | | 2006/0229114 A2 | 10/2006 | Kim |
| 2004/0117108 A1 | 6/2004 | Nemeth | | 2006/0234693 A1 | 10/2006 | Isidore et al. |
| 2004/0128359 A1 | 7/2004 | Horvitz et al. | | 2006/0234758 A1 | 10/2006 | Parupudi et al. |
| 2004/0132445 A1 | 7/2004 | Rogalski et al. | | 2006/0284732 A1 | 12/2006 | Brock-Fisher |
| 2004/0137893 A1 | 7/2004 | Muthuswamy et al. | | 2007/0015550 A1 | 1/2007 | Kayanuma |
| 2004/0137983 A1 | 7/2004 | Kerr et al. | | 2007/0050832 A1 | 3/2007 | Wright et al. |
| 2004/0139208 A1 | 7/2004 | Tuli | | 2007/0061845 A1 | 3/2007 | Barnes, Jr. |
| 2004/0142678 A1 | 7/2004 | Krasner | | 2007/0109262 A1 | 5/2007 | Oshima et al. |
| 2004/0157664 A1 | 8/2004 | Link | | 2007/0121596 A1 | 5/2007 | Kurapati et al. |
| 2004/0166832 A1 | 8/2004 | Portman et al. | | 2007/0135145 A1 | 6/2007 | Lee et al. |
| 2004/0166879 A1 | 8/2004 | Meadows et al. | | 2007/0135150 A1 | 6/2007 | Ushiki et al. |
| 2004/0174863 A1 | 9/2004 | Caspi et al. | | 2007/0142047 A1 | 6/2007 | Heeschen |
| 2004/0183937 A1 | 9/2004 | Viinikanoja et al. | | 2007/0190944 A1 | 8/2007 | Doan |
| 2004/0198374 A1 | 10/2004 | Bajikar | | 2007/0204014 A1 | 8/2007 | Greer et al. |
| 2004/0203490 A1 | 10/2004 | Kaplan | | 2007/0216760 A1 | 9/2007 | Kondo et al. |
| 2004/0203520 A1 | 10/2004 | Schirtzinger et al. | | 2007/0218891 A1 | 9/2007 | Cox |
| 2004/0203577 A1 | 10/2004 | Forman et al. | | 2007/0260456 A1 | 11/2007 | Proux et al. |
| 2004/0203904 A1 | 10/2004 | Gwon et al. | | 2007/0262848 A1 | 11/2007 | Berstis et al. |
| 2004/0203909 A1 | 10/2004 | Koster | | 2007/0293240 A1 | 12/2007 | Drennan |
| 2004/0204035 A1 | 10/2004 | Raghuram et al. | | 2008/0014917 A1 | 1/2008 | Rhoads et al. |
| 2004/0204126 A1 | 10/2004 | Reyes et al. | | 2008/0016526 A1 | 1/2008 | Asmussen |
| 2004/0204821 A1 | 10/2004 | Tu | | 2008/0016534 A1 | 1/2008 | Ortiz et al. |
| 2004/0204848 A1 | 10/2004 | Matsuo et al. | | 2008/0058005 A1 | 3/2008 | Zicker et al. |
| 2004/0209649 A1 | 10/2004 | Lord | | 2008/0194273 A1 | 8/2008 | Kansal et al. |
| 2004/0216037 A1 | 10/2004 | Hishida et al. | | 2008/0242271 A1 | 10/2008 | Schmidt et al. |
| 2004/0218738 A1 | 11/2004 | Arai et al. | | 2008/0242283 A1 | 10/2008 | Ruckart |
| 2004/0219951 A1 | 11/2004 | Holder | | 2008/0250459 A1 | 10/2008 | Roman |
| 2004/0222988 A1 | 11/2004 | Donnelly | | 2008/0299989 A1 | 12/2008 | King et al. |
| 2004/0223049 A1 | 11/2004 | Taniguchi et al. | | 2009/0047972 A1 | 2/2009 | Neeraj |
| 2004/0235513 A1 | 11/2004 | O'Connell | | 2009/0153490 A1 | 6/2009 | Nymark et al. |
| 2004/0235520 A1 | 11/2004 | Cadiz et al. | | 2009/0186628 A1 | 7/2009 | Yonker et al. |
| 2004/0242240 A1 | 12/2004 | Lin | | 2009/0197641 A1 | 8/2009 | Rofougaran et al. |
| 2004/0242269 A1 | 12/2004 | Fadell | | 2009/0290369 A1 | 11/2009 | Schofield et al. |
| 2004/0248586 A1 | 12/2004 | Patel et al. | | 2010/0030557 A1 | 2/2010 | Molloy et al. |
| 2004/0252197 A1 | 12/2004 | Fraley et al. | | 2010/0062740 A1 | 3/2010 | Ellis et al. |
| 2004/0257208 A1 | 12/2004 | Huang et al. | | 2010/0099457 A1 | 4/2010 | Kim |
| 2004/0267628 A1 | 12/2004 | Stillman | | 2010/0145700 A1 | 6/2010 | Kennewick et al. |
| 2005/0004749 A1 | 1/2005 | Park | | | | |
| 2005/0020301 A1 | 1/2005 | Lee | | | | |
| 2005/0026629 A1 | 2/2005 | Contractor | | | | |
| 2005/0036509 A1 | 2/2005 | Acharya | | FOREIGN PATENT DOCUMENTS | | |
| 2005/0046584 A1 | 3/2005 | Breed | | | | |
| 2005/0048987 A1 | 3/2005 | Glass | | JP | 2002208998 A | 7/2002 |
| 2005/0070257 A1 | 3/2005 | Saarinen et al. | | JP | 2003/228726 A1 | 8/2003 |
| 2005/0090768 A1 | 4/2005 | Brattesani et al. | | JP | 2003/263656 A1 | 9/2003 |
| 2005/0097038 A1 | 5/2005 | Yu et al. | | JP | 2005/216149 A1 | 8/2005 |
| | | | | WO | WO03001457 A1 | 1/2003 |

OTHER PUBLICATIONS

HI Corporation to Offer 3D Graphics to Motorola Mobile Phone Platform Customers (http://www.wirelessdevnet.com/news/2003/203/news7.html).

Development of NTT docomo Mova N504i—NEC Gi-Ho (Technology Magazine) vol. 56 No May 2003, p. 144.

Winners of Tokyo Venture Technology Grand Prize in 2000-2009 (http://www.sangyo-rodo.metro.tokyo.jp/shoko/sogyo/venture/2000-2009winners.pdf).

Audiovox, "POcket PC Phone User Manual", published on Mar. 19, 2004.

Gamespot, "Super Mario Bros. 3", Feb. 12, 1990, <http://www.gamespot.com/nes/action/supermariobros3/index.html?tag=tabs%3Bsummary>.

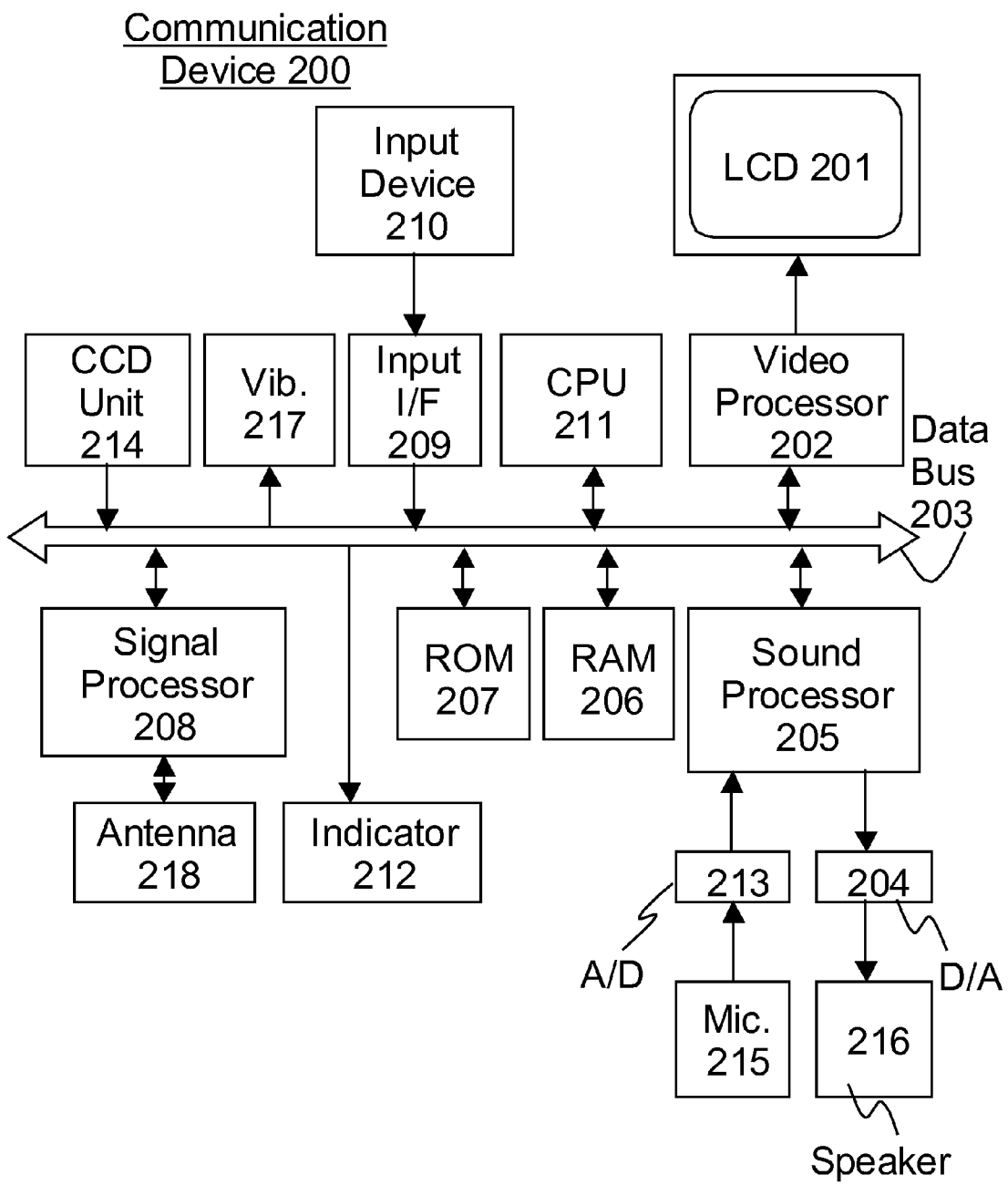

COMMUNICATION DEVICE

CROSS REFERENCE TO RELATED APPLICATIONS

The application is a continuation of U.S. Ser. No. 12/901,496 filed Oct. 9, 2010, which is a continuation of U.S. Ser. No. 11/623,061 filed Jan. 13, 2007 now U.S. Pat. No. 8,041,348, which is a continuation of U.S. Ser. No. 10/905,365 filed Dec. 30, 2004 now abandoned, which claims the benefit of U.S. Provisional Application No. 60/521,265 filed Mar. 23, 2004, all of which are hereby incorporated herein by reference in their entirety.

BACKGROUND OF INVENTION

The invention relates to a communication device and more particularly to the communication device which has a capability to communicate with another communication device in a wireless fashion.

U.S. Pat. No. 4,937,570 is introduced as a prior art of the present invention of which the summary is the following: "A route guidance display device for an automotive vehicle capable of displaying route patterns with a three-dimensional effect to enhance the viewer's comprehension of the road route situation being encountered. The display device includes a plurality of intersecting display segments indicative of corresponding possible route configurations. A depth-enhancing segment is included in a portion indicating the straight-ahead route. An intersection name display section may be separately included to display the name and related information regarding an intersection laying ahead." However, the foregoing prior art does not disclose the communication device comprising a voice communication implementer, an attached file email implementer, a geographic location implementer, a dictionary implementer, a schedule notification implementer, a multiple visual data display implementer, a touch panel implementer, a communication device search implementer, a resume enabled video game implementer, and an oncoming destination name notification implementer.

For the avoidance of doubt, the number of the prior arts introduced herein (and/or in IDS) may be of a large one, however, the applicant has no intent to hide the more relevant prior art(s) in the less relevant ones.

SUMMARY OF INVENTION

It is an object of the present invention to provide a device capable of implementing a plurality of functions.

It is another object of the present invention to provide merchandise to merchants attractive to the consumers in the U.S.

It is another object of the present invention to provide mobility to the users of the device in which the present invention is incorporated.

It is another object of the present invention to provide more convenience to the users of the device compared to the prior art.

It is another object of the present invention to overcome the shortcomings associated with the prior art.

It is another object of the present invention to provide a convenient device capable to implement the functions of both voice communication and audio(visual) player to consumers.

The present invention introduces the communication device comprising a voice communication implementer, an attached file email implementer, a geographic location implementer, a dictionary implementer, a schedule notification implementer, a multiple visual data display implementer, a touch panel implementer, a communication device search implementer, a resume enabled video game implementer, and an oncoming destination name notification implementer.

BRIEF DESCRIPTION OF DRAWING

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the paragraph number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Attached File Emailing Function>>

The following paragraphs illustrate the attached file emailing function which enables Communication Device 200 to send an email with a file attached selected by the user of Communication Device 200.

This paragraph illustrates the storage area included in RAM 206 (FIG. 1) of Communication Device 200. In the present embodiment, RAM 206 includes Attached File Emailing Information Storage Area 20678a of which the data and the software programs stored therein are described hereinafter.

The data and/or the software programs stored in Attached File Emailing Information Storage Area 20678a may be downloaded from Host H in the manner described hereinafter.

This paragraph illustrates the storage areas included in Attached File Emailing Information Storage Area 20678a. In the present embodiment, Attached File Emailing Information Storage Area 20678a includes Attached File Emailing Data Storage Area 20678b and Attached File Emailing Software Storage Area 20678c. Attached File Emailing Data Storage Area 20678b stores the data necessary to implement the present function, such as the one described hereinafter. Attached File Emailing Software Storage Area 20678c stores the software programs necessary to implement the present function, such as the ones described hereinafter.

This paragraph illustrates the storage areas included in Attached File Emailing Data Storage Area 20678b. In the present embodiment, Attached File Emailing Data Storage Area 20678b includes Selected File Storage Area 20678b1, Email Data Storage Area 20678b2, and Work Area 20678b3. Selected File Storage Area 20678b1 stores the selected file which is the file selected in S4 explained hereinafter. Email Data Storage Area 20678b2 stores the email data which includes alphanumeric data input via Input Device 210 (FIG. 1). Work Area 20678b3 is utilized as a work area to perform calculation and temporarily store data.

This paragraph illustrates the software programs stored in Attached File Emailing Software Storage Area 20678c. In the present embodiment, Attached File Emailing Software Storage Area 20678c stores Email Data Producing Software 20678c1, File Selecting Software 20678c2, and Selected File Emailing Software 20678c3. Email Data Producing Software 20678c1 is the software program described hereinafter. File Selecting Software 20678c2 is the software program described hereinafter. Selected File Emailing Software 20678c3 is the software program described hereinafter.

This paragraph illustrates Email Data Producing Software 20678c1 of Communication Device 200 which produces email. In the present embodiment, the user of Communication Device 200 opens a new email data by utilizing Input Device 210 (FIG. 1) or via voice recognition system (S1), and inputs a plurality of alphanumeric data (S2). Here, the email data is the data which primarily includes a plurality of alphanumeric data and which is sent via email. CPU 211 (FIG. 1) of Communication Device 200 stores the email data in Email Data Storage Area 20678b2 (S3).

This paragraph illustrates File Selecting Software 20678c2 of Communication Device 200, which selects the file to be attached to the email produced in the previous paragraph. In the present embodiment, CPU 211 (FIG. 1) of Communication Device 200 retrieves the email data from Email Data Storage Area 20678b2 and displays the data on LCD 201 (FIG. 1) (S1). The user of Communication Device 200 inputs a file list displaying signal (S2). Here, the file list displaying signal is a signal to display a list of files attachable to the email data. CPU 211 displays a file list (S3). The file list displaying signal is a signal to display a list of files attachable to the email data. The user of Communication Device 200 selects a file from the file list (S4). CPU 211 stores the selected file in Selected File Storage Area 20678b1 (S5), and sets a link between the email data and the selected file stored in Selected File Storage Area 20678b1 (S6). The file list is closed thereafter (S7).

This paragraph illustrates Selected File Emailing Software 20678c3 of Communication Device 200, which sends the email produced hereinbefore with the file selected hereinbefore. In the present embodiment, CPU 211 (FIG. 1) of Communication Device 200 retrieves the email data from Email Data Storage Area 20678b2 (S1), and also retrieves the file selected in S4 of the previous paragraph from Selected File Storage Area 20678b1 (S2). CPU 211 then sends the email data with the selected file (S3).

<<Movie eTicket Function>>

The following paragraphs illustrate(s) the movie eticket function which enables the user of Communication Device 200 to purchase the movie tickets via Communication Device 200 and enter the movie theaters by utilizing Communication Device 200 without utilizing paper tickets.

This paragraph illustrate(s) the storage area included in Host H. In the present embodiment, Host H includes Movie eTicket Data Storage Area H79*b* of which the data and the software programs stored therein are described hereinafter.

This paragraph illustrate(s) the storage areas included in Movie eTicket Data Storage Area H79*b*. In the present embodiment, Movie eTicket Data Storage Area H79*b* includes Movie Data Storage Area H79*b*1, User Data Storage Area H79*b*2, Purchase Data Storage Area H79*b*3, and Work Area H79*b*4. Movie Data Storage Area H79*b*1 stores the data described hereinafter. User Data Storage Area H79*b*2 stores the data described hereinafter. Purchase Data Storage Area H79*b*3 stores the data described hereinafter. Work Area H79*b*4 is utilized as a work area to perform calculation and temporarily store data.

This paragraph illustrate(s) the data stored in Movie Data Storage Area H79*b*1. In the present embodiment, Movie Data Storage Area H79*b*1 comprises two columns, i.e., 'Movie ID' and 'Movie Data'. Column 'Movie ID' stores the movie IDs, and each movie ID is an identification of the corresponding movie data stored in column 'Movie Data'. Column 'Movie Data' stores the movie data, and each the movie data includes five types of data, i.e., title, location, starting time, ending time, and summary. Here, the title represents the title of the movie represented by the corresponding movie ID, the location represents the geographic location of theater where the movie represented by the corresponding movie ID is shown, the starting time represents the starting time of the movie represented by the corresponding movie ID, the ending time represents the ending time of the movie represented by the corresponding movie ID, and the summary represents the summary of the movie represented by the corresponding movie ID. In the present embodiment, Movie Data Storage Area H79*b*1 stores the following data: the movie ID 'Movie#1' and the corresponding movie data 'Movie Data#1 (Title#1, Location#1, Starting Time#1, Ending Time#1, Summary#1)'; the movie ID 'Movie#2' and the corresponding movie data 'Movie Data#2 (Title#2, Location#2, Starting Time#2, Ending Time#2, Summary#2)'; the movie ID 'Movie#3' and the corresponding movie data 'Movie Data#3 (Title#3, Location#3, Starting Time#3, Ending Time#3, Summary#3)'; and the movie ID 'Movie#4' and the corresponding movie data 'Movie Data#4 (Title#4, Location#4, Starting Time#4, Ending Time#4, Summary#4)'.

This paragraph illustrate(s) the data stored in User Data Storage Area H79*b*2. In the present embodiment, User Data Storage Area H79*b*2 comprises two columns, i.e., 'User ID' and 'User Data'. Column 'User ID' stores the user IDs, and each user ID is an identification of the user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area H79*b*2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

This paragraph illustrate(s) the data stored in Purchase Data Storage Area H79*b*3. In the present embodiment, Purchase Data Storage Area H79*b*3 comprises two columns, i.e., 'User ID' and 'Purchase Data'. Column 'User ID' stores the user IDs described hereinbefore. Column 'Purchase Data' stores the purchase data, and each purchase data is composed of alphanumeric data which do not represent or indicate the user data. A unique alphanumeric data may be assigned to each purchase data so that each purchase data is distinguished from the other purchase data. In the present embodiment, Purchase Data Storage Area H79*b*3 stores the following data: the user ID 'User#1' and the corresponding purchase data 'Purchase Data#1'; the user ID 'User#2' and the corresponding purchase data 'Purchase Data#2'; the user ID 'User#3' and the corresponding purchase data 'Purchase Data#3'; and the user ID 'User#4' and the corresponding purchase data 'Purchase Data#4'. As another embodiment, a common alphanumeric data may be assigned to all purchase data (i.e., Purchase Data#1, Purchase Data#2, Purchase Data#3, and Purchase Data#4 are composed of the same alphanumeric data).

This paragraph illustrate(s) the software programs stored in Movie eTicket Software Storage Area H79*c*. In the present embodiment, Movie eTicket Software Storage Area H79*c* stores Movie Data Selecting Software H79*c*1, Purchase Data Producing Software H79*c*2, Purchase Data Updating Software H79*c*3, Purchase Data Deleting Software H79*c*5, and Movie eTicket Information Storage Area 20679*a*. Movie Data Selecting Software H79*c*1 is the software program described hereinafter. Purchase Data Producing Software H79*c*2 is the software program described hereinafter. Purchase Data Updating Software H79*c*3 is the software program described hereinafter. Purchase Data Deleting Software H79*c*5 is the software program described hereinafter.

This paragraph illustrate(s) the storage area included in RAM 206 (FIG. 1) of Communication Device 200. In the present embodiment, RAM 206 includes Movie eTicket Information Storage Area 20679*a* of which the data and the software programs stored therein are described hereinafter.

The data and/or the software programs stored in Movie eTicket Information Storage Area 20679*a* may be downloaded from Host H in the manner described hereinafter.

This paragraph illustrate(s) the storage areas included in Movie eTicket Information Storage Area 20679*a*. In the present embodiment, Movie eTicket Information Storage Area 20679*a* includes Movie eTicket Data Storage Area 20679*b* and Movie eTicket Software Storage Area 20679*c*. Movie eTicket Data Storage Area 20679*b* stores the data described hereinafter. Movie eTicket Software Storage Area 20679*c* stores the data described hereinafter.

This paragraph illustrate(s) the storage areas included in Movie eTicket Data Storage Area 20679*b*. In the present embodiment, Movie eTicket Data Storage Area 20679*b* includes Movie Data Storage Area 20679*b*1, User Data Storage Area 20679*b*2, Purchase Data Storage Area 20679*b*3, and Work Area 20679*b*4. Movie Data Storage Area 20679*b*1 stores the data described hereinafter. User Data Storage Area 20679*b*2 stores the data described hereinafter. Purchase Data Storage Area 20679*b*3 stores the data described hereinafter. Work Area 20679*b*4 is utilized as a work area to perform calculation and temporarily store data.

This paragraph illustrate(s) the data stored in Movie Data Storage Area 20679*b*1. In the present embodiment, Movie Data Storage Area 20679*b*1 comprises two columns, i.e., 'Movie ID' and 'Movie Data'. Column 'Movie ID' stores the movie IDs, and each movie ID is an identification of the corresponding movie data stored in column 'Movie Data'.

Column 'Movie Data' stores the movie data, and each the movie data includes five types of data, i.e., title, location, starting time, ending time, and summary. Here, the title represents the title of the movie represented by the corresponding movie ID, the location represents the geographic location of theater where the movie represented by the corresponding movie ID is shown, the starting time represents the starting time of the movie represented by the corresponding movie ID, the ending time represents the ending time of the movie represented by the corresponding movie ID, and the summary represents the summary of the movie represented by the corresponding movie ID. In the present embodiment, Movie Data Storage Area H79b1 stores the following data: the movie ID 'Movie#1' and the corresponding movie data 'Movie Data#1 (Title#1, Location#1, Starting Time#1, Ending Time#1, Summary#1)'; the movie ID 'Movie#2' and the corresponding movie data 'Movie Data#2 (Title#2, Location#2, Starting Time#2, Ending Time#2, Summary#2)'; the movie ID 'Movie#3' and the corresponding movie data 'Movie Data#3 (Title#3, Location#3, Starting Time#3, Ending Time#3, Summary#3)'; and the movie ID 'Movie#4' and the corresponding movie data 'Movie Data#4 (Title#4, Location#4, Starting Time#4, Ending Time#4, Summary#4)'.

This paragraph illustrate(s) the data stored in User Data Storage Area 20679b2. In the present embodiment, User Data Storage Area 20679b2 comprises two columns, i.e., 'User ID' and 'User Data'. Column 'User ID' stores the user ID which is an identification of the user data stored in column 'User Data'. Column 'User Data' stores the user data which includes name, home address, phone number, email address, and credit card information. Here, the name represents the name of the user of Communication Device 200 (e.g., device A), the home address represents the home address of the user, the phone number represents the phone number of the user, the email address represents the email address of the user, and the credit card information represents the credit card information of the user. In the present embodiment, User Data Storage Area 20679b2 stores the following data: the user ID 'User#4' and the user data 'User Data#4 (Name#4, Home Address#4, Phone Number#4, Email Address#4, Credit Card Information#4)'.

This paragraph illustrate(s) the data stored in Purchase Data Storage Area 20679b3. In the present embodiment, Purchase Data Storage Area 20679b3 comprises two columns, i.e., 'User ID' and 'Purchase Data'. Column 'User ID' stores the user IDs described hereinbefore. Column 'Purchase Data' stores the purchase data which is composed of alphanumeric data which do not represent or indicate the user data. In the present embodiment, Purchase Data Storage Area 20679b3 stores the following data: the user ID 'User#4' and the corresponding purchase data 'Purchase Data#4'.

This paragraph illustrate(s) the software programs stored in Movie eTicket Software Storage Area 20679c. In the present embodiment, Movie eTicket Software Storage Area 20679c stores Movie Data Selecting Software 20679c1, Purchase Data Producing Software 20679c2, and purchase data Authenticating Software 20679c4. Movie Data Selecting Software 20679c1 is the software program described hereinafter. Purchase Data Producing Software 20679c2 is the software program described hereinafter. Purchase Data Authenticating Software 20679c4 is the software program described hereinafter.

This paragraph illustrate(s) Movie Data Selecting Software H79c1 of Host H and Movie Data Selecting Software 20679c1 of Communication Device 200, which selects a movie for which the movie eticket is to be purchased. In the present embodiment, Host H retrieves all movie IDs and movie data from Movie Data Storage Area H79b1, and sends these data to Communication Device 200 in a wireless fashion (S1). Upon receiving the movie IDs and the movie data from Host H, CPU 211 (FIG. 1) of Communication Device 200 stores these data in Movie Data Storage Area 20679b1 (S2). CPU 211 retrieves the movie data from Movie Data Storage Area 20679b1 and displays a movie list on LCD 201 (FIG. 1) (S3). The user of Communication Device 200 selects a movie data (e.g., Movie Data#1) by utilizing Input Device 210 (FIG. 1) or via voice recognition system (S4).

This paragraph illustrate(s) Purchase Data Producing Software H79c2 of Host H and Purchase Data Producing Software 20679c2 of Communication Device 200, which produces a purchase data. In the present embodiment, CPU 211 (FIG. 1) of Communication Device 200 retrieves its user data (e.g., User Data#4) from User Data Storage Area 20679b2 (S1), and sends in a wireless fashion the corresponding movie ID (e.g., Movie#1) of the movie data selected in S4 (e.g., Movie Data#1) and the user data (e.g., User Data#4), which are received by Host H (S2). Host H retrieves the credit card information (e.g., Credit Card Information#4) from the user data (e.g., User Data#4), and performs the credit card authentication process which is a process to authenticate the credit card information (e.g., Credit Card Information#4) (S3). If the credit card information is authenticated, Host H produces a new user ID (e.g., User#4) and stores the user data (e.g., User Data#4) at the corresponding user ID (e.g., User#4) in User Data Storage Area H79b2 (S4). Host H produces a purchase data (e.g., Purchase Data#4) and stores the data at the corresponding user ID (e.g., User#4) in Purchase Data Storage Area H79b3 (S5). Host H sends in a wireless fashion the purchase data (e.g., Purchase Data#4), and Communication Device 200 receives the data (S6). CPU 211 of Communication Device 200 stores the purchase data (e.g., Purchase Data#4) in Purchase Data Storage Area 20679b3 (S7).

This paragraph illustrate(s) the function of Movie eTicket Authenticating Device MAD79, Admission Gate Controller AGC79, and Admission Gate AG79. In the present embodiment, Movie eTicket Authenticating Device MAD79 is connected to Admission Gate Controller AGC79, and Admission Gate Controller AGC79 is connected to Admission Gate AG79. Admission Gate AG79 is the gate installed at the entrance of a movie theater. Admission Gate AG79 is normally closed, and opens only when an admission gate signal is sent from Admission Gate Controller AGC79. People are able to go through Admission Gate AG79 when it is open. Admission Gate Controller AGC79 is a device to control Admission Gate AG79. Admission Gate Controller AGC79 sends the admission gate signal which is a command to open the gate of Admission Gate AG79. The admission gate signal is sent when Admission Gate Controller AGC79 receives an admission signal sent from Movie eTicket Authenticating Device MAD79. Here, the admission signal is a signal which indicates that a movie eticket is authenticated of which the process therefor is explained hereinafter.

This paragraph illustrate(s) the storage areas included in Movie eTicket Authenticating Device MAD79a. In the present embodiment, Movie eTicket Authenticating Device MAD79a includes Authenticated Movie eTicket Data Storage Area MAD79b and Authenticated Movie eTicket Software Storage Area MAD79c. Authenticated Movie eTicket Data Storage Area MAD79b stores the data necessary to implement the present function, such as the ones described hereinafter. Authenticated Movie eTicket Software Storage Area MAD79c stores the software programs necessary to implement the present function, such as the ones described hereinafter.

This paragraph illustrate(s) the storage areas included in Authenticated Movie eTicket Data Storage Area MAD79b. In the present embodiment, Authenticated Movie eTicket Data Storage Area MAD79b includes Purchase Data Storage Area MAD79b1, User Data Storage Area MAD79b2, and Work Area MAD79b3. Purchase Data Storage Area MAD79b1 stores the data described hereinafter. User Data Storage Area MAD79b2 stores the data described hereinafter. Work Area MAD79b3 is utilized as a work area to perform calculation and temporarily store data.

This paragraph illustrate(s) the data stored in User Data Storage Area MAD79b2. In the present embodiment, User Data Storage Area MAD79b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the corresponding user of Communication Device 200, the home address represents the home address of the corresponding user, the phone number represents the phone number of the corresponding user, the email address represents the email address of the corresponding user, and the credit card information represents the credit card information of the corresponding user. In the present embodiment, User Data Storage Area MAD79b2 stores the following data: the user ID 'User#1' and the corresponding user data 'User Data#1 (Name#1, Home Address#1, Phone Number#1, Email Address#1, Credit Card Information#1)'; the user ID 'User#2' and the corresponding user data 'User Data#2 (Name#2, Home Address#2, Phone Number#2, Email Address#2, Credit Card Information#2)'; the user ID 'User#3' and the corresponding user data 'User Data#3 (Name#3, Home Address#3, Phone Number#3, Email Address#3, Credit Card Information#3)'; and the user ID 'User#4' and the corresponding user data 'User Data#4 (Name#4, Home Address#4, Phone Number#4, Email Address#4, Credit Card Information#4)'.

This paragraph illustrate(s) the data stored in Purchase Data Storage Area MAD79b1. In the present embodiment, Purchase Data Storage Area MAD79b1 comprises two columns, i.e., 'User ID' and 'Purchase Data'. Column 'User ID' stores the user IDs described hereinbefore. Column 'Purchase Data' stores the purchase data, and each purchase data is composed of alphanumeric data which do not represent or indicate the user data. A unique alphanumeric data may be assigned to each purchase data so that each purchase data is distinguished from the other purchase data. In the present embodiment, Purchase Data Storage Area MAD79b1 stores the following data: the user ID 'User#1' and the corresponding purchase data 'Purchase Data#1'; the user ID 'User#2' and the corresponding purchase data 'Purchase Data#2'; the user ID 'User#3' and the corresponding purchase data 'Purchase Data#3'; and the user ID 'User#4' and the corresponding purchase data 'Purchase Data#4'. As another embodiment, a common alphanumeric data may be assigned to all purchase data (i.e., Purchase Data#1 , Purchase Data#2 , Purchase Data#3, and Purchase Data#4 are composed of the same alphanumeric data).

This paragraph illustrate(s) the software programs stored in Authenticated Movie eTicket Software Storage Area MAD79c. In the present embodiment, Authenticated Movie eTicket Software Storage Area MAD79c stores Purchase Data Updating Software MAD79c3, Purchase Data Authenticating Software MAD79c4, and purchase data Deleting Software MAD79c5. Purchase Data Updating Software MAD79c3 is the software program described hereinafter. Purchase Data Authenticating Software MAD79c4 is the software program described hereinafter. Purchase Data Deleting Software MAD79c5 is the software program described hereinafter.

This paragraph illustrate(s) Purchase Data Updating Software H79c3 of Host H and purchase data Updating Software MAD79c3 of Movie eTicket Authenticating Device MAD79, which update the purchase data stored in Movie eTicket Authenticating Device MAD79. In the present embodiment, Host H retrieves all user IDs and purchase data from Purchase Data Storage Area H79b3 and sends the data to Movie eTicket Authenticating Device MAD79 (S1). Movie eTicket Authenticating Device MAD79 receives the user IDs and the purchase data from Host H and stores the data in Purchase Data Storage Area MAD79b1 (S2).

This paragraph illustrate(s) Purchase Data Authenticating Software MAD79c4 of Movie eTicket Authenticating Device MAD79 and purchase data Authenticating Software 20679c4 of Communication Device 200, which authenticate the purchase data sent from Communication Device 200. In the present embodiment, CPU 211 (FIG. 1) of Communication Device 200 retrieves the purchase data (e.g., Purchase Data#4) from Purchase Data Storage Area 20679b3 and sends in a wireless fashion the data to Movie eTicket Authenticating Device MAD79 (S1). Movie eTicket Authenticating Device MAD79 receives the purchase data (e.g., Purchase Data#4) from Communication Device 200 and stores the data in Work Area MAD79b3 (S2). Movie eTicket Authenticating Device MAD79 performs the authentication process, i.e., scans Purchase Data Storage Area MAD79b1 (S3). If the purchase data (e.g., Purchase Data#4) is authenticated, Movie eTicket Authenticating Device MAD79 sends an admission signal to Admission Gate Controller AGC79 to open Admission Gate AG79 (S4). Movie eTicket Authenticating Device MAD79 sends in a wireless fashion a purchase data granted signal, which is received by Communication Device 200 (S5). Here, the purchase data granted signal is the signal which indicates that the purchase data (e.g., Purchase Data#4) is authenticated and thereby the user of Communication Device 200 is allowed to go through Admission Gate AG79. CPU 211 (FIG. 1) of Communication Device 200 stores the purchase data granted signal in Work Area 20679b4 (S6), and displays the purchase data granted notification data on LCD 201 (FIG. 1) (S7). Here, the purchase data granted notification data is an image data designed to be displayed on LCD 201 (FIG. 1) which indicates that the purchase data (e.g., Purchase Data#4) is authenticated and thereby the user of Communication Device 200 is allowed to go through Admission Gate AG79. If the movie theater has no Admission Gate AG79 or Admission Gate AG79 is not functioning, the attendant of the movie theater may visually confirm the purchase data granted notification displayed on LCD 201 (FIG. 1), and thereby allow the user of Communication Device 200 to enter the movie theater.

This paragraph illustrate(s) Purchase Data Deleting Software H79c5 of Host H and purchase data Deleting Software MAD79c5 of Movie eTicket Authenticating Device MAD79, which delete the purchase data stored in Movie eTicket Authenticating Device MAD79. In the present embodiment, Movie eTicket Authenticating Device MAD79 sends a purchase data expiration signal, which is received by Host H (S1). Here, the purchase data expiration signal is the signal which indicates that the user of Communication Device 200 has gone through Admission Gate AG79 and, thereby, the purchase data (e.g., Purchase Data#4) is no longer valid. In response to the purchase data expiration signal, Host H deletes the purchase data (e.g., Purchase Data#4) and the corresponding user ID (e.g., User#4) stored in Purchase Data Storage Area H79b3 (S2). Host H also deletes the user ID (e.g., User#4) and the corresponding user data (e.g., User Data#4) stored in User Data Storage Area H79b2 (S3).

<<Movie eTicket Function—Another Embodiment01>>

The following paragraphs illustrate(s) another embodiment of the present function wherein the user data, instead of the purchase data, is utilized for performing the admission process.

This paragraph illustrate(s) the software programs stored in Movie eTicket Software Storage Area H79c. In the present embodiment, Movie eTicket Software Storage Area H79c stores User Data Updating Software H79c3a and User Data Deleting Software H79c5a. User Data Updating Software H79c3a is the software program described hereinafter. User Data Deleting Software H79c5a is the software program described hereinafter.

This paragraph illustrate(s) the software programs stored in Movie eTicket Software Storage Area 20679c. In the present embodiment, Movie eTicket Software Storage Area 20679c stores User Data Authenticating Software 20679c4a. User Data Authenticating Software 20679c4a is the software program described hereinafter.

This paragraph illustrate(s) the data stored in User Data Storage Area MAD79b2. In the present embodiment, User Data Storage Area MAD79b2 comprises two columns, i.e., 'User ID' and 'User Data'. Column 'User ID' stores the user IDs, and each user ID is an identification of the user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area MAD79b2 stores the following data: the user ID 'User#' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

This paragraph illustrate(s) the software programs stored in Authenticated Movie eTicket Software Storage Area MAD79c. In the present embodiment, Authenticated Movie eTicket Software Storage Area MAD79c stores User Data Updating Software MAD79c3a, User Data Authenticating Software MAD79c4a, and User Data Deleting Software MAD79c5a. User Data Updating Software MAD79c3a is the software program described hereinafter. User Data Authenticating Software MAD79c4a is the software program described hereinafter. User Data Deleting Software MAD79c5a is the software program described hereinafter.

This paragraph illustrate(s) User Data Updating Software H79c3a of Host H and user data Updating Software MAD79c3a of Movie eTicket Authenticating Device MAD79, which update the user data stored in Movie eTicket Authenticating Device MAD79. In the present embodiment, Host H retrieves all user IDs and user data from User Data Storage Area H79b2 and sends the data to Movie eTicket Authenticating Device MAD79 (S1). Movie eTicket Authenticating Device MAD79 receives the user IDs and the user data from Host H and stores the data in User Data Storage Area MAD79b2 (S2).

This paragraph illustrate(s) User Data Authenticating Software MAD79c4a of Movie eTicket Authenticating Device MAD79 and User Data Authenticating Software 20679c4a of Communication Device 200, which authenticate the user data sent from Communication Device 200. In the present embodiment, CPU 211 (FIG. 1) of Communication Device 200 retrieves its user data (e.g., User Data#4) from User Data Storage Area 20679b2 and sends in a wireless fashion the data to Movie eTicket Authenticating Device MAD79 (S1). Movie eTicket Authenticating Device MAD79 receives the user data (e.g., User Data#4) from Communication Device 200 and stores the data in Work Area MAD79b3 (S2). Movie eTicket Authenticating Device MAD79 performs the authentication process, i.e., scans User Data Storage Area MAD79b2 (S3). If the user data is authenticated, Movie eTicket Authenticating Device MAD79 sends an admission signal to Admission Gate Controller AGC79 to open Admission Gate AG79 (MAD79) (S4). Movie eTicket Authenticating Device MAD79 sends in a wireless fashion a user data granted signal, which is received by Communication Device 200 (S5). Here, the user data granted signal is the signal which indicates that the user data (e.g., User Data#4) is authenticated and thereby the user of Communication Device 200 is allowed to go through Admission Gate AG79. CPU 211 of Communication Device 200 stores the user data granted signal in Work Area 20679b4 (S6), and displays the user data granted notification data on LCD 201 (FIG. 1) (S7). Here, the user data granted notification data is an image data designed to be displayed on LCD 201 (FIG. 1) which indicates that the user data (e.g., User Data#4) is authenticated and thereby the user of Communication Device 200 is allowed to go through Admission Gate AG79. If the movie theater has no Admission Gate AG79 or Admission Gate AG79 is not functioning, the attendant of the movie theater may visually confirm the user data granted notification displayed on LCD 201 (FIG. 1), and thereby allow the user of Communication Device 200 to enter the movie theater.

This paragraph illustrate(s) User Data Deleting Software H79c5a of Host H and User Data Deleting Software MAD79c5a of Movie eTicket Authenticating Device MAD79, which delete the user data stored in Movie eTicket Authenticating Device MAD79. In the present embodiment, Movie eTicket Authenticating Device MAD79 sends the user data expiration signal, which is received by Host H (S1). Here, the user data expiration signal is the signal which indicates that the user of Communication Device 200 has gone through Admission Gate AG79 and, thereby, the user data (e.g., User Data#4) is no longer valid. In response to the user data expiration signal, Host H deletes the user ID (e.g., User#4) and the user data (e.g., User Data#4) stored in User Data Storage Area H79b2 (S2).

<<Movie eTicket Function—Another Embodiment02>>

The following paragraphs illustrate(s) another embodiment of the present function wherein the user data, as well as the purchase data, is utilized for performing the admission process.

This paragraph illustrate(s) the software programs stored in Movie eTicket Software Storage Area H79c. In the present embodiment, Movie eTicket Software Storage Area H79c stores Movie Data Selecting Software H79c1, Purchase Data Producing Software H79c2, Purchase Data/User Data Updating Software H79c3b, and Purchase Data/User Data Deleting Software H79c5b. Movie Data Selecting Software H79c1 is the software program described hereinafter. Purchase Data Producing Software H79c2 is the software program described hereinafter. Purchase Data/User Data Updating Software H79c3b is the software program described hereinafter. Purchase Data/User Data Deleting Software H79c5b is the software program described hereinafter.

This paragraph illustrate(s) the software programs stored in Movie eTicket Software Storage Area 20679c. In the present embodiment, Movie eTicket Software Storage Area 20679c stores Movie Data Selecting Software 20679c1, Purchase Data Producing Software 20679c2, and Purchase Data/User Data Authenticating Software 20679c4b. Movie Data Selecting Software 20679c1 is the software program described hereinafter. Purchase Data Producing Software 20679c2 is the software program described hereinafter. Purchase Data/User Data Authenticating Software 20679c4b is the software program described hereinafter.

This paragraph illustrate(s) the data stored in User Data Storage Area MAD79b2. In the present embodiment, User Data Storage Area MAD79b2 comprises two columns, i.e., 'User ID' and 'User Data'. Column 'User ID' stores the user IDs, and each user ID is an identification of the user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area MAD79b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

This paragraph illustrate(s) the data stored in Purchase Data Storage Area MAD79b1. In the present embodiment, Purchase Data Storage Area MAD79b1 comprises two columns, i.e., 'User ID' and 'Purchase Data'. Column 'User ID' stores the user IDs described hereinbefore. Column 'Purchase Data' stores the purchase data, and each purchase data is composed of alphanumeric data which do not represent or indicate the user data. A unique alphanumeric data may be assigned to each purchase data so that each purchase data is distinguished from the other purchase data. In the present embodiment, Purchase Data Storage Area MAD79b1 stores the following data: the user ID 'User#1' and the corresponding purchase data 'Purchase Data#1'; the user ID 'User#2' and the corresponding purchase data 'Purchase Data#2'; the user ID 'User#3' and the corresponding purchase data 'Purchase Data#3'; and the user ID 'User#4' and the corresponding purchase data 'Purchase Data#4'. As another embodiment, a common alphanumeric data may be assigned to all purchase data (i.e., Purchase Data#1 , Purchase Data#2 , Purchase Data#3, and Purchase Data#4 are composed of the same alphanumeric data).

This paragraph illustrate(s) the software programs stored in Authenticated Movie eTicket Software Storage Area MAD79c. In the present embodiment, Authenticated Movie eTicket Software Storage Area MAD79c stores Purchase Data/User Data Updating Software MAD79c3b, Purchase Data/User Data Authenticating Software MAD79c4b, and Purchase Data/User Data Deleting Software MAD79c5b. Purchase Data/User Data Updating Software MAD79c3b is the software program described hereinafter. Purchase Data/User Data Authenticating Software MAD79c4b is the software program described hereinafter. Purchase Data/User Data Deleting Software MAD79c5b is the software program described hereinafter.

This paragraph illustrate(s) Movie Data Selecting Software H79c1 of Host H and Movie Data Selecting Software 20679c1 of Communication Device 200, which select the movie for which the movie eticket is to be purchased. In the present embodiment, Host H retrieves all movie IDs and movie data from Movie Data Storage Area H79b1, and sends these data to Communication Device 200 in a wireless fashion (S1). Upon receiving the movie IDs and the movie data from Host H, CPU 211 (FIG. 1) of Communication Device 200 stores these data in Movie Data Storage Area 20679b1 (S2). CPU 211 retrieves the movie data from Movie Data Storage Area 20679b1 and displays a movie list on LCD 201 (FIG. 1) (S3). The user of Communication Device 200 selects a movie data (e.g., Movie Data#1) by utilizing Input Device 210 (FIG. 1) or via voice recognition system (S4).

This paragraph illustrate(s) Purchase Data Producing Software H79c2 of Host H and Purchase Data Producing Software 20679c2 of Communication Device 200, which produce a purchase data. In the present embodiment, CPU 211 (FIG. 1) of Communication Device 200 retrieves its user data (e.g., User Data#4) from User Data Storage Area 20679b2 (S1), and sends in a wireless fashion the corresponding movie ID (e.g., Movie#1) of the movie data selected in S4 (e.g., Movie Data#1) and the user data (e.g., User Data#4), which are received by Host H (S2). Host H retrieves the credit card information (e.g., Credit Card Information#4) from the user data (e.g., User Data#4), and initiates the credit card authentication process which is a process to authenticate the credit card information (e.g., Credit Card Information#4) (S3). If the credit card information is authenticated, Host H produces a new user ID (e.g., User#4) and stores the user data (e.g., User Data#4) at the user ID (e.g., User#4) in User Data Storage Area H79b2 (S4). Host H produces a purchase data (e.g., Purchase Data#4) and stores the data at the user ID (e.g., User#4) in Purchase Data Storage Area H79b3 (S5). Host H sends the purchase data (e.g., Purchase Data#4) in a wireless fashion, and Communication Device 200 receives the data (S6). CPU 211 of Communication Device 200 stores the purchase data (e.g., Purchase Data#4) in Purchase Data Storage Area 20679b3 (S7).

This paragraph illustrate(s) Purchase Data/User Data Updating Software H79c3b of Host H and Purchase Data/User Data Updating Software MAD79c3b of Movie eTicket Authenticating Device MAD79, which update the purchase data and the user data stored in Movie eTicket Authenticating Device MAD79. In the present embodiment, Host H retrieves all user IDs and purchase data from Purchase Data Storage Area H79b3 (S1). Host H retrieves all user IDs and user data from User Data Storage Area H79b2 (S2). Host H sends the data retrieved in S1 and S2, and Movie eTicket Authenticating Device MAD79 receives the data (S3). Movie eTicket Authenticating Device MAD79 stores the user IDs and the purchase data in Purchase Data Storage Area MAD79b1 (S4). Movie eTicket Authenticating Device MAD79 stores the user IDs and the user data in User Data Storage Area MAD79b2 (S5).

This paragraph illustrate(s) Purchase Data/User Data Authenticating Software MAD79c4b of Movie eTicket Authenticating Device MAD79 and Purchase Data/User Data Authenticating Software 20679c4b of Communication Device 200, which authenticate the purchase data and the user data stored in Movie eTicket Authenticating Device MAD79. In the present embodiment, CPU 211 (FIG. 1) of Communication Device 200 retrieves the purchase data (e.g., Purchase Data#4) from Purchase Data Storage Area 20679b3 (S1). CPU 211 retrieves the user data (e.g., User Data#4) from User Data Storage Area 20679b2 (S2). CPU 211 retrieves the movie data from Movie Data Storage Area 20679b1 (S3). CPU 211 sends in a wireless fashion the data retrieved in S1, S2 and S3, and Movie eTicket Authenticating Device MAD79 receives the data (S4). Movie eTicket Authenticating Device MAD79 stores the purchase data (e.g., Purchase Data#4), the user data (e.g., User Data#4), and the movie data (e.g., Movie Data#1) in Work Area MAD79b3 (S5). Movie eTicket Authenticating Device MAD79 performs the authentication process, i.e., scans Purchase Data Storage Area MAD79b1 (S6), and also scans User Data Storage Area MAD79b2 (S7). Movie eTicket Authenticating Device MAD79 sends the admission signal to Admission Gate Controller AGC79 to open Admission Gate AG79 (S8). Movie eTicket Authenticating Device MAD79 sends in a wireless fashion the purchase data granted signal, which is received by Communication Device 200 (S9). Here, the purchase data granted signal is the signal which indicates that the purchase data (e.g., Purchase Data#4) is authenticated and thereby the user of Communication Device 200 is allowed to go through Admission Gate AG79. CPU 211 (FIG. 1) of Communication Device 200 stores the purchase data granted signal in Work Area 20679b4 (S10). Movie eTicket Authenticating Device MAD79 sends in a wireless fashion the user data granted signal, which is received by Communication Device 200 (S11). Here, the user data granted signal is the signal which indicates that the user data (e.g., User Data#4) is authenticated and thereby the user of Communication Device 200 is allowed to go through Admission Gate AG79. CPU 211 stores the user data granted signal in Work Area 20679b4 (S12). CPU 211 displays the Movie eTicket granted notification data on LCD 201 (FIG. 1) (S13). Here, the movie eticket granted notification data is an image data designed to be displayed on LCD 201 (FIG. 1) which indicates that the user of Communication Device 200 is allowed to go through Admission Gate AG79. If the movie theater has no Admission Gate AG79 or Admission Gate AG79 is not functioning, the attendant of the movie theater may visually confirm the purchase data granted notification displayed on LCD 201 (FIG. 1), and thereby allow the user of Communication Device 200 to enter the movie theater. The movie eticket granted notification data may include the user data of the user of Communication Device 200 and the movie data described hereinbefore.

This paragraph illustrate(s) Purchase Data/User Data Deleting Software H79c5b of Host H and Purchase Data/User Data Deleting Software MAD79c5b of Movie eTicket Authenticating Device MAD79, which delete the purchase data and the user data stored in Movie eTicket Authenticating Device MAD79. In the present embodiment, Movie eTicket Authenticating Device MAD79 sends the Purchase Data/User Data expiration signal, which is received by Host H (S1). Here, the purchase data/user data expiration signal is the signal which indicates that the user of Communication Device 200 has gone through Admission Gate AG79 and, thereby, the purchase data (e.g., Purchase Data#4) and the user data (e.g., User Data#4) are no longer valid. Host H deletes the purchase data (e.g., Purchase Data#4) and the user ID (e.g., User#4) stored in Purchase Data Storage Area H79b3 (S2). Host H deletes the user ID (e.g., User#4) and the user data (e.g., User Data#4) stored in User Data Storage Area H79b2 (S3).

The term 'movie eticket' utilized in this specification means the purchase data granted signal, the purchase data granted notification data, the user data granted signal, the user data granted notification data, and/or any data which represents that the user of Communication Device 200 has duly purchased the movie ticket and/or has the right to enter the movie theater to watch the certain movie (e.g., Movie#1).

<<Carrier Prepaid eCard Function>>

The following paragraphs illustrate(s) the carrier prepaid ecard function which enables to purchase prepaid ecards via Communication Device 200 and board carrier by utilizing Communication Device 200 without utilizing paper tickets. Here, the carrier prepaid ecard is a prepaid card stored in Communication Device 200 in an electronic form (i.e., ecard). A certain amount of credit (e.g., the credit equivalent to $40) is stored in the carrier prepaid ecard, and carrier fare is charged thereto every time the user of Communication Device 200 boards a carrier. The term 'carrier' includes any carrier or transportation system capable of carrying passengers, such as railway train, bus, taxi, airplane, etc.

This paragraph illustrate(s) the storage area included in Host H. In the present embodiment, Host H includes Carrier Prepaid eCard Information Storage Area H80a of which the data and the software programs stored therein are described hereinafter.

This paragraph illustrate(s) the storage areas included in Carrier Prepaid eCard Information Storage Area H80a. In the present embodiment, Carrier Prepaid eCard Information Storage Area H80a includes Carrier Prepaid eCard Data Storage Area H80b and Carrier Prepaid eCard Software Storage Area H80c. Carrier Prepaid eCard Data Storage Area H80b stores the data necessary to implement the present function on the side of Host H, such as the ones described hereinafter. Carrier Prepaid eCard Software Storage Area H80c stores the software programs necessary to implement the present function on the side of Host H, such as the ones described hereinafter.

This paragraph illustrate(s) the storage areas included in Carrier Prepaid eCard Data Storage Area H80b. In the present embodiment, Carrier Prepaid eCard Data Storage Area H80b includes Prepaid eCard Type Data Storage Area H80b1, User Data Storage Area H80b2, Purchased eCard Type Data Storage Area H80b3, Balance Data Storage Area H80b4, and Work Area H80b5. Prepaid eCard Type Data Storage Area H80b1 stores the data described hereinafter. User Data Storage Area H80b2 stores the data described hereinafter. Purchased eCard Type Data Storage Area H80b3 stores the data described hereinafter. Balance Data Storage Area H80b4 stores the data described hereinafter. Work Area H80b5 is utilized as a work area to perform calculation and temporarily store data.

This paragraph illustrate(s) the data stored in Prepaid eCard Type Data Storage Area H80b1. In the present embodiment, Prepaid eCard Type Data Storage Area H80b1 comprises two columns, i.e., 'Prepaid eCard Type ID' and 'Prepaid eCard Type Data'. Column 'Prepaid eCard Type ID' stores the prepaid ecard type IDs, and each prepaid ecard type ID is an identification of the corresponding prepaid ecard type data stored in column 'Prepaid eCard Type Data'. Column 'Prepaid eCard Type Data' stores the prepaid ecard type data, and each prepaid ecard type data represents the type of the prepaid ecard capable to be purchased. In the present embodiment, Prepaid eCard Type Data Storage Area H80b1 stores the following data: the prepaid ecard type ID 'Prepaid eCard Type#1' and the corresponding prepaid ecard type data 'Prepaid eCard Type Data#1'; the prepaid ecard type ID 'Prepaid eCard T e#2' and the corresponding prepaid ecard type data 'Prepaid eCard Type Data#2'; the prepaid ecard type ID 'Prepaid eCard Type#3' and the corresponding prepaid ecard type data 'Prepaid eCard Type Data#3'; and the prepaid ecard type ID 'Prepaid eCard Type#4' and the corresponding prepaid ecard type data 'Prepaid eCard Type Data#4'. Here, the prepaid ecard type data 'Prepaid eCard Type Data#1' represents the credit equivalent to the amount of $10; the prepaid ecard type data 'Prepaid eCard Type Data#2' represents the credit equivalent to the amount of $20; the prepaid ecard type data 'Prepaid eCard Type Data#3' represents the credit equivalent to the amount of $30; and the prepaid ecard type data 'Prepaid eCard Type Data#4' represents the credit equivalent to the amount of $40.

This paragraph illustrate(s) the data stored in User Data Storage Area H80b2. In the present embodiment, User Data Storage Area H80b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area H80b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

This paragraph illustrate(s) the data stored in Purchased eCard Type Data Storage Area H80b3. In the present embodiment, Purchased eCard Type Data Storage Area H80b3 comprises two columns, i.e., 'User ID' and 'Purchased eCard Type Data'. Column 'User ID' stores the user IDs described hereinbefore. Column 'Purchased eCard Type Data' stores the purchased ecard type data, and each purchased ecard type data represents the type of the carrier (e.g., train) prepaid ecard purchased by the user of the corresponding user ID. In the present embodiment, Purchased eCard Type Data Storage Area H80b3 stores the following data: the user ID 'User#1' and the corresponding purchased ecard type data 'Prepaid eCard Type Data#2'; the user ID 'User#2' and the corresponding purchased ecard type data 'Prepaid eCard Type Data#2'; the user ID 'User#3' and the corresponding purchased ecard type data 'Prepaid eCard Type Data#4'; and the user ID 'User#4' and the corresponding purchased ecard type data 'Prepaid eCard Type Data#4'. The foregoing data represents that the user whose user ID is 'User#1' has purchased the carrier prepaid ecard of the credit equivalent to the amount of $20; the user whose user ID is 'User#2' has purchased the carrier prepaid ecard of the credit equivalent to the amount of $20; the user whose user ID is 'User#3' has purchased the carrier prepaid ecard of the credit equivalent to the amount of $40; and the user whose user ID is 'User#4' has purchased the carrier prepaid ecard of the credit equivalent to the amount of $40.

This paragraph illustrate(s) the data stored in Balance Data Storage Area H80b4. In the present embodiment, Balance Data Storage Area H80b4 comprises two columns, i.e., 'User ID' and 'Balance Data'. Column 'User ID' stores the user IDs described hereinbefore. Column 'Balance Data' stores the balance data, and each balance data represents the outstanding balance or the remaining credit of the carrier prepaid ecard. In the present embodiment, Balance Data Storage Area H80b4 stores the following data: the user ID 'User#1' and the corresponding balance data 'Balance Data#1'; the user ID 'User#2' and the corresponding balance data 'Balance Data#2'; the user ID 'User#3' and the corresponding balance data 'Balance Data#3'; and the user ID 'User#4' and the corresponding balance data 'Balance Data#4'. Here, the balance data 'Balance Data#1' represents the credit equivalent to the amount of $20; the balance data 'Balance Data#2' represents the credit equivalent to the amount of $20; the balance data 'Balance Data#3' represents the credit equivalent to the amount of $40; and the balance data 'Balance Data#4' represents the credit equivalent to the amount of $35. The foregoing balance data indicates that the users whose user IDs are User#1 through #3 have not yet used the carrier prepaid ecard yet, whereas the user whose user ID is User#4 has used the carrier prepaid ecard for $5.

This paragraph illustrate(s) the software programs stored in Carrier Prepaid eCard Software Storage Area H80c. In the present embodiment, Carrier Prepaid eCard Software Storage Area H80c stores Carrier Prepaid eCard Selecting Software H80c1, Charging Device Updating Software H80c2, eCard Authenticating Software H80c3, Balance Data Updating Software H80c5, and eCard Charged Notifying Software H80c6. Carrier Prepaid eCard Selecting Software H80c1 is the software program described hereinafter. Charging Device Updating Software H80c2 is the software program described hereinafter. eCard Authenticating Software H80c3 is the software program described hereinafter. Balance Data Updating Software H80c5 is the software program described hereinafter. eCard Charged Notifying Software H80c6 is the software program described hereinafter.

This paragraph illustrate(s) the storage area included in RAM 206 (FIG. 1) of Communication Device 200 (e.g., Device A). In the present embodiment, RAM 206 includes Carrier Prepaid eCard Information Storage Area 20680a of which the data and the software programs stored therein are described hereinafter.

This paragraph illustrate(s) the storage areas included in Carrier Prepaid eCard Information Storage Area 20680a. In the present embodiment, Carrier Prepaid eCard Information Storage Area 20680a includes Carrier Prepaid eCard Data Storage Area 20680b and Carrier Prepaid eCard Software Storage Area 20680c. Carrier Prepaid eCard Data Storage Area 20680b stores the data necessary to implement the present function on the side of Communication Device 200, such as the ones described hereinafter. Carrier Prepaid eCard Software Storage Area 20680c stores the software programs necessary to implement the present function on the side of Communication Device 200, such as the ones described hereinafter.

The data and/or the software programs stored in Carrier Prepaid eCard Information Storage Area 20680a may be downloaded from Host H in the manner described hereinafter.

This paragraph illustrate(s) the storage areas included in Carrier Prepaid eCard Data Storage Area 20680b. In the present embodiment, Carrier Prepaid eCard Data Storage Area 20680b includes Prepaid eCard Type Data Storage Area 20680b1, User Data Storage Area 20680b2, Purchased eCard Type Data Storage Area 20680b3, Balance Data Storage Area 20680b4, and Work Area 20680b5. Prepaid eCard Type Data Storage Area 20680b1 stores the data described hereinafter. User Data Storage Area 20680b2 stores the data described hereinafter. Purchased eCard Type Data Storage Area 20680b3 stores the data described hereinafter. Balance Data Storage Area 20680b4 stores the data described hereinafter. Work Area 20680b5 is utilized as a work area to perform calculation and temporarily store data.

This paragraph illustrate(s) the data stored in Prepaid eCard Type Data Storage Area 20680b1. In the present embodiment, Prepaid eCard Type Data Storage Area 20680b1 comprises two columns, i.e., 'Prepaid eCard Type ID' and 'Prepaid eCard Type Data'. Column 'Prepaid eCard Type ID' stores the prepaid ecard type IDs, and each prepaid ecard type ID is an identification of the corresponding prepaid ecard type data stored in column 'Prepaid eCard Type Data'. Column 'Prepaid eCard Type Data' stores the prepaid ecard type data, and each prepaid ecard type data represents the type of the prepaid ecard capable to be purchased. In the present embodiment, Prepaid eCard Type Data Storage Area 20680b1 stores the following data: the prepaid ecard type ID 'Prepaid eCard Type#1' and the corresponding prepaid ecard type data 'Prepaid eCard Type Data#1'; the prepaid ecard type ID 'Prepaid eCard Type#2' and the corresponding prepaid ecard type data 'Prepaid eCard Type Data#2'; the prepaid ecard type ID 'Prepaid eCard Type#3' and the corresponding prepaid ecard type data 'Prepaid eCard Type Data#3'; and the prepaid ecard type ID 'Prepaid eCard Type#4' and the corresponding prepaid ecard type data 'Prepaid eCard Type Data#4'. Here, the prepaid ecard type data 'Prepaid eCard Type Data#1' represents the credit equivalent to the amount of $10; the prepaid ecard type data 'Prepaid eCard Type Data#2' represents the credit equivalent to the amount of $20; the prepaid ecard type data 'Prepaid eCard Type Data#3' represents the credit equivalent to the amount of $30; and the prepaid ecard type data 'Prepaid eCard Type Data#4' represents the credit equivalent to the amount of $40.

This paragraph illustrate(s) the data stored in User Data Storage Area 20680b2. In the present embodiment, User Data Storage Area 20680b2 comprises two columns, i.e., 'User ID' and 'User Data'. Column 'User ID' stores the user ID which is an identification of the user data stored in column 'User Data'. Column 'User Data' stores the user data which includes name, home address, phone number, email address, and credit card information. Here, the name represents the name of the user of Communication Device 200 (e.g., device A), the home address represents the home address of the user of Communication Device 200 (e.g., device A), the phone number represents the phone number of the user of Communication Device 200 (e.g., device A), the email address represents the email address of the user of Communication Device 200 (e.g., device A), and the credit card information represents the credit card information of the user of Communication Device 200 (e.g., device A). In the present embodiment, User Data Storage Area 20680b2 stores the following data: the user ID 'User#4' and the user data 'User Data#4 (Name#4, Home Address#4, Phone Number#4, Email Address#4, Credit Card Information#4)'.

This paragraph illustrate(s) the data stored in Purchased eCard Type Data Storage Area 20680b3. In the present embodiment, Purchased eCard Type Data Storage Area 20680b3 comprises two columns, i.e., 'User ID' and 'Purchased eCard Type Data'. Column 'User ID' stores the user ID described hereinbefore. Column 'Purchased eCard Type Data' stores the purchased ecard type data which represents the type of the carrier (e.g., train) prepaid ecard purchased by the user of the corresponding user ID. In the present embodiment, Purchased eCard Type Data Storage Area 20680b3 stores the following data: the user ID 'User#4' of the user of Communication Device 200 (e.g., Device A) and the corresponding purchased ecard type data 'Prepaid eCard Type Data#4'. The foregoing data represents that the user whose user ID is 'User#4' has purchased the carrier prepaid ecard of the credit equivalent to the amount of $40.

This paragraph illustrate(s) the data stored in Balance Data Storage Area 20680b4. In the present embodiment, Balance Data Storage Area 20680b4 comprises two columns, i.e., 'User ID' and 'Balance Data'. Column 'User ID' stores the user IDs described hereinbefore. Column 'Balance Data' stores the balance data which represents the outstanding balance or the remaining credit of the carrier prepaid ecard. In the present embodiment, Balance Data Storage Area 20680b4 stores the following data: the user ID 'User#4' of the user of Communication Device 200 (e.g., Device A) and the corresponding balance data 'Balance Data#4'. Here, the balance data 'Balance Data#4' represents the credit equivalent to the amount of $35. The foregoing balance data indicates that the user whose user ID is User#4 has used the carrier prepaid ecard for $5.

This paragraph illustrate(s) the software programs stored in Carrier Prepaid eCard Software Storage Area 20680c. In the present embodiment, Carrier Prepaid eCard Software Storage Area 20680c stores Carrier Prepaid eCard Selecting Software 20680c1, eCard Authenticating Software 20680c3, eCard Charging Software 20680c4, and eCard Charged Notifying Software 20680c6. Carrier Prepaid eCard Selecting Software 20680c1 is the software program described hereinafter. eCard Authenticating Software 20680c3 is the software program described hereinafter. eCard Charging Software 20680c4 is the software program described hereinafter. eCard Charged Notifying Software 20680c6 is the software program described hereinafter.

This paragraph illustrate(s) Carrier Prepaid eCard Selecting Software H80c1 of Host H and Carrier Prepaid eCard Selecting Software 20680c1 of Communication Device 200, which select and purchase the carrier prepaid ecard. In the present embodiment, Host H retrieves all prepaid ecard type IDs and prepaid ecard type data from Prepaid eCard Type Data Storage Area H80b1 and sends the data to Communication Device 200 (S1). CPU 211 (FIG. 1) of Communication Device 200 receives the prepaid ecard type ID and the prepaid ecard type data from Host H and stores the data in Prepaid eCard Type Data Storage Area 20680b1 (S2). CPU 211 retrieves all prepaid ecard type data from Prepaid eCard Type Data Storage Area 20680b1 and displays a list of prepaid ecard type data on LCD 201 (FIG. 1) (S3). The user of Communication Device 200 (e.g., Device A) selects a prepaid ecard type data (e.g., Prepaid eCard Type Data#4) (S4). CPU 211 stores the prepaid ecard type data (e.g., Prepaid eCard Type Data#4) selected in previous step in Purchased eCard Type Data Storage Area 20680b3 (S5). CPU 211 retrieves the user ID (e.g., User#4) and the user data (e.g., User Data#4) from User Data Storage Area 20680b2 (S6). CPU 211 sends the prepaid ecard type ID (e.g., Prepaid eCard Type#4) of the prepaid ecard type Data (e.g., Prepaid eCard Type Data#4) stored in S5, the user ID (e.g., User#4) and the user data (e.g., User Data#4), which are received by Host H (S7). Host H stores the user ID (e.g., User#4) and the user data (e.g., User Data#4) in User Data Storage Area H80b2 (S8). Host H stores the user ID (e.g., User#4) and the prepaid ecard type ID (e.g., Prepaid eCard Type#4) in Purchased eCard Type Data Storage Area H80b3 (S9). Host H retrieves the credit card information (e.g., Credit Card Information#4) from User Data Storage Area H80b2 and charges thereto for the carrier prepaid ecard (e.g., $40) (S10).

This paragraph illustrate(s) the function of Carrier Prepaid eCard Charging Device TPCC80, Admission Gate Controller AGC80, and Admission Gate AG80. In the present embodiment, Carrier Prepaid eCard Charging Device TPCC80 is connected to Admission Gate Controller AGC80, and Admission Gate Controller AGC80 is connected to Admission Gate AG80. Admission Gate AG80 is the gate installed near or at the boarding entrance of a carrier. Admission Gate AG80 is normally closed, and opens only when an admission gate signal is sent from Admission Gate Controller AGC80. Passengers are able to go through Admission Gate AG80 when it is open. Admission Gate Controller AGC80 is a device to control Admission Gate AG80. Admission Gate Controller AGC80 sends the admission gate signal which is a command to open the gate of Admission Gate AG80. The admission gate signal is sent when Admission Gate Controller AGC80 receives an admission signal sent from Carrier Prepaid eCard Charging Device TPCC80. Here, the admission signal is a signal which indicates that a carrier prepaid ecard is authenticated of which the process therefor is explained hereinafter. The location of Admission Gate AG80 may differ depending on the type of the carrier. For example, Admission Gate AG80 may be installed in a railway station if the carrier is a railway train. Admission Gate AG80 may be installed in the carrier if the carrier is a bus. Admission Gate AG80 may be installed in the carrier if the carrier is a taxi. Admission Gate AG80 may be installed in an airport if the carrier is an airplane.

This paragraph illustrate(s) the storage areas included in Carrier Prepaid eCard Charging Information Storage Area TPCC80a. In the present embodiment, Carrier Prepaid eCard Charging Information Storage Area TPCC80a includes Carrier Prepaid eCard Charging Data Storage Area TPCC80b and Carrier Prepaid eCard Authenticating Software Storage Area TPCC80c. Carrier Prepaid eCard Charging Data Storage Area TPCC80b stores the data necessary to implement the present function on the side of Carrier Prepaid eCard Charging Device TPCC80, such as the ones described hereinafter. Carrier Prepaid eCard Authenticating Software Storage Area TPCC80c stores the software programs necessary to implement the present function on the side of Carrier Prepaid eCard Charging Device TPCC80, such as the ones described hereinafter.

This paragraph illustrate(s) the storage areas included in Carrier Prepaid eCard Charging Data Storage Area TPCC80b. In the present embodiment, Carrier Prepaid eCard Charging Data Storage Area TPCC80b includes User Data Storage Area TPCC80b2, Purchased eCard Type Data Storage Area TPCC80b3, Balance Data Storage Area TPCC80b4, and Work Area TPCC80b5. User Data Storage Area TPCC80b2 stores the data described hereinafter. Purchased eCard Type Data Storage Area TPCC80b3 stores the data described hereinafter. Balance Data Storage Area TPCC80b4 stores the data described hereinafter. Work Area TPCC80b5 is utilized as a work area to perform calculation and temporarily store data.

This paragraph illustrate(s) the data stored in User Data Storage Area TPCC80b2. In the present embodiment, User Data Storage Area TPCC80b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area TPCC80b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

This paragraph illustrate(s) the data stored in Purchased eCard Type Data Storage Area TPCC80b3. In the present embodiment, Purchased eCard Type Data Storage Area TPCC80b3 comprises two columns, i.e., 'User ID' and 'Purchased eCard Type Data'. Column 'User ID' stores the user IDs described hereinbefore. Column 'Purchased eCard Type Data' stores the purchased ecard type data, and each purchased ecard type data represents the type of the carrier (e.g., train) prepaid ecard purchased by the user of the corresponding user ID. In the present embodiment, Purchased eCard Type Data Storage Area TPCC80b3 stores the following data: the user ID 'User#1' and the corresponding purchased ecard type data 'Prepaid eCard Type Data#2'; the user ID 'User#2' and the corresponding purchased ecard type data 'Prepaid eCard Type Data#2'; the user ID 'User#3' and the corresponding purchased ecard type data 'Prepaid eCard Type Data#4'; and the user ID 'User#4' and the corresponding purchased ecard type data 'Prepaid eCard Type Data#4'. The foregoing data represents that the user whose user ID is 'User#1' has purchased the carrier prepaid ecard of the credit equivalent to the amount of $20; the user whose user ID is 'User#2' has purchased the carrier prepaid ecard of the credit equivalent to the amount of $20; the user whose user ID is 'User#3' has purchased the carrier prepaid ecard of the credit equivalent to the amount of $40; and the user whose user ID is 'User#4' has purchased the carrier prepaid ecard of the credit equivalent to the amount of $40.

This paragraph illustrate(s) the data stored in Balance Data Storage Area TPCC80b4. In the present embodiment, Balance Data Storage Area TPCC80b4 comprises two columns, i.e., 'User ID' and 'Balance Data'. Column 'User ID' stores the user IDs described hereinbefore. Column 'Balance Data' stores the balance data, and each balance data represents the outstanding balance or the remaining credit of the carrier prepaid ecard. In the present embodiment, Balance Data Storage Area TPCC80b4 stores the following data: the user ID 'User#1' and the corresponding balance data 'Balance Data#1'; the user ID 'User#2' and the corresponding balance data 'Balance Data#2'; the user ID 'User#3' and the corresponding balance data 'Balance Data#3'; and the user ID 'User#4' and the corresponding balance data 'Balance Data#4'. Here, the balance data 'Balance Data#1' represents the credit equivalent to the amount of $20; the balance data 'Balance Data#2' represents the credit equivalent to the amount of $20; the balance data 'Balance Data#3' represents the credit equivalent to the amount of $40; and the balance data 'Balance Data#4' represents the credit equivalent to the amount of $35. The foregoing balance data indicates that the users whose user IDs are User#1 through #3 have not yet used the carrier prepaid ecard yet, whereas the user whose user ID is User#4 has used the carrier prepaid ecard for $5.

This paragraph illustrate(s) the software programs stored in Carrier Prepaid eCard Authenticating Software Storage Area TPCC80c. In the present embodiment, Carrier Prepaid eCard Authenticating Software Storage Area TPCC80c stores Charging Device Updating Software TPCC80c2, eCard Authenticating Software TPCC80c3, eCard Charging Software TPCC80c4, and Balance Data Updating Software TPCC80c5. Charging Device Updating Software TPCC80c2 is the software program described hereinafter. eCard Authenticating Software TPCC80c3 is the software program described hereinafter. eCard Charging Software TPCC80c4 is the software program described hereinafter. Balance Data Updating Software TPCC80c5 is the software program described hereinafter.

This paragraph illustrate(s) Charging Device Updating Software H80c2 of Host H and Charging Device Updating Software TPCC80c2 of Carrier Prepaid eCard Charging Device TPCC80, which update all data stored in Carrier Prepaid eCard Charging Data Storage Area TPCC80b. In the present embodiment, Host H retrieves all data stored in User Data Storage Area H80b2, Purchased eCard Type Data Storage Area H80b3, and Balance Data Storage Area H80b4 and sends the data to Carrier Prepaid eCard Charging Device TPCC80 (S1). Carrier Prepaid eCard Charging Device TPCC80 receives the data selected in S1 from Host H (S2). Carrier Prepaid eCard Charging Device TPCC80 stores the User IDs and the user data in User Data Storage Area TPCC80b2 (S3). Carrier Prepaid eCard Charging Device TPCC80 stores the User IDs and the Purchased eCard Type Data in Purchased eCard Type Data Storage Area TPCC80b3 (S4). Carrier Prepaid eCard Charging Device TPCC80 stores the User IDs and the balance data in Balance Data Storage Area H80b4 (S5). The foregoing sequence is performed periodically, for example every morning at the predetermined time.

This paragraph illustrate(s) eCard Authenticating Software TPCC80c3 of Carrier Prepaid eCard Charging Device TPCC80 and eCard Authenticating Software 20680c3 of Communication Device 200, which authenticate Communication Device 200 before allowing the user to go through Admission Gate AG80. In the present embodiment, CPU 211 (FIG. 1) of Communication Device 200 retrieves the user data (e.g., User Data#4) from User Data Storage Area 20680b2 and sends the data to Carrier Prepaid eCard Charging Device TPCC80 for authentication purposes (S1). Carrier Prepaid eCard Charging Device TPCC80 receives the user data (e.g., User Data#4) and stores the data in Work Area TPCC80b5 (S2). Carrier Prepaid eCard Charging Device TPCC80 performs the user data authentication process (i.e., scans User Data Storage Area TPCC80b2 for matching user data) (TPCC80) (S3).

This paragraph illustrate(s) eCard Authenticating Software H80c3 of Host H and eCard Authenticating Software TPCC80c3 of Carrier Prepaid eCard Charging Device TPCC80, which authenticate Communication Device 200 before allowing the user to go through Admission Gate AG80. The present embodiment illustrate(s) another embodiment of the sequence described hereinbefore, wherein the user data authentication process is performed by Host H instead. In the present embodiment, CPU 211 (FIG. 1) of Communication Device 200 retrieves the user data (e.g., User Data#4) from User Data Storage Area 20680b2 and sends the data to Carrier Prepaid eCard Charging Device TPCC80 for authentication purposes (S1). Carrier Prepaid eCard Charging Device TPCC80 receives the user data (e.g., User Data#4) and stores the data in Work Area TPCC80b5 (S2). Carrier Prepaid eCard Charging Device TPCC80 retrieves the user data (e.g., User Data#4) from Work Area TPCC80b5 and sends the data to Host H (S3). Upon receiving the user data (e.g., User Data#4), Host H performs the user data authentication process (i.e., scans User Data Storage Area H80b2 for matching user data) (S4). If the matching user data (e.g., User Data#4) is found, Host H sends the user data authenticated signal, which is received by Carrier Prepaid eCard Charging Device TPCC80 (S5). Here, the user data authenticated signal is a signal indicating that the user data (e.g., User Data#4) sent from Carrier Prepaid eCard Charging Device TPCC80 is authenticated and thereby the user thereof is allowed to go through Admission Gate AG80.

This paragraph illustrate(s) eCard Charging Software TPCC80c4 of Carrier Prepaid eCard Charging Device TPCC80 and eCard Charging Software 20680c4 of Communication Device 200, which charge the carrier prepaid ecard. In the present embodiment, Carrier Prepaid eCard Charging Device TPCC80 sends the ecard charge data in a wireless fashion, which is received by Communication Device 200 (S1). Here, the ecard charge data is the data representing the carrier ticket fare charged (e.g., $5) to the carrier prepaid ecard stored in Communication Device 200 to purchase the carrier ticket. eCard Charge Data also includes the name of the carrier station where the carrier prepaid ecard is charged and the date charged. CPU 211 (FIG. 1) of Communication Device 200 deducts the ecard charge data (e.g., $5) from Balance Data#4 (e.g., $40) stored in Balance Data Storage Area 20680b4 and updates Balance Data#4 (e.g., $35) (S2). Carrier Prepaid eCard Charging Device TPCC80 deducts the ecard charge data (e.g., $5) from Balance Data#4 (e.g., $40) stored in Balance Data Storage Area TPCC80b4 and updates Balance Data#4 (e.g., $35) (S3). CPU 211 displays the data included in ecard charge data (for example, the amount charged (e.g., $5), the name of the carrier station where charged, and the date charged) on LCD 201 (FIG. 1) (S4). Carrier Prepaid eCard Charging Device TPCC80 sends the admission signal to Admission Gate Controller AGC80, and Admission Gate AG80 is open (S5). Here, admission signal is a signal which instructs Admission Gate AG80 to open its gate.

This paragraph illustrate(s) Balance Data Updating Software H80c5 of Host H and Balance Data Updating Software TPCC80c5 of Carrier Prepaid eCard Charging Device TPCC80, which update the balance data stored in Balance Data Storage Area H80b4 of Host H. In the present embodiment, Carrier Prepaid eCard Charging Device TPCC80 retrieves all user IDs and balance data from Balance Data Storage Area TPCC80b4 and sends the data to Host H (S1). Host H receives the data retrieved in S1 and updates the balance data stored in Balance Data Storage Area H80b4, if any (S2).

This paragraph illustrate(s) eCard Charged Notifying Software H80c6 of Host H and eCard Charged Notifying Software 20680c6 of Communication Device 200, which send an email to the user of Communication Device 200 notifying that his/her carrier prepaid ecard has been charged. In the present embodiment, Host H scans Balance Data Storage Area H80b4 for any updated balance data (S1). Host H identifies the updated balance data (e.g., Balance Data#4) (S2). Host H identifies the corresponding user ID (e.g., User#4) in User Data Storage Area H80b2 and retrieves the corresponding email address (e.g., Email Address#4) (S3). Host H sends the carrier prepaid ecard charged data to the email address (e.g., Email Address#4) stating the amount charged to the carrier prepaid ecard and the date charged, which is received by Communication Device 200 (S4).

<<Carrier ePass Function>>

This paragraph illustrates the carrier epass function which enables to purchase epasses via Communication Device 200 and board carrier by utilizing Communication Device 200 without utilizing paper passes. Here, the carrier epass is a pass, which enables the passenger to board a carrier for a certain period of time (e.g., 1 month from the date the carrier epass is purchased) without purchasing a ticket every time he/she boards the carrier, stored in Communication Device 200 in an electronic form (i.e., epass). The term 'carrier' includes any carrier or transportation system capable of carrying passengers, such as railway train, bus, taxi, airplane, etc.

This paragraph illustrates the storage area included in Host H. In the present embodiment, Host H includes Carrier ePass Information Storage Area H81a of which the data and the software programs stored therein are described hereinafter.

This paragraph illustrates the storage areas included in Carrier ePass Information Storage Area H81a. In the present embodiment, Carrier ePass Information Storage Area H81a includes Carrier ePass Data Storage Area H81b and Carrier ePass Software Storage Area H81c. Carrier ePass Data Storage Area H81b stores the data necessary to implement the present function on the side of Host H, such as the ones described hereinafter. Carrier ePass Software Storage Area H81c stores the software programs necessary to implement the present function on the side of Host H, such as the ones described hereinafter.

This paragraph illustrates the storage areas included in Carrier ePass Data Storage Area H81b. In the present embodiment, Carrier ePass Data Storage Area H81b includes ePass Type Data Storage Area H81b1, User Data Storage Area H81b2, Purchased ePass Type Data Storage Area H81b3, Expiring Date Data Storage Area H81b4, and Work Area H81b5. ePass Type Data Storage Area H81b1 stores the data described hereinafter. User Data Storage Area H81b2 stores the data described hereinafter. Purchased ePass Type Data Storage Area H81b3 stores the data described hereinafter. Expiring Date Data Storage Area H81b4 stores the data described hereinafter. Work Area H81b5 is utilized as a work area to perform calculation and temporarily store data.

This paragraph illustrates the data stored in ePass Type Data Storage Area H81b1. In the present embodiment, ePass Type Data Storage Area H81b1 comprises two columns, i.e., 'ePass Type ID' and 'ePass Type Data'. Column 'ePass Type ID' stores the epass type IDs, and each epass type ID is an identification of the corresponding epass type data stored in column 'ePass Type Data'. Column 'ePass Type Data' stores the epass type data, and each epass type data represents the carrier epass valid between two stations for a certain period of time. In the present embodiment, ePass Type Data Storage Area H81b1 stores the following data: the epass type ID 'ePass Type#1' and the corresponding epass type data 'ePass Type Data#1'; the epass type ID 'ePass Type#2' and the corresponding epass type data 'ePass Type Data#2'; the epass type ID 'ePass Type#3' and the corresponding epass type data 'ePass Type Data#3'; and the epass type ID 'ePass Type#4' and the corresponding epass type data 'ePass Type Data#4'. In the present example, the epass type data 'ePass Type Data#1' represents the carrier epass valid between station (or bus stop or terminal or airport) A and station (or bus stop or terminal or airport) B, which is valid for 1 month from the date the carrier epass is purchased; the epass type data 'ePass Type Data#2' represents the carrier epass valid between station (or bus stop or terminal or airport) C and station (or bus stop or terminal or airport) D, which is valid for 2 months from the date the carrier epass is purchased; the epass type data 'ePass Type Data#3' represents the carrier epass valid between station (or bus stop or terminal or airport) E and station (or bus stop or terminal or airport) F, which is valid for 3 months from the date the carrier epass is purchased; and the epass type data 'ePass Type Data#4' represents the carrier epass valid between station (or bus stop or terminal or airport) G and station (or bus stop or terminal or airport) H, which is valid for 4 months from the date the carrier epass is purchased. Here, stations (or bus stops or terminals) A through H may represent any stations (or bus stop or terminal) existing in this world.

This paragraph illustrates the data stored in User Data Storage Area H81b2. In the present embodiment, User Data Storage Area H81b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area H81b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

This paragraph illustrates the data stored in Purchased ePass Type Data Storage Area H81b3. In the present embodiment, Purchased ePass Type Data Storage Area H81b3 comprises two columns, i.e., 'User ID' and 'Purchased ePass Type Data'. Column 'User ID' stores the user IDs described hereinbefore. Column 'Purchased ePass Type Data' stores the purchased epass type data, and each purchased epass type data represents the type of the carrier epass purchased by the user of the corresponding user ID. In the present embodiment, Purchased ePass Type Data Storage Area H81b3 stores the following data: the user ID 'User#1' and the corresponding purchased epass type data 'ePass Type Data#2' which represents the carrier epass valid between station (or bus stop or terminal or airport) C and station (or bus stop or terminal or airport) D, which is valid for 2 months from the date the carrier epass is purchased; the user ID 'User#2' and the corresponding purchased epass type data 'ePass Type Data#2' which represents the carrier epass valid between station (or bus stop or terminal or airport) C and station (or bus stop or terminal or airport) D, which is valid for 2 months from the date the carrier epass is purchased; the user ID 'User#3' and the corresponding purchased epass type data 'ePass Type Data#4' which represents the carrier epass valid between station (or bus stop or terminal or airport) G and station (or bus stop or terminal or airport) H, which is valid for 4 months from the date the carrier epass is purchased; and the user ID 'User#4' and the corresponding purchased epass type data 'ePass Type Data#4' which represents the carrier epass valid between station (or bus stop or terminal or airport) G and station (or bus stop or terminal or airport) H, which is valid for 4 months from the date the carrier epass is purchased.

This paragraph illustrates the data stored in Expiring Date Data Storage Area H81b4. In the present embodiment, Expiring Date Data Storage Area H81b4 comprises two columns, i.e., 'User ID' and 'Expiring Date Data'. Column 'User ID' stores the user IDs described hereinbefore. Column 'Expiring Date Data' stores the expiring date data, and each expiring date data represents the date in 'yyyy/mm/dd' format at which the carrier epass expires which is purchased by the user of the corresponding user ID. In the present embodiment, Expiring Date Data Storage Area H81b4 stores the following data: the user ID 'User#1' and the corresponding expiring date data 'Expiring Date Data#1'; the user ID 'User#2' and the corresponding expiring date data 'Expiring Date Data#2'; the user ID 'User#3' and the corresponding expiring date data 'Expiring Date Data#3'; and the user ID 'User#4' and the corresponding expiring date data 'Expiring Date Data#4'. Each expiring date data is calculated by Host H by utilizing the corresponding epass type data stored in Purchased ePass Type Data Storage Area H81b3.

This paragraph illustrates the software programs stored in Carrier ePass Software Storage Area H81c. In the present embodiment, Carrier ePass Software Storage Area H81c stores Carrier ePass Selecting Software H81c1, Authenticating Device Updating Software H81c2, and ePass Authenticating Software H81c3. Carrier ePass Selecting Software H81c1 is the software program described hereinafter. Authenticating Device Updating Software H81c2 is the software program described hereinafter. ePass Authenticating Software H81c3 is the software program described hereinafter.

This paragraph illustrates the storage area included in RAM 206 (FIG. 1) of Communication Device 200 (e.g., Device A). In the present embodiment, RAM 206 includes Carrier ePass Information Storage Area 20681a of which the data and the software programs stored therein are described hereinafter.

This paragraph illustrates the storage areas included in Carrier ePass Information Storage Area 20681a. In the present embodiment, Carrier ePass Information Storage Area 20681a includes Carrier ePass Data Storage Area 20681b and Carrier ePass Software Storage Area 20681c. Carrier ePass Data Storage Area 20681b stores the data necessary to implement the present function on the side of Communication Device 200, such as the ones described hereinafter. Carrier ePass Software Storage Area 20681c stores the software programs necessary to implement the present function on the side of Communication Device 200, such as the ones described hereinafter.

The data and/or the software programs stored in Carrier ePass Software Storage Area 20681c may be downloaded from Host H in the manner described hereinafter.

This paragraph illustrates the storage areas included in Carrier ePass Data Storage Area 20681b. In the present embodiment, Carrier ePass Data Storage Area 20681b includes ePass Type Data Storage Area 20681b1, User Data Storage Area 20681b2, Purchased ePass Type Data Storage Area 20681b3, Expiring Date Data Storage Area 20681b4, and Work Area 20681b5. ePass Type Data Storage Area 20681b1 stores the data described hereinafter. User Data Storage Area 20681b2 stores the data described hereinafter. Purchased ePass Type Data Storage Area 20681b3 stores the data described hereinafter. Expiring Date Data Storage Area 20681b4 stores the data described hereinafter. Work Area 20681b5 is utilized as a work area to perform calculation and temporarily store data.

This paragraph illustrates the data stored in ePass Type Data Storage Area 20681b1. In the present embodiment, ePass Type Data Storage Area 20681b1 comprises two columns, i.e., 'ePass Type ID' and 'ePass Type Data'. Column 'ePass Type ID' stores the epass type IDs, and each epass type ID is an identification of the corresponding epass type data stored in column 'ePass Type Data'. Column 'ePass Type Data' stores the epass type data, and each epass type data represents the carrier epass valid between two stations for a certain period of time. In the present embodiment, ePass Type Data Storage Area 20681b1 stores the following data: the epass type ID 'ePass Type#1' and the corresponding epass type data 'ePass Type Data#1'; the epass type ID 'ePass Type#2' and the corresponding epass type data 'ePass Type Data#2'; the epass type ID 'ePass Type#3' and the corresponding epass type data 'ePass Type Data#3'; and the epass type ID 'ePass Type#4' and the corresponding epass type data 'ePass Type Data#4'. In the present example, the epass type data 'ePass Type Data#1' represents the carrier epass valid between station (or bus stop or terminal or airport) A and station (or bus stop or terminal or airport) B, which is valid for 1 month from the date the carrier epass is purchased; the epass type data 'ePass Type Data#2' represents the carrier epass valid between station (or bus stop or terminal or airport) C and station (or bus stop or terminal or airport) D, which is valid for 2 months from the date the carrier epass is purchased; the epass type data 'ePass Type Data#3' represents the carrier epass valid between station (or bus stop or terminal or airport) E and station (or bus stop or terminal or airport) F, which is valid for 3 months from the date the carrier epass is purchased; and the epass type data 'ePass Type Data#4' represents the carrier epass valid between station (or bus stop or terminal or airport) G and station (or bus stop or terminal or airport) H, which is valid for 4 months from the date the carrier epass is purchased. Here, stations (or bus stops or terminals) A through H may represent any stations (or bus stop or terminal) existing in this world.

This paragraph illustrates the data stored in User Data Storage Area 20681b2. In the present embodiment, User Data Storage Area 20681b2 comprises two columns, i.e., 'User ID' and 'User Data'. Column 'User ID' stores the user ID which is an identification of the user data stored in column 'User Data'. Column 'User Data' stores the user data which includes name, home address, phone number, email address, and credit card information. Here, the name represents the name of the user of Communication Device 200 (e.g., device A), the home address represents the home address of the user of Communication Device 200 (e.g., device A), the phone number represents the phone number of the user of Communication Device 200 (e.g., device A), the email address represents the email address of the user of Communication Device 200 (e.g., device A), and the credit card information represents the credit card information of the user of Communication Device 200 (e.g., device A). In the present embodiment, User Data Storage Area 20681b2 stores the following data: the user ID 'User#4' and the user data 'User Data#4 (Name#4, Home Address#4, Phone Number#4, Email Address#4, Credit Card Information#4)'.

This paragraph illustrates the data stored in Purchased ePass Type Data Storage Area 20681b3. In the present embodiment, Purchased ePass Type Data Storage Area 20681b3 comprises two columns, i.e., 'User ID' and 'Purchased ePass Type Data'. Column 'User ID' stores the user ID described hereinbefore. Column 'Purchased ePass Type Data' stores the purchased epass type data which represents the type of the carrier epass purchased by the corresponding user of the user ID 'User#4' (e.g., the user of Device A). In the present embodiment, Purchased ePass Type Data Storage Area 20681b3 stores the following data: the user ID 'User#4' and the corresponding purchased epass type data 'ePass Type Data#4' which represents the carrier epass valid between station (or bus stop or terminal or airport) G and station (or bus stop or terminal or airport) H, which is valid for 4 months from the date the carrier epass is purchased.

This paragraph illustrates the data stored in Expiring Date Data Storage Area 20681b4. In the present embodiment, Expiring Date Data Storage Area 20681b4 comprises two columns, i.e., 'User ID' and 'Expiring Date Data'. Column 'User ID' stores the user ID described hereinbefore. Column 'Expiring Date Data' stores the expiring date data which represents the date in 'yyyy/mm/dd' format at which the carrier epass expires which is purchased by the corresponding user of the user ID 'User#4' (e.g., the user of Device A). In the present embodiment, Expiring Date Data Storage Area 20681b4 stores the following data: the user ID 'User#4' and the corresponding expiring date data 'Expiring Date Data#4'.

This paragraph illustrates the software programs stored in Carrier ePass Software Storage Area 20681c. In the present embodiment, Carrier ePass Software Storage Area 20681c stores Carrier ePass Selecting Software 20681c1 and ePass Authenticating Software 20681c3. Carrier ePass Selecting Software 20681c1 is the software program described hereinafter. ePass Authenticating Software 20681c3 is the software program described hereinafter.

This paragraph illustrates Carrier ePass Selecting Software H81c1 of Host H and Carrier ePass Selecting Software 20681c1 of Communication Device 200, which select and purchase the carrier epass. In the present embodiment, Host H retrieves all epass type IDs and epass type data from ePass Type Data Storage Area H81b1 and sends the data to Communication Device 200 (S1). CPU 211 (FIG. 1) of Communication Device 200 receives the epass type IDs and the epass type data from Host H and stores the data in ePass Type Data Storage Area 20681b1 (S2). CPU 211 retrieves all epass type data from ePass Type Data Storage Area 20681b1 and displays a list of epass type data on LCD 201 (FIG. 1) (S3). The user of Communication Device 200 selects an epass type data (e.g., ePass Type Data#4) from the list by utilizing Input Device 210 (FIG. 1) or via voice recognition system (S4). CPU 211 stores the epass type data selected in the previous step in Purchased ePass Type Data Storage Area 20681b3 (S5). CPU 211 retrieves the user ID (e.g., User#4) and the user data (e.g., User Data#4) from User Data Storage Area 20681b2 (S6). CPU 211 sends the corresponding epass type ID (e.g., ePass Type#4), the user ID (e.g., User#4) and the user data (e.g., User Data#4), which are received by Host H (S7). Host H stores the user ID (e.g., User#4) and the user data (e.g., User Data#4) in User Data Storage Area H81b2 (S8). Host H stores the user ID (e.g., User#4) and the epass type ID (e.g., ePass Type#4) in Purchased ePass Type Data Storage Area H81b3 (S9). Host H calculates the expiring date data (e.g., Expiring Date Data#4) and stores the data in Expiring Date Data Storage Area H81b4 (S10).

This paragraph illustrates the function of Carrier ePass Authenticating Device CPAD81, Admission Gate Controller AGC81, and Admission Gate AG81. In the present embodiment, Carrier ePass Authenticating Device CPAD81 is connected to Admission Gate Controller AGC81, and Admission Gate Controller AGC81 is connected to Admission Gate AG81. Admission Gate AG81 is the gate installed at the entrance of a carrier. Admission Gate AG81 is normally closed, and opens only when an admission gate signal is sent from Admission Gate Controller AGC81. Passengers are able to go through Admission Gate AG81 when it is open. Admission Gate Controller AGC81 is a device to control Admission Gate AG81. Admission Gate Controller AGC81 sends the admission gate signal which is a command to open the gate of Admission Gate AG81. The admission gate signal is sent when Admission Gate Controller AGC81 receives an admission signal sent from Carrier ePass Authenticating Device CPAD81. Here, the admission signal is a signal which indicates that a carrier prepaid ecard is authenticated of which the process therefor is explained hereinafter. The location of Admission Gate AG81 may differ depending on the type of the carrier. For example, Admission Gate AG81 may be installed in a railway station if the carrier is a railway train. Admission Gate AG81 may be installed in the carrier if the carrier is a bus. Admission Gate AG81 may be installed in the carrier if the carrier is a taxi. Admission Gate AG81 may be installed in an airport if the carrier is an airplane.

This paragraph illustrates the storage areas included in Carrier ePass Authenticating Information Storage Area CPAD81a of Carrier ePass Authenticating Device CPAD81. In the present embodiment, Carrier ePass Authenticating Information Storage Area CPAD81a includes Carrier ePass Authenticating Data Storage Area CPAD81b and Carrier ePass Authenticating Software Storage Area CPAD81c. Carrier ePass Authenticating Data Storage Area CPAD81b stores the data necessary to implement the present function on the side of Carrier ePass Authenticating Device CPAD81, such as the ones described hereinafter. Carrier ePass Authenticating Software Storage Area CPAD81c stores the software programs necessary to implement the present function on the side of Carrier ePass Authenticating Device CPAD81, such as the ones described hereinafter.

This paragraph illustrates the storage areas included in Carrier ePass Authenticating Data Storage Area CPAD81b. In the present embodiment, Carrier ePass Authenticating Data Storage Area CPAD81b includes User Data Storage Area CPAD81b2, Purchased ePass Type Data Storage Area CPAD81b3, Expiring Date Data Storage Area CPAD81b4, and Work Area CPAD81b5. User Data Storage Area CPAD81b2 stores the data described hereinafter. Purchased ePass Type Data Storage Area CPAD81b3 stores the data described hereinafter. Expiring Date Data Storage Area CPAD81b4 stores the data described hereinafter. Work Area CPAD81b5 is utilized as a work area to perform calculation and temporarily store data.

This paragraph illustrates the data stored in User Data Storage Area CPAD81b2. In the present embodiment, User Data Storage Area CPAD81b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area CPAD81b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)';

and the user ID 'User#4' and the user data 'User Data#4 (Name#4, Home Address#4, Phone Number#4, Email Address#4, Credit Card Information#4)'.

This paragraph illustrates the data stored in Purchased ePass Type Data Storage Area CPAD81b3. In the present embodiment, Purchased ePass Type Data Storage Area CPAD81b3 comprises two columns, i.e., 'User ID' and 'Purchased ePass Type Data'. Column 'User ID' stores the user IDs described hereinbefore. Column 'Purchased ePass Type Data' stores the purchased epass type data, and each purchased epass type data represents the type of the carrier epass purchased by the user of the corresponding user ID. In the present embodiment, Purchased ePass Type Data Storage Area CPAD81b3 stores the following data: the user ID 'User#1' and the corresponding purchased epass type data 'ePass Type Data#2' which represents the carrier epass valid between station (or bus stop or terminal or airport) C and station (or bus stop or terminal or airport) D, which is valid for 2 months from the date the carrier epass is purchased; the user ID 'User#2' and the corresponding purchased epass type data 'ePass Type Data#2' which represents the carrier epass valid between station (or bus stop or terminal or airport) C and station (or bus stop or terminal or airport) D, which is valid for 2 months from the date the carrier epass is purchased; the user ID 'User#3' and the corresponding purchased epass type data 'ePass Type Data#4' which represents the carrier epass valid between station (or bus stop or terminal or airport) G and station (or bus stop or terminal or airport) H, which is valid for 4 months from the date the carrier epass is purchased; and the user ID 'User#4' and the corresponding purchased epass type data 'ePass Type Data#4' which represents the carrier epass valid between station (or bus stop or terminal or airport) G and station (or bus stop or terminal or airport) H, which is valid for 4 months from the date the carrier epass is purchased.

This paragraph illustrates the data stored in Expiring Date Data Storage Area CPAD81b4. In the present embodiment, Expiring Date Data Storage Area CPAD81b4 comprises two columns, i.e., 'User ID' and 'Expiring Date Data'. Column 'User ID' stores the user IDs described hereinbefore. Column 'Expiring Date Data' stores the expiring date data, and each expiring date data represents the date in 'yyyy/mm/dd' format at which the carrier epass expires which is purchased by the user of the corresponding user ID. In the present embodiment, Expiring Date Data Storage Area CPAD81b4 stores the following data: the user ID 'User#1' and the corresponding expiring date data 'Expiring Date Data#1'; the user ID 'User#2' and the corresponding expiring date data 'Expiring Date Data#2'; the user ID 'User#3' and the corresponding expiring date data 'Expiring Date Data#3'; and the user ID 'User#4' and the corresponding expiring date data 'Expiring Date Data#4'.

This paragraph illustrates the software programs stored in Carrier ePass Authenticating Software Storage Area CPAD81c. In the present embodiment, Carrier ePass Authenticating Software Storage Area CPAD81c stores Authenticating Device Updating Software CPAD81c2 and ePass Authenticating Software CPAD81c3. Authenticating Device Updating Software CPAD81c2 is the software program described hereinafter. ePass Authenticating Software CPAD81c3 is the software program described hereinafter.

This paragraph illustrates Authenticating Device Updating Software H81c2 of Host H and Authenticating Device Updating Software CPAD81c2 of Carrier ePass Authenticating Device CPAD81, which update all data stored in Carrier ePass Authenticating Data Storage Area CPAD81b. In the present embodiment, Host H retrieves all data stored in User Data Storage Area H81b2, Purchased ePass Type Data Storage Area H81b3, and Expiring Date Data Storage Area H81b4 and sends the data to Carrier ePass Authenticating Device CPAD81 (S1). Carrier ePass Authenticating Device CPAD81 receives the data selected in S1 from Host H (S2). Carrier ePass Authenticating Device CPAD81 stores the user IDs and the user data in User Data Storage Area CPAD81b2 (S3). Carrier ePass Authenticating Device CPAD81 stores the user IDs and the purchased epass type data in Purchased ePass Type Data Storage Area CPAD81b3 (S4). Carrier ePass Authenticating Device CPAD81 stores the user IDs and the expiring date data in Expiring Date Data Storage Area CPAD81b4 (S5). The foregoing sequence is performed periodically, for example every morning at the predetermined time.

This paragraph illustrates ePass Authenticating Software CPAD81c3 of Carrier ePass Authenticating Device CPAD81 and ePass Authenticating Software 20681c3 of Communication Device 200, which authenticate Communication Device 200 (e.g., Device A) before allowing the user to go through Admission Gate AG81. The following sequence is performed when Communication Device 200 is within the range of 1 m (or as another embodiment, within the range of 30 cm) from Admission Gate AG81. In the present embodiment, CPU 211 (FIG. 1) of Communication Device 200 retrieves the purchased epass type data (e.g., ePass Type Data#4) from Purchased ePass Type Data Storage Area 20681b3 (S1). CPU 211 retrieves the expiring date data (e.g., Expiring Date Data#4) from Expiring Date Data Storage Area 20681b4 (S2). CPU 211 sends the data selected in S1 and S2, which are received by Carrier ePass Authenticating Device CPAD81 (S3). Carrier ePass Authenticating Device CPAD81 performs the boarding station authentication process which is a process to check whether the station (or bus stop or terminal or airport) at which the user is boarding is covered by the purchased epass type data (e.g., ePass Type Data#4) (S4). Carrier ePass Authenticating Device CPAD81 performs the date authentication process which is a process to check whether the carrier epass has not yet expired by utilizing the expiring date data (e.g., Expiring Date Data#4) (S5). If the foregoing processes are successful, CPU 211 sends the epass authenticated data, which is received by Communication Device 200 (S6). Here, the epass authenticated data is the data indicating that the station (or bus stop or terminal or airport) at which the user is boarding is covered by the purchased epass type data (e.g., ePass Type Data#4) and the carrier epass has not yet expired. CPU 211 displays the epass authenticated data on LCD 201 (FIG. 1), and Carrier ePass Authenticating Device CPAD81 also displays the same data on the display (not shown) of Admission Gate AG81 (S7). Carrier ePass Authenticating Device CPAD81 sends the admission signal to Admission Gate Controller AGC81 to open Admission Gate AG81 (S8). Here, the admission signal is a signal which instructs Admission Gate AG81 to open its gate.

This paragraph illustrates ePass Authenticating Software CPAD81c3 of Carrier ePass Authenticating Device CPAD81 and ePass Authenticating Software 20681c3 of Communication Device 200, which authenticate Communication Device 200 (e.g., Device A) before allowing the user to go through Admission Gate AG81. The following sequence is performed when Communication Device 200 is within the range of 1 m (or as another embodiment, within the range of 30 cm) from Admission Gate AG81. The present paragraph illustrates another embodiment of the sequence described hereinbefore, wherein the two matching processes (the purchased epass type data matching process and the expiring date data matching process) are added to maximize the security of the foregoing two authentication processes. In the present embodiment, CPU 211 (FIG. 1) of Communication Device 200 retrieves the purchased epass type data (e.g., ePass Type Data#4) from Purchased ePass Type Data Storage Area 20681b3 (S1). CPU 211 retrieves the expiring date data (e.g., Expiring Date Data#4) from Expiring Date Data Storage Area 20681b4 (S2). CPU 211 sends the data selected in S1 and S2, which are received by Carrier ePass Authenticating Device CPAD81 (S3). Carrier ePass Authenticating Device CPAD81 performs the purchased epass type data matching process which is a process to check whether the epass type data (e.g., ePass Type Data#4) matches with the one stored in Purchased ePass Type Data Storage Area CPAD81b3 (S4). Carrier ePass Authenticating Device CPAD81 performs the expiring date data matching process which is a process to check whether the expiring date data (e.g., Expiring Date Data#4) matches with the one stored in Expiring Date Data Storage Area CPAD81b4 (S5). Carrier ePass Authenticating Device CPAD81 performs the boarding station authentication process which is a process to check whether the station (or bus stop or terminal or airport) at which the user is boarding is covered by the purchased epass type data (e.g., ePass Type Data#4) (S6). Carrier ePass Authenticating Device CPAD81 performs the date authentication process which is a process to check whether the carrier epass has not yet expired by utilizing the expiring date data (e.g., Expiring Date Data#4) (S7). If the foregoing processes are successful, Carrier ePass Authenticating Device CPAD81 sends the epass authenticated data, which is received by Communication Device 200 (S8). Here, the epass authenticated data is the data indicating that the station (or bus stop or terminal or airport) at which the user is boarding is covered by the purchased epass type data (e.g., ePass Type Data#4) and the carrier epass has not yet expired. CPU 211 displays the epass authenticated data on LCD 201 (FIG. 1), and Carrier ePass Authenticating Device CPAD81 also displays the same data on the display (not shown) of Admission Gate AG81 (S9). Carrier ePass Authenticating Device CPAD81 sends the admission signal to Admission Gate Controller AGC81 to open Admission Gate AG81 (S10). Here, the admission signal is a signal which instructs Admission Gate AG81 to open its gate.

This paragraph illustrates ePass Authenticating Software H81c3 of Host H, ePass Authenticating Software CPAD81c3 of Carrier ePass Authenticating Device CPAD81 and ePass Authenticating Software 20681c3 of Communication Device 200, which authenticate Communication Device 200 (e.g., Device A) before allowing the user to go through Admission Gate AG81. The following sequence is performed when Communication Device 200 is within the range of 1 m (or as another embodiment, within the range of 30 cm) from Admission Gate AG81. The present paragraph illustrates another embodiment of the sequence described hereinbefore, wherein the two authentication processes (the boarding station authentication process and the date authentication process) are performed by Host H. In the present embodiment, CPU 211 (FIG. 1) of Communication Device 200 retrieves the purchased epass type data (e.g., ePass Type Data#4) from Purchased ePass Type Data Storage Area 20681b3 (S1). CPU 211 retrieves the expiring date data (e.g., Expiring Date Data#4) from Expiring Date Data Storage Area 20681b4 (S2). CPU 211 sends the data selected in S1 and S2, which are received by Carrier ePass Authenticating Device CPAD81 (S3). Carrier ePass Authenticating Device CPAD81 forwards the data received in S3, which are received by Host H (S4). Host H performs the boarding station authentication process which is a process to check whether the station (or bus stop or terminal or airport) at which the user is boarding is covered by the purchased epass type data (e.g., ePass Type Data#4) (S5). Host H performs the date authentication process which is a process to check whether the carrier epass has not yet expired by utilizing the expiring date data (e.g., Expiring Date Data#4) (S6). If the foregoing processes are successful, Host H sends the epass authenticated data, which is received by Carrier ePass Authenticating Device CPAD81(S7). Here, the epass authenticated data is the data indicating that the station (or bus stop or terminal or airport) at which the user is boarding is covered by the purchased epass type data (e.g., ePass Type Data#4) and the carrier epass has not yet expired. Carrier ePass Authenticating Device CPAD81 forwards the epass authenticated data, which is received by Communication Device 200 (S8). CPU 211 displays the epass authenticated data on LCD 201 (FIG. 1), and Carrier ePass Authenticating Device CPAD81 also displays the same data on the display (not shown) of Admission Gate AG81 (S9). Carrier ePass Authenticating Device CPAD81 sends the admission signal to Admission Gate Controller AGC81 to open Admission Gate AG81 (S10). Here, the admission signal is a signal which instructs Admission Gate AG81 to open its gate.

This paragraph illustrates ePass Authenticating Software H81c3 of Host H, ePass Authenticating Software CPAD81c3 of Carrier ePass Authenticating Device CPAD81, and ePass Authenticating Software 20681c3 of Communication Device 200, which authenticate Communication Device 200 (e.g., Device A) before allowing the user to go through Admission Gate AG81. The following sequence is performed when Communication Device 200 is within the range of 1 m (or as another embodiment, within the range of 30 cm) from Admission Gate AG81. The present paragraph illustrates another embodiment of the sequence described hereinbefore, wherein the two authentication processes (the boarding station authentication process and the date authentication process) and the two matching processes (the purchased epass type data matching process and the expiring date data matching process) are performed by Host H. In the present embodiment, CPU 211 (FIG. 1) of Communication Device 200 retrieves the purchased epass type data (e.g., ePass Type Data#4) from Purchased ePass Type Data Storage Area 20681b3 (S1). CPU 211 retrieves the expiring date data (e.g., Expiring Date Data#4) from Expiring Date Data Storage Area 20681b4 (S2). CPU 211 sends the data selected in S1 and S2, which are received by Carrier ePass Authenticating Device CPAD81(S3). Carrier ePass Authenticating Device CPAD81 forwards the data received in S3, which are received by Host H (S4). Host H performs the purchased epass type data matching process which is a process to check whether the epass type data (e.g., ePass Type Data#4) matches with the one stored in Purchased ePass Type Data Storage Area H81b3 (S5). Host H performs the expiring date data matching process which is a process to check whether the expiring date data (e.g., Expiring Date Data#4) matches with the one stored in Expiring Date Data Storage Area H81b4 (S6). Host H performs the boarding station authentication process which is a process to check whether the station (or bus stop or terminal or airport) at which the user is boarding is covered by the purchased epass type data (e.g., ePass Type Data#4) (S7). Host H performs the date authentication process which is a process to check whether the carrier epass has not yet expired by utilizing the expiring date data (e.g., Expiring Date Data#4) (S8). If the foregoing processes are successful, Host H sends the epass authenticated data, which is received by Carrier ePass Authenticating Device CPAD81 (S9). Here, the epass authenticated data is the data indicating that the station (or bus stop or terminal or airport) at which the user is boarding is covered by the purchased epass type data (e.g., ePass Type Data#4) and the carrier epass has not yet expired. Carrier ePass Authenticating Device CPAD81 forwards the epass authenticated data, which is received by Communication Device 200 (S10). CPU 211 displays the epass authenticated data on LCD 201 (FIG. 1), and Carrier ePass Authenticating Device CPAD81 also displays the same data on the display (not shown) of Admission Gate AG81 (S11). Carrier ePass Authenticating Device CPAD81 sends the admission signal to Admission Gate Controller AGC81 to open Admission Gate AG81 (S12). Here, the admission signal is a signal which instructs Admission Gate AG81 to open its gate.

<<Communication Device 200 Installed in Carrier>>

This paragraph illustrate(s) Communication Device 200 which is installed in a carrier. In the present embodiment, Communication Device 200 can be installed in Carrier C82. Here, Carrier C82 is a carrier or transportation system designed to carry passenger(s), such as automobile, motorcycle, railway train, taxi, bus, airplane, space ship, and space station. Communication Device 200 is the device described in FIG. 1.

<<In-Carrier Notifying Function>>

The following paragraphs illustrate(s) the in-carrier notifying function wherein a predetermined notice indicating that the user of Communication Device 200 is currently in carrier is announced while the user is utilizing the voice communication mode of Communication Device 200. The present function is useful when the user receives a phone call, however, needs to suggest the caller that the user is required to hang up since he/she is currently riding a carrier. Here, the carrier may be any carrier or transportation system designed to carry passenger(s), such as automobile, motorcycle, railway train, taxi, bus, space ship, and space station.

This paragraph illustrate(s) the antennas installed in Carrier CR83. Here, Carrier CR83 may be any carrier or transportation system designed to carry passenger(s), such as automobile, motorcycle, railway train, taxi, bus, space ship, and space station. In the present embodiment, six antennas, i.e., Antenna Ant83a, Antenna Ant83b, Antenna Ant83c, Antenna Ant83d, Antenna Ant83e, and Antenna Ant83f are installed in Carrier CR83. These antennas send and receive data in a wireless fashion.

This paragraph illustrate(s) the storage area included in Carrier CR83. In the present embodiment, Carrier CR83 includes In-Carrier Notifying Information Storage Area CR83a of which the data and the software programs stored therein are described hereinafter.

This paragraph illustrate(s) the storage areas included in In-Carrier Notifying Information Storage Area CR83a. In the present embodiment, In-Carrier Notifying Information Storage Area CR83a includes In-Carrier Notifying Data Storage Area CR83b and In-Carrier Notifying Software Storage Area CR83c. In-Carrier Notifying Data Storage Area CR83b stores the data necessary to implement the present function on the side of Carrier CR83, such as the ones described hereinafter. In-Carrier Notifying Software Storage Area CR83c stores the software programs necessary to implement the present function on the side of Carrier CR83, such as the one described hereinafter.

This paragraph illustrate(s) the storage areas included in In-Carrier Notifying Data Storage Area CR83b. In the present embodiment, In-Carrier Notifying Data Storage Area CR83b includes In-Carrier Notifying Data Storage Area CR83b1 and Work Area CR83b2. In-Carrier Notifying Data Storage Area CR83b1 stores the data described hereinafter. Work Area CR83b2 is utilized as a work area to perform calculation and temporarily store data.

This paragraph illustrate(s) the data stored in In-Carrier Notifying Data Storage Area CR83b1. In the present embodiment, In-Carrier Notifying Data Storage Area CR83b1 stores the in-carrier notifying data. Here, the in-carrier notifying data is the data designed to be output from Antenna Ant83a, Antenna Ant83b, Antenna Ant83c, Antenna Ant83d, Antenna Ant83e, and Antenna Ant83f in a wireless fashion respectively, which induces Communication Device 200 to output the message data described hereinafter.

This paragraph illustrate(s) the software programs stored in In-Carrier Notifying Software Storage Area CR83c. In the present embodiment, In-Carrier Notifying Software Storage Area CR83c stores In-Carrier Notifying Data Transmitting Software CR83c1. In-Carrier Notifying Data Transmitting Software CR83c1 is the software program described hereinafter.

This paragraph illustrate(s) In-Carrier Notifying Data Transmitting Software CR83 of Carrier CR83, which transmits the in-carrier notifying data periodically in a wireless fashion. In the present embodiment, Carrier CR83 retrieves the in-carrier notifying data from In-Carrier Notifying Data Storage Area CR83b1 (S1). Carrier CR83 transmits the in-carrier notifying data from Antenna Ant83a, Antenna Ant83b, Antenna Ant83c, Antenna Ant83d, Antenna Ant83e, and Antenna Ant83f, respectively (S2). The foregoing sequence is performed periodically.

This paragraph illustrate(s) the storage area included in RAM 206 (FIG. 1) of Communication Device 200. In the present embodiment, RAM 206 includes In-Carrier Notifying Information Storage Area 20683a of which the data and the software programs stored therein are described hereinafter.

The data and/or the software programs stored in In-Carrier Notifying Information Storage Area 20683a may be downloaded from Host H in the manner described hereinafter.

This paragraph illustrate(s) the storage areas included in In-Carrier Notifying Information Storage Area 20683a. In the present embodiment, In-Carrier Notifying Information Storage Area 20683a includes In-Carrier Notifying Data Storage Area 20683b and In-Carrier Notifying Software Storage Area 20683c. In-Carrier Notifying Data Storage Area 20683b stores the data necessary to implement the present function on the side of Communication Device 200, such as the ones described hereinafter. In-Carrier Notifying Software Storage Area 20683c stores the software programs necessary to implement the present function on the side of Communication Device 200, such as the ones described hereinafter.

This paragraph illustrate(s) the storage areas included in In-Carrier Notifying Data Storage Area 20683b. In the present embodiment, In-Carrier Notifying Data Storage Area 20683b includes Message Data Storage Area 20683b1, Selected Message ID Storage Area 20683b2, User's Name Data Storage Area 20683b3, and Work Area 20683b4. Message Data Storage Area 20683b1 stores the data described hereinafter. Selected Message ID Storage Area 20683b2 stores the data described hereinafter. User's Name Data Storage Area 20683b3 stores the data described hereinafter. Work Area 20683b4 is utilized as a work area to perform calculation and temporarily store data.

This paragraph illustrate(s) the data stored in Message Data Storage Area 20683b1. In the present embodiment, Message Data Storage Area 20683b1 comprises two columns, i.e., 'Message ID' and 'Message Data'. Column 'Message ID' stores the message IDs, and each message ID is the identification of the corresponding message data stored in column 'Message Data'. Column 'Message Data' stores the message data, and each message data is an audio data indicating the following sentence in different expressions: 'The user is currently in carrier.' In the present embodiment, Message Data Storage Area 20683b1 stores the following data: the message ID 'Message#1' and the corresponding message data 'Message Data#1'; the message ID 'Message#2' and the corresponding message data 'Message Data#2'; the message ID 'Message#3' and the corresponding message data 'Message Data#3'; and the message ID 'Message#4' and the corresponding message data 'Message Data#4'. Here, Message Data#1 is the audio data stating the following message in male voice: 'The user is currently in carrier.' Message Data#2 is the audio data stating the following message in female voice: 'The user is currently in carrier.' Message Data#3 is the audio data stating the following message in male voice: 'Please kindly understand that the user is not allowed to talk on the phone in carrier.' Message Data#4 is the audio data stating the following message in female voice: 'Please kindly understand that the user is not allowed to talk on the phone in carrier.'

This paragraph illustrate(s) the data stored in Selected Message ID Storage Area 20683b2. Selected Message ID Storage Area 20683b2 stores one of the message IDs stored in Message Data Storage Area 20683b1. In the present example, Selected Message ID Storage Area 20683b2 stores the message ID 'Message#1'.

This paragraph illustrate(s) the data stored in User's Name Data Storage Area 20683b3. User's Name Data Storage Area 20683b3 stores the user's name data. Here, the user's name data is an audio data representing the name of the user of Communication Device 200.

This paragraph illustrate(s) the software programs stored in In-Carrier Notifying Software Storage Area 20683c. In the present embodiment, In-Carrier Notifying Software Storage Area 20683c stores In-Carrier Notifying Data Detecting Software 20683c2, Message Data Outputting Software 20683c3, and Message Data Selecting Software 20683c4. In-Carrier Notifying Data Detecting Software 20683c2 is the software program described hereinafter. Message Data Outputting Software 20683c3 is the software program described hereinafter. Message Data Selecting Software 20683c4 is the software program described hereinafter.

This paragraph illustrate(s) In-Carrier Notifying Data Detecting Software 20683c2 of Communication Device 200, which detects the in-carrier notifying data transmitted from Antenna Ant83a, Antenna Ant83b, Antenna Ant83c, Antenna Ant83d, Antenna Ant83e, and/or Antenna Ant83f. In the present embodiment, CPU 211 (FIG. 1) of Communication Device 200 periodically checks the incoming data received from Antenna 218 (FIG. 1) (S1). If the incoming data is the in-carrier notifying data (S2), CPU 211 executes Message Data Outputting Software 20683c3 (S3).

This paragraph illustrate(s) Message Data Outputting Software 20683c3 of Communication Device 200, which outputs the selected message data. In the present embodiment, CPU 211 (FIG. 1) of Communication Device 200 periodically checks the voice communication mode status (S1). If Communication Device 200 is in the voice communication mode (S2), CPU 211 identifies the message ID (e.g., Message#1) stored in Selected Message ID Storage Area 20683b2 (S3). CPU 211 retrieves the corresponding message data (e.g., Message Data#1) from Message Data Storage Area 20683b1 (S4), and outputs the message data (e.g., Message Data#1) from Speaker 216 (FIG. 1) (S5). In addition, CPU 211 merges the message data (e.g., Message Data#1) with the outgoing user's voice data and sends the data to the counter party whom user is conversing with (S6). As a result, the counter party hears the message data (e.g., Message Data#1) from the speaker of his/her device (e.g., cellular phone).

This paragraph illustrate(s) Message Data Outputting Software 20683c3 of Communication Device 200, which outputs the selected message data. The present embodiment illustrate(s) another embodiment of the sequence described hereinbefore. In the present embodiment, CPU 211 (FIG. 1) of Communication Device 200 periodically checks the voice communication mode status (S1). If Communication Device 200 is in the voice communication mode (S2), CPU 211 identifies the message ID (e.g., Message#1) stored In Selected Message ID Storage Area 20683b2 (S3). CPU 211 retrieves the corresponding message data (e.g., Message Data#1) from Message Data Storage Area 20683b1 (S4). CPU 211 retrieves the user's name data from User's Name Data Storage Area 20683b3 (S5). CPU 211 embeds the user's name data to the message data (e.g., Message Data#1) and outputs the message data (e.g., Message Data#1) with user's name embedded from Speaker 216 (FIG. 1) (S6). CPU 211 merges the message data (e.g., Message Data#1) with the user's name embedded to outgoing user's voice data and sends the data to counter party whom user is conversing with (S7). As a result, the counter party hears the message data (e.g., Message Data#1) with the user's name embedded from the speaker of his/her device (e.g., cellular phone). Assuming that the user's name is 'Mr. John Doe'. The following is the message data (e.g., Message Data#1) without the user's name embedded: 'The user is currently in carrier.' The following is the message data (e.g., Message Data#1) with the user's name embedded: 'Mr. John Doe is currently in carrier.'

This paragraph illustrate(s) Message Data Selecting Software 20683c4 of Communication Device 200, which selects the message data which is output when Message Data Outputting Software 20683c3 is executed. In the present embodiment, CPU 211 (FIG. 1) of Communication Device 200 retrieves all message IDs from Message Data Storage Area 20683b1 and displays a list of the message IDs on LCD 201 (FIG. 1) (S1). The user of Communication Device 200 selects a message ID (e.g., Message#1) by utilizing Input Device 210 (FIG. 1) or via voice recognition system (S2). CPU 211 stores the message ID (e.g., Message#1) selected in the previous step in Selected Message ID Storage Area 20683b2 (S3).

<<Station Name Notifying Function>>

The following paragraphs illustrate(s) the station name notifying function which outputs the name of the next station at which the carrier is about to arrive. Here, the carrier may be any carrier or transportation system designed to carry passenger(s), such as automobile, motorcycle, railway train, taxi, bus, space ship, or space station. Here, the station is a location where the carrier picks up and/or drops off passenger(s). The station may be a railway station (if the carrier is a train), a bus stop (if the carrier is a bus), an airport (if the carrier is an airplane).

This paragraph illustrate(s) the antennas installed in Carrier CR84. Here, Carrier CR84 may be any carrier or transportation system designed to carry passenger(s), such as automobile, motorcycle, railway train, taxi, bus, space ship, or space station. In the present embodiment, six antennas, i.e., Antenna Ant84a, Antenna Ant84b, Antenna Ant84c, Antenna Ant84d, Antenna Ant84e, and Antenna Ant84f are installed in Carrier CR84. These antennas send and receive data in a wireless fashion.

This paragraph illustrate(s) the storage area included in Carrier CR84. In the present embodiment, Carrier CR84 includes Station Name Notifying Information Storage Area CR84a of which the data and the software programs stored therein are described hereinafter.

This paragraph illustrate(s) the storage areas included in Station Name Notifying Information Storage Area CR84a. In the present embodiment, Station Name Notifying Information Storage Area CR84a includes Station Name Notifying Data Storage Area CR84b and Station Name Notifying Software Storage Area CR84c. Station Name Notifying Data Storage Area CR84b stores the data necessary to implement the present function on the side of Carrier CR84, such as the ones described hereinafter. Station Name Notifying Software Storage Area CR84c stores the software programs necessary to implement the present function on the side of Carrier CR84, such as the ones described hereinafter.

This paragraph illustrate(s) the storage areas included in Station Name Notifying Data Storage Area CR84b. In the present embodiment, Station Name Notifying Data Storage Area CR84b includes Station Name Text Data Storage Area CR84b1, Station Name Sound Data Storage Area CR84b2, and Work Area CR84b3. Station Name Text Data Storage Area CR84b1 stores the data described hereinafter. Station Name Sound Data Storage Area CR84b2 stores the data described hereinafter. Work Area CR84b3 is utilized as a work area to perform calculation and temporarily store data.

This paragraph illustrate(s) the data stored in Station Name Text Data Storage Area CR84b1. In the present embodiment, Station Name Text Data Storage Area CR84b1 comprises two columns, i.e., 'Station Name ID' and 'Station Name Text Data'. Column 'Station Name ID' stores the station name IDs, and each station name ID is an identification of the corresponding station name text data stored in column 'Station Name Text Data'. Column 'Station Name Text Data' stores the station name text data, and each station name text data is an alphanumeric data indicating the name of the station designed to be displayed on LCD 201 (FIG. 1). In the present embodiment, Station Name Text Data Storage Area CR84b1 stores the following data: the station name ID 'Station Name#1' and the corresponding station name text data 'Station Name Text Data#1'; the station name ID 'Station Name#2' and the corresponding station name text data 'Station Name Text Data#2'; the station name ID 'Station Name#3' and the corresponding station name text data 'Station Name Text Data#3'; and the station name ID 'Station Name#4' and the corresponding station name text data 'Station Name Text Data#4'.

This paragraph illustrate(s) the data stored in Station Name Sound Data Storage Area CR84b2. In the present embodiment, Station Name Sound Data Storage Area CR84b2 comprises two columns, i.e., 'Station Name ID' and 'Station Name Sound Data'. Column 'Station Name ID' stores the station name IDs, and each station name ID is an identification of the corresponding station name sound data stored in column 'Station Name Sound Data'. The station name IDs stored in Station Name Sound Data Storage Area CR84b2 are identical to the ones stored in Station Name Text Data Storage Area CR84b1. Column 'Station Name Sound Data' stores the station name sound data, and each station name sound data is a sound data indicating the name of the station designed to be output from Speaker 216 (FIG. 1). In the present embodiment, Station Name Sound Data Storage Area CR84b2 stores the following data: the station name ID 'Station Name#1' and the corresponding station name sound data 'Station Name Sound Data#1'; the station name ID 'Station Name#2' and the corresponding station name sound data 'Station Name Sound Data#2'; the station name ID 'Station Name#3' and the corresponding station name sound data 'Station Name Sound Data#3'; and the station name ID 'Station Name#4' and the corresponding station name sound data 'Station Name Sound Data#4'. Here, the station name sound data 'Station Name Sound Data#1' represents the sound of the station name text data 'Station Name Text Data#1' stored in Station Name Text Data Storage Area CR84b1; the station name sound data 'Station Name Sound Data#2' represents the sound of the station name text data 'Station Name Text Data#2' stored in Station Name Text Data Storage Area CR84b1; the station name sound data 'Station Name Sound Data#3' represents the sound of the station name text data 'Station Name Text Data#3' stored in Station Name Text Data Storage Area CR84b1; and the station name sound data 'Station Name Sound Data#4' represents the sound of the station name text data 'Station Name Text Data#4' stored in Station Name Text Data Storage Area CR84b1.

This paragraph illustrate(s) the software programs stored in Station Name Notifying Software Storage Area CR84c. In the present embodiment, Station Name Notifying Software Storage Area CR84c stores Next Station Identifying Software CR84c1 and Station Name Data Sending/Receiving Software CR84c2. Next Station Identifying Software CR84c1 is the software program described hereinafter. Station Name Data Sending/Receiving Software CR84c2 is the software program described hereinafter.

This paragraph illustrate(s) Next Station Identifying Software CR84c1 of Carrier CR84, which identifies the next station at which Carrier CR84 is about to arrive. In the present embodiment, Carrier CR84 identifies the next station at which Carrier CR84 is about to arrive (S1). Carrier CR84 stores the station name ID of the next station in Work Area CR84b3 (S2).

This paragraph illustrate(s) the storage area included in RAM 206 (FIG. 1) of Communication Device 200. In the present embodiment, RAM 206 includes Station Name Notifying Information Storage Area 20684a of which the data and the software programs stored therein are described hereinafter.

The data and/or the software programs stored in Station Name Notifying Information Storage Area 20684a may be downloaded from Host H in the manner described hereinafter.

This paragraph illustrate(s) the storage areas included in Station Name Notifying Information Storage Area 20684a. In the present embodiment, Station Name Notifying Information Storage Area 20684a includes Station Name Notifying Data Storage Area 20684b and Station Name Notifying Software Storage Area 20684c. Station Name Notifying Data Storage Area 20684b stores the data necessary to implement the present function on the side of Communication Device 200, such as the ones described hereinafter. Station Name Notifying Software Storage Area 20684c stores the software programs necessary to implement the present function on the side of Communication Device 200, such as the ones described hereinafter.

This paragraph illustrate(s) the storage areas included in Station Name Notifying Data Storage Area 20684b. In the present embodiment, Station Name Notifying Data Storage Area 20684b includes Station Name Text Data Storage Area 20684b1, Station Name Sound Data Storage Area 20684b2, and Work Area 20684b3. Station Name Text Data Storage Area 20684b1 stores the data described hereinafter. Station Name Sound Data Storage Area 20684b2 stores the data described hereinafter. Work Area 20684b3 is utilized as a work area to perform calculation and temporarily store data.

This paragraph illustrate(s) the data stored in Station Name Text Data Storage Area 20684b1. In the present embodiment, Station Name Text Data Storage Area 20684b1 comprises two columns, i.e., 'Station Name ID' and 'Station Name Text Data'. Column 'Station Name ID' stores the station name ID which is an identification of the corresponding station name text data stored in column 'Station Name Text Data'. Column 'Station Name Text Data' stores the station name text data which is an alphanumeric data designed to be displayed on LCD 201 (FIG. 1) indicating the name of the station at which Carrier CR84 is about to arrive. In the present embodiment, Station Name Text Data Storage Area 20684b1 stores the following data: the station name ID 'Station Name#1' and the corresponding station name text data 'Station Name Text Data#1'.

This paragraph illustrate(s) the data stored in Station Name Sound Data Storage Area 20684b2. In the present embodiment, Station Name Sound Data Storage Area 20684b2 comprises two columns, i.e., 'Station Name Sound ID' and 'Station Name Sound Data'. Column 'Station Name Sound ID' stores the station name ID which is an identification of the corresponding station name sound data stored in column 'Station Name Sound Data'. The station name ID stored in Station Name Sound Data Storage Area CR84b2 is identical to the one stored in Station Name Text Data Storage Area CR84b1. Column 'Station Name Sound Data' stores the station name sound data which is the sound data designed to be output from Speaker 216 (FIG. 1) indicating the name of the station at which Carrier CR84 is about to arrive. In the present embodiment, Station Name Sound Data Storage Area 20684b2 stores the following data: the station name ID 'Station Name#1' and the corresponding station name sound data 'Station Name Sound Data#1'. Here, the station name sound data 'Station Name Sound Data#1' represents the sound of the station name text data 'Station Name Text Data#1' stored in Station Name Text Data Storage Area 20684b1.

This paragraph illustrate(s) the software programs stored in Station Name Notifying Software Storage Area 20684c. In the present embodiment, Station Name Notifying Software Storage Area 20684c stores Station Name Data Sending/Receiving Software 20684c1, Station Name Text Data Notifying Software 20684c2, and Station Name Sound Data Notifying Software 20684c3. Station Name Data Sending/Receiving Software 20684c1 is the software program described hereinafter. Station Name Text Data Notifying Software 20684c2 is the software program described hereinafter. Station Name Sound Data Notifying Software 20684c3 is the software program described hereinafter.

This paragraph illustrate(s) Station Name Data Sending/Receiving Software CR84c2 of Carrier CR84 and Station Name Data Sending/Receiving Software 20684c1 of Communication Device 200, which send the station name text data and the station name sound data to Communication Device 200. In the present embodiment, Carrier CR84 retrieves the station name ID (e.g., Station Name#1) of the next station from Work Area CR84b3 (S1). Carrier CR84 retrieves the corresponding station name text data (e.g., Station Name Text Data#1) from Station Name Text Data Storage Area CR84b1 (S2). Carrier CR84 retrieves the corresponding station name sound data (e.g., Station Name Sound Data#1) from Station Name Sound Data Storage Area CR84b2 (S3). Carrier CR84 sends the data retrieved in S1 through S3, which are received by Communication Device 200 via Antenna 218 (FIG. 1) (S4). CPU 211 (FIG. 1) of Communication Device 200 stores the station name ID (e.g., Station Name#1) and the corresponding station name text data (e.g., Station Name Text Data#1) in Station Name Text Data Storage Area 20684b1 (S5). CPU 211 stores the station name ID (e.g., Station Name#1) and the corresponding station name sound data (e.g., Station Name Sound Data#1) in Station Name Sound Data Storage Area 20684b2 (S6).

This paragraph illustrate(s) Station Name Text Data Notifying Software 20684c2 of Communication Device 200, which displays the station name text data on LCD 201 (FIG. 1). In the present embodiment, CPU 211 (FIG. 1) of Communication Device 200 retrieves the station name text data (e.g., Station Name Text Data#1) from Station Name Text Data Storage Area 20684b1 (S1) and displays the data on LCD 201 (FIG. 1) (S2). The foregoing sequence is performed periodically.

This paragraph illustrate(s) Station Name Sound Data Notifying Software 20684c3 of Communication Device 200, which outputs the station name sound data from Speaker 216 (FIG. 1). In the present embodiment, CPU 211 (FIG. 1) of Communication Device 200 retrieves the station name sound data (e.g., Station Name Sound Data#1) from Station Name Sound Data Storage Area 20684b2 (S1) and outputs the data from Speaker 216 (FIG. 1) (S2). The foregoing sequence is performed periodically.

<<Restaurant eMenu Function>>

The following paragraphs illustrate(s) the restaurant emenu function which enables the customer of a restaurant, i.e., the user of Communication Device 200, to display the restaurant menu on LCD 201 (FIG. 1) and order menu via Communication Device 200.

This paragraph illustrate(s) the location where Host H is installed. In the present embodiment, Host H is installed in a restaurant, Restaurant Rst85.

This paragraph illustrate(s) the storage area included in Host H. In the present embodiment, Host H includes Restaurant eMenu Information Storage Area H85a of which the data and the software programs stored therein are described hereinafter.

This paragraph illustrate(s) the storage areas included in Restaurant eMenu Information Storage Area H85a. In the present embodiment, Restaurant eMenu Information Storage Area H85a includes Restaurant eMenu Text Data Storage Area H85b and Restaurant eMenu Software Storage Area H85c. Restaurant eMenu Text Data Storage Area H85b stores the data necessary to implement the present function on the side of Host H, such as the ones described hereinafter. Restaurant eMenu Software Storage Area H85c stores the software programs necessary to implement the present function on the side of Host H, such as the ones described hereinafter.

This paragraph illustrate(s) the storage areas included in Restaurant eMenu Text Data Storage Area H85b. In the present embodiment, Restaurant eMenu Text Data Storage Area H85b includes Menu Text Data Storage Area H85b1, Menu Image Data Storage Area H85b2, Menu Price Data Storage Area H85b3, Selected Menu Data Storage Area H85b4, Order Status Data Storage Area H85b5, Total Price Data Storage Area H85b6, and Work Area H85b7. Menu Text Data Storage Area H85b1 stores the data described hereinafter. Menu Image Data Storage Area H85b2 stores the data described hereinafter. Menu Price Data Storage Area H85b3 stores the data described hereinafter. Selected Menu Data Storage Area H85b4 stores the data described hereinafter. Order Status Data Storage Area H85b5 stores the data described hereinafter. Total Price Data Storage Area H85b6 stores the data described hereinafter. Work Area H85b7 is utilized as a work area to perform calculation and temporarily store data.

This paragraph illustrate(s) the data stored in Menu Text Data Storage Area H85b1. In the present embodiment, Menu Text Data Storage Area H85b1 comprises two columns, i.e., 'Menu ID' and 'Menu Text Data'. Column 'Menu ID' stores the menu IDs, and each menu ID is an identification of the corresponding menu text data stored in column 'Menu Text Data'. Column 'Menu Text Data' stores the menu text data, and each menu text data represents the name of food or beverage. In the present embodiment, Menu Text Data Storage Area H85b1 stores the following data: the menu ID 'Menu#1' and the corresponding menu text data 'Menu Text Data#1'; the menu ID 'Menu#2' and the corresponding menu text data 'Menu Text Data#2'; the menu ID 'Menu#3' and the corresponding menu text data 'Menu Text Data#3'; and the menu ID 'Menu#4' and the corresponding menu text data 'Menu Text Data#4'. In the present example, the menu text data 'Menu Text Data#1' represents 'corn soup'; the menu text data 'Menu Text Data#2' represents 'salad'; the menu text data 'Menu Text Data#3' represents 'beefsteak'; and the menu text data 'Menu Text Data#4' represents 'orange juice'.

This paragraph illustrate(s) the data stored in Menu Image Data Storage Area H85b2. In the present embodiment, Menu Image Data Storage Area H85b2 comprises two columns, i.e., 'Menu ID' and 'Menu Image Data'. Column 'Menu ID' stores the menu IDs, and each menu ID is an identification of the corresponding menu image data stored in column 'Menu Image Data'. The menu IDs described in the present embodiment are identical to the ones described in the previous embodiment. Column 'Menu Image Data' stores the menu image data, and each menu image data is the image data describing the menu text data stored in Menu Text Data Storage Area H85b1 of the corresponding menu ID. In the example described in the present embodiment, Menu Image Data Storage Area H85b2 stores the following data: the menu ID 'Menu#1' and the corresponding menu image data 'Menu Image Data#1'; the menu ID 'Menu#2' and the corresponding menu image data 'Menu Image Data#2'; the menu ID 'Menu#3' and the corresponding menu image data 'Menu Image Data#3'; and the menu ID 'Menu#4' and the corresponding menu image data 'Menu Image Data#4'.

This paragraph illustrate(s) the data stored in Menu Price Data Storage Area H85b3. In the present embodiment, Menu Price Data Storage Area H85b3 comprises two columns, i.e., 'Menu ID' and 'Menu Price Data'. Column 'Menu ID' stores the menu IDs, and each menu ID is an identification of the corresponding menu price data stored in column 'Menu Price Data'. The menu IDs described in the present embodiment are identical to the ones described in the previous two embodiments. Column 'Menu Price Data' stores the menu price data, and each menu price data indicates the price of the menu of the corresponding menu ID. In the present embodiment, Menu Price Data Storage Area H85b3 stores the following data: the menu ID 'Menu#1' and the corresponding menu price data 'Menu Price Data#1'; the menu ID 'Menu#2' and the corresponding menu price data 'Menu Price Data#2'; the menu ID 'Menu#3' and the corresponding menu price data 'Menu Price Data#3'; and the menu ID 'Menu#4' and the corresponding menu price data 'Menu Price Data#4'. In the present example, the menu price data 'Menu Price Data#1' represents '$5'; the menu price data 'Menu Price Data#2' represents '$5'; the menu price data 'Menu Price Data#3' represents '$10'; and the menu price data 'Menu Price Data#4' represents '$5'.

This paragraph illustrate(s) the data stored in Selected Menu Data Storage Area H85b4. In the present embodiment, Selected Menu Data Storage Area H85b4 comprises two columns, i.e., 'Order ID' and 'Selected Menu Data'. Column 'Order ID' stores the order IDs, and each order ID is an identification of the corresponding selected menu data stored in column 'Selected Menu Data'. Column 'Selected Menu Data' stores the selected menu data, and each selected menu data includes the data regarding the menu selected by a customer (i.e., the user of Communication Device 200). In the present embodiment, Selected Menu Data Storage Area H85b4 stores the following data: the order ID 'Order#1' and the corresponding selected menu data 'Selected Menu Data#1'; the order ID 'Order#2' and the corresponding selected menu data 'Selected Menu Data#2'; the order ID 'Order#3' and the corresponding selected menu data 'Selected Menu Data#3'; and the order ID 'Order#4' and the corresponding selected menu data 'Selected Menu Data#4'.

This paragraph illustrate(s) the selected menu data 'Selected Menu Data#1' as an example of the data stored in Selected Menu Data Storage Area H85b4. In the present embodiment, Selected Menu Data#1 includes the menu IDs 'Menu#1, Menu#2, and Menu#3'. Referring to the data stored in Menu Text Data Storage Area H85b1, the selected menu data described in the present embodiment indicates that a customer (i.e., a user of Communication Device 200) represented by the order ID 'Order#1' selected corn soup, salad, and beefsteak.

This paragraph illustrate(s) the selected menu data 'Selected Menu Data#2' as an example of the selected menu data stored in Selected Menu Data Storage Area H85b4. In the present embodiment, Selected Menu Data#2 includes the menu ID 'Menu#4'. Referring to the data stored in Menu Text Data Storage Area H85b1, the selected menu data described in the present embodiment indicates that another customer (i.e., another user of Communication Device 200) represented by the order ID 'Order#2' selected orange juice.

This paragraph illustrate(s) the data stored in Order Status Data Storage Area H85b5. In the present embodiment, Order Status Data Storage Area H85b5 comprises two columns, i.e., 'Order ID' and 'Order Status Data'. Column 'Order ID' stores the order IDs, and each order ID is an identification of the corresponding order status data stored in column 'Order Status Data'. The order IDs described in the present embodiment are identical to the ones stored in Selected Menu Data Storage Area H85b4. Column 'Order Status Data' stores the order status data, and each order status data represents the current status of the order of each food or beverage, i.e., whether the corresponding food or beverage is served to the corresponding customer or not. In the present embodiment, Order Status Data Storage Area H85b5 stores the following data: the order ID 'Order#1' and the corresponding order status data 'Order Status Data#1'; the order ID 'Order#2' and the corresponding order status data 'Order Status Data#2'; the order ID 'Order#3' and the corresponding order status data 'Order Status Data#3'; and the order ID 'Order#4' and the corresponding order status data 'Order Status Data#4'.

This paragraph illustrate(s) the order status data 'Order Status Data#1' as an example of the data stored in Order Status Data Storage Area H85b5. In the present embodiment, Order Status Data#1 includes two columns, i.e., 'Menu ID' and 'Status Data'. Column 'Menu ID' stores the menu IDs, and each menu ID is an identification of the corresponding status data stored in column 'Status Data'. The menu IDs described in the present embodiment are identical to the ones stored in Menu Text Data Storage Area H85b1. Column 'Status Data' stores the status data, and each status data represents the current status of the order of the food or beverage of the corresponding menu ID, i.e., whether the food or beverage of the corresponding menu ID is served to the corresponding customer or not. The status data is indicated by either 'Served' or 'Not Served'. In the present embodiment, Order Status Data#1 stores the following data: the menu ID 'Menu#1' and the corresponding status data 'Served'; the menu ID 'Menu#2' and the corresponding status data 'Served'; and the menu ID 'Menu#3' and the corresponding status data Not Served'. The present example indicates that the ordered corn soup is served, the ordered salad is served, however, the ordered beefsteak is not yet served.

This paragraph illustrate(s) the order status data 'Order Status Data#2' as an example of the data stored in Order Status Data Storage Area H85b5. In the present embodiment, Order Status Data#2 includes two columns, i.e., 'Menu ID' and 'Status Data'. Column 'Menu ID' stores the menu IDs, and each menu ID is an identification of the corresponding status data stored in column 'Status Data'. The menu IDs described in the present embodiment are identical to the ones stored in Menu Text Data Storage Area H85b1. Column 'Status Data' stores the status data, and each status data represents the current status of the order of the food or beverage of the corresponding menu ID, i.e., whether the food or beverage of the corresponding menu ID is served to the corresponding customer or not. The status data is indicated by either 'Served' or Not Served'. In the present embodiment, Order Status Data#2 stores the following data: the menu ID 'Menu#4' and the corresponding status data Not Served'. The present example indicates that the ordered orange juice is not yet served.

This paragraph illustrate(s) the data stored in Total Price Data Storage Area H85b6. In the present embodiment, Total Price Data Storage Area H85b6 comprises two columns, i.e., 'Order ID' and 'Total Price Data'. Column 'Order ID' stores the order IDs, and each order ID is an identification of the corresponding total price data stored in column 'Total Price Data'. The order IDs described in the present embodiment are identical to the ones stored in Selected Menu Data Storage Area H85b4. Column 'Total Price Data' stores the total price data, and each total price data indicates the total amount charged to the customer, i.e., the user of Communication Device 200, of the corresponding order ID. In the example described in the present embodiment, Total Price Data Storage Area H85b6 stores the following data: the order ID 'Order#1' and the corresponding total price data 'Total Price Data#1'; the order ID 'Order#2' and the corresponding total price data 'Total Price Data#2'; the order ID 'Order#3' and the corresponding total price data 'Total Price Data#3'; and the order ID 'Order#4' and the corresponding total price data 'Total Price Data#4'. In the present example, the customer represented by the order ID 'Order#1' is charged $25; the customer represented by the order ID 'Order#2' is charged $5; the customer represented by the order ID 'Order#3' is charged $25; and the customer represented by the order ID 'Order#4' is charged $25.

This paragraph illustrate(s) the software programs stored in Restaurant eMenu Software Storage Area H85c. In the present embodiment, Restaurant eMenu Software Storage Area H85c stores Menu Data Sending/Receiving Software H85c1, Selected Menu Data Sending/Receiving Software H85c4, Order Status Data Updating/Notifying Software H85c5, and Total Price Data Producing/Notifying Software H85c6. Menu Data Sending/Receiving Software H85c1 is the software program described hereinafter. Selected Menu Data Sending/Receiving Software H85c4 is the software program described hereinafter. Order Status Data Updating/Notifying Software H85c5 is the software program described hereinafter. Total Price Data Producing/Notifying Software H85c6 is the software program described hereinafter.

This paragraph illustrate(s) the storage area included in RAM 206 (FIG. 1) of Communication Device 200. In the present embodiment, RAM 206 includes Restaurant eMenu Information Storage Area 20685a of which the data and the software programs stored therein are described hereinafter.

This paragraph illustrate(s) the storage areas included in Restaurant eMenu Information Storage Area 20685a. In the present embodiment, Restaurant eMenu Information Storage Area 20685a includes Restaurant eMenu Text Data Storage Area 20685b and Restaurant eMenu Software Storage Area 20685c. Restaurant eMenu Text Data Storage Area 20685b stores the data necessary to implement the present function on the side of Communication Device 200, such as the ones described hereinafter. Restaurant eMenu Software Storage Area 20685c stores the software programs necessary to implement the present function on the side of Communication Device 200, such as the ones described hereinafter.

This paragraph illustrate(s) the storage areas included in Restaurant eMenu Text Data Storage Area 20685b. In the present embodiment, Restaurant eMenu Text Data Storage Area 20685b includes Menu Text Data Storage Area 20685b1, Menu Image Data Storage Area 20685b2, Menu Price Data Storage Area 20685b3, Selected Menu Data Storage Area 20685b4, Order Status Data Storage Area 20685b5, Total Price Data Storage Area 20685b6, and Work Area 20685b7. Menu Text Data Storage Area 20685b1 stores the data described hereinafter. Menu Image Data Storage Area 20685b2 stores the data described hereinafter. Menu Price Data Storage Area 20685b3 stores the data described hereinafter. Selected Menu Data Storage Area 20685b4 stores the data described hereinafter. Order Status Data Storage Area 20685b5 stores the data described hereinafter. Total Price Data Storage Area 20685b6 stores the data described hereinafter. Work Area 20685b7 is utilized as a work area to perform calculation and temporarily store data.

This paragraph illustrate(s) the data stored in Menu Text Data Storage Area 20685b1. In the present embodiment, Menu Text Data Storage Area 20685b1 comprises two columns, i.e., 'Menu ID' and 'Menu Text Data'. Column 'Menu ID' stores the menu IDs, and each menu ID is an identification of the corresponding menu text data stored in column 'Menu Text Data'. Column 'Menu Text Data' stores the menu text data, and each menu text data represents the name of food or beverage. In the present embodiment, Menu Text Data Storage Area 20685b1 stores the following data: the menu ID 'Menu#1' and the corresponding menu text data 'Menu Text Data#1'; the menu ID 'Menu#2' and the corresponding menu text data 'Menu Text Data#2'; the menu ID 'Menu#3' and the corresponding menu text data 'Menu Text Data#3'; and the menu ID 'Menu#4' and the corresponding menu text data 'Menu Text Data#4'. In the present example, the menu text data 'Menu Text Data#1' represents 'corn soup'; the menu text data 'Menu Text Data#2' represents 'salad'; the menu text data 'Menu Text Data#3' represents 'beefsteak'; and the menu text data 'Menu Text Data#4' represents 'orange juice'.

This paragraph illustrate(s) the data stored in Menu Image Data Storage Area 20685b2. In the present embodiment, Menu Image Data Storage Area 20685b2 comprises two columns, i.e., 'Menu ID' and 'Menu Image Data'. Column 'Menu ID' stores the menu IDs, and each menu ID is an identification of the corresponding menu image data stored in column 'Menu Image Data'. The menu IDs described in the present embodiment are identical to the ones described in the previous embodiment. Column 'Menu Image Data' stores the menu image data, and each menu image data is the image data describing the menu text data stored in Menu Text Data Storage Area 20685b1 of the corresponding menu ID. In the present embodiment, Menu Image Data Storage Area 20685b2 stores the following data: the menu ID 'Menu#1' and the corresponding menu image data 'Menu Image Data#1'; the menu ID 'Menu#2' and the corresponding menu image data 'Menu Image Data#2'; the menu ID 'Menu#3' and the corresponding menu image data 'Menu Image Data#3'; and the menu ID 'Menu#4' and the corresponding menu image data 'Menu Image Data#4'.

This paragraph illustrate(s) the data stored in Menu Price Data Storage Area 20685b3. In the present embodiment, Menu Price Data Storage Area 20685b3 comprises two columns, i.e., 'Menu ID' and 'Menu Price Data'. Column 'Menu ID' stores the menu IDs, and each menu ID is an identification of the corresponding menu price data stored in column 'Menu Price Data'. The menu IDs described in the present embodiment are identical to the ones described in the previous two embodiments. Column 'Menu Price Data' stores the menu price data, and each menu price data indicates the price of the menu of the corresponding menu ID. In the present embodiment, Menu Price Data Storage Area 20685*b*3 stores the following data: the menu ID 'Menu#1' and the corresponding menu price data 'Menu Price Data#1'; the menu ID 'Menu#2' and the corresponding menu price data 'Menu Price Data#2'; the menu ID 'Menu#3' and the corresponding menu price data 'Menu Price Data#3'; and the menu ID 'Menu#4' and the corresponding menu price data 'Menu Price Data#4'. In the present example, the menu price data 'Menu Price Data#1' represents '$5'; the menu price data 'Menu Price Data#2' represents '$5'; the menu price data 'Menu Price Data#3' represents '$10'; and the menu price data 'Menu Price Data#4' represents '$5'.

This paragraph illustrate(s) the data stored in Selected Menu Data Storage Area 20685*b*4. In the present embodiment, Selected Menu Data Storage Area 20685*b*4 comprises two columns, i.e., 'Order ID' and 'Selected Menu Data'. Column 'Order ID' stores the order ID which is an identification of the corresponding selected menu data stored in column 'Selected Menu Data'. Column 'Selected Menu Data' stores the selected menu data which includes the data regarding the menu selected by the customer (i.e., the user of Communication Device 200) represented by the order ID 'Order#1'. In the present embodiment, Selected Menu Data Storage Area 20685*b*4 stores the following data: the order ID 'Order#1' and the corresponding selected menu data 'Selected Menu Data#1'.

This paragraph illustrate(s) the selected menu data 'Selected Menu Data#1' stored in Selected Menu Data Storage Area 20685*b*4. In the present embodiment, Selected Menu Data#1 includes the menu IDs 'Menu#1, Menu#2, and Menu#3'. Referring to the data stored in Menu Text Data Storage Area 20685*b*1, the selected menu data described in the present embodiment indicates that the customer (i.e., the user of Communication Device 200, for example Device A) represented by the order ID 'Order#1' selected corn soup, salad, and beefsteak.

This paragraph illustrate(s) the data stored in Order Status Data Storage Area 20685*b*5. In the present embodiment, Order Status Data Storage Area 20685*b*5 comprises two columns, i.e., 'Order ID' and 'Order Status Data'. Column 'Order ID' stores the order ID which is an identification of the corresponding order status data stored in column 'Order Status Data'. The order ID described in the present embodiment is identical to the one stored in Selected Menu Data Storage Area 20685*b*4. Column 'Order Status Data' stores the order status data which represents the current status of the order of each food or beverage, i.e., whether the corresponding food or beverage is served to the customer represented by the order ID 'Order#1' or not. In the present embodiment, Order Status Data Storage Area 20685*b*5 stores the following data: the order ID 'Order#1' and the corresponding order status data 'Order Status Data#1'.

This paragraph illustrate(s) the order status data 'Order Status Data#1' stored in Order Status Data Storage Area 20685*b*5. In the present embodiment, Order Status Data#1 includes two columns, i.e., 'Menu ID' and 'Status Data'. Column 'Menu ID' stores the menu IDs, and each menu ID is an identification of the corresponding status data stored in column 'Status Data'. The menu IDs described in the present embodiment are identical to the ones stored in Menu Text Data Storage Area 20685*b*1. Column 'Status Data' stores the status data, and each status data represents the current status of the order of the food or beverage of the corresponding menu ID, i.e., whether the food or beverage of the corresponding menu ID is served to the customer represented by the order ID 'Order#1' or not. The status data is indicated by either 'served' or 'not served'. In the present embodiment, Order Status Data#1 stores the following data: the menu ID 'Menu#1' and the corresponding status data 'Served'; the menu ID 'Menu#2' and the corresponding status data 'Served'; and the menu ID 'Menu#3' and the corresponding status data Not Served'. The present example indicates that the ordered corn soup is served, the ordered salad is served, however, the ordered beefsteak is not yet served.

This paragraph illustrate(s) the data stored in Total Price Data Storage Area 20685*b*6. In the present embodiment, Total Price Data Storage Area 20685*b*6 comprises two columns, i.e., 'Order ID' and 'Total Price Data'. Column 'Order ID' stores the order ID which is an identification of the corresponding total price data stored in column 'Total Price Data'. The order ID described in the present embodiment is identical to the one stored in Selected Menu Data Storage Area 20685*b*4. Column 'Total Price Data' stores the total price data which indicates the total amount charged to the customer, i.e., the user of Communication Device 200, represented by the order ID 'Order#1'. In the present embodiment, Total Price Data Storage Area 20685*b*6 stores the following data: the order ID 'Order#1' and the corresponding total price data 'Total Price Data#1'.

This paragraph illustrate(s) the software programs stored in Restaurant eMenu Software Storage Area 20685*c*. In the present embodiment, Restaurant eMenu Software Storage Area 20685*c* stores Menu Data Sending/Receiving Software 20685*c*1, Menu Data Displaying Software 20685*c*2, Menu Data Selecting Software 20685*c*3, Selected Menu Data Sending/Receiving Software 20685*c*4, Order Status Data Updating/Notifying Software 20685*c*5, and Total Price Data Producing/Notifying Software 20685*c*6. Menu Data Sending/Receiving Software 20685*c*1 is the software program described hereinafter. Menu Data Displaying Software 20685*c*2 is the software program described hereinafter. Menu Data Selecting Software 20685*c*3 is the software program described hereinafter. Selected Menu Data Sending/Receiving Software 20685*c*4 is the software program described hereinafter. Order Status Data Updating/Notifying Software 20685*c*5 is the software program described hereinafter. Total Price Data Producing/Notifying Software 20685*c*6 is the software program described hereinafter.

This paragraph illustrate(s) Menu Data Sending/Receiving Software H85*c*1 of Host H and Menu Data Sending/Receiving Software 20685*c*1 of Communication Device 200, which transfer the menu data (i.e., the menu text data, the menu image data, and the menu price data) from Host H to Communication Device 200 in order to have the menu data displayed on LCD 201 (FIG. 1) of Communication Device 200. In the present embodiment, CPU 211 (FIG. 1) of Communication Device 200 sends a menu data request, which is received by Host H (S1). Here, the menu data request is a signal sent to Host H which requests to send the menu text data, the menu image data, and the menu price data to Communication Device 200. Host H retrieves all menu IDs and menu text data from Menu Text Data Storage Area H85*b*1 (S2). Host H retrieves all menu IDs and menu image data from Menu Image Data Storage Area H85*b*2 (S3). Host H retrieves all menu IDs and menu price data from Menu Price Data Storage Area H85*b*3 (S4). Host H sends the data retrieved in S2 through S4, which are received by Communication Device 200 (S5). CPU 211 stores the menu IDs and the menu text data in Menu Text Data Storage Area 20685*b*1 (S6). CPU 211 stores the menu IDs and the menu image data in Menu Image Data Storage Area 20685*b*2 (S7). CPU 211 stores the menu IDs and the menu price data in Menu Price Data Storage Area 20685*b*3 (S8).

This paragraph illustrate(s) Menu Data Displaying Software 20685*c*2 of Communication Device 200, which displays the menu data (i.e., the menu text data, the menu image data, and the menu price data) on LCD 201 (FIG. 1) of Communication Device 200. In the present embodiment, CPU 211 (FIG. 1) of Communication Device 200 retrieves all menu text data from Menu Text Data Storage Area 20685*b*1 (S1). CPU 211 retrieves all menu image data from Menu Image Data Storage Area 20685*b*2 (S2). CPU 211 retrieves all menu price data from Menu Price Data Storage Area 20685*b*3 (S3). CPU 211 displays the data retrieved in S1 through S3 on LCD 201 (FIG. 1) (S4).

This paragraph illustrate(s) the menu list including the menu data (i.e., the menu text data, the menu image data, and the menu price data) displayed on LCD 201 (FIG. 1) of Communication Device 200. In the present embodiment, Menu List ML85 is displayed on LCD 201 (FIG. 1). Menu List ML85 comprises three types of data, i.e., the menu text data, the menu image data, and the menu price data. In the present embodiment, Menu List ML85 comprises the following data: the menu text data 'Menu Text Data#1' and the corresponding menu image data 'Menu Image Data#1' and the corresponding menu price data 'Menu Price Data#1'; the menu text data 'Menu Text Data#2' and the corresponding menu image data 'Menu Image Data#2' and the corresponding menu price data 'Menu Price Data#2'; the menu text data 'Menu Text Data#3' and the corresponding menu image data 'Menu Image Data#3' and the corresponding menu price data 'Menu Price Data#3'; and the menu text data 'Menu Text Data#4' and the corresponding menu image data 'Menu Image Data#4' and the corresponding menu price data 'Menu Price Data#4'.

This paragraph illustrate(s) Menu Data Selecting Software 20685*c*3 of Communication Device 200, which selects a menu from Menu List ML85 described in the previous embodiment. In the present embodiment, the user of Communication Device 200 selects menu(s) from Menu List ML85 (S1). CPU 211 (FIG. 1) of Communication Device 200 identifies the corresponding menu IDs (e.g., Menu#1, Menu#2, and Menu#3) (S2). CPU 211 produces the selected menu data (e.g., Selected Menu Data#1) (S3). Here, the selected menu data is the data representing the menu(s) selected in the previous step. CPU 211 stores the selected menu data (e.g., Selected Menu Data#1) in Selected Menu Data Storage Area 20685*b*4 (S4).

This paragraph illustrate(s) Selected Menu Data Sending/Receiving Software H85*c*4 of Host H and Selected Menu Data Sending/Receiving Software 20685*c*4 of Communication Device 200, which transfer the selected menu data from Communication Device 200 to Host H. In the present embodiment, CPU 211 (FIG. 1) of Communication Device 200 retrieves the selected menu data (e.g., Selected Menu Data#1) from Selected Menu Data Storage Area 20685*b*4 (S1). CPU 211 sends the selected menu data (e.g., Selected Menu Data#1), which is received by Host H (S2). Host H stores the selected menu data (e.g., Selected Menu Data#1) in Selected Menu Data Storage Area H85*b*4 (S3).

This paragraph illustrate(s) Order Status Data Updating/Notifying Software H85*c*5 of Host H and Order Status Data Updating/Notifying Software 20685*c*5 of Communication Device 200, which update the order status data stored in Order Status Data Storage Area H85*b*5 of Host H and notifies the customer, i.e., the user of Communication Device 200, of the latest status of his/her order. In the present embodiment, the restaurant owner inputs a new order status (e.g., corn soup and salad are served for Order#1) (S1), and Host H updates the order status data (e.g., Order Status Data#1) stored in Order Status Data Storage Area H85*b*5 (S2). Host H retrieves the updated order status data (e.g., Order Status Data#1) from Order Status Data Storage Area H85*b*5, which is sent to Communication Device 200 (S3). CPU 211 (FIG. 1) of Communication Device 200 receives the updated order status data (e.g., Order Status Data#1) from Host H, and stores the data in Order Status Data Storage Area 20685*b*5 (S4). CPU 211 retrieves the updated order status data (e.g., Order Status Data#1) from Order Status Data Storage Area 20685*b*5 and displays the data on LCD 201 (FIG. 1) (S5).

This paragraph illustrate(s) Total Price Data Producing/Notifying Software H85*c*6 of Host H and Total Price Data Producing/Notifying Software 20685*c*6 of Communication Device 200, which produce the total price data and notifies the total amount charged to the customer, i.e., the user of Communication Device 200, of the corresponding order ID. In the present embodiment, Host H retrieves the selected menu data (e.g., Selected Menu Data#1) from Selected Menu Data Storage Area H85*b*4 (S1). Host H identifies the menu IDs (e.g., Menu#1, Menu#2, Menu#3) included in Selected Menu Data (e.g., Selected Menu Data#1) (S2). Host H identifies the menu price data (e.g., Menu Price Data#1, Menu Price Data#2, Menu Price Data#3) of the corresponding menu IDs (e.g., Menu#1, Menu#2, Menu#3) (S3). Host H calculates the total price data (e.g., Total Price Data#1) from each menu price data (e.g., Menu Price Data#1 ($5)+Menu Price Data#2 ($5)+Menu Price Data#3 ($10)) (S4). Host H stores the total price data (e.g., Total Price Data#1) in Total Price Data Storage Area H85*b*6 at the corresponding order ID (e.g., Order#1) (S5). Host H retrieves the total price data (e.g., Total Price Data#1) from Total Price Data Storage Area H85*b*6 and sends the data to Communication Device 200 (S6). CPU 211 (FIG. 1) of Communication Device 200 receives the total price data (e.g., Total Price Data#1) from Host H and stores the data in Total Price Data Storage Area 20685*b*6 (S7). CPU 211 retrieves the total price data (e.g., Total Price Data#1) from Total Price Data Storage Area 20685*b*6 and displays the data on LCD 201 (FIG. 1) (S8).

<<Geographic Location Recording Function>>

The following paragraphs illustrate(s) the geographic location recording function which records the geographic location of Device A, a Communication Device 200, and/or Device B, another Communication Device 200. Assume that user A owns Device A, a Communication Device 200, and user B owns Device B, another Communication Device 200.

This paragraph illustrate(s) the storage area included in RAM 206 (FIG. 1) of Device A. In the present embodiment, RAM 206 includes Geographic Location Recording Information Storage Area 20686*a*A of which the data and the software programs stored therein are described hereinafter.

The data and/or the software programs stored in Geographic Location Recording Information Storage Area 20686*a*A may be downloaded from Host H in the manner described hereinafter.

This paragraph illustrate(s) the storage areas included in Geographic Location Recording Information Storage Area 20686*a*A. In the present embodiment, Geographic Location Recording Information Storage Area 20686*a*A includes Geographic Location Recording Data Storage Area 20686*b*A and Geographic Location Recording Software Storage Area 20686cA. Geographic Location Recording Data Storage Area 20686bA stores the data necessary to implement the present function on the side of Device A, such as the ones described hereinafter. Geographic Location Recording Software Storage Area 20686cA stores the software programs necessary to implement the present function on the side of Device A, such as the ones described hereinafter.

This paragraph illustrate(s) the storage areas included in Geographic Location Recording Data Storage Area 20686bA. In the present embodiment, Geographic Location Recording Data Storage Area 20686bA includes Device A's Location Data Storage Area 20686b1A, Device B's Location Data Storage Area 20686b2A, 3D Map Data Storage Area 20686b3A, Street Address Location Storage Area 20686b4A, Phone Number Location Storage Area 20686b5A, Icon Image Data Storage Area 20686b6A, and Work Area 20686b7A. Device A's Location Data Storage Area 20686b1A stores the data described hereinafter. Device B's Location Data Storage Area 20686b2A stores the data described hereinafter. 3D Map Data Storage Area 20686b3A stores the 3D map data. Here, the 3D map data is a map data covering the entire nation composed of a plurality of three-dimensional data. Street Address Location Storage Area 20686b4A stores the data described hereinafter. Phone Number Location Storage Area 20686b5A stores the data described hereinafter. Icon Image Data Storage Area 20686b6A stores the data described hereinafter. Work Area 20686b7A is utilized as a work area to perform calculation and temporarily store data.

This paragraph illustrate(s) the data stored in Device A's Location Data Storage Area 20686b1A. In the present embodiment, Device A's Location Data Storage Area 20686b1A comprises two columns, i.e., 'Time Data' and 'Device A's Location Data'. Column 'Time Data' stores the time data, and each time data is an identification of the Device A's location data stored in column 'Device A's Location Data'. Each time data represents the time at which the corresponding Device A's location data is stored in Device A's Location Data Storage Area 20686b1A. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device A's Location Data' stores the Device A's location data, and each Device A's location data represents the geographic location in (x,y,z) format of Device A at the time indicated by the corresponding time data. In the present embodiment, Device A's Location Data Storage Area 20686b1A stores the following data: the time data 'Time Data#1' and the corresponding Device A's location data 'Device A's Location Data#1'; the time data 'Time Data#2' and the corresponding Device A's location data 'Device A's Location Data#2'; the time data 'Time Data#3' and the corresponding Device A's location data 'Device A's Location Data#3'; and the time data 'Time Data#4' and the corresponding Device A's location data 'Device A's Location Data#4'.

This paragraph illustrate(s) the data stored in Device B's Location Data Storage Area 20686b2A. In the present embodiment, Device B's Location Data Storage Area 20686b2A comprises two columns, i.e., 'Time Data' and 'Device B's Location Data'. Column 'Time Data' stores the time data, and each time data is an identification of the Device B's location data stored in column 'Device B's Location Data'. Each time data represents the time at which the corresponding Device B's location data is stored in Device B's Location Data Storage Area 20686b2A. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device B's Location Data' stores the Device B's location data, and each Device B's location data represents the geographic location in (x,y,z) format of Device B at the time indicated by the corresponding time data. In the present embodiment, Device B's Location Data Storage Area 20686b2A stores the following data: the time data 'Time Data#5' and the corresponding Device B's location data 'Device B's Location Data#5'; the time data 'Time Data#6' and the corresponding Device B's location data 'Device B's Location Data#6'; the time data 'Time Data#7' and the corresponding Device B's location data 'Device B's Location Data#7'; and the time data 'Time Data#8' and the corresponding Device B's location data 'Device B's Location Data#8'.

This paragraph illustrate(s) the data stored in Street Address Location Storage Area 20686b4A. In the present embodiment, Street Address Location Storage Area 20686b4A comprises two columns, i.e., 'Street Address Data' and 'Street Address Location Data'. Column 'Street Address Data' stores the street address data, and each street address data represents a street address. The street address data includes the name of the state, the name of county, the name of street, and/or the street number. Column 'Street Address Location Data' stores the street address location data, and each street address location data represents the geographic location in (x,y,z) format of the corresponding street address data. In the present embodiment, Street Address Location Storage Area 20686b4A stores the following data: the street address data 'Street Address Data#1' and the corresponding street address location data 'Street Address Location Data#1'; the street address data 'Street Address Data#2' and the corresponding street address location data 'Street Address Location Data#2'; the street address data 'Street Address Data#3' and the corresponding street address location data 'Street Address Location Data#3'; and the street address data 'Street Address Data#4' and the corresponding street address location data 'Street Address Location Data#4'.

This paragraph illustrate(s) the data stored in Phone Number Location Storage Area 20686b5A. In the present embodiment, Phone Number Location Storage Area 20686b5A comprises two columns, i.e., 'Phone Number Data' and 'Phone Number Location Data'. Column 'Phone Number Data' stores the phone number data, and each phone number data represents a phone number. Column 'Phone Number Location Data' stores the phone number location data, and each phone number location data represents the geographic location of the premises (e.g., a restaurant or a hotel) in (x,y,z) format at which the corresponding phone number data is utilized. In the present embodiment, Phone Number Location Storage Area 20686b5A stores the following data: the phone number data 'Phone Number Data#1' and the corresponding phone number location data 'Phone Number Location Data#1'; the phone number data 'Phone Number Data#2' and the corresponding phone number location data 'Phone Number Location Data#2'; the phone number data 'Phone Number Data#3' and the corresponding phone number location data 'Phone Number Location Data#3'; and the phone number data 'Phone Number Data#4' and the corresponding phone number location data 'Phone Number Location Data#4'.

This paragraph illustrate(s) the data stored in Icon Image Data Storage Area 20686b6A. In the present embodiment, Icon Image Data Storage Area 20686b6A comprises two columns, i.e., 'Icon Image ID' and 'Icon Image Data'. Column 'Icon Image ID' stores the icon image IDs, and each icon image ID is an identification of the corresponding icon image data stored in column 'Icon Image Data'. Column 'Icon Image Data' stores the icon image data, and each icon image data is an image data designed to be displayed on LCD 201 (FIG. 1) indicating the geographic location of Device A or Device B. In the present embodiment, Icon Image Data Storage Area 20686*b*6A stores the following data: the icon image ID 'Icon Image#1' and the corresponding icon image data 'Icon Image Data#1'; and the icon image ID 'Icon Image#2' and the corresponding icon image data 'Icon Image Data#2'. In the present example, the icon image data 'Icon Image Data#1' represents Device A and the icon image data 'Icon Image Data#2' represents Device B.

This paragraph illustrate(s) the software programs stored in Geographic Location Recording Software Storage Area 20686*c*A. In the present embodiment, Geographic Location Recording Software Storage Area 20686*c*A stores Device A's Location One Time Recording Software 20686*c*1A, Device A's Location Continuous Recording Software 20686*c*2A, Device A's Location Displaying Software 20686*c*3A, Device A's Location Replaying Software 20686*c*4A, Device A's Location Street Address Displaying Software 20686*c*5A, Device A's Location Phone Number Displaying Software 20686*c*6A, Device A's Location Information Sending/Receiving Software 20686*c*7A, Device B's Location One Time Recording Software 20686*c*8A, Device B's Location Continuous Recording Software 20686*c*9A, Device B's Location Displaying Software 20686*c*10A, Device B's Location Replaying Software 20686*c*11A, Device B's Location Street Address Displaying Software 20686*c*12A, Device B's Location Phone Number Displaying Software 20686*c*13A, and Device B's Location Information Sending/Receiving Software 20686*c*14A. Device A's Location One Time Recording Software 20686*c*1A is the software program described hereinafter. Device A's Location Continuous Recording Software 20686*c*2A is the software program described hereinafter. Device A's Location Displaying Software 20686*c*3A is the software program described hereinafter. Device A's Location Replaying Software 20686*c*4A is the software program described hereinafter. Device A's Location Street Address Displaying Software 20686*c*5A is the software program described hereinafter. Device A's Location Phone Number Displaying Software 20686*c*6A is the software program described hereinafter. Device A's Location Information Sending/Receiving Software 20686*c*7A is the software program described hereinafter. Device B's Location One Time Recording Software 20686*c*8A is the software program described hereinafter. Device B's Location Continuous Recording Software 20686*c*9A is the software program described hereinafter. Device B's Location Displaying Software 20686*c*10A is the software program described hereinafter. Device B's Location Replaying Software 20686*c*11A is the software program described hereinafter. Device B's Location Street Address Displaying Software 20686*c*12A is the software program described hereinafter. Device B's Location Phone Number Displaying Software 20686*c*13A is the software program described hereinafter. Device B's Location Information Sending/Receiving Software 20686*c*14A is the software program described hereinafter.

This paragraph illustrate(s) the storage area included in RAM 206 (FIG. 1) of Device B. In the present embodiment, RAM 206 includes Geographic Location Recording Information Storage Area 20686*a*B of which the data and the software programs stored therein are described hereinafter.

The data and/or the software programs stored in Geographic Location Recording Information Storage Area 20686*a*B may be downloaded from Host H in the manner described hereinafter.

This paragraph illustrate(s) the storage areas included in Geographic Location Recording Information Storage Area 20686*a*B. In the present embodiment, Geographic Location Recording Information Storage Area 20686*a*B includes Geographic Location Recording Data Storage Area 20686*b*B and Geographic Location Recording Software Storage Area 20686*c*B. Geographic Location Recording Data Storage Area 20686*b*B stores the data necessary to implement the present function on the side of Device B, such as the ones described hereinafter. Geographic Location Recording Software Storage Area 20686*c*B stores the software programs necessary to implement the present function on the side of Device B, such as the ones described hereinafter.

This paragraph illustrate(s) the storage areas included in Geographic Location Recording Data Storage Area 20686*b*B. As described in the present embodiment, Geographic Location Recording Data Storage Area 20686*b*B includes Device B's Location Data Storage Area 20686*b*1B, Device A's Location Data Storage Area 20686*b*2B, 3D Map Data Storage Area 20686*b*3B, Street Address Location Storage Area 20686*b*4B, Phone Number Location Storage Area 20686*b*5B, Icon Image Data Storage Area 20686*b*6B, and Work Area 20686*b*7B. Device B's Location Data Storage Area 20686*b*1B stores the data described hereinafter. Device A's Location Data Storage Area 20686*b*2B stores the data described hereinafter. 3D Map Data Storage Area 20686*b*3B stores the 3D map data. Here, the 3D map data is a map data covering the entire nation composed of a plurality of three-dimensional data. Street Address Location Storage Area 20686*b*4B stores the data described hereinafter. Phone Number Location Storage Area 20686*b*5B stores the data described hereinafter. Icon Image Data Storage Area 20686*b*6B stores the data described hereinafter. Work Area 20686*b*7B is utilized as a work area to perform calculation and temporarily store data.

This paragraph illustrate(s) the data stored in Device B's Location Data Storage Area 20686*b*1B. In the present embodiment, Device B's Location Data Storage Area 20686*b*1B comprises two columns, i.e., 'Time Data' and 'Device B's Location Data'. Column 'Time Data' stores the time data, and each time data is an identification of the Device B's location data stored in column 'Device B's Location Data'. Each time data represents the time at which the corresponding Device B's location data is stored in Device B's Location Data Storage Area 20686*b*1B. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device B's Location Data' stores the Device B's location data, and each Device B's location data represents the geographic location in (x,y,z) format of Device B at the time indicated by the corresponding time data. In the present embodiment, Device B's Location Data Storage Area 20686*b*1B stores the following data: the time data 'Time Data#5' and the corresponding Device B's location data 'Device B's Location Data#5'; the time data 'Time Data#6' and the corresponding Device B's location data 'Device B's Location Data#6'; the time data 'Time Data#7' and the corresponding Device B's location data 'Device B's Location Data#7'; and the time data 'Time Data#8' and the corresponding Device B's location data 'Device B's Location Data#8'.

This paragraph illustrate(s) the data stored in Device A's Location Data Storage Area 20686b2B. In the present embodiment, Device A's Location Data Storage Area 20686b2B comprises two columns, i.e., 'Time Data' and 'Device A's Location Data'. Column 'Time Data' stores the time data, and each time data is an identification of the Device A's location data stored in column 'Device A's Location Data'. Each time data represents the time at which the corresponding Device A's location data is stored in Device A's Location Data Storage Area 20686b2B. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device A's Location Data' stores the Device A's location data, and each Device A's location data represents the geographic location in (x,y,z) format of Device A at the time indicated by the corresponding time data. In the present embodiment, Device A's Location Data Storage Area 20686b2B stores the following data: the time data 'Time Data#1' and the corresponding Device A's location data 'Device A's Location Data#1'; the time data 'Time Data#2' and the corresponding Device A's location data 'Device A's Location Data#2'; the time data 'Time Data#3' and the corresponding Device A's location data 'Device A's Location Data#3'; and the time data 'Time Data#4' and the corresponding Device A's location data 'Device A's Location Data#4'.

This paragraph illustrate(s) the data stored in Street Address Location Storage Area 20686b4B. In the present embodiment, Street Address Location Storage Area 20686b4B comprises two columns, i.e., 'Street Address Data' and 'Street Address Location Data'. Column 'Street Address Data' stores the street address data, and each street address data represents a street address. The street address data includes the name of state, the name of county, the name of street, and/or the street number. Column 'Street Address Location Data' stores the street address location data, and each street address location data represents the geographic location in (x,y,z) format of the corresponding street address data. In the present embodiment, Street Address Location Storage Area 20686b4B stores the following data: the street address data 'Street Address Data#1' and the corresponding street address location data 'Street Address Location Data#1'; the street address data 'Street Address Data#2' and the corresponding street address location data 'Street Address Location Data#2'; the street address data 'Street Address Data#3' and the corresponding street address location data 'Street Address Location Data#3'; and the street address data 'Street Address Data#4' and the corresponding street address location data 'Street Address Location Data#4'.

This paragraph illustrate(s) the data stored in Phone Number Location Storage Area 20686b5B. In the present embodiment, Phone Number Location Storage Area 20686b5B comprises two columns, i.e., 'Phone Number Data' and 'Phone Number Location Data'. Column 'Phone Number Data' stores the phone number data, and each phone number data represents a phone number. Column 'Phone Number Location Data' stores the phone number location data, and each phone number location data represents the geographic location of the premises (e.g., a restaurant or a hotel) in (x,y,z) format at which the corresponding phone number data is utilized. In the present embodiment, Phone Number Location Storage Area 20686b5B stores the following data: the phone number data 'Phone Number Data#1' and the corresponding phone number location data 'Phone Number Location Data#1'; the phone number data 'Phone Number Data#2' and the corresponding phone number location data 'Phone Number Location Data#2'; the phone number data 'Phone Number Data#3' and the corresponding phone number location data 'Phone Number Location Data#3'; and the phone number data 'Phone Number Data#4' and the corresponding phone number location data 'Phone Number Location Data#4'.

This paragraph illustrate(s) the data stored in Icon Image Data Storage Area 20686b6B. In the present embodiment, Icon Image Data Storage Area 20686b6B comprises two columns, i.e., 'Icon Image ID' and 'Icon Image Data'. Column 'Icon Image ID' stores the icon image IDs, and each icon image ID is an identification of the corresponding icon image data stored in column 'Icon Image Data'. Column 'Icon Image Data' stores the icon image data, and each icon image data is an image data designed to be displayed on LCD 201 (FIG. 1) indicating the geographic location of Device A or Device B. In the example described in the present embodiment, Icon Image Data Storage Area 20686b6B stores the following data: the icon image ID 'Icon Image#1' and the corresponding icon image data 'Icon Image Data#1'; the icon image ID 'Icon Image#2' and the corresponding icon image data 'Icon Image Data#2'; and In the present example, the icon image data 'Icon Image Data#1' represents Device A and the icon image data 'Icon Image Data#2' represents Device B.

This paragraph illustrate(s) the software programs stored in Geographic Location Recording Software Storage Area 20686cB. In the present embodiment, Geographic Location Recording Software Storage Area 20686cB stores Device B's Location One Time Recording Software 20686c1B, Device B's Location Continuous Recording Software 20686c2B, Device B's Location Displaying Software 20686c3B, Device B's Location Replaying Software 20686c4B, Device B's Location Street Address Displaying Software 20686c5B, Device B's Location Phone Number Displaying Software 20686c6B, Device B's Location Information Sending Software 20686c7B, Device A's Location One Time Recording Software 20686c8B, Device A's Location Continuous Recording Software 20686c9B, Device A's Location Displaying Software 20686c10B, Device A's Location Replaying Software 20686c11B, Device A's Location Street Address Displaying Software 20686c12B, Device A's Location Phone Number Displaying Software 20686c13B, and Device A's Location Information Sending/Receiving Software 20686c14B. Device B's Location One Time Recording Software 20686c1B is the software program described hereinafter. Device B's Location Continuous Recording Software 20686c2B is the software program described hereinafter. The sequence of Device B's Location Displaying Software 20686c3B is similar to the sequence of Device A's Location Displaying Software 20686c3A. The sequence of Device B's Location Replaying Software 20686c4B is similar to the sequence of Device A's Location Replaying Software 20686c4A. The sequence of Device B's Location Street Address Displaying Software 20686c5B is similar to the sequence of Device A's Location Street Address Displaying Software 20686c5A. The sequence of Device B's Location Phone Number Displaying Software 20686c6B is similar to the sequence of Device A's Location Phone Number Displaying Software 20686c6A. Device A's Location One Time Recording Software 20686c8B is the software program described hereinafter. Device A's Location Continuous Recording Software 20686c9B is the software program described hereinafter. The sequence of Device A's Location Displaying Software 20686c10B is similar to the sequence of Device B's Location Displaying Software 20686c10A. The sequence of Device A's Location Replaying Software 20686c11B is similar to the sequence of Device B's Location Replaying Software 20686c11A. The sequence of Device A's Location Street Address Displaying Software 20686c12B is similar to the sequence of Device B's Location Street Address Displaying Software 20686c12A. The sequence of Device A's Location Phone Number Displaying Software 20686c13B is similar to the sequence of Device B's Location Phone Number Displaying Software 20686c13A. The sequence of Device A's Location Info Sending/Receiving Software 20686c14B is similar to the sequence of Device B's Location Info Sending/Receiving Software 20686c14A.

This paragraph illustrate(s) Device A's Location One Time Recording Software 20686c1A of Device A and Device A's Location One Time Recording Software 20686c8B of Device B, which store the current location of Device A for one time. In the present embodiment, the user of Device A inputs a Device A's location one time recording signal (S1). Here, the Device A's location one time recording signal is a signal which instructs CPU 211 (FIG. 1) of Device A to initiate implementing the following steps. CPU 211 (FIG. 1) of Device A identifies the current time and stores the data in column 'Time Data' (e.g., Time Data#1) of Device A's Location Data Storage Area 20686b1A (S2). CPU 211 of Device A identifies the current geographic location data of Device A and stores the data in column 'Device A's Location Data' (e.g., Device A's Location Data#1) of Device A's Location Data Storage Area 20686b1A (S3). CPU 211 of Device A retrieves the time data and the Device A's location data from Device A's Location Data Storage Area 20686b1A and sends the data to Device B via Antenna 218 (FIG. 1) (S4). CPU 211 of Device B receives the time data and the Device A's location data from Device A and stores the data in Device A's Location Data Storage Area 20686b2B (S5).

This paragraph illustrate(s) Device A's Location Continuous Recording Software 20686c2A of Device A and Device A's Location Continuous Recording Software 20686c9B of Device B, which continuously store the current location of Device A. In the present embodiment, the user of Device A inputs a Device A's location continuous recording signal (Device A) (S1). Here, the Device A's location continuous recording signal is a signal which instructs CPU 211 (FIG. 1) of Device A to initiate implementing the following steps. CPU 211 of Device A identifies the current time and adds the data as a new time data in column 'Time Data' (e.g., Time Data#1) of Device A's Location Data Storage Area 20686b1A (S2). CPU 211 of Device A identifies the current geographic location data of Device A and adds the data as a new Device A's location data in column 'Device A's Location Data' (e.g., Device A's Location Data#1) of Device A's Location Data Storage Area 20686b1A (S3). CPU 211 of Device A retrieves the new time data and Device A's location data from Device A's Location Data Storage Area 20686b1A and sends the data to Device B via Antenna 218 (FIG. 1) (S4). The sequence of S2 through S4 is repeated Periodically (S5).

This paragraph illustrate(s) Device A's Location Displaying Software 20686c3A of Device A, which displays the current location of Device A on LCD 201 (FIG. 1) of Device A. In the present embodiment, CPU 211 (FIG. 1) of Device A retrieves all time data from Device A's Location Data Storage Area 20686b1A and displays a list of time data on LCD 201 (FIG. 1) (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A retrieves the 3D map data from 3D Map Data Storage Area 20686b3A and displays the data on LCD 201 (FIG. 1) of Device A (S4). CPU 211 of Device A retrieves Icon Image Data#1 from Icon Image Data Storage Area 20686b6A (S5), and displays the data on LCD 201 of Device A at the location corresponding to the Device A's location data (e.g., Device A's Location Data#1) retrieved in S3 (S6).

This paragraph illustrate(s) Device A's Location Replaying Software 20686c4A of Device A, which replays the location of Device A. In the present embodiment, CPU 211 (FIG. 1) of Device A retrieves the 3D map from 3D Map Data Storage Area 20686b3A and the data is displayed on LCD 201 (FIG. 1) of Device A (S1). CPU 211 of Device A retrieves the 1st time data (e.g., Time Data#1) stored in Device A's Location Data Storage Area 20686b1A (S2). CPU 211 of Device A retrieves the corresponding Device A's location data (e.g., Device A's Location Data#1) (S3). CPU 211 of Device A retrieves Icon Image Data#1 from Icon Image Data Storage Area 20686b6A (S4), and displays the data on LCD 201 of Device A at the location corresponding to Device A's location data (e.g., Device A's Location Data#1) retrieved in S3 (S5). The sequence of S2 through S5 is performed with the 2nd time data (e.g., Time Data#2), the 3rd time data (e.g., Time Data#3), and the 4th time data (e.g., Time Data#4) (S6).

This paragraph illustrate(s) Device A's Location Street Address Displaying Software 20686c5A of Device A, which displays the street address of the premises (e.g., a hotel or a restaurant) where Device A is currently located. In the present embodiment, CPU 211 of Device A retrieves all time data from Device A's Location Data Storage Area 20686b1A and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest street address location data (e.g., Street Address Location Data#1) stored in Street Address Location Storage Area 20686b4A (S4). CPU 211 of Device A retrieves the corresponding street address data (e.g., Street Address Data#1) from Street Address Location Storage Area 20686b4A and displays the data on LCD 201 (FIG. 1) of Device A (S5).

This paragraph illustrate(s) Device A's Location Phone Number Displaying Software 20686c6A of Device A, which displays the phone number of the premises (e.g., a hotel or restaurant) where Device A is currently located. In the present embodiment, CPU 211 (FIG. 1) of Device A retrieves all time data from Device A's Location Data Storage Area 20686b1A and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest phone number location data (e.g., Phone Number Location Data#1) stored in Phone Number Location Storage Area 20686b5A (S4). CPU 211 of Device A retrieves the corresponding phone number data (e.g., Phone Number Data#1) from Phone Number Location Storage Area 20686b5A and displays the data on LCD 201 (FIG. 1) of Device A (S5).

This paragraph illustrate(s) Device A's Location Information Sending/Receiving Software 20686c7A of Device A and Device A's Location Information Sending Software 20686cB of Device B, which send the Device A's location data, the Device A's location street address, and the Device A's location phone number to Device B. In the present embodiment, CPU 211 of Device A retrieves all time data from Device A's Location Data Storage Area 20686b1A and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest street address location data (e.g., Street Address Location Data#1) stored in Street Address Location Storage Area 20686b4A (S4). CPU 211 of Device A retrieves the corresponding street address data (e.g., Street Address Data#1) from Street Address Location Storage Area 20686b4A and displays the data on LCD 201 (FIG. 1) of Device A (S5). CPU 211 of Device A identifies the closest phone number location data (e.g., Phone Number Location Data#1) stored in Phone Number Location Storage Area 20686b5A (S6). CPU 211 of Device A retrieves the corresponding phone number data (e.g., Phone Number Data#1) from Phone Number Location Storage Area 20686b5A and displays the data on LCD 201 (FIG. 1) of Device A (S7). CPU 211 of Device A sends the Device A's location data, the Device A's location street address, and the Device A's location phone number, which are received by Device B (S8).

This paragraph illustrate(s) Device B's Location One Time Recording Software 20686c8A of Device A and Device B's Location One Time Recording Software 20686c1B of Device B, which store the current location of Device B for one time. In the present embodiment, the user of Device B inputs a Device B's location one time recording signal (S1). Here, the Device B's location one time recording signal is a signal which instructs CPU 211 (FIG. 1) of Device B to initiate implementing the following steps. CPU 211 (FIG. 1) of Device B identifies the current time and stores the data in column 'Time Data' (e.g., Time Data#5) of Device B's Location Data Storage Area 20686b1B (S2). CPU 211 of Device B identifies the current geographic location data of Device B and stores the data in column 'Device B's Location Data' (e.g., Device B's Location Data#5) of Device B's Location Data Storage Area 20686b1B (S3). CPU 211 of Device B retrieves the time data and the Device B's location data from Device B's Location Data Storage Area 20686b1B and sends the data to Device A via Antenna 218 (FIG. 1) (S4). CPU 211 of Device A receives the time data and the Device B's location data from Device B and stores the data in Device B's Location Data Storage Area 20686b2A (S5).

This paragraph illustrate(s) Device B's Location Continuous Recording Software 20686c9A of Device A and Device B's Location Continuous Recording Software 20686c2B of Device B, which continuously store the current location of Device B. In the present embodiment, the user of Device B inputs a Device B's location continuous recording signal (S1). Here, the Device B's location continuous recording signal is a signal which instructs CPU 211 (FIG. 1) of Device B to initiate implementing the following steps. CPU 211 (FIG. 1) of Device B identifies the current time and adds the data as a new time data in column 'Time Data' (e.g., Time Data#5) of Device B's Location Data Storage Area 20686b1B (S2). CPU 211 of Device B identifies the current geographic location data of Device B and adds the data as a new Device B's location data in column 'Device B's Location Data' (e.g., Device B's Location Data#5) of Device B's Location Data Storage Area 20686b1B (S3). CPU 211 of Device B retrieves the new time data and Device B's location data from Device B's Location Data Storage Area 20686b1B and sends the data to Device A via Antenna 218 (FIG. 1) (S4). The sequence of S2 through S4 is repeated Periodically (S5).

This paragraph illustrate(s) Device B's Location Displaying Software 20686c10A of Device A, which displays the current location of Device B on LCD 201 (FIG. 1) of Device A. In the present embodiment, CPU 211 (FIG. 1) of Device A retrieves all time data from Device B's Location Data Storage Area 20686b2A and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A retrieves the 3D map data from 3D Map Data Storage Area 20686b3A and displays the data on LCD 201 (FIG. 1) of Device A (S4). CPU 211 of Device A retrieves Icon Image Data#2 from Icon Image Data Storage Area 20686b6A (S5). CPU 211 of Device A displays the data on LCD 201 of Device A at the location corresponding to the Device B's Location Data (e.g., Device B's Location Data#5) retrieved in S3 (S6).

This paragraph illustrate(s) Device B's Location Replaying Software 20686c11A of Device A, which replays the location of Device B. In the present embodiment, CPU 211 (FIG. 1) of Device A retrieves the 3D map data from 3D Map Data Storage Area 20686b3A and displays the data on LCD 201 (FIG. 1) of Device A (S1). CPU 211 of Device A retrieves the 1st time data (e.g., Time Data#5) stored in Device B's Location Data Storage Area 20686b2A (S2). CPU 211 of Device A retrieves the corresponding Device B's location data (e.g., Device B's Location Data#5) (S3). CPU 211 of Device A retrieves Icon Image Data#2 from Icon Image Data Storage Area 20686b6A (S4). CPU 211 of Device A displays the date on LCD 201 of Device A at the location corresponding to the Device B's location data (e.g., Device B's Location Data#5) retrieved in S3 (S5). The sequence of S2 through S5 is repeated with the 2nd time data (e.g., Time Data#6), the 3rd time data (e.g., Time Data#7), and the 4th time data (e.g., Time Data#8) (S6).

This paragraph illustrate(s) Device B's Location Street Address Displaying Software 20686c12A of Device A, which displays the street address of the premises (e.g., a hotel or restaurant) where Device B is currently located. In the present embodiment, CPU 211 (FIG. 1) of Device A retrieves all time data from Device B's Location Data Storage Area 20686b2A and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A identifies the closest street address location data (e.g., Street Address Location Data#5) stored in Street Address Location Storage Area 20686b4A (S4). CPU 211 of Device A retrieves the corresponding street address data (e.g., Street Address Data#5) from Street Address Location Storage Area 20686b4A and displays the data on LCD 201 (FIG. 1) of Device A (S5).

This paragraph illustrate(s) Device B's Location Phone Number Displaying Software 20686c13A of Device A, which displays the phone number of the premises (e.g., a hotel or restaurant) where Device B is currently located. In the present embodiment, CPU 211 (FIG. 1) of Device A retrieves all time data from Device B's Location Data Storage Area 20686b2A and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A identifies the closest phone number location data (e.g., Phone Number Location Data#5) stored in Phone Number Location Storage Area 20686b5A (S4). CPU 211 of Device A retrieves the corresponding phone number data (e.g., Phone Number Data#5) from Phone Number Location Storage Area 20686b5A and displays the data on LCD 201 (FIG. 1) of Device A (S5).

This paragraph illustrate(s) Device B's Location Information Sending/Receiving Software 20686c14A of Device A and Device B's Location Information Sending Software 20686c7B of Device B, which send the Device B's location data, the Device B's location street address, and the Device B's location phone number to Device A. In the present embodiment, CPU 211 (FIG. 1) of Device B retrieves all time data from Device B's Location Data Storage Area 20686b2B and displays a list of time data on LCD 201 (FIG. 1) of Device B (S1). The user of Device B selects a time data (e.g., Time Data#5) by utilizing Input Device 210 (FIG. 1) or via voice recognition system (S2). CPU 211 of Device B retrieves the corresponding Device B's location data (e.g., Device B's Location Data#5) (S3). CPU 211 of Device B identifies the closest street address location data (e.g., Street Address Location Data#5) stored in Street Address Location Storage Area 20686b4B (S4). CPU 211 of Device B retrieves the corresponding street address data (e.g., Street Address Data#5) from Street Address Location Storage Area 20686b4B and displays the data on LCD 201 (FIG. 1) of Device B (S5). CPU 211 of Device B identifies the closest phone number location data (e.g., Phone Number Location Data#5) stored in Phone Number Location Storage Area 20686b5B (S6). CPU 211 of Device B retrieves the corresponding phone number data (e.g., Phone Number Data#5) from Phone Number Location Storage Area 20686b5B and displays the data on LCD 201 (FIG. 1) of Device B (S7). CPU 211 of Device B sends the Device B's location data, the Device B's location street address, and the Device B's location phone number, which are received by Device A (S8).

<<CCD Dictionary Function>>

The following paragraphs illustrate(s) the CCD dictionary function which enables the user of Communication Device 200 to utilize Communication Device 200 as a language dictionary.

This paragraph illustrate(s) the storage area included in Host H. In the present embodiment, Host H includes CCD Dictionary Information Storage Area H87a of which the data and the software programs stored therein are described hereinafter.

This paragraph illustrate(s) the storage areas included in CCD Dictionary Information Storage Area H87a. In the present embodiment, CCD Dictionary Information Storage Area H87a includes CCD Dictionary Data Storage Area H87b and CCD Dictionary Software Storage Area H87c. CCD Dictionary Data Storage Area H87b stores the data necessary to implement the present function on the side of Host H, such as the ones described hereinafter. CCD Dictionary Software Storage Area H87c stores the software programs necessary to implement the present function on the side of Host H, such as the ones described hereinafter.

This paragraph illustrate(s) the storage areas included in CCD Dictionary Data Storage Area H87b. In the present embodiment, CCD Dictionary Data Storage Area H87b includes Dictionary Data Storage Area H87b1 and Work Area H87b2. Dictionary Data Storage Area H87b1 stores the data described hereinafter. Work Area H87b2 is utilized as a work area to perform calculation and temporarily store data.

This paragraph illustrate(s) the storage areas included in Dictionary Data Storage Area H87b1. In the present embodiment, Dictionary Data Storage Area H87b1 includes English/English Dictionary Data Storage Area H87b1a and English/Japanese Dictionary Data Storage Area H87b1b. English/English Dictionary Data Storage Area H87b1a stores the data described hereinafter. English/Japanese Dictionary Data Storage Area H87b1b stores the data described hereinafter.

This paragraph illustrate(s) the data stored in English/English Dictionary Data Storage Area H87b1a. In the present embodiment, English/English Dictionary Data Storage Area H87b1a comprises two columns, i.e., 'English Term' and 'English Explanation Data'. Column 'English Term' stores the English terms, and each English term represents an English word. Each English term includes alphanumeric data. Column 'English Explanation Data' stores the English explanation data, and each English explanation data represents the explanation in English of the corresponding English term. Each English explanation data includes alphanumeric data. In the present embodiment, English/English Dictionary Data Storage Area H87b1a stores the following data: the English term 'English Term#1' and the corresponding English explanation data 'English Explanation Data#1'; the English term 'English Term#2' and the corresponding English explanation data 'English Explanation Data#2'; the English term 'English Term#3' and the corresponding English explanation data 'English Explanation Data#3'; and the English term 'English Term#4' and the corresponding English explanation data 'English Explanation Data#4'.

This paragraph illustrate(s) the data stored in English/Japanese Dictionary Data Storage Area H87b1b. In the present embodiment, English/Japanese Dictionary Data Storage Area H87b1b comprises two columns, i.e., 'English Term' and 'Japanese Explanation Data'. Column 'English Term' stores the English terms, and each English term represents an English word. Each English term includes alphanumeric data. The English terms stored in English/Japanese Dictionary Data Storage Area H87b1b are identical to the ones stored in English/English Dictionary Data Storage Area H87b1a. Column 'Japanese Explanation Data' stores the Japanese explanation data, and each Japanese explanation data represents the explanation in Japanese of the corresponding English term. Each Japanese explanation data includes alphanumeric data. In the present embodiment, English/Japanese Dictionary Data Storage Area H87b1b stores the following data: the English term 'English Term#1' and the corresponding Japanese explanation data 'Japanese Explanation Data#1'; the English term 'English Term#2' and the corresponding Japanese explanation data 'Japanese Explanation Data#2'; the English term 'English Term#3' and the corresponding Japanese explanation data 'Japanese Explanation Data#3'; and the English term 'English Term#4' and the corresponding Japanese explanation data 'Japanese Explanation Data#4'.

This paragraph illustrate(s) the software programs stored in CCD Dictionary Software Storage Area H87c. In the present embodiment, CCD Dictionary Software Storage Area H87c stores Dictionary Data Downloading Software H87c1 and Explanation Data Retrieving Software H87c2. Dictionary Data Downloading Software H87c1 is the software program described hereinafter. Explanation Data Retrieving Software H87c2 is the software program described hereinafter.

This paragraph illustrate(s) the storage area included in RAM 206 (FIG. 1) of Communication Device 200. In the present embodiment, RAM 206 includes CCD Dictionary Information Storage Area 20687a of which the data and the software programs stored therein are described hereinafter.

The data and/or the software programs stored in CCD Dictionary Information Storage Area 20687a may be downloaded from Host H in the manner described hereinafter.

This paragraph illustrate(s) the storage areas included in CCD Dictionary Information Storage Area 20687a. In the present embodiment, CCD Dictionary Information Storage Area 20687*a* includes CCD Dictionary Data Storage Area 20687*b* and CCD Dictionary Software Storage Area 20687*c*. CCD Dictionary Data Storage Area 20687*b* stores the data necessary to implement the present function on the side of Communication Device 200, such as the ones described hereinafter. CCD Dictionary Software Storage Area 20687*c* stores the software programs necessary to implement the present function on the side of Communication Device 200, such as the ones described hereinafter.

This paragraph illustrate(s) the storage areas included in CCD Dictionary Data Storage Area 20687*b*. In the present embodiment, CCD Dictionary Data Storage Area 20687*b* includes Dictionary Data Storage Area 20687*b*1 and Work Area 20687*b*2. Dictionary Data Storage Area 20687*b*1 stores the data described hereinafter. Work Area 20687*b*2 is utilized as a work area to perform calculation and temporarily store data.

This paragraph illustrate(s) the storage areas included in Dictionary Data Storage Area 20687*b*1. In the present embodiment, Dictionary Data Storage Area 20687*b*1 includes English/English Dictionary Data Storage Area 20687*b*1*a* and English/Japanese Dictionary Data Storage Area 20687*b*1*b*. English/English Dictionary Data Storage Area 20687*b*1*a* stores the data described hereinafter. English/Japanese Dictionary Data Storage Area 20687*b*1*b* stores the data described hereinafter.

This paragraph illustrate(s) the data stored in English/English Dictionary Data Storage Area 20687*b*1*a*. In the present embodiment, English/English Dictionary Data Storage Area 20687*b*1*a* comprises two columns, i.e., 'English Term' and 'English Explanation Data'. Column 'English Term' stores the English terms, and each English term represents an English word. Each English term includes alphanumeric data. Column 'English Explanation Data' stores the English explanation data, and each English explanation data represents the explanation in English of the corresponding English term. Each English explanation data includes alphanumeric data. In the present embodiment, English/English Dictionary Data Storage Area 20687*b*1*a* stores the following data: the English term 'English Term#1' and the corresponding English explanation data 'English Explanation Data#1'; the English term 'English Term#2' and the corresponding English explanation data 'English Explanation Data#2'; the English term 'English Term#3' and the corresponding English explanation data 'English Explanation Data#3'; and the English term 'English Term#4' and the corresponding English explanation data 'English Explanation Data#4'.

This paragraph illustrate(s) the data stored in English/Japanese Dictionary Data Storage Area 20687*b*1*b*. In the present embodiment, English/Japanese Dictionary Data Storage Area 20687*b*1*b* comprises two columns, i.e., 'English Term' and 'Japanese Explanation Data'. Column 'English Term' stores the English terms, and each English term represents an English word. Each English term includes alphanumeric data. The English terms stored in English/Japanese Dictionary Data Storage Area 20687*b*1*b* are identical to the ones stored in English/English Dictionary Data Storage Area 20687*b*1*a*. Column 'Japanese Explanation Data' stores the Japanese explanation data, and each Japanese explanation data represents the explanation in Japanese of the corresponding English term. Each Japanese explanation data includes alphanumeric data. In the present embodiment, English/Japanese Dictionary Data Storage Area 20687*b*1*b* stores the following data: the English term 'English Term#1' and the corresponding Japanese explanation data 'Japanese Explanation Data#1'; the English term 'English Term#2' and the corresponding Japanese explanation data 'Japanese Explanation Data#2'; the English term 'English Term#3' and the corresponding Japanese explanation data 'Japanese Explanation Data#3'; and the English term 'English Term#4' and the corresponding Japanese explanation data 'Japanese Explanation Data#4'.

This paragraph illustrate(s) the software programs stored in CCD Dictionary Software Storage Area 20687*c*. In the present embodiment, CCD Dictionary Software Storage Area 20687*c* stores Dictionary Data Downloading Software 20687*c*1, Explanation Data Retrieving Software 20687*c*2, and CCD Dictionary Software 20687*c*3. Dictionary Data Downloading Software 20687*c*1 is the software program described hereinafter. Explanation Data Retrieving Software 20687*c*2 is the software program described hereinafter. CCD Dictionary Software 20687*c*3 is the software program described hereinafter.

This paragraph illustrate(s) Dictionary Data Downloading Software H87*c*1 of Host H and Dictionary Data Downloading Software 20687*c*1 of Communication Device 200, which download the data stored in Dictionary Data Storage Area H87*b*1. In the present embodiment, CPU 211 (FIG. 1) of Communication Device 200 sends, in a wireless fashion via Antenna 218 (FIG. 1), a dictionary data downloading request, which is received by Host H (S1). Here, the dictionary data downloading request is a request to download the data stored in Dictionary Data Storage Area H87*b*1 of Host H. In response, Host H retrieves all data from Dictionary Data Storage Area H87*b*1 and sends the data to Communication Device 200 (S2). CPU 211 receives the data and stores them in Dictionary Data Storage Area 20687*b*1 (S3).

This paragraph illustrate(s) Explanation Data Retrieving Software 20687*c*2 of Communication Device 200, which displays on LCD 201 (FIG. 1) the explanations of the English term input by utilizing Input Device 210 (FIG. 1) or via voice recognition system. In the present embodiment, the user of Communication Device 200 inputs an English term (e.g., English Term#1) by utilizing Input Device 210 (FIG. 1) or via voice recognition system (S1). CPU 211 (FIG. 1) of Communication Device 200 searches English/English Dictionary Data Storage Area 20687*b*1*a* for the matching term (S2). CPU 211 then searches English/Japanese Dictionary Data Storage Area 20687*b*1*b* for the matching term (S3). CPU 211 stores the corresponding English explanation data (e.g., English Explanation Data#1) in Work Area 20687*b*2 (S4). CPU 211 stores the corresponding Japanese explanation data (e.g., Japanese Explanation Data#1) in Work Area 20687*b*2 (S5). CPU 211 retrieves the corresponding English explanation data (e.g., English Explanation Data#1) and the corresponding Japanese explanation data (e.g., Japanese Explanation Data#1) from Work Area 20687*b*2 and displays both data on LCD 201 (FIG. 1) (S6).

This paragraph illustrate(s) CCD Dictionary Software 20687*c*3 of Communication Device 200, which displays on LCD 201 (FIG. 1) the explanations of the English term input via CCD Unit 214 (FIG. 1). In the present embodiment, CPU 211 (FIG. 1) of Communication Device 200 inputs an image data from CCD Unit 214 (FIG. 1) (S1). CPU 211 stores the image data input In S1 in Work Area 20687*b*2 (S2), and converts the image data to text data and retrieves an English term (e.g., English Term#1) therefrom (S3). CPU 211 searches English/English Dictionary Data Storage Area 20687*b*1*a* for the matching term (S4). CPU 211 then searches English/Japanese Dictionary Data Storage Area 20687*b*1*b* for the matching term (S5). CPU 211 stores the corresponding English explanation data (e.g., English Explanation Data#1) in Work Area 20687*b*2 (S6). CPU 211 stores the corresponding Japanese explanation data (e.g., Japanese Explanation Data#1) in Work Area 20687b2 (S7). CPU 211 retrieves the corresponding English explanation data and the corresponding Japanese explanation data from Work Area 20687b2 and displays both data on LCD 201 (FIG. 1) (S8).

This paragraph illustrate(s) Explanation Data Retrieving Software H87c2 of Host H and Explanation Data Retrieving Software 20687c2 of Communication Device 200, which display on LCD 201 (FIG. 1) the explanations of the English term input by utilizing Input Device 210 (FIG. 1) or via voice recognition system. The explanation data are retrieved from Host H in this embodiment. Referring to the present embodiment, the user of Communication Device 200 inputs an English term (e.g., English Term#1) by utilizing Input Device 210 (FIG. 1) or via voice recognition system (S1). CPU 211 (FIG. 1) of Communication Device 200 sends, in a wireless fashion via Antenna 218 (FIG. 1), the English term (e.g., English Term#1) input In S1, which is received by Host H (S2). Host H searches English/English Dictionary Data Storage Area H87b1a for the matching term (S3). Host H searches English/Japanese Dictionary Data Storage Area H87b1b for the matching term (S4). Host H sends the corresponding English explanation data (e.g., English Explanation Data#1) and the corresponding Japanese explanation data (e.g., Japanese Explanation Data#1), which are received by Communication Device 200 (S5). CPU 211 of Communication Device 200 stores the corresponding English explanation data (e.g., English Explanation Data#1) in Work Area 20687b2 (S6). CPU 211 stores the corresponding Japanese explanation data (e.g., Japanese Explanation Data#1) in Work Area 20687b2 (S7). CPU 211 retrieves the corresponding English explanation data and the corresponding Japanese explanation data from Work Area 20687b2 and displays both data on LCD 201 (FIG. 1) (S8).

This paragraph illustrate(s) Explanation Data Retrieving Software H87c2 of Host H and CCD Dictionary Software 20687c3 of Communication Device 200, which display on LCD 201 (FIG. 1) the explanations of the English term input via CCD Unit 214 (FIG. 1). The explanation data are retrieved from Host H in this embodiment. In the present embodiment, CPU 211 (FIG. 1) of Communication Device 200 inputs an image data from CCD Unit 214 (FIG. 1) (S1). CPU 211 stores the image data input In S1 in Work Area 20687b2 (S2), and converts the image data to text data and retrieves an English term (e.g., English Term#1) therefrom (S3). CPU 211 sends, in a wireless fashion via Antenna 218 (FIG. 1), the English term (e.g., English Term#1) input In S1, which is received by Host H (S4). Host H searches English/English Dictionary Data Storage Area H87b1a for the matching term (S5). Host H searches English/Japanese Dictionary Data Storage Area H87b1b for the matching term (S6). Host H sends the corresponding English explanation data (e.g., English Explanation Data#1) and the corresponding Japanese explanation data (e.g., Japanese Explanation Data#1), which are received by Communication Device 200 (S7). CPU 211 of Communication Device 200 stores the corresponding English explanation data (e.g., English Explanation Data#1) in Work Area 20687b2 (S8). CPU 211 stores the corresponding Japanese explanation data (e.g., Japanese Explanation Data#1) in Work Area 20687b2 (S9). CPU 211 retrieves the corresponding English explanation data and the corresponding Japanese explanation data from Work Area 20687b2 and displays both data on LCD 201 (FIG. 1) (S10).

<<Schedule Notifying Function>>

This paragraph illustrates the schedule notifying function which enables the user of Communication Device 200 to register his/her schedule via his/her personal computer (e.g., a desktop computer, a PDA, a laptop computer, Communication Device 200 described hereinafter and another Communication Device 200) and display a notice on Communication Device 200 when the registered schedule is about to start.

This paragraph illustrates the connections of Personal Computer PC88, Network NT, Host H, and Communication Device 200. In the present embodiment, Personal Computer PC88 is connected to Network NT (e.g., the Internet). Host H is connected to Network NT. Communication Device 200 is connected to Network NT in a wireless fashion. Personal Computer PC88 and Host H are capable to send and receive data via Network NT. Host H and Communication Device 200 are capable to send and receive data via Network NT. Here, Personal Computer PC88 may be any computer, such as a desktop computer, a PDA, a laptop computer, Communication Device 200 described hereinafter or another Communication Device 200.

This paragraph illustrates the storage areas included in Personal Computer PC88. In the present embodiment, Personal Computer PC88 includes Work Area PC88b and Software Storage Area PC88c. Work Area PC88b is utilized as a work area to perform calculation and temporarily store data. Software Storage Area PC88c stores the software programs necessary to implement the present function on the side of Host H, such as the one described hereinafter.

This paragraph illustrates the software programs stored in Software Storage Area PC88c. In the present embodiment, Software Storage Area PC88c stores Schedule Data Inputting Software PC88c1. Schedule Data Inputting Software PC88c1 is the software program described hereinafter.

This paragraph illustrates the storage area included in Host H. In the present embodiment, Host H includes Schedule Notifying Information Storage Area H88a of which the data and the software programs stored therein are described hereinafter.

This paragraph illustrates the storage areas included in Schedule Notifying Information Storage Area H88a. In the present embodiment, Schedule Notifying Information Storage Area H88a includes Schedule Notifying Data Storage Area H88b and Schedule Notifying Software Storage Area H88c. Schedule Notifying Data Storage Area H88b stores the data necessary to implement the present function on the side of Host H, such as the ones described hereinafter. Schedule Notifying Software Storage Area H88c stores the software programs necessary to implement the present function on the side of Host H, such as the ones described hereinafter.

This paragraph illustrates the storage areas included in Schedule Notifying Data Storage Area H88b. In the present embodiment, Schedule Notifying Data Storage Area H88b includes Users' Schedule Data Storage Area H88b1 and Work Area H88b2. Users' Schedule Data Storage Area H88b1 stores the data necessary to implement the present function on the side of Host H, such as the ones described hereinafter. Work Area H88b2 is utilized as a work area to perform calculation and temporarily store data.

This paragraph illustrates the storage areas included in Users' Schedule Data Storage Area H88b1. Users' Schedule Data Storage Area H88b1 stores the schedule data of each user (e.g., user#1 and user#2). Here, the schedule data includes the starting time data, the ending time data, the place data, the title data, and the memo data. The starting time data represents the starting time of the schedule represented by the title data. The ending time data represents the ending time of the schedule represented by the title data. The place data represents the place at which the schedule represented by the title data takes place. The title data represents the title of the schedule data. The memo data represents the alphanumeric data which the user inputs for a memorandum. In the present embodiment, Users' Schedule Data Storage Area H88b1 includes User#1's Schedule Data Storage Area H88b1a and User#2's Schedule Data Storage Area H88b1b. User#1's Schedule Data Storage Area H88b1a stores the schedule data of user#1, of which the data stored therein are described hereinafter. User#2's Schedule Data Storage Area H88b1b stores the schedule data of user#2, of which the data stored therein are described hereinafter.

This paragraph illustrates the data stored in User#1's Schedule Data Storage Area H88b1a. In the present embodiment, User#1's Schedule Data Storage Area H88b1a comprises two columns, i.e., 'User#1's Schedule ID' and 'User#1's Schedule Data'. Column 'User#1's Schedule ID' stores the user#1's schedule IDs, and each user#1's schedule ID is an identification of the corresponding user#1's schedule data stored in column 'User#1's Schedule Data'. Column 'User#1's Schedule Data' stores the schedule data of user#1 of which the data included therein are described hereinafter. In the present embodiment, User#1's Schedule Data Storage Area H88b1a stores the following data: the user#1's schedule ID 'User#1's Schedule#1' and the corresponding user#1's schedule data 'User#1's Schedule Data#1'; the user#1's schedule ID 'User#1's Schedule#2' and the corresponding user#1's schedule data 'User#1's Schedule Data#2'; the user#1's schedule ID 'User#1's Schedule#3' and the corresponding user#1's schedule data 'User#1's Schedule Data#3'; and the user#1's schedule ID 'User#1's Schedule#4' and the corresponding user#1's schedule data 'User#1's Schedule Data#4'.

This paragraph illustrates the data stored in User#2's Schedule Data Storage Area H88b1b. In the present embodiment, User#2's Schedule Data Storage Area H88b1b comprises two columns, i.e., 'User#2's Schedule ID' and 'User#2's Schedule Data'. Column 'User#2's Schedule ID' stores the user#2's schedule IDs, and each user#2's schedule ID is an identification of the corresponding user#2's schedule data stored in column 'User#2's Schedule Data'. Column 'User#2's Schedule Data' stores the schedule data of user#2. In the present embodiment, User#2's Schedule Data Storage Area H88b1b stores the following data: the user#2's schedule ID 'User#2's Schedule#1' and the corresponding user#2's schedule data 'User#2's Schedule Data#1'; the user#2's schedule ID 'User#2's Schedule#2' and the corresponding user#2's schedule data 'User#2's Schedule Data#2'; the user#2's schedule ID 'User#2's Schedule#3' and the corresponding user#2's schedule data 'User#2's Schedule Data#3'; and the user#2's schedule ID 'User#2's Schedule#4' and the corresponding user#2's schedule data 'User#2's Schedule Data#4'.

This paragraph illustrates an example of the schedule data stored in User#1's Schedule Data Storage Area H88b1a and User#2's Schedule Data Storage Area H88b1b taking the user#1's schedule data 'User#1's Schedule Data#4' as an example. Here, the user#1's schedule data 'User#1's Schedule Data#4' includes the starting time data 'Starting Time Data#4a', the ending time data 'Ending Time Data#4b', the place data 'Place Data#4c', the title data 'Title Data#4d', and the memo data 'Memo Data#4e'. The starting time data 'Starting Time Data#4a' represents the starting time of the schedule represented by the title data 'Title Data#4d'. The ending time data 'Ending Time Data#4b' represents the ending time of the schedule represented by the title data 'Title Data#4d'. The place data 'Place Data#4c' represents the place at which the schedule represented by the title data 'Title Data#4d takes place. The title data 'Title Data#4d' represents the title of the schedule data 'User#1's Schedule Data#4' of User#1 . The memo data 'Memo Data#4e' represents the alphanumeric data which the user input for a memorandum.

This paragraph illustrates the software programs stored in Schedule Notifying Software Storage Area H88c. In the present embodiment, Schedule Notifying Software Storage Area H88c stores Schedule Data Inputting Software H88c1, Schedule Notifying Software H88c2, and Schedule Displaying Software H88c3. Schedule Data Inputting Software H88c1 is the software program described hereinafter. Schedule Notifying Software H88c2 is the software program described hereinafter. Schedule Displaying Software H88c3 is the software program described hereinafter.

This paragraph illustrates the storage area included in RAM 206 (FIG. 1) of Communication Device 200. In the present embodiment, RAM 206 includes Schedule Notifying Information Storage Area 20688a of which the data and the software programs stored therein are described hereinafter.

The data and/or the software programs stored in Schedule Notifying Information Storage Area 20688a may be downloaded from Host H in the manner described hereinafter.

This paragraph illustrates the storage areas included in Schedule Notifying Information Storage Area 20688a. In the present embodiment, Schedule Notifying Information Storage Area 20688a includes Schedule Notifying Data Storage Area 20688b and Schedule Notifying Software Storage Area 20688c. Schedule Notifying Data Storage Area 20688b stores the data necessary to implement the present function on the side of Communication Device 200, such as the ones described hereinafter. Schedule Notifying Software Storage Area 20688c stores the software programs necessary to implement the present function on the side of Communication Device 200, such as the ones described hereinafter.

This paragraph illustrates the storage areas included in Schedule Notifying Data Storage Area 20688b. In the present embodiment, Schedule Notifying Data Storage Area 20688b includes User#1's Schedule Data Storage Area 20688b1a and Work Area 20688b2. User#1's Schedule Data Storage Area 20688b1a stores the data described hereinafter. Work Area 20688b2 is utilized as a work area to perform calculation and temporarily store data.

This paragraph illustrates the data stored in User#1's Schedule Data Storage Area 20688b1a. In the present embodiment, User#1's Schedule Data Storage Area 20688b1a comprises two columns, i.e., 'User#1's Schedule ID' and 'User#1's Schedule Data'. Column 'User#1's Schedule ID' stores the user#1's schedule IDs, and each user#1's schedule ID is an identification of the corresponding user#1's schedule data stored in column 'User#1's Schedule Data'. Column 'User#1's Schedule Data' stores the schedule data of user#1 of which the data included therein are described hereinafter. In the present embodiment, User#1's Schedule Data Storage Area 20688b1a stores the following data: the user#1's schedule ID 'User#1's Schedule#1' and the corresponding user#1's schedule data 'User#1's Schedule Data#1'; the user#1's schedule ID 'User#1's Schedule#2' and the corresponding user#1's schedule data 'User#1's Schedule Data#2'; the user#1's schedule ID 'User#1's Schedule#3' and the corresponding user#1's schedule data 'User#1's Schedule Data#3'; and the user#1's schedule ID 'User#1's Schedule#4' and the corresponding user#1's schedule data 'User#1's Schedule Data#4'.

This paragraph illustrates an example of the schedule data stored in User#1's Schedule Data Storage Area 20688b1a taking the user#1's schedule data 'User#1's Schedule Data#4' as an example. Here, the user#1's schedule data 'User#1's Schedule Data#4' includes the starting time data 'Starting Time Data#4a', the ending time data 'Ending Time Data#4b', the place data 'Place Data#4c', the title data 'Title Data#4d', and the memo data 'Memo Data#4e'. The starting time data 'Starting Time Data#4a' represents the starting time of the schedule represented by the title data 'Title Data#4d'. The ending time data 'Ending Time Data#4b' represents the ending time of the schedule represented by the title data 'Title Data#4d'. The place data 'Place Data#4c' represents the place at which the schedule represented by the title data 'Title Data#4d takes place. The title data 'Title Data#4d' represents the title of the schedule data 'User#1's Schedule Data#4' of User#1. The memo data 'Memo Data#4e' represents the alphanumeric data which the user input for a memorandum.

This paragraph illustrates the software programs stored in Schedule Notifying Software Storage Area 20688c. In the present embodiment, Schedule Notifying Software Storage Area 20688c stores Schedule Notifying Software 20688c2 and Schedule Displaying Software 20688c3. Schedule Notifying Software 20688c2 is the software program described hereinafter. Schedule Displaying Software 20688c3 is the software program described hereinafter.

This paragraph illustrates Schedule Data Inputting Software H88c1 of Host H and Schedule Data Inputting Software PC88c1 of Personal Computer PC88, which input the schedule data of the user of Communication Device 200. In the present embodiment, the user (e.g., user#1) inputs to Personal Computer PC88 a schedule data (e.g., Schedule Data#4), for example, the starting time data 'Starting Time Data#4a', the ending time data 'Ending Time Data#4b', the place data 'Place Data#4c', the title data 'Title Data#4d', and the memo data 'Memo Data#4e'. (S1). Personal Computer PC88 stores the schedule data (e.g., Schedule Data#4) input in S1 in Work Area PC88b (S2). Personal Computer PC88 retrieves the schedule data (e.g., Schedule Data#4) from Work Area PC88b and sends the data to Host H (S3). Host H receives the schedule data (e.g., Schedule Data#4) from Personal Computer PC88 and stores the data in User#1's Schedule Data Storage Area H88b1a (S4).

This paragraph illustrates Schedule Notifying Software H88c2 of Host H and Schedule Notifying Software 20688c2 of Personal Computer PC88, which display on LCD 201 (FIG. 1) of Communication Device 200 a notice when the registered schedule is about to start. In the present embodiment, Host H scans the starting time data of each schedule data stored in Users' Schedule Data Storage Area H88b1 (S1). Host H compares the current time and the starting time data (e.g., Starting Time Data#4a) (S2). If the current time is predetermined time before the starting time data (e.g., five minutes before Starting Time Data#4a), Host H moves to the next step (S3). Host H sends a notice data, which is received by Communication Device 200 (S4). Here, the notice data is a data designed to be displayed on LCD 201 (FIG. 1) of Communication Device 200 which indicates that the schedule represented by the schedule data (e.g., Schedule Data#4) is about to start. CPU 211 (FIG. 1) of Communication Device 200 stores the notice data in Work Area 20688b2 and displays the data on LCD 201 (FIG. 1) (S5).

This paragraph illustrates Schedule Displaying Software H88c3 of Host H and Schedule Displaying Software 20688c3 of Communication Device 200, which display the schedule data on LCD 201 (FIG. 1) of Communication Device 200. In the present embodiment, the user (e.g., user#1) of Communication Device 200 inputs a schedule data displaying signal by utilizing Input Device 210 (FIG. 1) or via voice recognition system (S1). Here, the schedule data displaying signal is a signal to display the schedule of the user (e.g., user#1) of Communication Device 200. In response, CPU 211 (FIG. 1) of Communication Device 200 sends a schedule data request, which is received by Host H (S2). Here, the schedule data request is a request to send all schedule data of the corresponding user (e.g., user#1) stored in Host H to Communication Device 200 in order for the schedule data to be displayed on LCD 201 (FIG. 1) of Communication Device 200. Host H retrieves all schedule data (e.g., User#1's Schedule Data#1 Through #4) of the corresponding user (e.g., User#1), which are sent to Communication Device 200 (S3). CPU 211 (FIG. 1) of Communication Device 200 receives the schedule data (e.g., User#1's Schedule Data#1 Through #4) from Host H and stores the data in User#1's Schedule Data Storage Area 20688b1a (S4). CPU 211 retrieves all schedule data (e.g., User#1's Schedule Data#1 Through #4) from User#1's Schedule Data Storage Area 20688b1a and displays the data on LCD 201 (FIG. 1) (S5).

<<Multiple Type TV Program Distributing System>>

This paragraph illustrate(s) the connections between Host H and the three broadcast centers, i.e., Satellite TV Broadcast Center 94TVBC1, Ground Wave TV Broadcast Center 94TVBC2, and Cable TV Broadcast Center 94TVBC3. Satellite TV Broadcast Center 94TVBC1 is the broadcast center which broadcasts the satellite TV program data. Here, the satellite TV program data is the data distributed from Satellite TV Broadcast Center 94TVBC1 which is designed to be output from displays, such as TV monitors. Ground Wave TV Broadcast Center 94TVBC2 is the broadcast center which broadcasts the ground wave TV program data. Here, the ground wave TV program data is the data distributed from Ground Wave TV Broadcast Center 94TVBC2 which is designed to be output from displays, such as TV monitors. Cable TV Broadcast Center 94TVBC3 is the broadcast center which broadcasts the cable TV program data. Here, the cable TV program data is the data distributed from Cable TV Broadcast Center 94TVBC3 which is designed to be output from displays, such as TV monitors. The foregoing three broadcast centers broadcast the TV program data in their ordinary manner, and also distribute the same TV program data to Host H via Network NT (e.g., the Internet) in order for Communication Device 200 to display the TV program data by implementing the present system. Host H receives the TV program data from the foregoing three broadcast centers realtime, twenty-four hour a day and seven days a week of which the details are described hereinafter.

This paragraph illustrate(s) another embodiment of the connection between Host H and Satellite TV Broadcast Center 94TVBC1. Satellite TV Broadcast Center 94TVBC1 is the broadcast center which broadcasts the satellite TV program data. Here, the satellite TV program data is the data distributed from Satellite TV Broadcast Center 94TVBC1 which is designed to be output from displays, such as TV monitors. Satellite TV Broadcast Center 94TVBC1 broadcasts the satellite TV program data in their ordinary manner via Artificial Satellite AS94, which is received by Host H in order for Communication Device 200 to display the satellite TV program data by implementing the present system.

This paragraph illustrate(s) another embodiment of the connection between Host H and Ground Wave TV Broadcast Center 94TVBC2. Ground Wave TV Broadcast Center 94TVBC2 is the broadcast center which broadcasts the ground wave TV program data. Here, the ground wave TV program data is the data distributed from Ground Wave TV Broadcast Center 94TVBC2 which is designed to be output from displays, such as TV monitors. Ground Wave TV Broadcast Center 94TVBC2 broadcasts the ground wave TV program data in their ordinary manner via Antenna Ant94, which is received by Host H in order for Communication Device 200 to display the ground wave TV program data by implementing the present system and/or the cellular TV function.

This paragraph illustrate(s) another embodiment of the connection between Host H and Cable TV Broadcast Center 94TVBC3. Cable TV Broadcast Center 94TVBC3 is the broadcast center which broadcasts the cable TV program data. Here, the cable TV program data is the data distributed from Cable TV Broadcast Center 94TVBC3 which is designed to be output from displays, such as TV monitors. Cable TV Broadcast Center 94TVBC3 broadcasts the cable TV program data in their ordinary manner via Cable Cb194, which is received by Host H in order for Communication Device 200 to display the cable TV program data by implementing the present system and/or the cellular TV function.

This paragraph illustrate(s) the storage area included in Host H. In the present embodiment, Host H includes Multiple Type TV Program Information Storage Area H94a of which the data and the software programs stored therein are described hereinafter.

This paragraph illustrate(s) the storage areas included in Multiple Type TV Program Information Storage Area H94a. In the present embodiment, Multiple Type TV Program Information Storage Area H94a includes Multiple Type TV Program Data Storage Area H94b and Multiple Type TV Program Data Software Storage Area H94c. Multiple Type TV Program Data Storage Area H94b stores the data necessary to implement the present function on the side of Host H, such as the ones described hereinafter. Multiple Type TV Program Data Software Storage Area H94c stores the software programs necessary to implement the present function on the side of Host H, such as the ones described hereinafter.

This paragraph illustrate(s) the storage areas included in Multiple Type TV Program Data Storage Area H94b. In the present embodiment, Multiple Type TV Program Data Storage Area H94b includes Satellite TV Program Data Storage Area H94b1, Ground Wave TV Program Data Storage Area H94b2, Cable TV Program Data Storage Area H94b3, and Work Area H94b4. Satellite TV Program Data Storage Area H94b1 stores the data described hereinafter. Ground Wave TV Program Data Storage Area H94b2 stores the data described hereinafter. Cable TV Program Data Storage Area H94b3 stores the data described hereinafter. Work Area H94b4 is utilized as a work area to perform calculation and temporarily store data.

This paragraph illustrate(s) the data stored in Satellite TV Program Data Storage Area H94b1. In the present embodiment, Satellite TV Program Data Storage Area H94b1 comprises two columns, i.e., 'Satellite TV Program ID' and 'Satellite TV Program Data'. Column 'Satellite TV Program ID' stores the satellite TV program IDs, and each satellite TV program ID is an identification of the corresponding satellite TV program data stored in column 'Satellite TV Program Data'. Column 'Satellite TV Program Data' stores the satellite TV program data, and each satellite TV program data is the data received from Satellite TV Broadcast Center 94TVBC1. In the present embodiment, Satellite TV Program Data Storage Area H94b1 stores the following data: the satellite TV program ID 'Satellite TV Program#1' and the corresponding satellite TV program data 'Satellite TV Program Data#1'; the satellite TV program ID 'Satellite TV Program#2' and the corresponding satellite TV program data 'Satellite TV Program Data#2'; the satellite TV program ID 'Satellite TV Program#3' and the corresponding satellite TV program data 'Satellite TV Program Data#3'; and the satellite TV program ID 'Satellite TV Program#4' and the corresponding satellite TV program data 'Satellite TV Program Data#4'.

This paragraph illustrate(s) the data stored in Ground Wave TV Program Data Storage Area H94b2. In the present embodiment, Ground Wave TV Program Data Storage Area H94b2 comprises two columns, i.e., 'Ground Wave TV Program ID' and 'Ground Wave TV Program Data'. Column 'Ground Wave TV Program ID' stores the ground wave TV program IDs, and each ground wave TV program ID is an identification of the corresponding ground wave TV program data stored in column 'Satellite TV Program Data'. Column 'Ground Wave TV Program Data' stores the ground wave TV program data, and each ground wave TV program data is the data received from Ground Wave TV Broadcast Center 94TVBC2. In the present embodiment, Ground Wave TV Program Data Storage Area H94b2 stores the following data: the ground wave TV program ID 'Ground Wave TV Program#1' and the corresponding ground wave TV program data 'Ground Wave TV Program Data#1'; the ground wave TV program ID 'Ground Wave TV Program#2' and the corresponding ground wave TV program data 'Ground Wave TV Program Data#2'; the ground wave TV program ID 'Ground Wave TV Program#3' and the corresponding ground wave TV program data 'Ground Wave TV Program Data#3'; and the ground wave TV program ID 'Ground Wave TV Program#4' and the corresponding ground wave TV program data 'Ground Wave TV Program Data#4'.

This paragraph illustrate(s) the data stored in Cable TV Program Data Storage Area H94b3. In the present embodiment, Cable TV Program Data Storage Area H94b3 comprises two columns, i.e., 'Cable TV Program ID' and 'Cable TV Program Data'. Column 'Cable TV Program ID' stores the cable TV program IDs, and each cable TV program ID is an identification of the corresponding cable TV program data stored in column 'Satellite TV Program Data'. Column 'Cable TV Program Data' stores the cable TV program data, and each cable TV program data is the data received from Cable TV Broadcast Center 94TVBC3. In the present embodiment, Cable TV Program Data Storage Area H94b3 stores the following data: the cable TV program ID 'Cable TV Program#1' and the corresponding cable TV program data 'Cable TV Program Data#1'; the cable TV program ID 'Cable TV Program#2' and the corresponding cable TV program data 'Cable TV Program Data#2'; the cable TV program ID 'Cable TV Program#3' and the corresponding cable TV program data 'Cable TV Program Data#3'; and the cable TV program ID 'Cable TV Program#4' and the corresponding cable TV program data 'Cable TV Program Data#4'.

This paragraph illustrate(s) the software programs stored in Multiple Type TV Program Data Software Storage Area H94c. In the present embodiment, Multiple Type TV Program Data Software Storage Area H94c stores Satellite TV Program Data Receiving Software H94c1, Ground Wave TV Program Data Receiving Software H94c2, Cable TV Program Data Receiving Software H94c3, Satellite TV Program Data Sending/Receiving Software H94c4, Ground Wave TV Program Data Sending/Receiving Software H94c5, and Cable TV Program Data Sending/Receiving Software H94c6. Satellite TV Program Data Receiving Software H94c1 is the software program described hereinafter. Ground Wave TV Program Data Receiving Software H94c2 is the software program described hereinafter. Cable TV Program Data Receiving Software H94c3 is the software program described hereinafter. Satellite TV Program Data Sending/Receiving Software H94c4 is the software program described hereinafter. Ground Wave TV Program Data Sending/Receiving Software H94c5 is the software program described hereinafter. Cable TV Program Data Sending/Receiving Software H94c6 is the software program described hereinafter.

This paragraph illustrate(s) the storage area included in RAM 206 (FIG. 1) of Communication Device 200. In the present embodiment, RAM 206 includes Multiple Type TV Program Information Storage Area 20694a of which the data and the software programs stored therein are described hereinafter.

The data and/or the software programs stored in Multiple Type TV Program Information Storage Area 20694a may be downloaded from Host H in the manner described hereinafter.

This paragraph illustrate(s) the storage areas included in Multiple Type TV Program Information Storage Area 20694a. In the present embodiment, Multiple Type TV Program Information Storage Area 20694a includes Multiple Type TV Program Data Storage Area 20694b and Multiple Type TV Program Data Software Storage Area 20694c. Multiple Type TV Program Data Storage Area 20694b stores the data necessary to implement the present function on the side of Communication Device 200, such as the ones described hereinafter. Multiple Type TV Program Data Software Storage Area 20694c stores the software programs necessary to implement the present function on the side of Communication Device 200, such as the ones described hereinafter.

This paragraph illustrate(s) the storage areas included in Multiple Type TV Program Data Storage Area 20694b. In the present embodiment, Multiple Type TV Program Data Storage Area 20694b includes Satellite TV Program Data Storage Area 20694b1, Ground Wave TV Program Data Storage Area 20694b2, Cable TV Program Data Storage Area 20694b3, and Work Area 20694b4. Satellite TV Program Data Storage Area 20694b1 stores the data described hereinafter. Ground Wave TV Program Data Storage Area 20694b2 stores the data described hereinafter. Cable TV Program Data Storage Area 20694b3 stores the data described hereinafter. Work Area 20694b4 is utilized as a work area to perform calculation and temporarily store data.

This paragraph illustrate(s) the data stored in Satellite TV Program Data Storage Area 20694b1. In the present embodiment, Satellite TV Program Data Storage Area 20694b1 comprises two columns, i.e., 'Satellite TV Program ID' and 'Satellite TV Program Data'. Column 'Satellite TV Program ID' stores the satellite TV program IDs, and each satellite TV program ID is an identification of the corresponding satellite TV program data stored in column 'Satellite TV Program Data'. Column 'Satellite TV Program Data' stores the satellite TV program data, and each satellite TV program data is the data received from Host H. In the present embodiment, Satellite TV Program Data Storage Area 20694b1 stores the following data: the satellite TV program ID 'Satellite TV Program#1' and the corresponding satellite TV program data 'Satellite TV Program Data#1'; the satellite TV program ID 'Satellite TV Program#2' and the corresponding satellite TV program data 'Satellite TV Program Data#2'; the satellite TV program ID 'Satellite TV Program#3' and the corresponding satellite TV program data 'Satellite TV Program Data#3'; and the satellite TV program ID 'Satellite TV Program#4' and the corresponding satellite TV program data 'Satellite TV Program Data#4'.

This paragraph illustrate(s) the data stored in Ground Wave TV Program Data Storage Area 20694b2. In the present embodiment, Ground Wave TV Program Data Storage Area 20694b2 comprises two columns, i.e., 'Ground Wave TV Program ID' and 'Ground Wave TV Program Data'. Column 'Ground Wave TV Program ID' stores the ground wave TV program IDs, and each ground wave TV program ID is an identification of the corresponding ground wave TV program data stored in column 'Satellite TV Program Data'. Column 'Ground Wave TV Program Data' stores the ground wave TV program data, and each ground wave TV program data is the data received from Host H. In the present embodiment, Ground Wave TV Program Data Storage Area 20694b2 stores the following data: the ground wave TV program ID 'Ground Wave TV Program#1' and the corresponding ground wave TV program data 'Ground Wave TV Program Data#1'; the ground wave TV program ID 'Ground Wave TV Program#2' and the corresponding ground wave TV program data 'Ground Wave TV Program Data#2'; the ground wave TV program ID 'Ground Wave TV Program#3' and the corresponding ground wave TV program data 'Ground Wave TV Program Data#3'; and the ground wave TV program ID 'Ground Wave TV Program#4' and the corresponding ground wave TV program data 'Ground Wave TV Program Data#4'.

This paragraph illustrate(s) the data stored in Cable TV Program Data Storage Area 20694b3. In the present embodiment, Cable TV Program Data Storage Area 20694b3 comprises two columns, i.e., 'Cable TV Program ID' and 'Cable TV Program Data'. Column 'Cable TV Program ID' stores the cable TV program IDs, and each cable TV program ID is an identification of the corresponding cable TV program data stored in column 'Satellite TV Program Data'. Column 'Cable TV Program Data' stores the cable TV program data, and each cable TV program data is the data received from Host H. In the present embodiment, Cable TV Program Data Storage Area 20694b3 stores the following data: the cable TV program ID 'Cable TV Program#1' and the corresponding cable TV program data 'Cable TV Program Data#1'; the cable TV program ID 'Cable TV Program#2' and the corresponding cable TV program data 'Cable TV Program Data#2'; the cable TV program ID 'Cable TV Program#3' and the corresponding cable TV program data 'Cable TV Program Data#3'; and the cable TV program ID 'Cable TV Program#4' and the corresponding cable TV program data 'Cable TV Program Data#4'.

This paragraph illustrate(s) the software programs stored in Multiple Type TV Program Data Software Storage Area 20694c. In the present embodiment, Multiple Type TV Program Data Software Storage Area 20694c stores Satellite TV Program Data Sending/Receiving Software 20694c1, Ground Wave TV Program Data Sending/Receiving Software 20694c2, and Cable TV Program Data Sending/Receiving Software 20694c3. Satellite TV Program Data Sending/Receiving Software 20694c1 is the software program described hereinafter. Ground Wave TV Program Data Sending/Receiving Software 20694c2 is the software program described hereinafter. Cable TV Program Data Sending/Receiving Software 20694c3 is the software program described hereinafter.

This paragraph illustrate(s) Satellite TV Program Data Receiving Software H94c1 of Host H, which receives the satellite TV program data from Satellite TV Broadcast Center 94TVBC1. In the present embodiment, Host H receives the satellite TV program data (e.g., Satellite TV Program Data#1 Through #4) from Satellite TV Broadcast Center 94TVBC1 (S1). Host H stores the satellite TV program data (e.g., Satellite TV Program Data#1 Through #4) in Satellite TV Program Data Storage Area H94b1 (S2). The foregoing sequence is repeated periodically.

This paragraph illustrate(s) Ground Wave TV Program Data Receiving Software H94c2 of Host H, which receives the ground wave TV program data from Ground Wave TV Broadcast Center 94TVBC2. In the present embodiment, Host H receives the ground wave TV program data (e.g., Ground Wave TV Program Data#1 Through #4) from Ground Wave TV Broadcast Center 94TVBC2 (S1). Host H stores the ground wave TV program data (e.g., Ground Wave TV Program Data#1 Through #4) in Ground Wave TV Program Data Storage Area H94b2 (S2). The foregoing sequence is repeated periodically.

This paragraph illustrate(s) Cable TV Program Data Receiving Software H94c3 of Host H, which receives the cable TV program data from Cable TV Broadcast Center 94TVBC3. In the present embodiment, Host H receives the cable TV program data (e.g., Cable TV Program Data#1 Through #4) from Cable TV Broadcast Center 94TVBC3 (S1). Host H stores the cable TV program data (e.g., Cable TV Program Data#1 Through #4) in Cable TV Program Data Storage Area H94b3 (S2). The foregoing sequence is repeated periodically.

This paragraph illustrate(s) Satellite TV Program Data Sending/Receiving Software H94c4 of Host H and Satellite TV Program Data Sending/Receiving Software 20694c1 of Communication Device 200, which sends and receives the satellite TV program data. In the present embodiment, Host H retrieves all satellite TV program data (e.g., Satellite TV Program Data#1 Through #4) from Satellite TV Program Data Storage Area H94b1 and sends the data to Communication Device 200 (S1). CPU 211 (FIG. 1) of Communication Device 200 receives the satellite TV program data (e.g., Satellite TV Program Data#1 Through #4) from Host H via Antenna 218 (FIG. 1) (S2). CPU 211 stores the satellite TV program data (e.g., Satellite TV Program Data#1 Through #4) in Satellite TV Program Data Storage Area 20694b1 (S3). The foregoing sequence is repeated periodically.

This paragraph illustrate(s) Ground Wave TV Program Data Sending/Receiving Software H94c5 of Host H and Ground Wave TV Program Data Sending/Receiving Software 20694c2 of Communication Device 200, which sends and receives the ground wave TV program data. In the present embodiment, Host H retrieves all ground wave TV program data (e.g., Ground Wave TV Program Data#1 Through #4) from Ground Wave TV Program Data Storage Area H94b2 and sends the data to Communication Device 200 (S1). CPU 211 (FIG. 1) of Communication Device 200 receives the ground wave TV program data (e.g., Ground Wave TV Program Data#1 Through #4) from Host H (S2). CPU 211 stores the ground wave TV program data (e.g., Ground Wave TV Program Data#1 Through #4) in Ground Wave TV Program Data Storage Area 20694b2 (S3). The foregoing sequence is repeated periodically.

This paragraph illustrate(s) Cable TV Program Data Sending/Receiving Software H94c6 of Host H and Cable TV Program Data Sending/Receiving Software 20694c3 of Communication Device 200, which sends and receives the cable TV program data. In the present embodiment, Host H retrieves all cable TV program data (e.g., Cable TV Program Data#1 Through #4) from Cable TV Program Data Storage Area H94b3 and sends the data to Communication Device 200 (S1). CPU 211 (FIG. 1) of Communication Device 200 receives the cable TV program data (e.g., Cable TV Program Data#1 Through #4) from Host H (S2). CPU 211 stores the cable TV program data (e.g., Cable TV Program Data#1 Through #4) in Cable TV Program Data Storage Area 20694b3 (S3). The foregoing sequence is repeated periodically.

<<Multiple TV Screen Displaying Function>>

The following paragraphs illustrate(s) the multiple TV screen displaying function which displays a plurality of TV screen on LCD 201 (FIG. 1) of Communication Device 200 wherein each TV screen displays a TV program, and the user of Communication Device 200 is enabled to select a TV program to watch therefrom.

This paragraph illustrate(s) the storage area included in RAM 206 (FIG. 1) of Communication Device 200. In the present embodiment, RAM 206 includes Multiple TV Screen Displaying Information Storage Area 20695a of which the data and the software programs stored therein are described hereinafter.

The data and/or the software programs stored in Multiple TV Screen Displaying Information Storage Area 20695a may be downloaded from Host H in the manner described hereinafter.

This paragraph illustrate(s) the storage areas included in Multiple TV Screen Displaying Information Storage Area 20695a. In the present embodiment, Multiple TV Screen Displaying Information Storage Area 20695a includes Multiple TV Screen Displaying Data Storage Area 20695b and Multiple TV Screen Displaying Software Storage Area 20695c. Multiple TV Screen Displaying Data Storage Area 20695b stores the data necessary to implement the present function on the side of Communication Device 200, such as the ones described hereinafter. Multiple TV Screen Displaying Software Storage Area 20695c stores the software programs necessary to implement the present function on the side of Communication Device 200, such as the ones described hereinafter.

This paragraph illustrate(s) the storage areas included in Multiple TV Screen Displaying Data Storage Area 20695b. In the present embodiment, Multiple TV Screen Displaying Data Storage Area 20695b includes TV Program Data Storage Area 20695b1, Multiple TV Screen Data Storage Area 20695b2, and Work Area 20695b3. TV Program Data Storage Area 20695b1 stores the data described hereinafter. Multiple TV Screen Data Storage Area 20695b2 stores the data described hereinafter. Work Area 20695b3 is utilized as a work area to perform calculation and temporarily store data.

This paragraph illustrate(s) the data stored in TV Program Data Storage Area 20695b1. In the present embodiment, TV Program Data Storage Area 20695b1 comprises two columns, i.e., 'TV Program ID' and 'TV Program Data'. Column 'TV Program ID' stores the TV program IDs, and each TV program ID is an identification of the corresponding TV program data stored in column 'TV Program Data'. Column 'TV Program Data' stores the TV program data, and each TV program data is a TV program data including audiovisual data designed to be output from LCD 201 (FIG. 1) and Speaker 216 (FIG. 1) of Communication Device 200. Here, the TV program data may be of the data utilized and/or may be stored in Communication Device 200 in the manner described in the function(s) and/or system(s) described in this specification, such as the multiple type TV program distributing system described hereinafter. In the present embodiment, TV Program Data Storage Area 20695b1 stores the following data: the TV program ID 'TV Program#1' and the corresponding TV program data 'TV Program Data#1'; the TV program ID 'TV Program#2' and the corresponding TV program data 'TV Program Data#2'; the TV program ID 'TV Program#3' and the corresponding TV program data 'TV Program Data#3'; and the TV program ID 'TV Program#4' and the corresponding TV program data 'TV Program Data#4'.

This paragraph illustrate(s) the data stored in Multiple TV Screen Data Storage Area 20695b2. In the present embodiment, Multiple TV Screen Data Storage Area 20695b2 comprises two columns, i.e., 'Cell ID' and 'TV Program Data Displaying Cell'. Column 'Cell ID' stores the cell IDs, and each cell ID is an identification of the corresponding TV program data displaying cell stored in column 'TV Program Data Displaying Cell'. Column 'TV Program Data Displaying Cell' stores the TV program data displaying cell, and each TV program data displaying cell is the area in which a TV program data stored in TV Program Data Storage Area 20695*b*1 is temporary stored and from which the TV program data is retrieved for purposes of being displayed on LCD 201 (FIG. 1) of Communication Device 200. In the present embodiment, Multiple TV Screen Data Storage Area 20695*b*2 stores the following data: the cell ID 'Cell#1' and the corresponding TV program data displaying cell 'TV Program Data Displaying Cell#1'; the cell ID 'Cell#2' and the corresponding TV program data displaying cell 'TV Program Data Displaying Cell#2'; the cell ID 'Cell#3' and the corresponding TV program data displaying cell 'TV Program Data Displaying Cell#3'; and the cell ID 'Cell#4' and the corresponding TV program data displaying cell 'TV Program Data Displaying Cell#4'.

This paragraph illustrate(s) the location of each TV program data displaying cell described in the previous embodiment. In the present embodiment, each TV program data displaying cell is arranged in a matrix fashion.

This paragraph illustrate(s) the software programs stored in Multiple TV Screen Displaying Software Storage Area 20695*c*. In the present embodiment, Multiple TV Screen Displaying Software Storage Area 20695*c* stores Multiple TV Program Retrieving Software 20695*c*1, Multiple TV Program Displaying Software 20695*c*2, TV Program Selecting Software 20695*c*3, and Multiple TV Program Matrix Data Displaying Software 20695*c*5. Multiple TV Program Retrieving Software 20695*c*1 is the software program described hereinafter. Multiple TV Program Displaying Software 20695*c*2 is the software program described hereinafter. TV Program Selecting Software 20695*c*3 is the software program described hereinafter. Multiple TV Program Matrix Data Displaying Software 20695*c*5 is the software program described hereinafter.

This paragraph illustrate(s) Multiple TV Program Retrieving Software 20695*c*1 of Communication Device 200, which retrieves all TV program data from TV Program Data Storage Area 20695*b*1. In the present embodiment, CPU 211 (FIG. 1) of Communication Device 200 retrieves TV Program Data#1 through #4 from TV Program Data Storage Area 20695*b*1 (S1). CPU 211 stores TV Program Data#1 in TV Program Data Displaying Cell#1 of Multiple TV Screen Data Storage Area 20695*b*2 (S2). CPU 211 stores TV Program Data#2 in TV Program Data Displaying Cell#2 of Multiple TV Screen Data Storage Area 20695*b*2 (S3). CPU 211 stores TV Program Data#3 in TV Program Data Displaying Cell#3 of Multiple TV Screen Data Storage Area 20695*b*2 (S4). CPU 211 stores TV Program Data#4 in TV Program Data Displaying Cell#4 of Multiple TV Screen Data Storage Area 20695*b*2 (S5).

This paragraph illustrate(s) the display areas at which the TV program data are displayed. In the present embodiment, each TV program data stored in Multiple TV Screen Data Storage Area 20695*b*2 is retrieved and displayed on LCD 201 (FIG. 1) of Communication Device 200 in a matrix fashion. Namely, TV Program Data#1 stored in TV Program Data Displaying Cell#1 of Multiple TV Screen Data Storage Area 20695*b*2 is displayed at Display Area 20195*a*; TV Program Data#2 stored in TV Program Data Displaying Cell#2 of Multiple TV Screen Data Storage Area 20695*b*2 is displayed at Display Area 20195*b*; TV Program Data#3 stored in TV Program Data Displaying Cell#3 of Multiple TV Screen Data Storage Area 20695*b*2 is displayed at Display Area 20195*c*; and TV Program Data#4 stored in TV Program Data Displaying Cell#4 of Multiple TV Screen Data Storage Area 20695*b*2 is displayed at Display Area 20195*d*.

This paragraph illustrate(s) Multiple TV Program Displaying Software 20695*c*2 of Communication Device 200, which displays the TV program data stored in Multiple TV Screen Data Storage Area 20695*b*2 in a matrix fashion. In the present embodiment, CPU 211 (FIG. 1) of Communication Device 200 retrieves TV Program Data#1 from TV Program Data Displaying Cell#1 of Multiple TV Screen Data Storage Area 20695*b*2 and displays the data at Display Area 20195*a* (S1). CPU 211 retrieves TV Program Data#2 from TV Program Data Displaying Cell#2 of Multiple TV Screen Data Storage Area 20695*b*2 and displays the data at Display Area 20195*b* (S2). CPU 211 retrieves TV Program Data#3 from TV Program Data Displaying Cell#3 of Multiple TV Screen Data Storage Area 20695*b*2 and displays the data at Display Area 20195*c* (S3). CPU 211 retrieves TV Program Data#4 from TV Program Data Displaying Cell#4 of Multiple TV Screen Data Storage Area 20695*b*2 and displays the data at Display Area 20195*d* (S4).

This paragraph illustrate(s) TV Program Selecting Software 20695*c*3 of Communication Device 200, which selects a TV program in order for the TV program to be displayed on LCD 201 (FIG. 1) in full screen. Referring to the present embodiment, the user of Communication Device 200 selects a display area (e.g., Display Area 20195*a*) by utilizing Input Device 210 (FIG. 1) or via voice recognition system (S1). CPU 211 (FIG. 1) of Communication Device 200 displays the TV program data (e.g., TV Program Data#1) displayed in display area (e.g., Display Area 20195*a*) selected in S1 in full screen (S2).

<<Multiple TV Screen Displaying Function—Another Embodiment>>

The following paragraphs illustrate(s) another embodiment, wherein Host H plays a major role in implementing the present function.

This paragraph illustrate(s) the storage area included in Host H. In the present embodiment, Host H includes Multiple TV Screen Displaying Information Storage Area H95*a* of which the data and the software programs stored therein are described hereinafter.

This paragraph illustrate(s) the storage areas included in Multiple TV Screen Displaying Information Storage Area H95*a*. In the present embodiment, Multiple TV Screen Displaying Information Storage Area H95*a* includes Multiple TV Screen Displaying Data Storage Area H95*b* and Multiple TV Screen Displaying Software Storage Area H95*c*. Multiple TV Screen Displaying Data Storage Area H95*b* stores the data necessary to implement the present function on the side of Host H, such as the ones described hereinafter. Multiple TV Screen Displaying Software Storage Area H95*c* stores the software programs necessary to implement the present function on the side of Host H, such as the ones described hereinafter.

This paragraph illustrate(s) the storage areas included in Multiple TV Screen Displaying Data Storage Area H95*b*. In the present embodiment, Multiple TV Screen Displaying Data Storage Area H95*b* includes TV Program Data Storage Area H95*b*1, Multiple TV Screen Data Storage Area H95*b*2, and Work Area H95*b*3. TV Program Data Storage Area H95*b*1 stores the data described hereinafter. Multiple TV Screen Data Storage Area H95*b*2 stores the data described hereinafter. Work Area H95*b*3 is utilized as a work area to perform calculation and temporarily store data.

This paragraph illustrate(s) the data stored in TV Program Data Storage Area H95*b*1. In the present embodiment, TV Program Data Storage Area H95*b*1 comprises two columns, i.e., 'TV Program ID' and 'TV Program Data'. Column 'TV Program ID' stores the TV program IDs, and each TV each TV program ID is an identification of the corresponding TV program data stored in column 'TV Program Data'. Column 'TV Program Data' stores the TV program data, and each TV program data is a TV program data including audiovisual data designed to be output from LCD 201 (FIG. 1) and Speaker 216 (FIG. 1) of Communication Device 200. Here, the TV program data may be of the data utilized and/or may be stored in Host H in the manner described in the function(s) and/or system(s) described in this specification, such as the multiple type TV program distributing system. In the present embodiment, TV Program Data Storage Area H95b1 stores the following data: the TV program ID 'TV Program#1' and the corresponding TV program data 'TV Program Data#1'; the TV program ID 'TV Program#2' and the corresponding TV program data 'TV Program Data#2'; the TV program ID 'TV Program#3' and the corresponding TV program data 'TV Program Data#3'; and the TV program ID 'TV Program#4' and the corresponding TV program data 'TV Program Data#4'.

This paragraph illustrate(s) the data stored in Multiple TV Screen Data Storage Area H95b2. In the present embodiment, Multiple TV Screen Data Storage Area H95b2 comprises two columns, i.e., 'Cell ID' and 'TV Program Data Displaying Cell'. Column 'Cell ID' stores the cell IDs, and each cell ID is an identification of the corresponding TV program data displaying cell stored in column 'TV Program Data Displaying Cell'. Column 'TV Program Data Displaying Cell' stores the TV program data displaying cell, and each TV program data displaying cell is the area in which a TV program data stored in TV Program Data Storage Area H95b1 is temporary stored and from which the TV program data is retrieved for purposes of being displayed on LCD 201 (FIG. 1) of Communication Device 200. In the present embodiment, Multiple TV Screen Data Storage Area H95b2 stores the following data: the cell ID 'Cell#1' and the corresponding TV program data displaying cell 'TV Program Data Displaying Cell#1'; the cell ID 'Cell#2' and the corresponding TV program data displaying cell 'TV Program Data Displaying Cell#2'; the cell ID 'Cell#3' and the corresponding TV program data displaying cell 'TV Program Data Displaying Cell#3'; and the cell ID 'Cell#4' and the corresponding TV program data displaying cell 'TV Program Data Displaying Cell#4'.

This paragraph illustrate(s) the location of each TV program data displaying cell described in the previous embodiment. In the present embodiment, each TV program data displaying cell is arranged in a matrix fashion.

This paragraph illustrate(s) the software programs stored in Multiple TV Screen Displaying Software Storage Area H95c. In the present embodiment, Multiple TV Screen Displaying Software Storage Area H95c stores Multiple TV Program Retrieving Software H95c1, TV Program Selecting Software H95c3, Multiple TV Program Matrix Data Producing Software H95c4, and Multiple TV Program Matrix Data Displaying Software H95c5. Multiple TV Program Retrieving Software H95c1 is the software program described hereinafter. TV Program Selecting Software H95c3 is the software program described hereinafter. Multiple TV Program Matrix Data Producing Software H95c4 is the software program described hereinafter. Multiple TV Program Matrix Data Displaying Software H95c5 is the software program described hereinafter.

This paragraph illustrate(s) Multiple TV Program Retrieving Software H95c1 of Host H, which retrieves all TV program data from TV Program Data Storage Area H95b1. In the present embodiment, Host H retrieves TV Program Data#1 through #4 from TV Program Data Storage Area H95b1 (S1). Host H stores TV Program Data#1 in TV Program Data Displaying Cell#1 of Multiple TV Screen Data Storage Area H95b2 (S2). Host H stores TV Program Data#2 in TV Program Data Displaying Cell#2 of Multiple TV Screen Data Storage Area H95b2 (S3). Host H stores TV Program Data#3 in TV Program Data Displaying Cell#3 of Multiple TV Screen Data Storage Area H95b2 (S4). Host H stores TV Program Data#4 in TV Program Data Displaying Cell#4 of Multiple TV Screen Data Storage Area H95b2 (S5). The foregoing sequence is repeated periodically.

This paragraph illustrate(s) Multiple TV Program Matrix Data Producing Software H95c4 of Host H, which displays the TV program data stored in Multiple TV Screen Data Storage Area H95b2 in a matrix fashion. In the present embodiment, Host H retrieves TV Program Data#1 from TV Program Data Displaying Cell#1 of Multiple TV Screen Data Storage Area H95b2 (S1). Host H retrieves TV Program Data#2 from TV Program Data Displaying Cell#2 of Multiple TV Screen Data Storage Area H95b2 (S2). Host H retrieves TV Program Data#3 from TV Program Data Displaying Cell#3 of Multiple TV Screen Data Storage Area H95b2 (S3). Host H retrieves TV Program Data#4 from TV Program Data Displaying Cell#4 of Multiple TV Screen Data Storage Area H95b2 (S4). Host H produces a multiple TV program matrix data and stores the data in Work Area H95b3 (S5). Here, the multiple TV program matrix data is a visual data produced by composing TV Program Data#1 through #4 into one screen data designed to be displayed on LCD 201 (FIG. 1) as described hereinafter. The foregoing sequence is repeated periodically.

This paragraph illustrate(s) Multiple TV Program Matrix Data Displaying Software H95c5 of Host H and Multiple TV Program Matrix Data Displaying Software 20695c5 of Communication Device 200, which display the multiple TV program matrix data on LCD 201 (FIG. 1). In the present embodiment, Host H retrieves the multiple TV program matrix data from Work Area H95b3 and sends the data to Communication Device 200 (S1). CPU 211 (FIG. 1) of Communication Device 200 receives the multiple TV program matrix data from Host H and stores the data in Work Area 20695b3 (S2). The foregoing sequence is repeated periodically.

This paragraph illustrate(s) the multiple TV program matrix data displayed on LCD 201 (FIG. 1). In the present embodiment, the TV program data stored in Multiple TV Screen Data Storage Area H95b2 of Host H are displayed on LCD 201 (FIG. 1) of Communication Device 200 in a matrix fashion. Namely, TV Program Data#1 stored in TV Program Data Displaying Cell#1 of Multiple TV Screen Data Storage Area H95b2 is displayed at Display Area 20195a; TV Program Data#2 stored in TV Program Data Displaying Cell#2 of Multiple TV Screen Data Storage Area H95b2 is displayed at Display Area 20195b; TV Program Data#3 stored in TV Program Data Displaying Cell#3 of Multiple TV Screen Data Storage Area H95b2 is displayed at Display Area 20195c; and TV Program Data#4 stored in TV Program Data Displaying Cell#4 of Multiple TV Screen Data Storage Area H95b2 is displayed at Display Area 20195d.

This paragraph illustrate(s) TV Program Selecting Software H95c3 of Host H and TV Program Selecting Software 20695c3 of Communication Device 200, which select a TV program in order for the TV program to be displayed on LCD 201 (FIG. 1) in full screen. In the present embodiment, the user of Communication Device 200 selects a display area (e.g., Display Area 20195a) by utilizing Input Device 210 (FIG. 1) or via voice recognition system (S1). CPU 211 (FIG. 1) of Communication Device 200 sends a selected display area signal, which is received by Host H (S2). Here, the selected display area signal is a signal identifying the display area (e.g., Display Area 20195*a*) selected in the previous step. Host H identifies the corresponding TV program data (e.g., TV Program Data#1) and retrieves the data which is sent to Communication Device 200 (S3). CPU 211 receives the TV program data (e.g., TV Program Data#1) and stores the data in Work Area 20695*b*3 (S4). CPU 211 retrieves the TV program data (e.g., TV Program Data#1) from Work Area 20695*b*3 and displays the data on LCD 201 (FIG. 1) in full screen (S5).

<<Touch Panel Function>>

The following paragraphs illustrate the touch panel function which enables the user to operate Communication Device 200 via a touch panel. In other words, the touch panel is installed in LCD 201 (FIG. 1), and the user is enabled to operate Communication Device 200 by touching LCD 201 instead of utilizing Input Device 210 (FIG. 1) or voice recognition system.

The mechanism and/or the structure of the touch panel is primarily described in the following patents and the references cited thereof: U.S. Pat. No. 6,690,363; U.S. Pat. No. 6,690,361; U.S. Pat. No. 6,689,458; U.S. Pat. No. 6,686,909; U.S. Pat. No. 6,685,805; U.S. Pat. No. 6,680,448; U.S. Pat. No. 6,677,934; U.S. Pat. No. 6,677,542; U.S. Pat. No. 6,664,952; U.S. Pat. No. 6,664,951; U.S. Pat. No. 6,664,950; U.S. Pat. No. 6,661,406; U.S. Pat. No. 6,654,006; U.S. Pat. No. 6,646,634; U.S. Pat. No. 6,639,587; U.S. Pat. No. 6,639,163; U.S. Pat. No. 6,633,280; U.S. Pat. No. 6,633,279; U.S. Pat. No. 6,630,058; U.S. Pat. No. 6,629,833; U.S. Pat. No. 6,628,271; U.S. Pat. No. 6,628,269; U.S. Pat. No. 6,628,268; U.S. Pat. No. 6,621,486; U.S. Pat. No. 6,611,299; U.S. Pat. No. 6,597,508; U.S. Pat. No. 6,593,917; U.S. Pat. No. 6,590,622; U.S. Pat. No. 6,583,935; U.S. Pat. No. 6,573,155; U.S. Pat. No. 6,572,941; U.S. Pat. No. 6,570,707; U.S. Pat. No. 6,567,077; U.S. Pat. No. 6,559,902; U.S. Pat. No. 6,559,834; U.S. Pat. No. 6,556,189; U.S. Pat. No. 6,552,718; U.S. Pat. No. 6,549,195; U.S. Pat. No. 6,549,193; U.S. Pat. No. 6,538,706; U.S. Pat. No. 6,538,644; U.S. Pat. No. 6,529,188; U.S. Pat. No. 6,522,322; U.S. Pat. No. 6,512,512; U.S. Pat. No. 6,507,337; U.S. Pat. No. 6,504,583; U.S. Pat. No. 6,502,668; U.S. Pat. No. 6,492,633; U.S. Pat. No. 6,480,187; and U.S. Pat. No. 6,473,235.

This paragraph illustrates the storage area included in RAM 206 (FIG. 1) of Communication Device 200. In the present embodiment, RAM 206 includes Touch Panel Information Storage Area 20696*a* of which the data and the software programs stored therein are described hereinafter.

The data and/or the software programs stored in Touch Panel Information Storage Area 20696*a* may be downloaded from Host H in the manner described hereinafter.

This paragraph illustrates the storage areas included in Touch Panel Information Storage Area 20696*a*. In the present embodiment, Touch Panel Information Storage Area 20696*a* includes Touch Panel Data Storage Area 20696*b* and Touch Panel Software Storage Area 20696*c*. Touch Panel Data Storage Area 20696*b* stores the data necessary to implement the present function, such as the ones described hereinafter. Touch Panel Software Storage Area 20696*c* stores the software programs necessary to implement the present function, such as the ones described hereinafter.

This paragraph illustrates the storage areas included in Touch Panel Data Storage Area 20696*b*. In the present embodiment, Touch Panel Data Storage Area 20696*b* includes Keyboard Displaying Area Image Data Storage Area 20696*b*1, Font Data Storage Area 20696*b*2, Color Data Storage Area 20696*b*3, Movable Image Data Storage Area 20696*b*4, and Work Area 20696*b*5. Keyboard Displaying Area Image Data Storage Area 20696*b*1 stores the keyboard displaying area image data. Here, the keyboard displaying area image data is the image data of Keyboard Displaying Area 20196*a*2 described hereinafter. Font Data Storage Area 20696*b*2 stores the data described hereinafter. Color Data Storage Area 20696*b*3 stores the data described hereinafter. Movable Image Data Storage Area 20696*b*4 stores the data described hereinafter. Work Area 20696*b*5 is utilized as a work area to perform calculation and temporarily store data.

This paragraph illustrates the storage areas included in Font Data Storage Area 20696*b*2. In the present embodiment, Font Data Storage Area 20696*b*2 includes Alphabet Key Font Data Storage Area 20696*b*2*a* and Numeric Key Font Data Storage Area 20696*b*2*b*. Alphabet Key Font Data Storage Area 20696*b*2*a* stores the data described hereinafter. Numeric Key Font Data Storage Area 20696*b*2*b* stores the data described hereinafter.

This paragraph illustrates the data stored in Alphabet Key Font Data Storage Area 20696*b*2*a*. In the present embodiment, Alphabet Key Font Data Storage Area 20696*b*2*a* stores the alphabet key font data, and each alphabet key font data represents a specific font of an alphabet. In the present example, Alphabet Key Font Data Storage Area 20696*b*2*a* stores the alphabet key font data of the following alphabets: 'A', 'B', 'C', 'D', 'E', 'F', 'G', 'H', 'I', 'J', 'K', 'L', 'M', 'N', 'O', 'P', 'Q', 'R', 'S', 'T', 'U', 'V', 'W', 'X', 'Y', and 'Z'.

This paragraph illustrates the data stored in Numeric Key Font Data Storage Area 20696*b*2*b*. In the present embodiment, Numeric Key Font Data Storage Area 20696*b*2*b* stores the numeric key font data, and each numeric key font data represents a specific font of a numeric figure. In the present example, Numeric Key Font Data Storage Area 20696*b*2*b* stores the numeric key font data of the following figures: '1', '2', '3', '4', '5', '6', '7', '8', '9', and '0'.

This paragraph illustrates the data stored in Color Data Storage Area 20696*b*3. In the present embodiment, Color Data Storage Area 20696*b*3 comprises two columns, i.e., 'Color ID' and 'Color Data'. Column 'Color ID' stores the color IDs, and each color ID is an identification of the corresponding color data stored in column 'Color Data'. Column 'Color Data' stores the color data, and each color data represents the color of a font displayed on LCD 201. In the present embodiment, Color Data Storage Area 20696*b*3 stores the following data: the color ID 'Color#1' and the corresponding color data 'Color Data#1'; the color ID 'Color#2' and the corresponding color data 'Color Data#2'; the color ID 'Color#3' and the corresponding color data 'Color Data#3'; and the color ID 'Color#4' and the corresponding color data 'Color Data#4'. In the present example, the color data 'Color Data#1' represents the color 'black'; the color data 'Color Data#2' represents the color 'blue'; the color data 'Color Data#3' represents the color 'green'; and the color data 'Color Data#4' represents the color 'yellow'.

This paragraph illustrates the data stored in Movable Image Data Storage Area 20696*b*4. In the present embodiment, Movable Image Data Storage Area 20696*b*4 comprises two columns, i.e., 'Movable Image ID' and 'Movable Image Data'. Column 'Movable Image ID' stores the movable image IDs, and each movable image ID is an identification of the corresponding movable image data stored in column 'Movable Image Data'. Column 'Movable Image Data' stores the movable image data, and each movable image data is an image data which moves within LCD 201 by implementing the present function or utilizing Input Device 210 (FIG. 1) or via voice recognition system. In the present embodiment, Movable Image Data Storage Area 20696*b*4 stores the following data: the movable image ID 'Movable Image#1' and the corresponding movable image data 'Movable Image Data#1'; and the movable image ID 'Movable Image#2' and the corresponding movable image data 'Movable Image Data#2'. In the present example, Movable Image Data#1 represents an image of a mouse pointer, and Movable Image Data#2 represents an image of a cursor.

This paragraph illustrates the displaying areas displayed on LCD 201 (FIG. 1). In the present embodiment, two areas are displayed on LCD 201, i.e., Alphanumeric Data Displaying Area 20196a1 and Keyboard Displaying Area 20196a2. Alphanumeric Data Displaying Area 20196a1 is the area where alphanumeric data input by utilizing the present function or by utilizing Input Device 210 (FIG. 1) or via voice recognition system are displayed (e.g., the area displayed in MS Word, Word Pad, and Note Pad). Keyboard Displaying Area 20196a2 is the area where an image of a keyboard is displayed as described hereinafter.

This paragraph illustrates the displaying areas included in Keyboard Displaying Area 20196a2. In the present embodiment, Keyboard Displaying Area 20196a2 includes Alphabet Key Displaying Area 20196b, Numeric Key Displaying Area 20196c, and Color Palette Displaying Area 20196d. Alphabet Key Displaying Area 20196b is further described hereinafter. Numeric Key Displaying Area 20196c is further described hereinafter. Color Palette Displaying Area 20196d is further described hereinafter.

This paragraph illustrates the displaying areas included in Alphabet Key Displaying Area 20196b. In the present embodiment, Alphabet Key Displaying Area 20196b includes a plurality of key displaying areas, and each key displaying area represents a specific alphabet key. In the present example, Alphabet Key Displaying Area 20196b includes 'A' Key Displaying Area 20196b1 which represents the letter 'A'; 'B' Key Displaying Area 20196b2 which represents the letter 'B'; 'C' Key Displaying Area 20196b3 which represents the letter 'C'; 'D' Key Displaying Area 20196b4 which represents the letter 'D'; 'E' Key Displaying Area 20196b5 which represents the letter 'E'; 'F' Key Displaying Area 20196b6 which represents the letter 'F'; 'G' Key Displaying Area 20196b7 which represents the letter 'G'; 'H' Key Displaying Area 20196b8 which represents the letter 'H'; 'I' Key Displaying Area 20196b9 which represents the letter 'I'; 'J' Key Displaying Area 20196b10 which represents the letter 'J'; 'K' Key Displaying Area 20196b11 which represents the letter 'K'; 'L' Key Displaying Area 20196b12 which represents the letter 'L'; 'M' Key Displaying Area 20196b13 which represents the letter 'M'; 'N' Key Displaying Area 20196b14 which represents the letter 'N'; 'O' Key Displaying Area 20196b15 which represents the letter 'O'; 'P' Key Displaying Area 20196b16 which represents the letter 'P'; 'Q' Key Displaying Area 20196b17 which represents the letter 'Q'; 'R' Key Displaying Area 20196b18 which represents the letter 'R'; 'S' Key Displaying Area 20196b19 which represents the letter 'S'; 'T' Key Displaying Area 20196b20 which represents the letter 'T'; 'U' Key Displaying Area 20196b21 which represents the letter 'U'; 'V' Key Displaying Area 20196b22 which represents the letter 'V'; 'W' Key Displaying Area 20196b23 which represents the letter 'W'; 'X' Key Displaying Area 20196b24 which represents the letter 'X'; 'Y' Key Displaying Area 20196b25 which represents the letter 'Y'; and 'Z' Key Displaying Area 20196b26 which represents the letter 'Z'. In the present example, the letter 'A' is input to Communication Device 200 and displayed in Alphanumeric Data Displaying Area 20196a1 when 'A' Key Displaying Area 20196b1 is touched by the user; the letter 'B' is input to Communication Device 200 and displayed in Alphanumeric Data Displaying Area 20196a1 when 'B' Key Displaying Area 20196b2 is touched by the user; the letter 'C' is input to Communication Device 200 and displayed in Alphanumeric Data Displaying Area 20196a1 when 'C' Key Displaying Area 20196b3 is touched by the user; the letter 'D' is input to Communication Device 200 and displayed in Alphanumeric Data Displaying Area 20196a1 when 'D' Key Displaying Area 20196b4 is touched by the user; the letter 'E' is input to Communication Device 200 and displayed in Alphanumeric Data Displaying Area 20196a1 when 'E' Key Displaying Area 20196b5 is touched by the user; the letter 'F' is input to Communication Device 200 and displayed in Alphanumeric Data Displaying Area 20196a1 when 'F' Key Displaying Area 20196b6 is touched by the user; the letter 'G' is input to Communication Device 200 and displayed in Alphanumeric Data Displaying Area 20196a1 when 'G' Key Displaying Area 20196b7 is touched by the user; the letter 'H' is input to Communication Device 200 and displayed in Alphanumeric Data Displaying Area 20196a1 when 'H' Key Displaying Area 20196b8 is touched by the user; the letter 'I' is input to Communication Device 200 and displayed in Alphanumeric Data Displaying Area 20196a1 when 'I' Key Displaying Area 20196b9 is touched by the user; the letter 'J' is input to Communication Device 200 and displayed in Alphanumeric Data Displaying Area 20196a1 when 'J' Key Displaying Area 20196b10 is touched by the user; the letter 'K' is input to Communication Device 200 and displayed in Alphanumeric Data Displaying Area 20196a1 when 'K' Key Displaying Area 20196b11 is touched by the user; the letter 'L' is input to Communication Device 200 and displayed in Alphanumeric Data Displaying Area 20196a1 when 'L' Key Displaying Area 20196b12 is touched by the user; the letter 'M' is input to Communication Device 200 and displayed in Alphanumeric Data Displaying Area 20196a1 when 'M' Key Displaying Area 20196b13 is touched by the user; the letter 'NI' is input to Communication Device 200 and displayed in Alphanumeric Data Displaying Area 20196a1 when 'NI' Key Displaying Area 20196b14 is touched by the user; the letter 'O' is input to Communication Device 200 and displayed in Alphanumeric Data Displaying Area 20196a1 when 'O' Key Displaying Area 20196b15 is touched by the user; the letter 'P' is input to Communication Device 200 and displayed in Alphanumeric Data Displaying Area 20196a1 when 'P' Key Displaying Area 20196b16 is touched by the user; the letter 'Q' is input to Communication Device 200 and displayed in Alphanumeric Data Displaying Area 20196a1 when 'Q' Key Displaying Area 20196b17 is touched by the user; the letter 'R' is input to Communication Device 200 and displayed in Alphanumeric Data Displaying Area 20196a1 when 'R' Key Displaying Area 20196b18 is touched by the user; the letter 'S' is input to Communication Device 200 and displayed in Alphanumeric Data Displaying Area 20196a1 when 'S' Key Displaying Area 20196b19 is touched by the user; the letter 'T' is input to Communication Device 200 and displayed in Alphanumeric Data Displaying Area 20196a1 when 'T' Key Displaying Area 20196b20 is touched by the user; the letter 'U' is input to Communication Device 200 and displayed in Alphanumeric Data Displaying Area 20196a1 when 'U' Key Displaying Area 20196b21 is touched by the user; the letter 'V' is input to Communication Device 200 and displayed in Alphanumeric Data Displaying Area 20196a1 when 'V' Key Displaying Area 20196b22 is touched by the user; the letter 'W' is input to Communication Device 200 and displayed in Alphanumeric Data Displaying Area 20196a1 when 'W' Key Displaying Area 20196b23 is touched by the user; the letter 'X' is input to Communication Device 200 and displayed in Alphanumeric Data Displaying Area 20196a1 when 'X' Key Displaying Area 20196b24 is touched by the user; the letter 'Y' is input to Communication Device 200 and displayed in Alphanumeric Data Displaying Area 20196a1 when 'Y' Key Displaying Area 20196b25 is touched by the user; and the letter 'Z' is input to Communication Device 200 and displayed in Alphanumeric Data Displaying Area 20196a1 when 'Z' Key Displaying Area 20196b26 is touched by the user.

This paragraph illustrates the displaying areas included in Numeric Key Displaying Area 20196c. In the present embodiment, Numeric Key Displaying Area 20196c includes a plurality of key displaying areas, and each key displaying area represents a specific numeric key. In the present example, Numeric Key Displaying Area 20196c includes '1' Key Displaying Area 20196c1 which represents the figure '1'; '2' Key Displaying Area 20196c2 which represents the figure '2'; '3' Key Displaying Area 20196c3 which represents the figure '3'; '4' Key Displaying Area 20196c4 which represents the figure '4'; '5' Key Displaying Area 20196c5 which represents the figure '5'; '6' Key Displaying Area 20196c6 which represents the figure '6'; '7' Key Displaying Area 20196c7 which represents the figure '7'; '8' Key Displaying Area 20196c8 which represents the figure '8'; '9' Key Displaying Area 20196c9 which represents the figure '9'; and '0' Key Displaying Area 20196c10 which represents the figure '0'. In the present example, the figure '1' is input to Communication Device 200 and displayed in Alphanumeric Data Displaying Area 20196a1 when '1' Key Displaying Area 20196c1 is touched by the user; the figure '2' is input to Communication Device 200 and displayed in Alphanumeric Data Displaying Area 20196a1 when '2' Key Displaying Area 20196c2 is touched by the user; the figure '3' is input to Communication Device 200 and displayed in Alphanumeric Data Displaying Area 20196a1 when '3' Key Displaying Area 20196c3 is touched by the user; the figure '4' is input to Communication Device 200 and displayed in Alphanumeric Data Displaying Area 20196a1 when '4' Key Displaying Area 20196c4 is touched by the user; the figure '5' is input to Communication Device 200 and displayed in Alphanumeric Data Displaying Area 20196a1 when '5' Key Displaying Area 20196c5 is touched by the user; the figure '6' is input to Communication Device 200 and displayed in Alphanumeric Data Displaying Area 20196a1 when '6' Key Displaying Area 20196c6 is touched by the user; the FIG. 7' is input to Communication Device 200 and displayed in Alphanumeric Data Displaying Area 20196a1 when '7' Key Displaying Area 20196c7 is touched by the user; the figure '8' is input to Communication Device 200 and displayed in Alphanumeric Data Displaying Area 20196a1 when '8' Key Displaying Area 20196c8 is touched by the user; the figure '9' is input to Communication Device 200 and displayed in Alphanumeric Data Displaying Area 20196a1 when '9' Key Displaying Area 20196c9 is touched by the user; and the figure '0' is input to Communication Device 200 and displayed in Alphanumeric Data Displaying Area 20196a1 when '0' Key Displaying Area 20196c10 is touched by the user.

This paragraph illustrates the displaying area included in Color Palette Displaying Area 20196d. In the present embodiment, Color Palette Displaying Area 20196d includes a plurality of palette displaying areas, and each palette displaying area represents a specific color. In the present example, Color Palette Displaying Area 20196d includes Black Color Displaying Area 20196d1 which represents the color 'black'; Blue Color Displaying Area 20196d2 which represents the color 'blue'; Green Color Displaying Area 20196d3 which represents the color 'green'; and Yellow Color Displaying Area 20196d4 which represents the color 'yellow'. In the present example, the color 'black' is selected when Black Color Displaying Area 20196d1 is touched by the user; the color 'blue' is selected when Blue Color Displaying Area 20196d2 is touched by the user; the color 'green' is selected when Green Color Displaying Area 20196d3 is touched by the user; and the color 'yellow' is selected when Yellow Color Displaying Area 20196d4; is touched by the user.

This paragraph illustrates the software programs stored in Touch Panel Software Storage Area 20696c. In the present embodiment, Touch Panel Software Storage Area 20696c stores Keyboard Displaying Area Image Data Outputting Software 20696c1, Key Data Inputting Software 20696c2, Mouse Pointer Moving Software 20696c3, and Font Color Changing Software 20696c4. Keyboard Displaying Area Image Data Outputting Software 20696c1 is the software program described hereinafter. Key Data Inputting Software 20696c2 is the software program described hereinafter. Mouse Pointer Moving Software 20696c3 is the software program described hereinafter. Font Color Changing Software 20696c4 is the software program described hereinafter.

This paragraph illustrates Keyboard Displaying Area Image Data Outputting Software 20696c1 of Communication Device 200, which displays Keyboard Displaying Area 20196a2 on LCD 201 as described hereinbefore. In the present embodiment, the user of Communication Device 200 inputs a keyboard displaying signal (S1). Here, the keyboard displaying signal is a signal input by the user of Communication Device 200 indicating to display Keyboard Displaying Area 20196a2 on LCD 201. In response, CPU 211 (FIG. 1) of Communication Device 200 retrieves the keyboard displaying area image data from Keyboard Displaying Area Image Data Storage Area 20696b1 and displays the data on LCD 201 (S2).

This paragraph illustrates Key Data Inputting Software 20696c2 of Communication Device 200, which inputs key data (i.e., alphanumeric data) by implementing the present function. In the present embodiment, CPU 211 (FIG. 1) of Communication Device 200 identifies the displaying area within Keyboard Displaying Area 20196a2 where the user touches (S1). CPU 211 retrieves the corresponding key font data from Font Data Storage Area 20696b2 (S2). CPU 211 identifies the default color data (e.g., Color Data#1, black) from Color Data Storage Area 20696b3 (S3). CPU 211 displays on LCD 201 the key font data retrieved in S2 with the color data (e.g., Color Data#1, black) identified in S3 (S4).

This paragraph illustrates Mouse Pointer Moving Software 20696c3 of Communication Device 200, which moves the mouse pointer displayed on LCD 201 by implementing the present function. In the present embodiment, CPU 211 (FIG. 1) of Communication Device 200 identifies the location on LCD 201 where the user touches (S1). CPU 211 moves to and displays at the location identified in S1 Movable Image Data#1 (e.g., mouse pointer) stored in Movable Image Data Storage Area 20696b4 (S2).

This paragraph illustrates Font Color Changing Software 20696c4 of Communication Device 200, which changes the color of the fonts displayed on LCD 201 by implementing the present function. In the present embodiment, CPU 211 (FIG. 1) of Communication Device 200 identifies the location in Alphanumeric Data Displaying Area 20196a1 where the user touches (S1). CPU 211 identifies the alphanumeric data at the location identified in S1 (S2). Next, CPU 211 identifies the location in Color Palette Displaying Area 20196d where the user touches (S3). CPU 211 identifies the color displaying area (e.g., Blue Color Displaying Area 20196d2) at the location identified in S3 (S4). CPU 211 changes the color (e.g., to blue) of the alphanumeric data identified in S2 (S5).

<<Communication Device Finding Function>>

This paragraph illustrate(s) the storage area included in RAM 206 (FIG. 1) of Communication Device 200. In the present embodiment, RAM 206 includes Communication Device Finding Information Storage Area 20697a of which the data and the software programs stored therein are described hereinafter.

The data and/or the software programs stored in Communication Device Finding Information Storage Area 20697a may be downloaded from Host H in the manner described hereinafter.

This paragraph illustrate(s) the storage areas included in Communication Device Finding Information Storage Area 20697a. In the present embodiment, Communication Device Finding Information Storage Area 20697a includes Communication Device Finding Data Storage Area 20697b and Communication Device Finding Software Storage Area 20697c. Communication Device Finding Data Storage Area 20697b stores the data necessary to implement the present function, such as the ones described hereinafter. Communication Device Finding Software Storage Area 20697c stores the software programs necessary to implement the present function, such as the ones described hereinafter.

This paragraph illustrate(s) the storage areas included in Communication Device Finding Data Storage Area 20697b. In the present embodiment, Communication Device Finding Data Storage Area 20697b includes User's Voice Wave Data Storage Area 20697b1, User's Voice Pattern Data Storage Area 20697b2, User's Phrase Data Storage Area 20697b3, Responding Sound Data Storage Area 20697b4, and Work Area 20697b5. User's Voice Wave Data Storage Area 20697b1 stores the user's voice wave data. Here, the user's voice wave data is the wave data of the voice of the user of Communication Device 200. User's Voice Pattern Data Storage Area 20697b2 stores the user's voice pattern data. Here, the user's voice pattern data is the voice pattern data of the user of Communication Device 200. The voice pattern data is same or similar to voice print which is unique to each user. User's Phrase Data Storage Area 20697b3 stores the user's phrase data. Here, the user's phrase data is primarily composed of alphanumeric data. The phrase data may be a word or a sentence determined by the user of Communication Device 200. In the present example, a phrase 'Where are you, Communication Device 200?' is stored in User's Phrase Data Storage Area 20697b3. Responding Sound Data Storage Area 20697b4 stores the responding sound data. Here the responding sound data is the sound data designed to be output via Speaker 216 (FIG. 1) for responding purposes. The responding sound data may be any data which may be output from Speaker 216. Work Area 20697b5 is utilized as a work area to perform calculation and temporarily store data.

This paragraph illustrate(s) the software programs stored in Communication Device Finding Software Storage Area 20697c. In the present embodiment, Communication Device Finding Software Storage Area 20697c stores User's Voice Wave Data Analyzing Software 20697c1 and Responding Sound Data Outputting Software 20697c2. User's Voice Wave Data Analyzing Software 20697c1 is the software program described hereinafter. Responding Sound Data Outputting Software 20697c2 is the software program described hereinafter.

This paragraph illustrate(s) User's Voice Wave Data Analyzing Software 20697c1 of Communication Device 200, which retrieves the user's voice pattern data and the user's phrase data from the user's voice wave data. In the present embodiment, the user of Communication Device 200 inputs the user's voice wave data via Microphone 215 (FIG. 1) (S1). CPU 211 (FIG. 1) of Communication Device 200 stores the user's voice wave data in User's Voice Wave Data Storage Area 20697b1 (S2). CPU 211 retrieves the user's voice pattern data from the user's voice wave data, and stores the data in User's Voice Pattern Data Storage Area 20697b2 (S3). CPU 211 retrieves the user's phrase data by voice recognition system, and stores the data in User's Phrase Data Storage Area 20697b3 (S4).

This paragraph illustrate(s) Responding Sound Data Outputting Software 20697c2 of Communication Device 200, which outputs the responding sound data when a predetermined user's voice data is detected. In the present embodiment, CPU 211 (FIG. 1) of Communication Device 200 retrieves the general sound data via Microphone 215 (FIG. 1) (S1). CPU 211 stores the general sound data retrieved in the previous step in Work Area 20697b5 (S2). CPU 211 retrieves the pattern data from the general sound data, and compares the data with the user's voice pattern data stored in User's Voice Pattern Data Storage Area 20697b2 (S3). If the pattern data of the general sound data substantially matches with the user's voice pattern data, CPU 211 retrieves the alphanumeric data therefrom by utilizing voice recognition system described hereinbefore (S4). CPU 211 compares the alphanumeric data retrieved in the previous step with the user's phrase data stored in User's Phrase Data Storage Area 20697b3 (S5). If the two data in the previous step substantially matches, CPU 211 retrieves the responding sound data from Responding Sound Data Storage Area 20697b4, and outputs the responding sound data from Speaker 216 (FIG. 1) with maximum volume (S6). The foregoing sequence is repeated periodically.

This paragraph illustrate(s) Responding Sound Data Outputting Software 20697c2 of Communication Device 200, which outputs the responding sound data when a predetermined user's voice data is detected. The present embodiment illustrate(s) another embodiment of Responding Sound Data Outputting Software 20697c2 described in the previous embodiment. In the present embodiment, CPU 211 (FIG. 1) of Communication Device 200 retrieves the general sound data via Microphone 215 (FIG. 1) (S1). CPU 211 stores the general sound data retrieved in the previous step in Work Area 20697b5 (S2). CPU 211 retrieves the general sound data from Work Area 20697b5, and compares the data with the user's voice wave data stored in User's Voice Wave Data Storage Area 20697b1 (S3). If the two data in the previous step substantially matches, CPU 211 retrieves the responding sound data from Responding Sound Data Storage Area 20697b4, and outputs the responding sound data from Speaker 216 (FIG. 1) with maximum volume (S4). The foregoing sequence is repeated periodically.

<<Product Information Retrieving Function (CCD)>>

The following paragraphs illustrate(s) the product information retrieving function wherein an image data attached to a product (such as the one sold in a supermarket) is input via CCD Unit 214 (FIG. 1) and a product data relating to the product is displayed on LCD 201 (FIG. 1) of Communication Device 200.

This paragraph illustrate(s) the storage area included in Host H. In the present embodiment, Host H includes Product Information Retrieving Information Storage Area H99a of which the data and the software programs stored therein are described hereinafter.

This paragraph illustrate(s) the storage areas included in Product Information Retrieving Information Storage Area H99a. In the present embodiment, Product Information Retrieving Information Storage Area H99a includes Product Information Retrieving Data Storage Area H99b and Product Information Retrieving Software Storage Area H99c. Product Information Retrieving Data Storage Area H99b stores the data necessary to implement the present function on the side of Host H, such as the ones described hereinafter. Product Information Retrieving Software Storage Area H99c stores the software programs necessary to implement the present function on the side of Host H, such as the ones described hereinafter.

This paragraph illustrate(s) the storage areas included in Product Information Retrieving Data Storage Area H99b. In the present embodiment, Product Information Retrieving Data Storage Area H99b includes Product Data Storage Area H99b1, Encrypted Image Data Storage Area H99b2, and Work Area H99b3. Product Data Storage Area H99b1 stores the data described hereinafter. Encrypted Image Data Storage Area H99b2 stores the data described hereinafter. Work Area H99b3 is utilized as a work area to perform calculation and temporarily store data.

This paragraph illustrate(s) the data stored in Product Data Storage Area H99b1. In the present embodiment, Product Data Storage Area H99b1 comprises two columns, i.e., 'Product ID' and 'Product Data'. Column 'Product ID' stores the product IDs, and each product ID is an identification of the corresponding product data stored in column 'Product Data'. Column 'Product Data' stores the product data, and each product data includes various types of data of a specific product. Here, the product data includes, in the present example, the product name data, the produced date data, the price data, the producer's name data, the produced country data, and/or the ingredient data. Here, the product name data represents the name of the corresponding product; the produced date data represents the date at which the corresponding product is produced; the price data represents the price with which the corresponding product is sold; the producer's name data represents the name of the producer (or manufacturer) who produced (or manufactured) the corresponding product; the produced country data represents the name of the country at which the corresponding product is produced (or manufactured); and the ingredient data represents the ingredients included in the corresponding product. In the present embodiment, Product Data Storage Area H99b1 stores the following data: the product ID 'Product#1' and the corresponding product data 'Product Data#1'; the product ID 'Product#2' and the corresponding product data 'Product Data#2'; the product ID 'Product#3' and the corresponding product data 'Product Data#3'; and the product ID 'Product#4' and the corresponding product data 'Product Data#4'. The product data 'Product Data#1' represents the product data of a baby food; the product data 'Product Data#2' represents the product data of a soap; the product data 'Product Data#3' represents the product data of a dish; and the product data 'Product Data#4' represents the product data of a can juice.

This paragraph illustrate(s) the data stored in Encrypted Image Data Storage Area H99b2. In the present embodiment, Encrypted Image Data Storage Area H99b2 comprises two columns, i.e., 'Product ID' and 'Encrypted Image Data'. Column 'Product ID' stores the product IDs, and each product ID is an identification of the corresponding encrypted image data stored in column 'Encrypted Image Data'. The product IDs stored in Encrypted Image Data Storage Area H99b2 are identical to the ones stored in Product Data Storage Area H99b1. Column 'Encrypted Image Data' stores the encrypted image data, and each encrypted image data is an image data from which the product data can not be visually perceived. Bar code may be utilized for the encrypted image data. The encrypted image data may be constituted of two colors (i.e., black and white) or include more than two colors (i.e., blue, green, red, black, white, yellow, and brown). The encrypted image data may be constituted of a set of stripes, dots, and/or specific patterns. In the present embodiment, Encrypted Image Data Storage Area H99b2 stores the following data: the product ID 'Product#1' and the corresponding encrypted image data 'Encrypted Image Data#1'; the product ID 'Product#2' and the corresponding encrypted image data 'Encrypted Image Data#2'; the product ID 'Product#3' and the corresponding encrypted image data 'Encrypted Image Data#3'; and the product ID 'Product#4' and the corresponding encrypted image data 'Encrypted Image Data#4'.

This paragraph illustrate(s) the software programs stored in Product Information Retrieving Software Storage Area H99c. In the present embodiment, Product Information Retrieving Software Storage Area H99c stores Product Data Displaying Software H99c2 and Product Data/Encrypted Image Data Updating Software H99c3. Product Data Displaying Software H99c2 is the software program described hereinafter. Product Data/Encrypted Image Data Updating Software H99c3 is the software program described hereinafter.

This paragraph illustrate(s) the storage area included in RAM 206 (FIG. 1) of Communication Device 200. In the present embodiment, RAM 206 includes Product Information Retrieving Information Storage Area 20699a of which the data and the software programs stored therein are described hereinafter.

The data and/or the software programs stored in Product Information Retrieving Information Storage Area 20699a may be downloaded from Host H in the manner described hereinafter.

This paragraph illustrate(s) the storage areas included in Product Information Retrieving Information Storage Area 20699a. In the present embodiment, Product Information Retrieving Information Storage Area 20699a includes Product Information Retrieving Data Storage Area 20699b and Product Information Retrieving Software Storage Area 20699c. Product Information Retrieving Data Storage Area 20699b stores the data necessary to implement the present function on the side of Communication Device 200, such as the ones described hereinafter. Product Information Retrieving Software Storage Area 20699c stores the software programs necessary to implement the present function on the side of Communication Device 200, such as the ones described hereinafter.

This paragraph illustrate(s) the storage areas included in Product Information Retrieving Data Storage Area 20699b. In the present embodiment, Product Information Retrieving Data Storage Area 20699b includes Product Data Storage Area 20699b1, Encrypted Image Data Storage Area 20699b2, and Work Area 20699b3. Product Data Storage Area 20699b1 stores the data described hereinafter. Encrypted Image Data Storage Area 20699b2 stores the data described hereinafter. Work Area 20699b3 is utilized as a work area to perform calculation and temporarily store data.

This paragraph illustrate(s) the data stored in Product Data Storage Area 20699b1. In the present embodiment, Product Data Storage Area 20699b1 comprises two columns, i.e., 'Product ID' and 'Product Data'. Column 'Product ID' stores the product IDs, and each product ID is an identification of the corresponding product data stored in column 'Product Data'. Column 'Product Data' stores the product data, and each product data includes various types of data of a specific product. Here, the product data includes, in the present example, the product name data, the produced date data, the price data, the producer's name data, the produced country data, and/or the ingredient data. Here, the product name data represents the name of the corresponding product; the produced date data represents the date at which the corresponding product is produced; the price data represents the price with which the corresponding product is sold; the producer's name data represents the name of the producer (or manufacturer) who produced (or manufactured) the corresponding product; the produced country data represents the name of the country at which the corresponding product is produced (or manufactured); and the ingredient data represents the ingredients included in the corresponding product. In the present embodiment, Product Data Storage Area 20699b1 stores the following data: the product ID 'Product#1' and the corresponding product data 'Product Data#1'; the product ID 'Product#2' and the corresponding product data 'Product Data#2'; the product ID 'Product#3' and the corresponding product data 'Product Data#3'; and the product ID 'Product#4' and the corresponding product data 'Product Data#4'. The product data 'Product Data#1' represents the product data of a baby food; the product data 'Product Data#2' represents the product data of a soap; the product data 'Product Data#3' represents the product data of a dish; and the product data 'Product Data#4' represents the product data of a can juice.

This paragraph illustrate(s) the data stored in Encrypted Image Data Storage Area 20699b2. In the present embodiment, Encrypted Image Data Storage Area 20699b2 comprises two columns, i.e., 'Product ID' and 'Encrypted Image Data'. Column 'Product ID' stores the product IDs, and each product ID is an identification of the corresponding encrypted image data stored in column 'Encrypted Image Data'. The product IDs stored in Encrypted Image Data Storage Area H99b2 are identical to the ones stored in Product Data Storage Area H99b1. Column 'Encrypted Image Data' stores the encrypted image data, and each encrypted image data is an image data from which the product data can not be visually perceived. Bar code may be utilized for the encrypted image data. The encrypted image data may be constituted of two colors (i.e., black and white) or include more than two colors (i.e., blue, green, red, black, white, yellow, and brown). The encrypted image data may be constituted of a set of stripes, dots, and/or specific patterns. In the present embodiment, Encrypted Image Data Storage Area 20699b2 stores the following data: the product ID 'Product#1' and the corresponding encrypted image data 'Encrypted Image Data#1'; the product ID 'Product#2' and the corresponding encrypted image data 'Encrypted Image Data#2'; the product ID 'Product#3' and the corresponding encrypted image data 'Encrypted Image Data#3'; and the product ID 'Product#4' and the corresponding encrypted image data 'Encrypted Image Data#4'.

This paragraph illustrate(s) the software programs stored in Product Information Retrieving Software Storage Area 20699c. In the present embodiment, Product Information Retrieving Software Storage Area 20699c stores Image Data Retrieving Software 20699c1, Product Data Displaying Software 20699c2, and Product Data/Encrypted Image Data Updating Software 20699c3. Image Data Retrieving Software 20699c1 is the software program described hereinafter. Product Data Displaying Software 20699c2 is the software program described hereinafter. Product Data/Encrypted Image Data Updating Software 20699c3 is the software program described hereinafter.

This paragraph illustrate(s) the label, Label L99 attached to a product, Product P99, sold in a supermarket. Here, Product P99 may be any product, such as baby food, soap, dish, can juice, and frozen food. Product P99 may also include paper product utilized for adverting, e.g., leaflet, catalogue, poster, brochure, and flyer. Label L99 may be attached to Product P99. Label L99 may be directly printed to Product P99 instead. A specific image is printed on Label L99 from which the product data can not be visually perceived. Bar code may be utilized for the specific image. The specific image may be constituted of two colors (i.e., black and white) or include more than two colors (i.e., blue, green, red, black, white, yellow, and brown). The specific image may be constituted of a set of stripes, dots, and/or specific patterns.

This paragraph illustrate(s) Image Data Retrieving Software 20699c1 of Communication Device 200, which retrieves the image data of Label L99. In the present embodiment, CPU 211 (FIG. 1) of Communication Device 200 retrieves the image data of Label L99 via CCD Unit (FIG. 1) (S1). CPU 211 stores the image data retrieved in S1 in work area 20699b3 (S2).

This paragraph illustrate(s) Product Data Displaying Software H99c2 of Host H and the product data Displaying Software 20699c2 of Communication Device 200, which display the product data of Product P99. In the present embodiment, CPU 211 (FIG. 1) of Communication Device 200 retrieves the image data from Work Area 20699b3 which is sent to Host H (S1). Host H receives the image data from Communication Device 200 and stores the data in work area H99b3 (S2). Host H compares the image data stored in work area H99b3 with the encrypted image data stored in Encrypted Image Data Storage Area H99b2 (S3). If the matched encrypted image data is found in the previous step, Host H identifies the corresponding product ID (S4). Host H identifies the product data stored in Product Data Storage Area H99b1 of the corresponding product ID (S5). Host H sends the product data identified in the previous step to Communication Device 200, which is received by Communication Device 200 (S6). CPU 211 stores the product data received in the previous step in work area 20699b3 and displays the data on LCD 201 (FIG. 1) (S7).

<<Product Information Retrieving Function (CCD)—Another Embodiment>>

The following paragraphs illustrate(s) another embodiment, wherein Communication Device 200 plays the major role in implementing the present function.

This paragraph illustrate(s) Product Data/Encrypted Image Data Updating Software H99c3 of Host H and Product Data/Encrypted Image Data Updating Software 20699c3 of Communication Device 200, which update all data stored in Product Data Storage Area 20699b1 and Encrypted Image Data Storage Area 20699b2. In the present embodiment, CPU 211 (FIG. 1) of Communication Device 200 sends the product data/encrypted image data updating request, which is received by Host H (S1). Here, the product data/encrypted image data updating request is a request sent to Host H to send all data stored in Product Data Storage Area H99b1 and Encrypted Image Data Storage Area H99b2 of Host H to Communication Device 200. Host H retrieves all data stored in Product Data Storage Area H99b1 and Encrypted Image Data Storage Area H99b2 which are sent to Communication Device 200 (S2). CPU 211 receives the data retrieved in the previous step (S3). CPU 211 stores the product ID and the product data in Product Data Storage Area 20699b1 (S4). CPU 211 stores the product ID and the encrypted image data in Encrypted Image Data Storage Area 20699b2 (S5).

This paragraph illustrate(s) Image Data Retrieving Software 20699c1 of Communication Device 200, which retrieves the image data of Label L99. In the present embodiment, CPU 211 (FIG. 1) of Communication Device 200 retrieves the image data of Label L99 via CCD Unit (FIG. 1) (S1). CPU 211 stores the image data retrieved in S1 in work area 20699b3 (S2).

This paragraph illustrate(s) Product Data Displaying Software 20699c2 of Communication Device 200, which displays the product data of Product P99. In the present embodiment, CPU 211 (FIG. 1) of Communication Device 200 retrieves the image data from Work Area 20699b3 (S1). CPU 211 compares the image data stored in work area 20699b3 with the encrypted image data stored in Encrypted Image Data Storage Area 20699b2 (S2). If the matched encrypted image data is found in the previous step, CPU 211 identifies the corresponding product ID (S3). CPU 211 identifies the product data stored in Product Data Storage Area 20699b1 of the corresponding product ID (S4). CPU 211 retrieves the product data identified in the previous step and displays the data on LCD 201 (FIG. 1) (S5).

<<Continue Enabled Video Game Function>>

The following paragraphs illustrate(s) the continue enabled video game function which enables a video game to be continued from the point the game ended.

This paragraph illustrate(s) the storage area included in Host H. In the present embodiment, Host H includes Continue Enabled Video Game Information Storage Area H103a of which the data and the software programs stored therein are described hereinafter.

This paragraph illustrate(s) the storage areas included in Continue Enabled Video Game Information Storage Area H103a. In the present embodiment, Continue Enabled Video Game Information Storage Area H103a includes Continue Enabled Video Game Data Storage Area H103b and Continue Enabled Video Game Software Storage Area H103c. Continue Enabled Video Game Data Storage Area H103b stores the data necessary to implement the present function on the side of Host H, such as the ones described hereinafter. Continue Enabled Video Game Software Storage Area H103c stores the software programs necessary to implement the present function on the side of Host H, such as the ones described hereinafter.

This paragraph illustrate(s) the storage areas included in Continue Enabled Video Game Data Storage Area H103b. In the present embodiment, Continue Enabled Video Game Data Storage Area H103b includes 3D Object Data Storage Area H103b1, Count Down Data Storage Area H103b2, and Work Area H103b3. 3D Object Data Storage Area H103b1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Count Down Data Storage Area H103b2 stores the count down data. Here, the count down data is composed of ten count down image data, i.e., the count down image '10' data, the count down image '9' data, the count down image '8' data, the count down image '7' data, the count down image '6' data, the count down image '5' data, the count down image '4' data, the count down image '3' data, the count down image '2' data, and the count down image '1' data. The foregoing tem count down image data are designed to be displayed on LCD 201 (FIG. 1). Work Area H103b3 is utilized as a work area to perform calculation and temporarily store data.

This paragraph illustrate(s) the software programs stored in Continue Enabled Video Game Software Storage Area H103c. In the present embodiment, Continue Enabled Video Game Software Storage Area H103c stores Video Game Processing Software H103c1, Video Game Continuing Software H103c2, and Video Game Downloading Software H103c3. Video Game Processing Software H103c1 is the software program described hereinafter. Video Game Continuing Software H103c2 is the software program described hereinafter. Video Game Downloading Software H103c3 is the software program described hereinafter.

This paragraph illustrate(s) the storage area included in RAM 206 (FIG. 1) of Communication Device 200. In the present embodiment, RAM 206 includes Continue Enabled Video Game Information Storage Area 206103a of which the data and the software programs stored therein are described hereinafter.

The data and/or the software programs stored in Continue Enabled Video Game Information Storage Area 206103a may be downloaded from Host H in the manner described hereinafter.

This paragraph illustrate(s) the storage areas included in Continue Enabled Video Game Information Storage Area 206103a. In the present embodiment, Continue Enabled Video Game Information Storage Area 206103a includes Continue Enabled Video Game Data Storage Area 206103b and Continue Enabled Video Game Software Storage Area 206103c. Continue Enabled Video Game Data Storage Area 206103b stores the data necessary to implement the present function on the side of Communication Device 200, such as the ones described hereinafter. Continue Enabled Video Game Software Storage Area 206103c stores the software programs necessary to implement the present function on the side of Communication Device 200, such as the ones described hereinafter.

This paragraph illustrate(s) the storage areas included in Continue Enabled Video Game Data Storage Area 206103b. In the present embodiment, Continue Enabled Video Game Data Storage Area 206103b includes 3D Object Data Storage Area 206103b1, Count Down Data Storage Area 206103b2, and Work Area 206103b3. 3D Object Data Storage Area 206103b1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Count Down Data Storage Area 206103b2 stores the count down data. Here, the count down data is composed of ten count down image data, i.e., the count down image '10' data, the count down image '9' data, the count down image '8' data, the count down image '7' data, the count down image '6' data, the count down image '5' data, the count down image '4' data, the count down image '3' data, the count down image '2' data, and the count down image '1' data. The foregoing tem count down image data are designed to be displayed on LCD 201 (FIG. 1). Work Area 206103b3 is utilized as a work area to perform calculation and temporarily store data.

This paragraph illustrate(s) the software programs stored in Continue Enabled Video Game Software Storage Area 206103c. In the present embodiment, Continue Enabled Video Game Software Storage Area 206103c stores Video Game Processing Software 206103c1, Video Game Continuing Software 206103c2, and Video Game Downloading Software 206103c3. Video Game Processing Software 206103c1 is the software program described hereinafter. Video Game Continuing Software 206103c2 is the software program described hereinafter. Video Game Downloading Software 206103c3 is the software program described hereinafter.

This paragraph illustrate(s) Video Game Processing Software H103c1 of Host H and Video Game Processing Software 206103c1 of Communication Device 200, which process the video game. Referring to the present embodiment, CPU 211 (FIG. 1) of Communication Device 200 sends a video game command signal which is received by Host H (S1). Here, the video game command signal is a signal input by utilizing Input Device 210 (FIG. 1) or via voice recognition system to operate the 3D object operable data displayed on LCD 201 (FIG. 1). Host H retrieves the 3D object operable data, the 3D object non-operable data, and the 3D background data from 3D Object Data Storage Area H103b1 (S2). Host H processes with the data retrieved in the previous step in accordance with the video command signal received in S1 (S3). Host H produces the video game screen data, which is sent to Communication Device 200 (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 receives the video game screen data and stores the data in Work Area 206103b3, and displays the data on LCD 201 (FIG. 1) (S5). The foregoing sequence is repeated periodically.

This paragraph illustrate(s) Video Game Continuing Software H103c2 of Host H and Video Game Continuing Software 206103c2 of Communication Device 200, which continue and resume the video game. In the present embodiment, Host H periodically checks the game status (S1). If the game is over, Host H proceeds to the next step (S2). Host H initiates the video game continuing process (S3). If the video game continuing signal is input during video game continuing process, Host H proceeds to the next step (S4). Here, the video game continuing signal is a signal input by utilizing Input Device 210 (FIG. 1) or via voice recognition system indicating to initiate the video game resuming process described in the next step. Host H initiates the video game resuming process (S5). Here, the video game is continued and resumed from the point where the game ended. As another embodiment, if the video game includes a plurality of game stages, and the game ended at a middle of a certain game stage, the video game is continued and resumed from the beginning of the game stage where the game ended.

This paragraph illustrate(s) the video game continuing process described in the previous embodiment. In the present embodiment, Host H retrieves the count down image data (e.g., Count Down Image '10' Data) from Count Down Data Storage Area H103b2 (S1). Host H produces the video game screen data, which is sent to Communication Device 200 (S2). Here, the video game screen data is the image data representing the perspective view of the 3D object operable data, 3D object non-operable data, and 3D background data retrieved in S2 after being processed in S3, which is designed to be displayed on LCD 201 (FIG. 1). CPU 211 (FIG. 1) of Communication Device 200 receives the video game screen data and stores the data in Work Area 206103b3, and displays the data on LCD 201 (FIG. 1) (S3). The foregoing sequence is repeated periodically. Thus, the count down image '10' data is displayed on LCD 201 (FIG. 1) for a certain period of time, the count down image '9' data is displayed on LCD 201 (FIG. 1) for a certain period of time, the count down image '8' data is displayed on LCD 201 (FIG. 1) for a certain period of time, the count down image '7' data is displayed on LCD 201 (FIG. 1) for a certain period of time, the count down image '6' data is displayed on LCD 201 (FIG. 1) for a certain period of time, the count down image '5' data is displayed on LCD 201 (FIG. 1) for a certain period of time, the count down image '4' data is displayed on LCD 201 (FIG. 1) for a certain period of time, the count down image '3' data is displayed on LCD 201 (FIG. 1) for a certain period of time, the count down image '2' data is displayed on LCD 201 (FIG. 1) for a certain period of time, and the count down image '1' data is displayed on LCD 201 (FIG. 1) for a certain period of time.

<<Continue Enabled Video Game Function—Another Embodiment>>

The following paragraphs illustrate(s) another embodiment, wherein the present function is implemented solely by Communication Device 200.

This paragraph illustrate(s) Video Game Downloading Software H103c3 of Host H and Video Game Downloading Software 206103c3 of Communication Device 200, which enable Communication Device 200 to download a video game software capable to implement the present function. In the present embodiment, Host H retrieves all data from Continue Enabled Video Game Information Storage Area H103a, which is sent to Communication Device 200 (S1). CPU 211 (FIG. 1) of Communication Device 200 receives the data retrieved in the previous step and stores the data in Continue Enabled Video Game Information Storage Area 206103a (S2).

This paragraph illustrate(s) Video Game Processing Software 206103c1 of Communication Device 200, which processes the video game. In the present embodiment, the user of Communication Device 200 inputs a video game command signal (S1). Here, the video game command signal is a signal input by utilizing Input Device 210 (FIG. 1) or via voice recognition system to operate the 3D object operable data displayed on LCD 201 (FIG. 1). CPU 211 retrieves the 3D object operable data, the 3D object non-operable data, and the 3D background data from 3D Object Data Storage Area 206103b1 (S2). CPU 211 processes with the data retrieved in the previous step in accordance with the video command signal input in S1 (S3). CPU 211 produces the video game screen data (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 stores the video game screen data in Work Area 206103b3, and displays the data on LCD 201 (FIG. 1) (S5). The foregoing sequence is repeated periodically.

This paragraph illustrate(s) Video Game Continuing Software 206103c2 of Communication Device 200, which continues and resumes the video game. In the present embodiment, CPU 211 (FIG. 1) of Communication Device 200 periodically checks the game status (S1). If the game is over, CPU 211 proceeds to the next step (S2). CPU 211 initiates the video game continuing process (S3). If the video game continuing signal is input during video game continuing process, CPU 211 proceeds to the next step (S4). Here, the video game continuing signal is a signal input by utilizing Input Device 210 (FIG. 1) or via voice recognition system indicating to initiate the video game resuming process described in the next step. CPU 211 initiates the video game resuming process (S5). Here, the video game is continued and resumed from the point where the game ended. As another embodiment, if the video game includes a plurality of game stages, and the game ended at a middle of a certain game stage, the video game is continued and resumed from the beginning of the game stage where the game ended.

This paragraph illustrate(s) the video game continuing process described in the previous embodiment. In the present embodiment, CPU 211 (FIG. 1) of Communication Device 200 retrieves the count down image data (e.g., Count Down Image '10' Data) from Count Down Data Storage Area 206103*b*2 (S1). CPU 211 produces the video game screen data (S2). CPU 211 stores the video game screen data in Work Area 206103*b*3, and displays the data on LCD 201 (FIG. 1) (S3). The foregoing sequence is repeated periodically. Thus, the count down image '10' data is displayed on LCD 201 (FIG. 1) for a certain period of time, the count down image '9' data is displayed on LCD 201 (FIG. 1) for a certain period of time, the count down image '8' data is displayed on LCD 201 (FIG. 1) for a certain period of time, the count down image '7' data is displayed on LCD 201 (FIG. 1) for a certain period of time, the count down image '6' data is displayed on LCD 201 (FIG. 1) for a certain period of time, the count down image '5' data is displayed on LCD 201 (FIG. 1) for a certain period of time, the count down image '4' data is displayed on LCD 201 (FIG. 1) for a certain period of time, the count down image '3' data is displayed on LCD 201 (FIG. 1) for a certain period of time, the count down image '2' data is displayed on LCD 201 (FIG. 1) for a certain period of time, and the count down image '1' data is displayed on LCD 201 (FIG. 1) for a certain period of time.

<<Resume Enabled Video Game Function>>

The following paragraphs illustrate(s) the resume enabled video game function which enables a video game to be resumed from the point at which the video game ended last time. For example, the user of Communication Device 200 may end playing the video game and close the video game software, and open the software on the next day and resume from the point he/she ended last day.

This paragraph illustrate(s) the storage area included in Host H. In the present embodiment, Host H includes Resume Enabled Video Game Information Storage Area H104*a* of which the data and the software programs stored therein are described hereinafter.

This paragraph illustrate(s) the storage areas included in Resume Enabled Video Game Information Storage Area H104*a*. In the present embodiment, Resume Enabled Video Game Information Storage Area H104*a* includes Resume Enabled Video Game Data Storage Area H104*b* and Resume Enabled Video Game Software Storage Area H104*c*. Resume Enabled Video Game Data Storage Area H104*b* stores the data necessary to implement the present function on the side of Host H, such as the ones described hereinafter. Resume Enabled Video Game Software Storage Area H104*c* stores the software programs necessary to implement the present function on the side of Host H, such as the ones described hereinafter.

This paragraph illustrate(s) the storage areas included in Resume Enabled Video Game Data Storage Area H104*b*. In the present embodiment, Resume Enabled Video Game Data Storage Area H104*b* includes 3D Object Data Storage Area H104*b*1, Middleway Resuming Data Storage Area H104*b*2, and Work Area H104*b*3. 3D Object Data Storage Area H104*b*1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Middleway Resuming Data Storage Area H104*b*2 stores the middleway resuming data. Here, the middleway resuming data represents the point at which the video game ended last time. The middleway resuming data is utilized when the video game software program is executed next time and the user of Communication Device 200 desires to resume the video game from the point at which the video game ended last time. Work Area H104*b*3 is utilized as a work area to perform calculation and temporarily store data.

This paragraph illustrate(s) the software programs stored in Resume Enabled Video Game Software Storage Area H104*c*. In the present embodiment, Resume Enabled Video Game Software Storage Area H104*c* stores Video Game Processing Software H104*c*1, Video Game Middleway Ending Software H104*c*2, Video Game Middleway Resuming Software H104*c*3, and Video Game Downloading Software H104*c*4. Video Game Processing Software H104*c*1 is the software program described hereinafter. Video Game Middleway Ending Software H104*c*2 is the software program described hereinafter. Video Game Middleway Resuming Software H104*c*3 is the software program described hereinafter. Video Game Downloading Software H104*c*4 is the software program described hereinafter.

This paragraph illustrate(s) the storage area included in RAM 206 (FIG. 1) of Communication Device 200. In the present embodiment, RAM 206 includes Resume Enabled Video Game Information Storage Area 206104*a* of which the data and the software programs stored therein are described hereinafter.

The data and/or the software programs stored in Resume Enabled Video Game Information Storage Area 206104*a* may be downloaded from Host H in the manner described hereinafter.

This paragraph illustrate(s) the storage areas included in Resume Enabled Video Game Information Storage Area 206104*a*. In the present embodiment, Resume Enabled Video Game Information Storage Area 206104*a* includes Resume Enabled Video Game Data Storage Area 206104*b* and Resume Enabled Video Game Software Storage Area 206104*c*. Resume Enabled Video Game Data Storage Area 206104*b* stores the data necessary to implement the present function on the side of Communication Device 200, such as the ones described hereinafter. Resume Enabled Video Game Software Storage Area 206104*c* stores the software programs necessary to implement the present function on the side of Communication Device 200, such as the ones described hereinafter.

This paragraph illustrate(s) the storage areas included in Resume Enabled Video Game Data Storage Area 206104*b*. In the present embodiment, Resume Enabled Video Game Data Storage Area 206104*b* includes 3D Object Data Storage Area 206104*b*1, Middleway Resuming Data Storage Area 206104*b*2, and Work Area 206104*b*3. 3D Object Data Storage Area 206104*b*1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Middleway Resuming Data Storage Area 206104*b*2 stores the middleway resuming data. Here, the middleway resuming data represents the point at which the video game ended last time. The middleway resuming data is utilized when the video game software program is executed next time and the user of Communication Device 200 desires to resume the video game from the point at which the video game ended last time. Work Area 206104*b*3 is utilized as a work area to perform calculation and temporarily store data.

This paragraph illustrate(s) the software programs stored in Resume Enabled Video Game Software Storage Area 206104*c*. In the present embodiment, Resume Enabled Video Game Software Storage Area 206104*c* stores Video Game Processing Software 206104*c*1, Video Game Middleway Ending Software 206104*c*2, Video Game Middleway Resuming Software 206104*c*3, and Video Game Downloading Software 206104*c*4. Video Game Processing Software 206104*c*1 is the software program described hereinafter. Video Game Middleway Ending Software 206104*c*2 is the software program described hereinafter. Video Game Middleway Resuming Software 206104*c*3 is the software program described hereinafter. Video Game Downloading Software 206104*c*4 is the software program described hereinafter.

This paragraph illustrate(s) Video Game Processing Software H104*c*1 of Host H and Video Game Processing Software 206104*c*1 of Communication Device 200, which process the video game. In the present embodiment, CPU 211 (FIG. 1) of Communication Device 200 sends the video game command signal, which is received by Host H (S1). Here, the video game command signal is a signal input by utilizing Input Device 210 (FIG. 1) or via voice recognition system to operate the 3D object operable data displayed on LCD 201 (FIG. 1). Host H retrieves the 3D object operable data, the 3D object non-operable data, and the 3D background data from 3D Object Data Storage Area H104*b*1 (S2). Host H processes with the data retrieved in the previous step in accordance with the video command signal received in S1 (S3). Host H produces the video game screen data, which is sent to Communication Device 200 (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 receives the video game screen data and stores the data in Work Area 206104*b*3 and displays the data on LCD 201 (FIG. 1) (S5). The foregoing sequence is repeated periodically.

This paragraph illustrate(s) Video Game Middleway Ending Software H104*c*2 of Host H and Video Game Middleway Ending Software 206104*c*2 of Communication Device 200, which end the video game. In the present embodiment, the user of Communication Device 200 inputs the video game middleway ending signal which is sent to Host H (S1). Here, the video game middleway ending signal is a signal input by utilizing Input Device 210 (FIG. 1) or via voice recognition system indicating to end the video game and record the point at which the video game ended for purposes from which the video game to be resumed when the video game software is executed next time. Host H receives the video game middleway ending signal (S2). Host H, in response, produces the middleway resuming data and stores the data in Middleway Resuming Data Storage Area H104*b*2 (S3). Host H ends the video game thereafter (S4).

This paragraph illustrate(s) Video Game Middleway Resuming Software H104*c*3 of Host H and Video Game Middleway Resuming Software 206104*c*3 of Communication Device 200, which resume the video game. In the present embodiment, the user of Communication Device 200 inputs the video game middleway resuming signal which is sent to Host H (S1). Here, the video game middleway resuming signal is a signal input by utilizing Input Device 210 (FIG. 1) or via voice recognition system indicating to resume the video game from the point at which the video game ended last time. Host H receives the video game middleway resuming signal (S2). Host H retrieves the middleway resuming data from Middleway Resuming Data Storage Area H104*b*2 (S3). Host H resumes the video game in accordance with the middleway resuming data retrieved in the previous step (S4). Video Game Processing Software H104*c*1 of Host H and Video Game Processing Software 206104*c*1 of Communication Device 200 are executed and the video game is resumed from the point at which the video game ended last time. As another embodiment, if the video game includes a plurality of game stages, and the video game ended at a middle of a certain game stage, the video game may be continued and resumed from the beginning of the video game stage where the video game ended last time.

<<Resume Enabled Video Game Function—Another Embodiment>>

The following paragraphs illustrate(s) another embodiment, wherein the present function is implemented solely by Communication Device 200.

This paragraph illustrate(s) Video Game Downloading Software H104*c*4 of Host H and Video Game Downloading Software 206104*c*4 of Communication Device 200, which enable Communication Device 200 to download a video game software capable to implement the present function. In the present embodiment, Host H retrieves all data from Resume Enabled Video Game Information Storage Area H104*a*, which is sent to Communication Device 200 (S1). CPU 211 (FIG. 1) of Communication Device 200 receives the data retrieved in the previous step and stores the data in Resume Enabled Video Game Information Storage Area 206104*a* (S2).

This paragraph illustrate(s) Video Game Processing Software 206104*c*1 of Communication Device 200, which processes the video game. In the present embodiment, the user of Communication Device 200 inputs the video game command signal (S1). Here, the video game command signal is a signal input by utilizing Input Device 210 (FIG. 1) or via voice recognition system to operate the 3D object operable data displayed on LCD 201 (FIG. 1). CPU 211 retrieves the 3D object operable data, the 3D object non-operable data, and the 3D background data from 3D Object Data Storage Area 206104*b*1 (S2). CPU 211 processes with the data retrieved in the previous step in accordance with the video command signal input in S1 (S3). CPU 211 produces the video game screen data (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 stores the video game screen data in Work Area 206104*b*3 and displays the data on LCD 201 (FIG. 1) (S5). The foregoing sequence is repeated periodically.

This paragraph illustrate(s) Video Game Middleway Ending Software 206104*c*2 of Communication Device 200, which ends the video game. In the present embodiment, the user of Communication Device 200 inputs the video game middleway ending signal (S1). Here, the video game middleway ending signal is a signal input by utilizing Input Device 210 (FIG. 1) or via voice recognition system indicating to end the video game and record the point at which the video game ended for purposes from which the video game to be resumed when the video game software is executed next time. CPU 211, in response, produces the middleway resuming data and stores the data in Middleway Resuming Data Storage Area 206104*b*2 (S2). CPU 211 ends the video game thereafter (S3).

This paragraph illustrate(s) Video Game Middleway Resuming Software 206104c3 of Communication Device 200, which resumes the video game. In the present embodiment, the user of Communication Device 200 inputs the video game middleway resuming signal (S1). Here, the video game middleway resuming signal is a signal input by utilizing Input Device 210 (FIG. 1) or via voice recognition system indicating to resume the video game from the point at which the video game ended last time. CPU 211 retrieves the middleway resuming data from Middleway Resuming Data Storage Area 206104b2 (S2). CPU 211 resumes the video game in accordance with the middleway resuming data retrieved in the previous step (S3). Video Game Processing Software 206104c1 of Communication Device 200 is executed and the video game is resumed from the point at which the video game ended last time. As another embodiment, if the video game includes a plurality of game stages, and the video game ended at a middle of a certain game stage, the video game may be continued and resumed from the beginning of the video game stage where the video game ended last time.

<<Signal Forwarding Function>>

The following paragraphs illustrate(s) the signal forwarding function by which a wireless signal received from a wireless communication device is forwarded to another wireless communication device by implementing the present function.

This paragraph illustrate(s) the overall operation of the present function. Four Communication Devices 200, for example, Device A, Device B, Device C, and Device D are utilized to describe the present function. In the present embodiment, Device D is not within the communication range of Device A. In contrast, Device B and Device C are within the communication range of Device A. Device D is within the communication range of Device B and Device C. Device C is within the communication range of Device B. In the present example, Device A is capable to communicate with Device D via (Device B and) Device C, i.e., having Device A's wireless signal being forward to Device D by (Device B and) Device C. The device IDs are utilized to implement the present function: the device ID of Device A is 'Device#A'; the device ID of Device B is 'Device#B'; the device ID of Device C is 'Device#C'; and the device ID of Device D is 'Device#D'. Here, each device ID is an identification of the corresponding Communication Device 200.

This paragraph illustrate(s) the storage area included in RAM 206 (FIG. 1) of Devices A through D. In the present embodiment, RAM 206 includes Signal Forwarding Information Storage Area 206105a of which the data and the software programs stored therein are described hereinafter.

The data and/or the software programs stored in Signal Forwarding Information Storage Area 206105a may be downloaded from Host H in the manner described hereinafter.

This paragraph illustrate(s) the storage areas included in Signal Forwarding Information Storage Area 206105a. In the present embodiment, Signal Forwarding Information Storage Area 206105a includes Signal Forwarding Data Storage Area 206105b and Signal Forwarding Software Storage Area 206105c. Signal Forwarding Data Storage Area 206105b stores the data necessary to implement the present function, such as the ones described hereinafter. Signal Forwarding Software Storage Area 206105c stores the software programs necessary to implement the present function, such as the ones described hereinafter.

This paragraph illustrate(s) the storage areas included in Signal Forwarding Data Storage Area 206105b. In the present embodiment, Signal Forwarding Data Storage Area 206105b includes Origin Device ID Storage Area 206105b1, Destination Device ID Storage Area 206105b2, Communication Route Data Storage Area 206105b3, Communication Data Storage Area 206105b4, and Work Area 206105b5. Origin Device ID Storage Area 206105b1 stores the origin device ID which represents the device ID (e.g., Device#A) of Communication Device 200 which transmits a wireless signal. In the present example, the device ID 'Device#A' is the origin device ID, i.e., Device A transmits the wireless signal, which is received by Device D by having the wireless signal being forwarded by (Device B and) Device C. Destination Device ID Storage Area 206105b2 stores the destination device ID which represents the device ID (e.g., Device#D) of Communication Device 200 which receives the wireless signal transmitted by Communication Device 200 of which the device ID is the origin device ID. In the present example, the device ID 'Device#D' is the destination device ID, i.e., Device D receives the wireless signal transmitted by Device A forwarded by (Device B and) Device C. Communication Route Data Storage Area 206105b3 stores the shortest route from Communication Device 200 represented by the origin device ID (e.g., Device#A) to Communication Device 200 represented by the destination device ID (e.g., Device#D). Communication Data Storage Area 206105b4 stores the communication data which may include audio data, text data, image data, video data, and/or other types of data. Work Area 206105b5 is utilized as a work area to perform calculation and temporarily store data.

This paragraph illustrate(s) the software programs stored in Signal Forwarding Software Storage Area 206105c. In the present embodiment, Signal Forwarding Software Storage Area 206105c stores Route Inquiry Initiating Software 206105c1, Route Inquiry Signal Forwarding Software 206105c2, Route Inquiry Signal Receiving Software 206105c3, Route Comparing Software 206105c4, Route Response Initiating Software 206105c5, Route Response Signal Forwarding Software 206105c6, Route Response Signal Receiving Software 206105c7, Origin Device Communicating Software 206105c8, Communication Data Forwarding Software 206105c9, and Communication Data Receiving Software 206105c10. Route Inquiry Initiating Software 206105c1 is the software program described hereinafter. Route Inquiry Signal Forwarding Software 206105c2 is the software program described hereinafter. Route Inquiry Signal Receiving Software 206105c3 is the software program described hereinafter. Route Comparing Software 206105c4 is the software program described hereinafter. Route Response Initiating Software 206105c5 is the software program described hereinafter. Route Response Signal Forwarding Software 206105c6 is the software program described hereinafter. Route Response Signal Receiving Software 206105c7 is the software program described hereinafter. Origin Device Communicating Software 206105c8 is the software program described hereinafter. Communication Data Forwarding Software 206105c9 is the software program described hereinafter. Communication Data Receiving Software 206105c10 is the software program described hereinafter.

This paragraph illustrate(s) the data included in the route inquiry signal which is utilized to implement the present function. In the present embodiment, the route inquire signal includes the origin device ID, the forwarding device IDs, and the destination device ID. Here, the origin device ID represents the device ID (e.g., Device#A) of Communication Device 200 which transmits a wireless signal. The destination device ID represents the device ID (e.g., Device#D) of Communication Device 200 which receives the wireless signal transmitted by Communication Device 200 of which the device ID is the origin device ID (e.g., Device#A). The forwarding device IDs represent the device IDs (e.g., Device#C and Device#D) of Communication Devices 200 which forward the wireless signal received from Communication Device 200 of which the device ID is the origin device ID (e.g., Device#A) to Communication Device 200 of which the device ID is the destination device ID (e.g., Device#D).

This paragraph illustrate(s) Route Inquiry Initiating Software 206105c1 of Device A, which initiates to transfer the route inquiry signal. In the present embodiment, CPU 211 (FIG. 1) of Device A produces the route inquiry signal (S1). CPU 211 retrieves the origin device ID (e.g., Device#A) from Origin Device ID Storage Area 206105b1 and adds the data to the route inquiry signal (S2). CPU 211 retrieves the destination device ID (e.g., Device#D) from Destination Device ID Storage Area 206105b2 and adds the data to the route inquiry signal (S3). CPU 211 sends the route inquiry signal in a wireless fashion via Antenna 218 (FIG. 1) to Communication Device 200 within its communication range (e.g., Devices B and C) (S4).

This paragraph illustrate(s) Route Inquiry Signal Forwarding Software 206105c2 of Device B, which forwards the route inquiry signal. In the present embodiment, CPU 211 (FIG. 1) of Device B receives signal via Antenna 218 (FIG. 1) (S1). If the signal received in S1 is the route inquiry signal, CPU 211 proceeds to the next step (S2). If own device ID (e.g., Device#B) is NOT included in the destination device ID of the route inquiry signal, CPU 211 proceeds to the next step (S3). CPU 211 adds its own device ID (e.g., Device#B) as the forwarding device ID to the route inquiry signal and sends via Antenna 218 (FIG. 1) the data to Communication Device 200 located within its communication range (e.g., Device C) (S4). The foregoing sequence is performed periodically.

This paragraph illustrate(s) Route Inquiry Signal Forwarding Software 206105c2 of Device C, which forwards the route inquiry signal. In the present embodiment, CPU 211 (FIG. 1) of Device C receives signal via Antenna 218 (FIG. 1) (S1). If the signal received in S1 is the route inquiry signal, CPU 211 proceeds to the next step (S2). If own device ID (e.g., Device#C) is NOT included in the destination device ID of the route inquiry signal, CPU 211 proceeds to the next step (S3). CPU 211 adds its own device ID (e.g., Device#C) as the forwarding device ID to the route inquiry signal and sends via Antenna 218 (FIG. 1) the data to Communication Device 200 located within its communication range (e.g., Device C) (S4). The foregoing sequence is performed periodically.

This paragraph illustrate(s) Route Inquiry Signal Receiving Software 206105c3 of Device D, which receives the route inquiry signal. In the present embodiment, CPU 211 (FIG. 1) of Device D receives signal via Antenna 218 (FIG. 1) (S1). If the signal received in S1 is the route inquiry signal, CPU 211 proceeds to the next step (S2). If own device ID (e.g., Device#D) is included in the destination device ID of the route inquiry signal, CPU 211 proceeds to the next step (S3). CPU 211 stores the route inquiry signal in Work Area 206105c (S4). The foregoing sequence is performed periodically.

This paragraph illustrate(s) Route Response Initiating Software 206105c5 of Device D, which sends a response to the route inquiry signal. In the present embodiment, CPU 211 (FIG. 1) of Device D retrieves the route inquiry signal from Work Area 206105c and produces the route response signal and includes the route inquiry signal therein (S1). CPU 211 returns the route response signal via Antenna 218 (FIG. 1) to the previous Communication Device 200 (e.g., Device C) by referring to the route inquiry signal included in the route response signal (S2).

This paragraph illustrate(s) Route Response Signal Forwarding Software 206105c6 of Devices C and B, which forward the route response signal. Taking Device C for example, CPU 211 (FIG. 1) of Device C receives signal via Antenna 218 (FIG. 1) (S1). If the signal received in S1 is the route response signal, CPU 211 proceeds to the next step (S2). CPU 211 returns the route response signal via Antenna 218 (FIG. 1) to the previous Communication Device 200 (e.g., Device A) by referring to the route inquiry signal included in the route response signal (S3). The foregoing sequence is performed periodically.

This paragraph illustrate(s) Route Response Signal Receiving Software 206105c7 of Device A, which receives the route response signal. In the present embodiment, CPU 211 (FIG. 1) of Device A receives signal via Antenna 218 (FIG. 1) (S1). If the signal received in S1 is the route response signal, CPU 211 proceeds to the next step (S2). CPU 211 stores the route response signal in Work Area 206105c (S3). The foregoing sequence is performed periodically.

This paragraph illustrate(s) the overall process described in the previous seven software programs. In the present embodiment, CPU 211 (FIG. 1) of Device A retrieves the destination device ID (e.g., Device#D) from Destination Device ID Storage Area 206105b2 and adds the data to the route inquiry signal (S1). CPU 211 of Device A adds its own device ID (e.g., Device#A) to the route inquiry signal and sends the route inquiry signal (S2). CPU 211 (FIG. 1) of Device B receives the route inquiry signal and adds its own device ID (e.g., Device#B) to the route inquiry signal and sends the route inquiry signal (S3). CPU 211 (FIG. 1) of Device C receives the route inquiry signal and adds its own device ID (e.g., Device#C) to the route inquiry signal and sends the route inquiry signal (S4). CPU 211 (FIG. 1) of Device D receives the route inquiry signal and adds its own device ID (e.g., Device#D) to the route inquiry signal (S5).

This paragraph illustrate(s) the simplified description of the process described in the previous embodiment. In the present embodiment, the route inquiry signal is transferred from Device A which is forward by Device B and Device C, and received by Device D.

This paragraph illustrate(s) the overall process of the software programs described hereinbefore. In the present embodiment, CPU 211 (FIG. 1) of Device A retrieves the destination device ID (e.g., Device#D) from Destination Device ID Storage Area 206105b2 and adds the data to the route inquiry signal (S1). CPU 211 of Device A adds its own device ID (e.g., Device#A) to the route inquiry signal and sends the route inquiry signal (S2). CPU 211 (FIG. 1) of Device C receives the route inquiry signal and adds its own device ID (e.g., Device#C) to the route inquiry signal and sends the route inquiry signal (S3). CPU 211 (FIG. 1) of Device D receives the route inquiry signal and adds its own device ID (e.g., Device#D) to the route inquiry signal (S4).

This paragraph illustrate(s) the simplified description of the process described in the previous embodiment. In the present embodiment, the route inquiry signal is transferred from Device A to Device C, and received by Device D.

This paragraph illustrate(s) Route Comparing Software 206105c4 of Device A, which compares the route inquiry signals to identify the shortest route. In the present embodiment, CPU 211 (FIG. 1) of Device A retrieves all route response signals from Work Area 206105b5 (S1). CPU 211 retrieves the route inquiry signals from the route response signals (S2). CPU 211 compares all route inquiry signals (S3). CPU 211 identifies the route inquiry signal representing the shortest route and stores the data as the communication route data (e.g., Communication Route Data#A) in Communication Route Data Storage Area 206105*b*3 (S4).

This paragraph illustrate(s) Origin Device Communicating Software 206105*c*8 of Device A, which sends the communication data. In the present embodiment, CPU 211 (FIG. 1) of Device A retrieves the communication route data (e.g., Communication Route Data#A) from Communication Route Data Storage Area 206105*b*3 (S1). CPU 211 retrieves the communication data from Communication Data Storage Area 206105*b*4 (S2). Here, the communication data may include audio data, text data, image data, video data, and/or other types of data. CPU 211 produces the device to device communicating signal and adds its data retrieved in S1 and S2 (S3). Here, the device to device communicating signal is a signal produced for purposes of communicating (sending/receiving audio data, text data, image data, video data, and/or other types of data) with Communication Device 200 (e.g., Device D) of which the device ID (e.g., Device#D) is the destination device ID. CPU 211 sends the device to device communicating signal in accordance with the communication route data (e.g., Communication Route Data#A) (e.g., to Device C) via Antenna 218 (FIG. 1) (S4).

This paragraph illustrate(s) Communication Data Forwarding Software 206105*c*9 of Device C, which forwards the communication data. In the present embodiment, CPU 211 (FIG. 1) of Device C receives signal via Antenna 218 (FIG. 1) (S1). If the signal received in S1 is the device to device communicating signal, CPU 211 proceeds to the next step (S2). If own device ID (e.g., Device#C) is NOT included in destination device ID of the device to device communicating signal, CPU 211 proceeds to the next step (S3). CPU 211 forwards the device to device communicating signal in accordance with the communication route data (e.g., Communication Route Data#A) (e.g., to Device D) via Antenna 218 (FIG. 1) (S4). The foregoing sequence is performed periodically.

This paragraph illustrate(s) Communication Data Receiving Software 206105*c*10 of Device D, which receives the communication data. In the present embodiment, CPU 211 (FIG. 1) of Device D receives signal via Antenna 218 (FIG. 1) (S1). If the signal received in S1 is the device to device communicating signal, CPU 211 proceeds to the next step (S2). If own device ID (e.g., Device#D) is included in destination device ID of the device to device communicating signal, CPU 211 proceeds to the next step (S3). CPU 211 stores the device to device communicating signal in Work Area 206105*b*5 (S4). CPU 211 retrieves the communication data from the device to device communicating signal (S5). CPU 211 processes with the communication data thereafter (S6). The foregoing sequence is performed periodically.

<<In-Carrier Auto Implementing Mode Function>>

This paragraph illustrates the in-carrier auto implementing mode function which automatically implements the mode selected by the user of Communication Device 200 while the user is in a carrier. Here, the carrier may be any carrier or transportation system designed to carry passenger(s), such as automobile, motorcycle, railway train, taxi, bus, space ship, and space station.

This paragraph illustrates the carrier, Carrier CR106, which carriers one or more of passengers. Carrier CR106 may be any carrier or transportation system designed to carry passenger(s), such as automobile, motorcycle, railway train, taxi, bus, space ship, and space station. In the present embodiment, Carrier CR106 includes Host H and a plurality of antennas, Antennas Ant106*a* through Ant106*f*. Antennas Ant106*a* through Ant106*f* are designed to send and receive wireless signals with devices located in Carrier CR106. As another embodiment of the present function, Host H may be located apart from Carrier CR106 and send and receive data with Carrier CR106 via network, such as the Internet. In such embodiment, a sub-host (not shown) is installed in Carrier CR106, which communicates with Host H via network, such as the Internet.

This paragraph illustrates the storage area included in Host H. In the present embodiment, Host H includes In-Carrier Auto Implementing Mode Information Storage Area H106*a* of which the data and the software programs stored therein are described hereinafter.

This paragraph illustrates the storage areas included in In-Carrier Auto Implementing Mode Information Storage Area H106*a*. In the present embodiment, In-Carrier Auto Implementing Mode Information Storage Area H106*a* includes In-Carrier Auto Implementing Mode Data Storage Area H106*b* and In-Carrier Auto Implementing Mode Software Storage Area H106*c*. In-Carrier Auto Implementing Mode Data Storage Area H106*b* stores the data necessary to implement the present function on the side of Host H, such as the ones described hereinafter. In-Carrier Auto Implementing Mode Software Storage Area H106*c* stores the software programs necessary to implement the present function on the side of Host H, such as the ones described hereinafter.

This paragraph illustrates the storage areas included in In-Carrier Auto Implementing Mode Data Storage Area H106*b*. In the present embodiment, In-Carrier Auto Implementing Mode Data Storage Area H106*b* includes In-Carrier Notifying Data Storage Area H106*b*1, In-Carrier Mode Setting Data Storage Area H106*b*2, Answering Machine Message Data Storage Area H106*b*3, Caller's Message Data Storage Area H106*b*4, and Work Area H106*b*5. In-Carrier Notifying Data Storage Area H106*b*1 stores the in-carrier notifying data which indicates that Communication Device 200 receiving such data is inside Carrier CR106. The in-carrier notifying data is distributed via Antennas Ant106*a* through Ant106*f* in a wireless fashion within Carrier CR106. In-Carrier Mode Setting Data Storage Area H106*b*2 stores the in-carrier mode setting data which identifies the mode to be implemented upon receiving the in-carrier notifying data in Carrier CR 106 via Antenna 218 (FIG. 1). Answering Machine Message Data Storage Area H106*b*3 stores the answering machine message data which is the voice data indicating that the user of Communication Device 200 (callee) can not answer the call and also indicating to leave a message for the user of Communication Device 200 (callee). Caller's Message Data Storage Area H106*b*4 stores the caller's message data which is the voice data of the caller who called the user of Communication Device 200. Work Area H106*b*5 is utilized as a work area to perform calculation and temporarily store data.

This paragraph illustrates the software programs stored in In-Carrier Auto Implementing Mode Software Storage Area H106*c*. In the present embodiment, In-Carrier Auto Implementing Mode Software Storage Area H106*c* stores In-Carrier Notifying Software H106*c*1, In-Carrier Mode Setting Software H106*c*2, In-Carrier Auto Implementing Software H106*c*3, and Answering Machine Mode Implementing Software H106*c*6. In-Carrier Notifying Software H106*c*1 is the software program described hereinafter. In-Carrier Mode Setting Software H106*c*2 is the software program described hereinafter. In-Carrier Auto Implementing Software H106*c*3 is the software program described hereinafter. Answering Machine Mode Implementing Software H106*c*6 is the software program described hereinafter.

This paragraph illustrates In-Carrier Notifying Software H106*c*1 of Host H, which sends the in-carrier notifying data via Antennas Ant106*a* through Ant106*f* in a wireless fashion.

In the present embodiment, Host H retrieves the in-carrier notifying data from In-Carrier Notifying Data Storage Area H106b1 (S1). Host H distributes the in-carrier notifying data via Antennas Ant106a through Ant106f (S2). The foregoing sequence is performed periodically.

This paragraph illustrates the storage area included in RAM 206 (FIG. 1) of Communication Device 200. In the present embodiment, RAM 206 includes In-Carrier Auto Implementing Mode Information Storage Area 206106a of which the data and the software programs stored therein are described hereinafter.

The data and/or the software programs stored in In-Carrier Auto Implementing Mode Information Storage Area 206106a may be downloaded from Host H in the manner described hereinafter.

This paragraph illustrates the storage areas included in In-Carrier Auto Implementing Mode Information Storage Area 206106a. In the present embodiment, In-Carrier Auto Implementing Mode Information Storage Area 206106a includes In-Carrier Auto Implementing Mode Data Storage Area 206106b and In-Carrier Auto Implementing Mode Software Storage Area 206106c. In-Carrier Auto Implementing Mode Data Storage Area 206106b stores the data necessary to implement the present function on the side of Communication Device 200, such as the ones described hereinafter. In-Carrier Auto Implementing Mode Software Storage Area 206106c stores the software programs necessary to implement the present function on the side of Communication Device 200, such as the ones described hereinafter.

This paragraph illustrates the storage areas included in In-Carrier Auto Implementing Mode Data Storage Area 206106b. In the present embodiment, In-Carrier Auto Implementing Mode Data Storage Area 206106b includes In-Carrier Mode Setting Data Storage Area 206106b2, Answering Machine Message Data Storage Area 206106b3, Caller's Message Data Storage Area 206106b4, and Work Area 206106b5. In-Carrier Mode Setting Data Storage Area 206106b2 stores the in-carrier mode setting data which identifies the mode to be implemented upon receiving the in-carrier notifying data in Carrier CR 106 via Antenna 218 (FIG. 1). Answering Machine Message Data Storage Area 206106b3 stores the answering machine message data which is the voice data indicating that the user of Communication Device 200 (callee) can not answer the call and also indicating to leave a message for the user of Communication Device 200 (callee). Caller's Message Data Storage Area 206106b4 stores the caller's message data which is the voice data of the caller who called the user of Communication Device 200. Work Area 206106b5 is utilized as a work area to perform calculation and temporarily store data.

This paragraph illustrates the software programs stored in In-Carrier Auto Implementing Mode Software Storage Area 206106c. In the present embodiment, In-Carrier Auto Implementing Mode Software Storage Area 206106c stores In-Carrier Mode Setting Software 206106c2, In-Carrier Auto Implementing Software 206106c3, Manner Mode Implementing Software 206106c4, Power Off Mode Software 206106c5, and Answering Machine Mode Implementing Software 206106c6. In-Carrier Mode Setting Software 206106c2 is the software program described hereinafter. In-Carrier Auto Implementing Software 206106c3 is the software program described hereinafter. Manner Mode Implementing Software 206106c4 is the software program described hereinafter. Power Off Mode Software 206106c5 is the software program described hereinafter. Answering Machine Mode Implementing Software 206106c6 is the software program described hereinafter.

This paragraph illustrates In-Carrier Mode Setting Software H106c2 of Host H and In-Carrier Mode Setting Software 206106c2 of Communication Device 200, which identify the mode(s) to be implemented by implementing the present function. In the present embodiment, CPU 211 (FIG. 1) of Communication Device 200 displays the in-carrier mode setting screen on LCD 201 (FIG. 1) (S1). Here, the in-carrier mode setting screen displays three modes, i.e., the manner mode, the power off mode, and the answering machine mode. The user of Communication Device 200 selects mode(s) from the in-carrier mode setting screen displayed in the previous step by (e.g., the manner mode and the answering machine mode) (S2). In response, CPU 211 produces the in-carrier mode setting data in accordance with the mode(s) selected in the previous step (S3). Here, the in-carrier mode setting data identifies the mode to be implemented upon receiving the in-carrier notifying data in Carrier CR 106 via Antenna 218 (FIG. 1). CPU 211 sends the in-carrier mode setting data via Antenna 218 (FIG. 1), which is received by Host H (S4). Host H stores the in-carrier mode setting data in In-carrier Mode Setting Data Storage Area H106b2 (S5).

This paragraph illustrates In-Carrier Auto Implementing Software H106c3 of Host H and In-Carrier Auto Implementing Software 206106c3 of Communication Device 200, which implement the mode(s) selected in the previous paragraph by implementing the present function. In the present embodiment, CPU 211 (FIG. 1) of Communication Device 200 receives signal via Antenna 218 (FIG. 1) (S1). If the signal received in S1 is an in-carrier notifying data, CPU 211 proceeds to the next step (S2). CPU 211 sends the in-carrier mode setting data request, which is received by Host H (S3). Here, the in-carrier mode setting data request is a request sent to Host H to send the in-carrier mode setting data to Communication Device 200. Host H retrieves the in-carrier mode setting data from In-carrier Mode Setting Data Storage Area H106b2 (S4). Host H sends the in-carrier mode setting data via Antennas Ant106a through Ant106f, which is received by Communication Device 200 (S5). If the manner mode is included in the in-carrier mode setting data, CPU 211 executes Manner Mode Implementing Software 206106c4 (S6). If the power off mode is included in the in-carrier mode setting data, CPU 211 executes Power Off Mode Software 206106c5 (S7). If the answering machine mode is included in the in-carrier mode setting data, CPU 211 executes Answering Machine Mode Implementing Software 206106c6 (S8). The foregoing sequence is performed periodically.

This paragraph illustrates Manner Mode Implementing Software 206106c4 of Communication Device 200, which implements the manner mode. In the present embodiment, CPU 211 (FIG. 1) of Communication Device 200 receives signal via Antenna 218 (FIG. 1) (S1). If the signal received in S1 is a phone call signal, CPU 211 proceeds to the next step (S2). Here, the phone call signal indicates that another person (caller) is calling the user of Communication Device 200 (callee) for voice communication. CPU 211 activates Vibrator 217 (FIG. 1) while receiving the phone call signal (S3).

This paragraph illustrates Power Off Mode Software 206106c5 of Communication Device 200, which turns off the power of Communication Device 200. In the present embodiment, CPU 211 (FIG. 1) of Communication Device 200 turns off the power of Communication Device 200 (S1).

This paragraph illustrates Answering Machine Mode Implementing Software H106c6 of Host H and Answering Machine Mode Implementing Software 206106c6 of Communication Device 200, which implement the answering machine mode. In the present embodiment, CPU 211 (FIG. 1) of Communication Device 200 receives signal via Antenna

218 (FIG. 1) (S1). If the signal received in S1 is an in-carrier notifying data, CPU 211 proceeds to the next step (S2). CPU 211 connects the call (S3). CPU 211 sends an answering machine message data request, which is received by Host H (S4). Here, the answering machine message data request is a request sent to Host H to send the answering machine message data to Communication Device 200. Host H retrieves the answering machine message data from Answering Machine Message Data Storage Area H106*b*3 and sends the data to Communication Device 200 (S5). CPU 211 receives the answering machine message data via Antenna 218 (FIG. 1) and stores the data in Answering Machine Message Data Storage Area 206106*b*3, which is output to the caller (S6). CPU 211 stores the caller's message data in Caller's Message Data Storage Area 206106*b*4 and sends the data to Host H (S7). Host H receives the caller's message data from Communication Device 200 and stores the data in Caller's Message Data Storage Area H106*b*4 (S8). CPU 211 disconnects the call thereafter (S9). The foregoing sequence is performed periodically.

<<In-Carrier Auto Implementing Mode Function—Another Embodiment>>

The following paragraphs illustrate another embodiment, wherein the present function is primarily implemented by Communication Device 200.

This paragraph illustrates In-Carrier Mode Setting Software 206106*c*2 of Communication Device 200, which identifies the mode(s) to be implemented by implementing the present function. In the present embodiment, CPU 211 (FIG. 1) of Communication Device 200 displays the in-carrier mode setting screen on LCD 201 (FIG. 1) (S1). Here, the in-carrier mode setting screen displays three modes, i.e., the manner mode, the power off mode, and the answering machine mode. The user of Communication Device 200 selects mode(s) from the in-carrier mode setting screen displayed in the previous step by (e.g., the manner mode and the answering machine mode) (S2). In response, CPU 211 produces the in-carrier mode setting data in accordance with the mode(s) selected in the previous step (S3). Here, the in-carrier mode setting data identifies the mode to be implemented upon receiving the in-carrier notifying data in Carrier CR 106 via Antenna 218 (FIG. 1). CPU 211 stores the in-carrier mode setting data in In-carrier Mode Setting Data Storage Area 206106*b*2 (S4).

This paragraph illustrates In-Carrier Auto Implementing Software 206106*c*3 of Communication Device 200, which implements the mode(s) selected in the previous paragraph by implementing the present function. In the present embodiment, CPU 211 receives signal via Antenna 218 (FIG. 1) (S1). If the signal received in S1 is an in-carrier notifying data, CPU 211 proceeds to the next step (S2). CPU 211 retrieves the in-carrier mode setting data from In-carrier Mode Setting Data Storage Area 206106*b*2 (S3). If the manner mode is included in the in-carrier mode setting data, CPU 211 executes Manner Mode Implementing Software 206106*c*4 (S4). If the power off mode is included in the in-carrier mode setting data, CPU 211 executes Power Off Mode Software 206106*c*5 (S5). If the answering machine mode is included in the in-carrier mode setting data, executes Answering Machine Mode Implementing Software 206106*c*6 (S6). The foregoing sequence is performed periodically.

This paragraph illustrates Manner Mode Implementing Software 206106*c*4 of Communication Device 200, which implements the manner mode. In the present embodiment, CPU 211 (FIG. 1) of Communication Device 200 receives signal via Antenna 218 (FIG. 1) (S1). If the signal received in S1 is a phone call signal, CPU 211 proceeds to the next step (S2). Here, the phone call signal indicates that another person (caller) is calling the user of Communication Device 200 (callee) for voice communication. CPU 211 activates Vibrator 217 (FIG. 1) while receiving the phone call signal (S3).

This paragraph illustrates Power Off Mode Software 206106*c*5 of Communication Device 200, which turns off the power of Communication Device 200. In the present embodiment, CPU 211 (FIG. 1) of Communication Device 200 turns off the power of Communication Device 200 (S1).

This paragraph illustrates Answering Machine Mode Implementing Software 206106*c*6 of Communication Device 200, which implements the answering machine mode. In the present embodiment, CPU 211 (FIG. 1) of Communication Device 200 receives signal via Antenna 218 (FIG. 1) (S1). If the signal received in S1 is an in-carrier notifying data, CPU 211 proceeds to the next step (S2). CPU 211 connects the call (S3). CPU 211 retrieves the answering machine message data from Answering Machine Message Data Storage Area 206106*b*3, which is output to the caller (S4). CPU 211 stores the caller's message data in Caller's Message Data Storage Area 206106*b*4 (S5). CPU 211 disconnects the call thereafter (S6). The foregoing sequence is performed periodically.

<<Voice Message Displaying Function>>

The following paragraphs illustrate(s) the voice message displaying function which converts the message data, a voice data, stored by implementing the answering machine mode into text data.

This paragraph illustrate(s) the storage area included in RAM 206 (FIG. 1) of Communication Device 200. In the present embodiment, RAM 206 includes Voice Message Displaying Information Storage Area 206107*a* of which the data and the software programs stored therein are described hereinafter.

The data and/or the software programs stored in Voice Message Displaying Information Storage Area 206107*a* may be downloaded from Host H in the manner described hereinafter.

This paragraph illustrate(s) the storage areas included in Voice Message Displaying Information Storage Area 206107*a*. In the present embodiment, Voice Message Displaying Information Storage Area 206107*a* includes Voice Message Displaying Data Storage Area 206107*b* and Voice Message Displaying Software Storage Area 206107*c*. Voice Message Displaying Data Storage Area 206107*b* stores the data necessary to implement the present function, such as the ones described hereinafter. Voice Message Displaying Software Storage Area 206107*c* stores the software programs necessary to implement the present function, such as the ones described hereinafter.

This paragraph illustrate(s) the storage areas included in Voice Message Displaying Data Storage Area 206107*b*. In the present embodiment, Voice Message Displaying Data Storage Area 206107*b* includes Answering Machine Message Data Storage Area 206107*b*1, Caller's Message Data Storage Area 206107*b*2, Time Stamp Data Storage Area 206107*b*3, Text Message Data Storage Area 206107*b*4, and Work Area 206107*b*5. Answering Machine Message Data Storage Area 206107*b*1 stores the answering machine message data which is the voice data indicating that the user of Communication Device 200 (callee) can not answer the call and also indicating to leave a message. Caller's Message Data Storage Area 206107*b*2 stores the data described hereinafter. Time Stamp Data Storage Area 206107*b*3 stores the data described hereinafter. Text Message Data Storage Area 206107*b*4 stores the data described hereinafter. Work Area 206107*b*5 is utilized as a work area to perform calculation and temporarily store data.

This paragraph illustrate(s) the data stored in Caller's Message Data Storage Area 206107*b*2. In the present embodiment, Caller's Message Data Storage Area 206107*b*2 comprises two columns, i.e., 'Message ID' and 'Caller's Message Data'. Column 'Message ID' stores the message IDs, and each message ID is an identification of the corresponding caller's message data stored in column 'Caller's Message Data'. Here, the message ID may be the caller's phone number or his/her name. Column 'Caller's Message Data' stores the caller's message data, and each caller's message data is the voice data of the caller who called the user of Communication Device 200. In the present embodiment, Caller's Message Data Storage Area 206107*b*2 stores the following data: the message ID 'Message#1' and the corresponding caller's message data 'Caller's Message Data#1'; the message ID 'Message#2' and the corresponding caller's message data 'Caller's Message Data#2'; the message ID 'Message#3' and the corresponding caller's message data 'Caller's Message Data#3'; and the message ID 'Message#4' and the corresponding caller's message data 'Caller's Message Data#4'.

This paragraph illustrate(s) the data stored in Time Stamp Data Storage Area 206107*b*3. In the present embodiment, Time Stamp Data Storage Area 206107*b*3 comprises two columns, i.e., 'Message ID' and 'Time Stamp Data'. Column 'Message ID' stores the message IDs, and each message ID is an identification of the corresponding time stamp data stored in column 'Time Stamp Data'. The message IDs stored in Time Stamp Data Storage Area 206107*b*3 are identical to the ones stored in Caller's Message Data Storage Area 206107*b*2. Column 'Time Stamp Data' stores the time stamp data, and each time stamp data is the data indicating the date, day, and time at which the caller's message data of the corresponding message ID is stored in Caller's Message Data Storage Area 206107*b*2. In the present embodiment, Time Stamp Data Storage Area 206107*b*3 stores the following data: the message ID 'Message#1' and the corresponding time stamp data 'Time Stamp Data#1'; the message ID 'Message#2' and the corresponding time stamp data 'Time Stamp Data#2'; the message ID 'Message#3' and the corresponding time stamp data 'Time Stamp Data#3'; and the message ID 'Message#4' and the corresponding time stamp data 'Time Stamp Data#4'.

This paragraph illustrate(s) the data stored in Text Message Data Storage Area 206107*b*4. In the present embodiment, Text Message Data Storage Area 206107*b*4 comprises two columns, i.e., 'Message ID' and 'Text Message Data'. Column 'Message ID' stores the message IDs, and each Message ID is an identification of the corresponding text message data stored in column 'Text Message Data'. The message IDs stored in Text Message Data Storage Area 206107*b*4 are identical to the ones stored in Caller's Message Data Storage Area 206107*b*2. Column 'Text Message Data' stores the text message data, and each text message data is the text data to which the caller's message data of the corresponding message ID stored in Caller's Message Data Storage Area 206107*b*2 is converted by utilizing the voice recognition system. In the present embodiment, Text Message Data Storage Area 206107*b*4 stores the following data: the message ID 'Message#1' and the corresponding text message data 'Text Message Data#1'; the message ID 'Message#2' and the corresponding text message data 'Text Message Data#2'; the message ID 'Message#3' and the corresponding text message data 'Text Message Data#3'; and the message ID 'Message#4' and the corresponding text message data 'Text Message Data#4'.

This paragraph illustrate(s) the software programs stored in Voice Message Displaying Software Storage Area 206107*c*. In the present embodiment, Voice Message Displaying Software Storage Area 206107*c* stores Answering Machine Mode Implementing Software 206107*c*1, Afterwards Caller's Message Data Converting Software 206107*c*2, Text Message Data Displaying Software 206107*c*3, and Realtime Caller's Message Data Converting Software 206107*c*4. Answering Machine Mode Implementing Software 206107*c*1 is the software program described hereinafter. Afterwards Caller's Message Data Converting Software 206107*c*2 is the software program described hereinafter. Text Message Data Displaying Software 206107*c*3 is the software program described hereinafter. Realtime Caller's Message Data Converting Software 206107*c*4 is the software program described hereinafter.

This paragraph illustrate(s) Answering Machine Mode Implementing Software 206107*c*1 of Communication Device 200, which implements the answering machine mode. In the present embodiment, CPU 211 (FIG. 1) of Communication Device 200 receives signal via Antenna 218 (FIG. 1) (S1). If the signal received in S1 is the phone call signal, CPU 211 (FIG. 1) proceeds to the next step (S2). Here, the phone call signal indicates that another person (caller) is calling the user of Communication Device 200 (callee) for voice communication. CPU 211 connects the call (S3). CPU 211 retrieves the answering machine message data from Answering Machine Message Data Storage Area 206107*b*1 and outputs the data to the caller (S4). CPU 211 assigns the caller's phone number (or his/her name) as the new message ID (e.g., Message#4) (S5). CPU 211 stores the caller's message data at the message ID (e.g., Message#4) assigned in the previous step in Caller's Message Data Storage Area 206107*b*2 (S6). CPU 211 (FIG. 1) stores the current time as the time stamp data at the message ID (e.g., Message#4) assigned in the previous step in Time Stamp Data Storage Area 206107*b*3 (S7). CPU 211 disconnects the call thereafter (S8). The foregoing sequence is performed periodically.

This paragraph illustrate(s) Afterwards Caller's Message Data Converting Software 206107*c*2 of Communication Device 200, which selects a caller's message data and converts the data to a text message data. In the present embodiment, CPU 211 (FIG. 1) of Communication Device 200 retrieves all message IDs from Caller's Message Data Storage Area 206107*b*2 and displays the data on LCD 201 (FIG. 1) (S1). The user of Communication Device 200 selects by utilizing Input Device 210 (FIG. 1) or via voice recognition system a message ID (e.g., Message#1) (S2). CPU 211 outputs the corresponding caller's message data (e.g., Caller's Message Data#1) from Speaker 216 (FIG. 1) (S3). CPU 211 retrieves the corresponding time stamp data (e.g., Time Stamp Data#1) from Time Stamp Data Storage Area 206107*b*3 and displays the data on LCD 201 (FIG. 1) (S4). If a convert to text message data signal is input by utilizing Input Device 210 (FIG. 1) or via voice recognition system, CPU 211 (FIG. 1) proceeds to the next step (S5). Here, the convert to text message data signal is a signal to convert the caller's message data (e.g., Message#1) selected in S2 to the text message data (e.g., Text Message Data#1). CPU 211 converts the caller's message data (e.g., Caller's Message Data#1) of the message ID (e.g., Message#1) selected in S2 to the text message data (e.g., Text Message Data#1) and displays the data on LCD 201 (FIG. 1) (S6). CPU 211 stores the text message data (e.g., Text Message Data#1) converted in the previous step at the corresponding message ID (e.g., Message#1) in Text Message Data Storage Area 206107*b*4 (S7).

This paragraph illustrate(s) Text Message Data Displaying Software 206107*c*3 of Communication Device 200, which displays the text message data on LCD 201 (FIG. 1). In the present embodiment, CPU 211 (FIG. 1) of Communication Device 200 retrieves all message IDs from Text Message Data Storage Area 206107b4 (S1). CPU 211 retrieves all corresponding time stamp data from Time Stamp Data Storage Area 206107b3 (S2). CPU 211 retrieves all corresponding text message data (however, the first portion of each text message data (e.g., first 10 words of each text message data)) from Text Message Data Storage Area 206107b4 (S3). CPU 211 displays the data retrieved in the previous three steps on LCD 201 (FIG. 1) (S4). The user of Communication Device 200 selects by utilizing Input Device 210 (FIG. 1) or via voice recognition system a message ID (e.g., Message#1) (S5). CPU 211 retrieves the corresponding text message data (the entire data of Text Message Data#1) and the corresponding message ID (e.g., Message#1) from Text Message Data Storage Area 206107b4 (S6). CPU 211 retrieves the corresponding time stamp data (e.g., Time Stamp Data#1) from Time Stamp Data Storage Area 206107b3 (S7). CPU 211 displays the data retrieved in the previous two steps on LCD 201 (FIG. 1) (S8).

This paragraph illustrate(s) Realtime Caller's Message Data Converting Software 206107c4 of Communication Device 200, which converts the caller's message data to text message data realtime. In the present embodiment, CPU 211 (FIG. 1) of Communication Device 200 receives signal via Antenna 218 (FIG. 1) (S1). If the signal received in S1 is the phone call signal, CPU 211 (FIG. 1) proceeds to the next step (S2). Here, the phone call signal indicates that another person (caller) is calling the user of Communication Device 200 (callee) for voice communication. CPU 211 connects the call (S3). CPU 211 retrieves the answering machine message data from Answering Machine Message Data Storage Area 206107b1 and outputs the data to the caller (S4). CPU 211 assigns the caller's phone number (or his/her name) as the new message ID (e.g., Message#4) (S5). CPU 211 stores the caller's message data (e.g., Caller's Message Data#4) at the message ID (e.g., Message#4) assigned in the previous step in Caller's Message Data Storage Area 206107b2 (S6). CPU 211 stores the current time as the time stamp data (e.g., Time Stamp Data#4) at the message ID (e.g., Message#4) assigned in the previous step in Time Stamp Data Storage Area 206107b3 (S7). CPU 211 outputs the caller's message data (e.g., Caller's Message Data#4) stored in S6 from Speaker 216 (FIG. 1) (S8). CPU 211 converts the caller's message data (e.g., Caller's Message Data#4) stored in S6 to the text message data (e.g., Text Message Data#4) (S9). CPU 211 stores the text message data (e.g., Text Message Data#4) converted in the previous step at the corresponding message ID (e.g., Message#4) in Text Message Data Storage Area 206107b4 (S10). CPU 211 retrieves the text message data (e.g., Text Message Data#4) stored in the previous step from Text Message Data Storage Area 206107b4 (S11). CPU 211 retrieves the time stamp data (e.g., Time Stamp Data#4) stored in S7 from Time Stamp Data Storage Area 206107b3 (S12). CPU 211 displays the data retrieved in the previous two steps on LCD 201 (FIG. 1) (S13). CPU 211 disconnects the call thereafter (S14). The foregoing sequence is performed periodically. The data stored in the foregoing sequence may be displayed on LCD 201 by executing Text Message Data Displaying Software 206107c3.

<<Multiple Mode Implementing Function>>

The following paragraphs illustrate(s) the multiple mode implementing function of Communication Device 200 which enables to activate and implement a plurality of modes, functions, and/or systems described in this specification simultaneously.

This paragraph illustrate(s) the software programs stored in RAM 206 (FIG. 1) to implement the multiple mode implementing function (FIG. 1). In the present embodiment, RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrate(s) the sequence of Mode List Displaying Software 20690c. In the present embodiment, CPU 211 (FIG. 1), under the command of Mode List Displaying Software 20690c, displays a list of a certain amount or all modes, functions, and/or systems described in this specification on LCD 201 (FIG. 1).

This paragraph illustrate(s) the sequence of Mode Selecting Software 20690d. In the present embodiment, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrate(s) the sequence of Mode Activating Software 20690e. In the present embodiment, CPU 211 (FIG. 1), under the command of Mode Activating Software 20690e, activates the mode, function, or, system selected in S2 explained hereinbefore. CPU 211 thereafter implements the activated mode, function, or system as described in the relevant embodiments in this specification.

This paragraph illustrate(s) the sequence of Mode Implementation Repeater 20690f. In the present embodiment, the user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690*b*, Mode List Displaying Software 20690*c*, Mode Selecting Software 20690*d*, Mode Activating Software 20690*e*, and Mode Implementation Repeater 20690*f* described hereinbefore may be integrated into one software program, Multiple Mode Implementer 20690*b*. In the present embodiment, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant embodiments in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Multiple Software Download Function>>

The following paragraphs illustrate(s) the multiple software download function which enables Communication Device 200 to download a plurality of software programs simultaneously. All software programs, data, any types of information to implement all modes, functions, and systems described in this specification are stored in a host or server from which Communication Device 200 can download.

This paragraph illustrate(s) the software programs stored in RAM 206 (FIG. 1). In the present embodiment, RAM 206 includes Multiple Software Download Controller Storage Area 20691*a*. Multiple Software Download Controller Storage Area 20691*a* includes Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g*. Multiple Software Download Controller 20691*b* administers the overall implementation of the present function. One of the major tasks of Multiple Software Download Controller 20691*b* is to administer and control the timing and sequence of Download Software List Displaying Software 20691*c*, Download Software Selector 20691*d*, Download Software Storage Area Selector 20691*e*, Download Implementer 20691*f*, and Download Repeater 20691*g*. For example, Multiple Software Download Controller 20691*b* executes them in the following order: Download Software List Displaying Software 20691*c*, Download Software Selector 20691*d*, Download Software Storage Area Selector 20691*e*, Download Implementer 20691*f*, and Download Repeater 20691*g*. Download Software List Displaying Software 20691*c* displays on LCD 201 (FIG. 1) a list of a certain amount or all software programs necessary to implement the modes, functions, and/or systems explained in this specification of which the sequence is explained hereinafter. Download Software Selector 20691*d* selects one of the software programs displayed on LCD 201 of which the sequence is explained hereinafter. Download Software Storage Area Selector 20691*e* selects the storage area in RAM 206 where the downloaded software program is stored of which the sequence is explained hereinafter. Download Implementer 20691*f* implements the download process of the software program selected by Download Software Selector 20691*d* hereinbefore and stores the software program in the storage area selected by Download Software Storage Area Selector 20691*e* hereinbefore of which the sequence is explained hereinafter. Download Repeater 20691*g* executes Multiple Software Download Controller 20691*b* which reactivates Download Software List Displaying Software 20691*c*, Download Software Selector 20691*d*, Download Software Storage Area Selector 20691*e*, and Download Implementer 20691*f* of which the sequence is explained hereinafter.

This paragraph illustrate(s) the sequence of Download Software List Displaying Software 20691*c*. In the present embodiment, CPU 211 (FIG. 1), under the command of Download Software List Displaying Software 20691*c*, displays a list of a certain amount or all software programs to implement all modes, functions, and systems described in this specification on LCD 201 (FIG. 1).

This paragraph illustrate(s) the sequence of Download Software Selector 20691*d*. In the present embodiment, the user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20691*d*, interprets the input signal and selects the corresponding software program (S2).

This paragraph illustrate(s) the sequence of Download Software Storage Area Selector 20691*e*. In the present embodiment, CPU 211 (FIG. 1), under the command of Download Software Storage Area Selector 20691*e*, selects a specific storage area in RAM 206 (FIG. 1) where the downloaded software program is to be stored. The selection of the specific storage area in RAM 206 may be done automatically by CPU 211 or manually by the user of Communication Device 200 by utilizing Input Device 210 (FIG. 1) or via voice recognition system.

This paragraph illustrate(s) the sequence of Download Implementer 20691f. In the present embodiment, CPU 211 (FIG. 1), under the command of Download Implementer 20691f, implements the download process of the software program selected by Download Software Selector 20691d and stores the software program in the storage area selected by Download Software Storage Area Selector 20691e.

This paragraph illustrate(s) the sequence of Download Repeater 20691g. In the present embodiment, the user of Communication Device 200 inputs an input signal by utilizing Input Device 210 (FIG. 1) or via voice recognition system when the downloading process of the software program is completed (S1). If the input signal indicates to repeat the process to download another software program, CPU 211 (FIG. 1), under the command of Download Repeater 20691g, executes Multiple Software Download Controller 20691b, which reactivates Download Software List Displaying Software 20691c, Download Software Selector 20691d, Download Software Storage Area Selector 20691e, and Download Implementer 20691f to download the second software program while the downloading process of the first software program is still in progress by utilizing the method so-called 'time sharing' (S3). Download Software List Displaying Software 20691c, Download Software Selector 20691d, Download Software Storage Area Selector 20691e, and Download Implementer 20691f can be repeatedly executed until all software programs displayed on LCD 201 (FIG. 1) are selected and downloaded. The downloading process is not repeated if the input signal explained in S2 so indicates.

As another embodiment, Multiple Software Download Controller 20691b, Download Software List Displaying Software 20691c, Download Software Selector 20691d, Download Software Storage Area Selector 20691e, Download Implementer 20691f, and Download Repeater 20691g may be integrated into a single software program, Multiple Software Download Controller 20691b. First of all, CPU 211 (FIG. 1) displays a list of all software programs downloadable from a host or server on LCD 201 (FIG. 1) (S1). The user of Communication Device 200 inputs an input signal by utilizing Input Device 210 (FIG. 1) or via voice recognition system identifying one of the software programs displayed on LCD 201 (S2), and CPU 211 interprets the input signal and selects the corresponding software program (S3) and selects the storage area in RAM 206 (FIG. 1) where the downloaded software program is to be stored (S4). The selection of the specific storage area in RAM 206 may be done automatically by CPU 211 or manually by the user of Communication Device 200 by utilizing Input Device 210 (FIG. 1) or via voice recognition system. CPU 211 then implements the download process of the software program selected in S3 and stores the software program in the storage area selected in S4 (S5). The user of Communication Device 200 inputs an input signal by utilizing Input Device 210 or via voice recognition system when the activation of downloading process of the software program described in S5 is completed (S6). If the input signal indicates to repeat the process to download another software program, CPU 211 repeats the steps of S1 through S5 to download the second software program while the downloading process of the first software program is still in progress by utilizing the method so-called 'time sharing' (S7). The steps of S1 through S5 can be repeated until all software programs displayed on LCD 201 are selected and downloaded. The downloading process is not repeated if the input signal explained in S6 so indicates.

For the avoidance of doubt, the foregoing paragraphs are also applicable to download data and any types of information other than software programs.

INCORPORATION BY REFERENCE

The following paragraphs and drawings described in U.S. Provisional Application No. 60/521,265, filed Mar. 12, 2004, are incorporated to this application by reference: the preamble described in paragraph [2822] (no drawings); Communication Device 200 (Voice Communication Mode) described in paragraphs [2823] through [2828] (FIGS. 1 through 2c); Voice Recognition System described in paragraphs [2829] through [2861] (FIGS. 3 through 19); Positioning System described in paragraphs [2862] through [2893] (FIGS. 20a through 32e); Auto Backup System described in paragraphs [2894] through [2903] (FIGS. 33 through 37); Signal Amplifier described in paragraphs [2904] through [2909] (FIG. 38); Audio/Video Data Capturing System described in paragraphs [2910] through [2922] (FIGS. 39 through 44b); Digital Mirror Function (1) described in paragraphs [2923] through [2931] (FIGS. 44c through 44e); Caller ID System described in paragraphs [2932] through [2939] (FIGS. 45 through 47); Stock Purchasing Function described in paragraphs [2940] through [2949] (FIGS. 48 through 52); Timer Email Function described in paragraphs [2950] through [2956] (FIGS. 53a and 53b); Call Blocking Function described in paragraphs [2957] through [2970] (FIGS. 54 through 59); Online Payment Function described in paragraphs [2971] through [2980] (FIGS. 60 through 64); Navigation System described in paragraphs [2981] through [3003] (FIGS. 65 through 74a); Remote Controlling System described in paragraphs [3004] through [3022] (FIGS. 75 through 85); Auto Emergency Calling System described in paragraphs [3023] through [3031] (FIGS. 86 and 87); Cellular TV Function described in paragraphs [3032] through [3116] (FIGS. 88 through 135); 3D Video Game Function described in paragraphs [3117] through [3129] (FIGS. 136 through 144); Digital Mirror Function (2) described in paragraphs [3130] through [3139] (FIGS. 145 through 155); Voice Recognition Sys—E-mail (2) described in paragraphs [3140] through [3148] (FIGS. 156 through 160); Positioning System—GPS Search Engine described in paragraphs [3149] through [3191] (FIGS. 161 through 182); Mobile Ignition Key Function described in paragraphs [3192] through [3214] (FIGS. 183 through 201); Voice Print Authentication System described in paragraphs [3215] through [3225] (FIGS. 202 through 211); Fingerprint Authentication System described in paragraphs [3226] through [3238] (FIGS. 212 through 221); Auto Time Adjust Function described in paragraphs [3239] through [3243] (FIGS. 222 through 224); Video/Photo Mode described in paragraphs [3244] through [3272] (FIGS. 225 through 242); Call Taxi Function described in paragraphs [3273] through [3313] (FIGS. 243 through 269); Shooting Video Game Function described in paragraphs [3314] through [3330] (FIGS. 270 through 283); Driving Video Game Function described in paragraphs [3331] through [3344] (FIGS. 284 through 294); Address Book Updating Function described in paragraphs [3345] through [3365] (FIGS. 295 through 312); Batch Address Book Updating Function—With Host described in paragraphs [3366] through [3387] (FIGS. 313 through 329); Batch Address Book Updating Function—Peer-To-Peer Connection described in paragraphs [3388] through [3392] (FIGS. 329a through 329c); Batch Scheduler Updating Function—With Host described in paragraphs [3393] through [3416] (FIGS. 330 through 350); Batch Scheduler Updating Function—Peer-To-Peer Connection described in paragraphs [3417] through [3421] (FIGS. 351 and 352); Calculator Function described in paragraphs [3422] through [3427] (FIGS. 353 through 356); Spreadsheet Function described in paragraphs [3428] through [3435] (FIGS. 357 through 360); Word Processing Function described in paragraphs [3436] through [3451] (FIGS. 361 through 373); TV Remote Controller Function described in paragraphs [3452] through [3474] (FIGS. 374 through 394); CD/PC Inter-communicating Function described in paragraphs [3475] through [3499] (FIGS. 413 through 427); PDWR Sound Selecting Function described in paragraphs [3500] through [3536](FIGS. 428 through 456); Start Up Software Function described in paragraphs [3537] through [3553] (FIGS. 457 through 466); Another Embodiment Of Communication Device 200 described in paragraphs [3554] through [3558] (FIGS. 467a through 467d); Stereo Audio Data Output Function described in paragraphs [3559] through [3578] (FIGS. 468 through 479); Stereo Visual Data Output Function described in paragraphs [3579] through [3598] (FIGS. 480 through 491); Multiple Signal Processing Function described in paragraphs [3599] through [3671] (FIGS. 492 through 529); Positioning System—Pin-pointing Function described in paragraphs [3672] through [3705] (FIGS. 530 through 553); Artificial Satellite Host described in paragraphs [3706] through [3724] (FIGS. 554 through 567); CCD Bar Code Reader Function described in paragraphs [3725] through [3746] (FIGS. 568 through 579); Online Renting Function described in paragraphs [3747] through [3824] (FIGS. 580 through 633); SOS Calling Function described in paragraphs [3825] through [3845] (FIGS. 634 through 645); Input Device described in paragraphs [3846] through [3851] (FIGS. 646 through 650); PC Remote Controlling Function described in paragraphs [3852] through [3887] (FIGS. 651 through 670); PC Remote Downloading Function described in paragraphs [3888] through [3937] (FIGS. 671 through 701); Audiovisual Playback Function described in paragraphs [3938] through [3963] (FIGS. 702 through 716); Audio Playback Function described in paragraphs [3964] through [3988] (FIGS. 717 through 731); Ticket Purchasing Function described in paragraphs [3989] through [4018] (FIGS. 732 through 753); Remote Data Erasing Function described in paragraphs [4019] through [4048] (FIGS. 754 through 774); Business Card Function described in paragraphs [4049] through [4065] (FIGS. 775 through 783); Game Vibrating Function described in paragraphs [4066] through [4076] (FIGS. 784 through 786); Part-time Job Finding Function described in paragraphs [4077] through [4097] (FIGS. 787 through 801); Parking Lot Finding Function described in paragraphs [4098] through [4137] (FIGS. 802 through 832); Parts Upgradable Communication Device described in paragraphs [4138] through [4163] (FIGS. 833a through 833x); On Demand TV Function described in paragraphs [4164] through [4194] (FIGS. 834 through 855); Inter-communicating TV Function described in paragraphs [4195] through [4229] (FIGS. 856 through 882); Display Controlling Function described in paragraphs [4230] through [4247] (FIGS. 883 through 894); Multiple Party Communicating Function described in paragraphs [4248] through [4281] (FIGS. 894a through 917); Display Brightness Controlling Function described in paragraphs [4282] through [4291] (FIGS. 918 through 923); Multiple Party Pin-pointing Function described in paragraphs [4292] through [4339] (FIGS. 924 through 950f); Digital Camera Function described in paragraphs [4340] through [4367] (FIGS. 951 through 968); Phone Number Linking Function described in paragraphs [4368] through [4391] (FIGS. 968a through 983); Multiple Window Displaying Function described in paragraphs [4392] through [4410] (FIGS. 984 through 995); Mouse Pointer Displaying Function described in paragraphs [4411] through [4448] (FIGS. 996 through 1021); House Item Pin-pointing Function described in paragraphs [4449] through [4608] (FIGS. 1022 through 1152); Membership Administrating Function described in paragraphs [4609] through [4651] (FIGS. 1153 through 1188); Keyword Search Timer Recording Function described in paragraphs [4652] through [4743] (FIGS. 1189 through 1254); Weather Forecast Displaying Function described in paragraphs [4744] through [4785] (FIGS. 1255 through 1288); Multiple Language Displaying Function described in paragraphs [4786] through [4843] (FIGS. 1289 through 1331); Caller's Information Displaying Function described in paragraphs [4844] through [4897] (FIGS. 1332 through 1375); Communication Device Remote Controlling Function (By Phone) described in paragraphs [4898] through [4938] (FIGS. 1394 through 1415); Communication Device Remote Controlling Function (By Web) described in paragraphs [4939] through [4979] (FIGS. 1416 through 1437); Shortcut Icon Displaying Function described in paragraphs [4980] through [5007] (FIGS. 1438 through 1455); Task Tray Icon Displaying Function described in paragraphs [5008] through [5030] (FIGS. 1456 through 1470); Multiple Channel Processing Function described in paragraphs [5031] through [5078] (FIGS. 1471 through 1498); Solar Battery Charging Function described in paragraphs [5079] through [5092] (FIGS. 1499 through 1509); OS Updating Function described in paragraphs [5093] through [5160] (FIGS. 1510 through 1575); Device Managing Function described in paragraphs [5161] through [5178] (FIGS. 1576 through 1587); Automobile Controlling Function described in paragraphs [5179] through [5227] (FIGS. 1588 through 1627); OCR Function described in paragraphs [5228] through [5263] (FIGS. 1628 through 1652); Real-time GPS Function described in paragraphs [5264] through [5333] (FIGS. 1653 through 1712); CCD Video Stabilizing Function described in paragraphs [5334] through [5365] (FIGS. 1713 through 1736); DVD Remote Controlling Function described in paragraphs [5366] through [5404] (FIGS. 1737 through 1757); Dual Frame Buffer Implementing Function described in paragraphs [5405] through [5421] (FIGS. 1758 through 1767); Mouse Pointer Image Auto Changing Function described in paragraphs [5422] through [5435] (FIGS. 1768 through 1774); Dual CCD Camera Function described in paragraphs [5436] through [5456] (FIGS. 1775a through 1786); Radio Tuner Function described in paragraphs [5457] through [5487] (FIGS. 1787 through 1812); Registered Voice Recognizing Function described in paragraphs [5488] through [5527] (FIGS. 1813 through 1842); Host's TV Resolution Converting Function described in paragraphs [5528] through [5557] (FIGS. 1843 through 1864); Voice Shortcut Recognizing Function described in paragraphs [5558] through [5592] (FIGS. 1865 through 1889); Vital Sign Monitoring Function described in paragraphs [5593] through [5682] (FIGS. 1890a through 1954); Attached File Emailing Function described in paragraphs [5683] through [5695] (FIGS. 1955 through 1961); Movie eTicket Function described in paragraphs [5696] through [5748] (FIGS. 1962 through 2002); Carrier Prepaid eCard Function described in paragraphs [5749] through [5789] (FIGS. 2003 through 2032); Carrier ePass Function described in paragraphs [5790] through [5829] (FIGS. 2033 through 2061b); Communication Device 200 Installed In Carrier described in paragraphs [5830] through [5831] (FIG. 2062); Wireless Communication Facilitating System described in paragraphs [5832] through [5861] (FIGS. 2063 through 2076b); In-Carrier Notifying Function described in paragraphs [5862] through [5892] (FIGS. 2077 through 2093); Station Name Notifying Function described in paragraphs [5893] through [5922] (FIGS. 2094 through 2110); Restaurant eMenu Function described in paragraphs [5923] through [5965] (FIGS. 2111 through 2144); Geographic Location Recording Function described in paragraphs [5966] through [6007] (FIGS. 2145 through 2176b); CCD Dictionary Function described in paragraphs [6008] through [6032] (FIGS. 2177 through 2195b); Schedule Notifying Function described in paragraphs [6033] through [6059] (FIGS. 2196 through 2215); Customized Device Purchasing System described in paragraphs [6060] through [6100] (FIGS. 2216 through 2250); Multiple Type TV Program Distributing System described in paragraphs [6101] through [6131] (FIGS. 2251 through 2274); Multiple TV Screen Displaying Function described in paragraphs [6132] through [6163] (FIGS. 2275 through 2297); Touch Panel Function described in paragraphs [6164] through [6189] (FIGS. 2298 through 2315); Communication Device Finding Function described in paragraphs [6190] through [6201] (FIGS. 2316 through 2322); Carrier Safety Measure Controlling Function described in paragraphs [6202] through [6236] (FIGS. 2323 through 2342); Product Information Retrieving Function (CCD) described in paragraphs [6237] through [6265] (FIGS. 2343 through 2360); Product Information Stored Chip Function described in paragraphs [6266] through [6303] (FIGS. 2361 through 2385); Karaoke Playing Function described in paragraphs [6304] through [6332] (FIGS. 2386 through 2406); Performing Pattern Identifying Anti-Virus Function described in paragraphs [6333] through [6355] (FIGS. 2407 through 2421); Continue Enabled Video Game Function described in paragraphs [6356] through [6378] (FIGS. 2422 through 2436); Resume Enabled Video Game Function described in paragraphs [6379] through [6401] (FIGS. 2437 through 2451); Signal Forwarding Function described in paragraphs [6402] through [6430] (FIGS. 2452 through 2472); In-Carrier Auto Implementing Mode Function described in paragraphs [6431] through [6460] (FIGS. 2473 through 2492); Voice Message Displaying Function described in paragraphs [6461] through [6481] (FIGS. 2493 through 2503c); Human Toes Displaying Function described in paragraphs [6482] through [6499] (FIGS. 2504 through 2521); Wrinkles/Muscles Displaying Function described in paragraphs [6500] through [6541] (FIGS. 2522a through 2552e); Protruded Body Part Displaying Function described in paragraphs [6542] through [6561] (FIGS. 2553 through 2566b); Satellite TV Program Displaying Function described in paragraphs [6562] through [6606] (FIGS. 2567 through 2601); Definition of Communication Device 200 described in paragraphs [6607] through [6608] (no drawings); Multiple Mode Implementing Function described in paragraphs [6610] through [6617] (FIGS. 395 through 400); Multiple Software Download Function described in paragraphs [6618] through [6627] (FIGS. 401 through 407); Selected Software Distributing Function described in paragraphs [6628] through [6647] (FIGS. 1376 through 1393d); Multiple Software Download And Mode Implementation Function described in paragraphs [6648] through [6655] (FIGS. 408 through 412); and the last sentence described in paragraph [6657] (no drawings).

The invention claimed is:

1. A communication device comprising:
a microphone;
a speaker;
a display;
a camera;
a touch panel;
an antenna;
a voice communication implementer, wherein voice communication is implemented by utilizing said microphone and said speaker;
an attached file email implementer, wherein an email is sent with a file attached thereto;
a geographic location implementer, wherein a communication device geographic location which indicates the current geographic location of said communication device is indicated on a map displayed on said display;
a dictionary implementer, wherein an image is retrieved via said camera, an alphanumeric data is identified from said image, and an explanation data corresponding to said alphanumeric data is displayed on said display;
a schedule notification implementer, wherein a notice is output from said communication device when a schedule is about to start;
a multiple visual data display implementer, wherein a 1st visual data and a 2nd visual data are received via said antenna, and said 1st visual data and said 2nd visual data are displayed on said display simultaneously;
a touch panel implementer, wherein said communication device is operated via said touch panel;
a communication device search implementer, wherein when said communication device receives a certain instruction, said communication device sets the sound volume to a higher level and outputs from said speaker a certain audio with the set sound volume;
a resume enabled video game implementer, wherein a video game is operable to be paused and resumed from the point it is paused; and
an oncoming destination name notification implementer, wherein said communication device displays the name of the location to which said communication device is about to arrive.

2. The communication device of claim 1, wherein said communication device is a handheld device.

3. The communication device of claim 1, wherein said communication device geographic location is recorded periodically.

4. The communication device of claim 1, wherein said 1st visual data is the visual portion of a 1st audio visual data, and said 2nd visual data is the visual portion of a 2nd audio visual data.

5. The communication device of claim 1, wherein said touch panel is part of said display.

6. The communication device of claim 1, wherein said certain instruction is audio data retrieved via said microphone.

7. A method for a communication device comprising a microphone, a speaker, a display, a camera, a touch panel, and an antenna, comprising:
a voice communication implementing step, wherein voice communication is implemented by utilizing said microphone and said speaker;
an attached file email implementing step, wherein an email is sent with a file attached thereto;
a geographic location implementing step, wherein a communication device geographic location which indicates the current geographic location of said communication device is indicated on a map displayed on said display;
a dictionary implementing step, wherein an image is retrieved via said camera, an alphanumeric data is identified from said image, and an explanation data corresponding to said alphanumeric data is displayed on said display;
a schedule notification implementing step, wherein a notice is output from said communication device when a schedule is about to start;
a multiple visual data display implementing step, wherein a 1st visual data and a 2nd visual data are received via said antenna, and said 1st visual data and said 2nd visual data are displayed on said display simultaneously;

a touch panel implementing step, wherein said communication device is operated via said touch panel;

a communication device search implementing step, wherein when said communication device receives a certain instruction, said communication device sets the sound volume to a higher level and outputs from said speaker a certain audio with the set sound volume;

a resume enabled video game implementing step, wherein a video game is operable to be paused and resumed from the point it is paused; and an oncoming destination name notification implementing step, wherein said communication device displays the name of the location to which said communication device is about to arrive.

8. The method of claim 7, wherein said communication device is a handheld device.

9. The method of claim 7, wherein said communication device geographic location is recorded periodically.

10. The method of claim 7, wherein said 1st visual data is the visual portion of a 1st audio visual data, and said 2nd visual data is the visual portion of a 2nd audio visual data.

11. The method of claim 7, wherein said touch panel is part of said display.

12. The method of claim 7, wherein said certain instruction is audio data retrieved via said microphone.

13. A system comprising:

a communication device which includes a microphone, a speaker, a display, a camera, a touch panel, and an antenna;

a voice communication implementer, wherein voice communication is implemented by utilizing said microphone and said speaker;

an attached file email implementer, wherein an email is sent with a file attached thereto;

a geographic location implementer, wherein a communication device geographic location which indicates the current geographic location of said communication device is indicated on a map displayed on said display;

a dictionary implementer, wherein an image is retrieved via said camera, an alphanumeric data is identified from said image, and an explanation data corresponding to said alphanumeric data is displayed on said display;

a schedule notification implementer, wherein a notice is output from said communication device when a schedule is about to start;

a multiple visual data display implementer, wherein a 1st visual data and a 2nd visual data are received via said antenna, and said 1st visual data and said 2nd visual data are displayed on said display simultaneously;

a touch panel implementer, wherein said communication device is operated via said touch panel;

a communication device search implementer, wherein when said communication device receives a certain instruction, said communication device sets the sound volume to a higher level and outputs from said speaker a certain audio with the set sound volume;

a resume enabled video game implementer, wherein a video game is operable to be paused and resumed from the point it is paused; and an oncoming destination name notification implementer, wherein said communication device displays the name of the location to which said communication device is about to arrive.

14. The system of claim 13, wherein said communication device is a handheld device.

15. The system of claim 13, wherein said communication device geographic location is recorded periodically.

16. The system of claim 13, wherein said 1st visual data is the visual portion of a 1st audio visual data, and said 2nd visual data is the visual portion of a 2nd audio visual data.

17. The system of claim 13, wherein said touch panel is part of said display.

18. The system of claim 13, wherein said certain instruction is audio data retrieved via said microphone.

\* \* \* \* \*